United States Patent
Kim et al.

(10) Patent No.: US 8,959,546 B2
(45) Date of Patent: Feb. 17, 2015

(54) MULTI-FUNCTIONAL DISPLAY DEVICE HAVING AN ELECTRONIC PROGRAMMING GUIDE AND METHOD FOR CONTROLLING THE SAME

(75) Inventors: Uniyoung Kim, Seoul (KR);
Hyungnam Lee, Seoul (KR);
Samavarthy Challagali, Seoul (KR);
Bipin Therat Sethumadhavan, Seoul (KR); Kiran Patalappa, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/369,999

(22) Filed: Feb. 9, 2012

(65) Prior Publication Data
US 2012/0210355 A1    Aug. 16, 2012

Related U.S. Application Data

(60) Provisional application No. 61/441,632, filed on Feb. 10, 2011, provisional application No. 61/479,865, filed on Apr. 28, 2011.

(30) Foreign Application Priority Data

Aug. 29, 2011    (KR) ........................ 10-2011-0086691

(51) Int. Cl.
*H04N 5/445* (2011.01)
*H04N 21/4788* (2011.01)
*H04N 21/482* (2011.01)

(52) U.S. Cl.
CPC ....... *H04N 21/4788* (2013.01); *H04N 21/4821* (2013.01)
USPC ................... 725/38; 725/39; 725/51; 725/45; 725/46

(58) Field of Classification Search
USPC ..................................... 725/38–51
See application file for complete search history.

(56) References Cited

U.S. PATENT DOCUMENTS

| | | | |
|---|---|---|---|
| 6,144,376 A | 11/2000 | Connelly | 345/327 |
| 6,268,849 B1 | 7/2001 | Boyer et al. | 345/327 |
| 6,312,336 B1 | 11/2001 | Handelman et al. | 463/40 |
| 6,642,938 B1 | 11/2003 | Gilboy | 345/721 |
| 6,754,904 B1 | 6/2004 | Cooper et al. | 725/32 |

(Continued)

FOREIGN PATENT DOCUMENTS

| | | |
|---|---|---|
| CN | 101199204 | 6/2008 |
| CN | 101449582 | 6/2009 |

(Continued)

OTHER PUBLICATIONS

European Search Report dated Aug. 14, 2012.

(Continued)

*Primary Examiner* — Olugbenga Idowu
(74) *Attorney, Agent, or Firm* — Ked & Associates, LLP

(57) ABSTRACT

A multi-functional display device and a method for displaying an electronic programming guide (EPG) in the same are disclosed herein. The multi-functional display device may include a display for displaying broadcast programs or data, a network interface configured to receive event information associated with a social network service (SNS) account for an individual or entity, a storage device configured to store at least one channel number and at least one SNS account information assigned to the at least one channel number, and a controller for controlling the multi-functional display device. The controller may map the event information to one of the at least one channel numbers and may construct an EPG that includes the mapped event information and the corresponding channel number for display on the display.

8 Claims, 107 Drawing Sheets

(56) References Cited

U.S. PATENT DOCUMENTS

| | | | |
|---|---|---|---|
| 6,756,997 | B1 | 6/2004 | Ward et al. ............... 345/716 |
| 7,185,355 | B1* | 2/2007 | Ellis et al. ................. 725/46 |
| 8,448,206 | B2* | 5/2013 | Roberts et al. ............ 725/40 |
| 2002/0088004 | A1 | 7/2002 | Kitsukawa et al. ....... 725/113 |
| 2002/0104099 | A1 | 8/2002 | Novak ...................... 725/136 |
| 2002/0144289 | A1 | 10/2002 | Taguchi et al. ............ 725/112 |
| 2002/0188952 | A1 | 12/2002 | Istvan et al. |
| 2004/0123318 | A1 | 6/2004 | Lee et al. .................. 725/46 |
| 2006/0132595 | A1 | 6/2006 | Kenoyer et al. .......... 348/14.08 |
| 2007/0011702 | A1 | 1/2007 | Vaysman ................... 725/45 |
| 2007/0061842 | A1 | 3/2007 | Walter et al. .............. 725/48 |
| 2007/0182855 | A1 | 8/2007 | Nadarajah ................. 348/565 |
| 2008/0120668 | A1 | 5/2008 | Yau ........................... 725/110 |
| 2008/0134265 | A1 | 6/2008 | Tsubota et al. ............ 725/110 |
| 2008/0256085 | A1 | 10/2008 | Lee et al. ................... 707/10 |
| 2008/0271080 | A1* | 10/2008 | Gossweiler et al. ....... 725/47 |
| 2009/0113480 | A1 | 4/2009 | Allard et al. ............... 725/46 |
| 2009/0164559 | A1 | 6/2009 | Johnson et al. ............ 709/203 |
| 2010/0035640 | A1 | 2/2010 | Lew et al. .................. 455/466 |
| 2010/0037277 | A1 | 2/2010 | Flynn-Ripley et al. ... 725/110 |
| 2010/0175089 | A1 | 7/2010 | Seo et al. ................... 725/44 |
| 2010/0263010 | A1 | 10/2010 | Kim ........................... 725/110 |
| 2010/0319034 | A1 | 12/2010 | Mountain .................. 725/68 |
| 2011/0010431 | A1 | 1/2011 | Rooks et al. ............... 709/218 |
| 2011/0126258 | A1* | 5/2011 | Emerson et al. .......... 725/133 |
| 2012/0030587 | A1 | 2/2012 | Ketkar ....................... 715/751 |
| 2012/0036154 | A1 | 2/2012 | Vellaikal ................... 707/770 |
| 2012/0038550 | A1 | 2/2012 | Lemmey et al. ........... 345/156 |
| 2012/0131608 | A1* | 5/2012 | Byun et al. ................. 725/34 |
| 2012/0166964 | A1 | 6/2012 | Tseng ........................ 715/745 |
| 2013/0182071 | A1 | 7/2013 | Edwards .................... 348/43 |

FOREIGN PATENT DOCUMENTS

| | | |
|---|---|---|
| CN | 101523390 | 9/2009 |
| CN | 101715109 | 5/2010 |
| CN | 101771834 | 7/2010 |
| CN | 102656898 | 9/2012 |
| EP | 2 237 517 A1 | 10/2010 |
| WO | WO 01/41430 A1 | 6/2001 |
| WO | WO 2004/061637 | 7/2004 |
| WO | WO 2006/074304 A2 | 7/2006 |
| WO | WO 2010/103325 | 9/2010 |
| WO | WO 2011/046605 A1 | 4/2011 |

OTHER PUBLICATIONS

Jui-Hung Chang et al: "3PRS: a personalized popular program recommendation system for digital TV for P2P social network", Multimedia Tools and Applications, Kluwer Academic Publishers, BO, vol. 47, No. 1, Nov. 7, 2009, pp. 31-48, XP019773174, ISSN: 1573-7721 "The whole document".

Aguila, Nicolas: "Les meilleurs agrégateurs pour gérer tous ses réseaux sociaux: Facebook, Twitter et les autres," Aug. 15, 2010, XP055079851, Retrieved from the Internet: URL: http://web.archive.org/web/20100815053148/http://www.infos-du-net.com/actualite/photoreportages/240-facebook-twitter.html [retrieved on Sep. 18, 2013].

European Search Report issued in Application No. 12000571.5 dated Aug. 2, 2012.

European Search Report issued in Application No. 12000576.4 dated Aug. 17, 2012.

U.S. Office Action issued in U.S. Appl. No. 13/369,913 dated Dec. 19, 2012.

U.S. Office Action issued in U.S. Appl. No. 13/369,913 dated Jul. 10, 2013.

U.S. Office Action issued in U.S. Appl. No. 13/369,951 dated Jul. 11, 2013.

U.S. Office Action issued in U.S. Appl. No. 13/370,029 dated Jul. 26, 2013.

U.S. Office Action issued in U.S. Appl. No. 13/369,980 dated Sep. 26, 2013.

European Search Report issued in Application No. 12000571.5 dated Oct. 15, 2013.

European Search Report issued in Application No. 12000577.2 dated Oct. 17, 2013.

U.S. Office Action issued in U.S. Appl. No. 13/369,913 dated Oct. 31, 2013.

U.S. Office Action issued in U.S. Appl. No. 13/369,951 dated Dec. 2, 2013.

U.S. Office Action issued in U.S. Appl. No. 13/370,029 dated Dec. 30, 2013.

Chinese Office Action issued in related Application No. 201210030499.1 dated Feb. 7, 2014.

Chinese Office Action issued in related Application No. 201210030573.X dated Feb. 8, 2014.

Chinese Office Action issued in related Application No. 201210030470.3 dated Feb. 20, 2014.

U.S. Notice of Allowance issued in co-pending U.S. Appl. No. 13/369,980 dated Apr. 25, 2014.

European Search Report issued in related Application No. 12000572.3 dated Apr. 29, 2014.

U.S. Office Action issued in co-pending U.S. Appl. No. 13/370,029 dated May 19, 2014.

Chinese Office Action issued in Application No. 201210030606.0 dated Jan. 6, 2014.

U.S. Notice of Allowance issued in co-pending U.S. Appl. No. 13/369,913 dated Sep. 3, 2014.

* cited by examiner

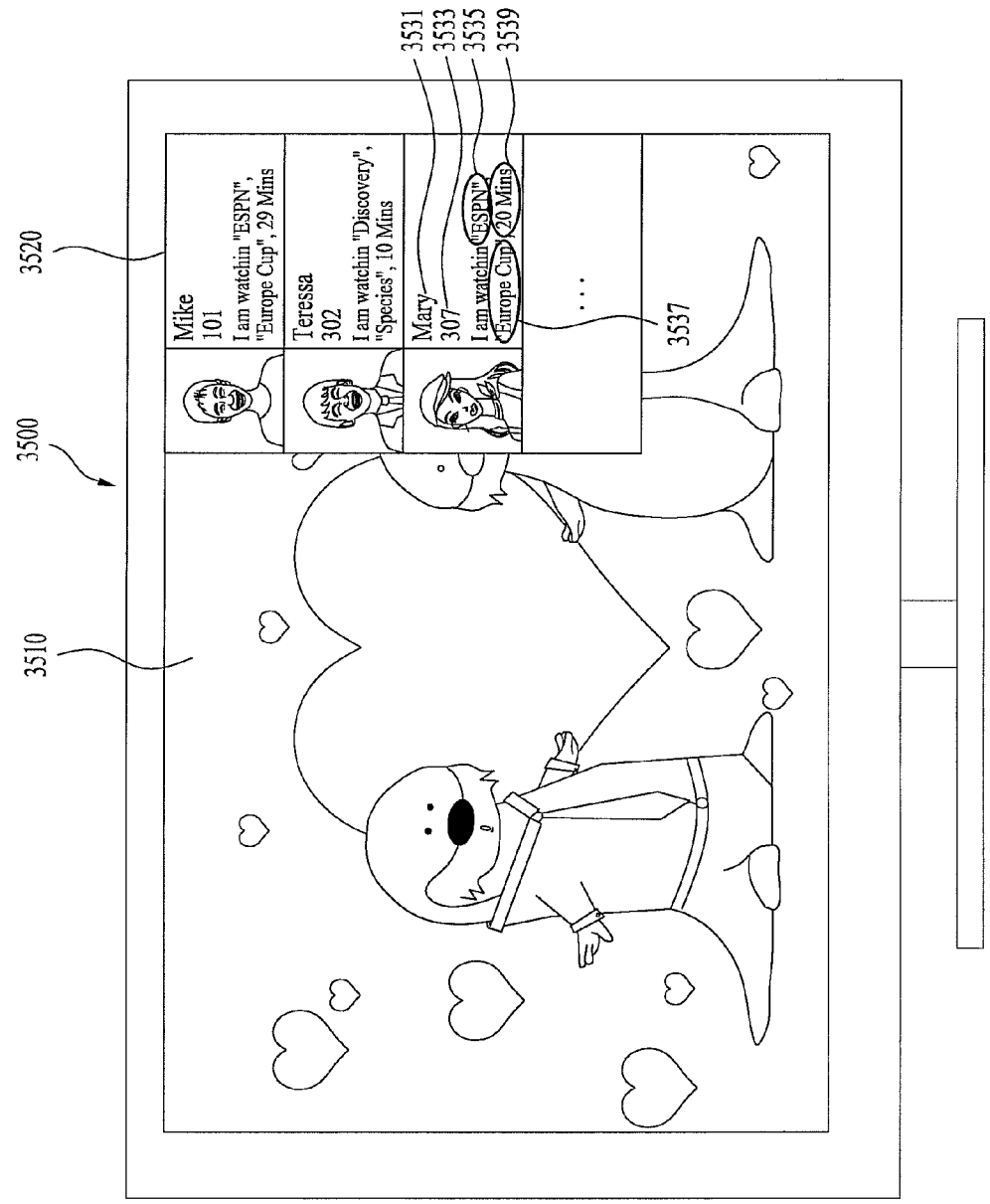

5410  5420  5430

FIG. 81A
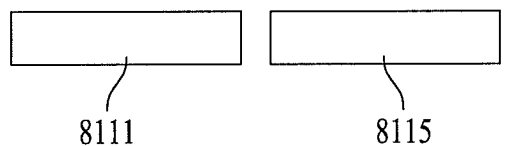
8111　　　　　　　8115
FIG. 81B
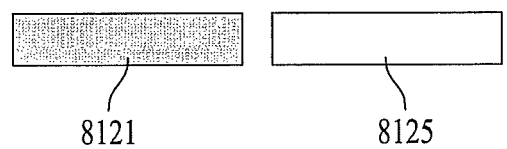
8121　　　　　　　8125

| 24 Mar' 11 | | | |
|---|---|---|---|
| Human | Channels | 24 Mar'11 | 30 Mar'11 |
| | 0<br>Mike | | |
| | 110<br>Miranda | | |
| 10341 | 116<br>Sweety | | |

MULTI-FUNCTIONAL DISPLAY DEVICE HAVING AN ELECTRONIC PROGRAMMING GUIDE AND METHOD FOR CONTROLLING THE SAME

CROSS-REFERENCE TO RELATED APPLICATION(S)

This application claims the benefit of the U.S. Provisional Application No. 61/441,632, filed on Feb. 10, 2011, the U.S. Provisional Application No. 61/479,865, filed on Apr. 28, 2011, the Korean Patent Application No. 10-2011-0086691, filed in Korea on Aug. 29, 2011, which is hereby incorporated by reference in its entirety.

BACKGROUND

1. Field

A multi-functional display device having an electronic programming guide and method for controlling the same are disclosed herein.

2. Background

Multi-functional display devices having electronic programming guides and methods for controlling the same are known. However they suffer from various disadvantages.

BRIEF DESCRIPTION OF THE DRAWINGS

The embodiments will be described in detail with reference to the following drawings in which like reference numerals refer to like elements wherein:

FIG. 35 is a diagram illustrating an exemplary embodiment of a broadcast screen on which a human channel map is displayed;

FIGS. 81A to 81D are a diagrams explaining a connection state of an owner of a human channel.

FIG. 103 is a diagram illustrating an embodiment of a screen in which channel numbers are selected on an electronic program guide in accordance with the present disclosure;

FIGS. 105 to 107 are diagrams illustrating an embodiment in which an electronic program guide in accordance with the present disclosure is dragged;

FIG. 108 is a diagram illustrating an embodiment of a screen on which a content list is displayed on an electronic program guide in accordance with the present disclosure;

FIG. 109 is a diagram illustrating an embodiment of a screen on which a preview of content selected from among the content list of FIG. 108 is displayed;

DETAILED DESCRIPTION

Figure 1:
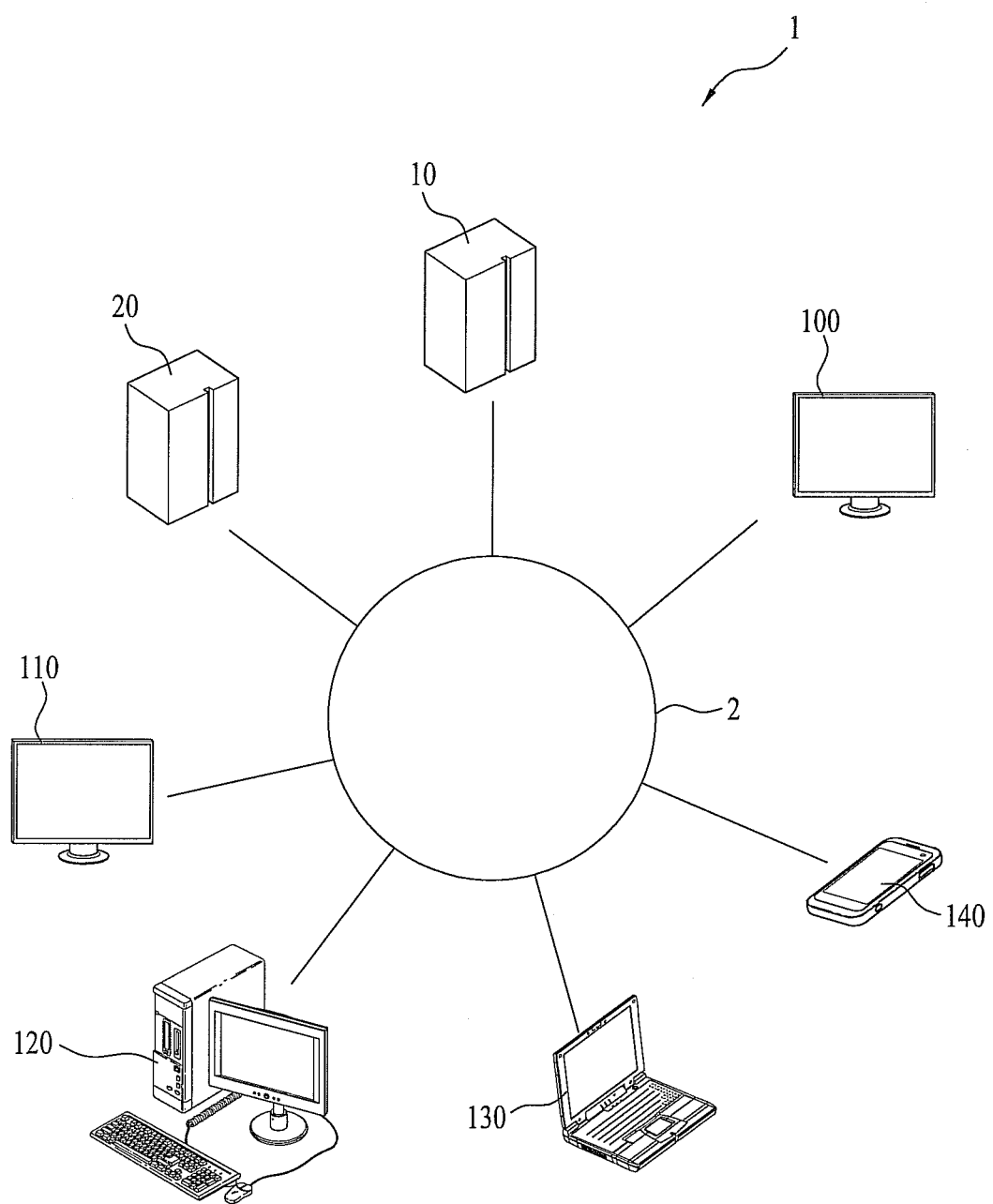
FIG. 1 is a schematic diagram illustrating a configuration of an exemplary embodiment for a broadcast system in accordance with the present invention.

An electronic device as disclosed herein may be a multi-functional display device. The multi-functional display device may be a television or a Smart TV that includes a broadcast receiver. The broadcast receiver may include, for example, a function for receiving and processing a broadcast image viewable by a user. The broadcast receiver may display a broadcast, which is selected by the user from among broadcast signals transmitted from a broadcast station, on a display. Broadcasts may be transitioned from analog broadcasting to digital broadcasting.

Digital broadcasting may refer to digital audio and video signal broadcast. Digital broadcasting has low data loss due to robustness against external noise, favorable error correction, high resolution, and high-definition screen as compared with analog broadcasting. In addition, digital broadcasting may provide a bidirectional service unlike analog broadcasting.

In addition to providing digital broadcasting, the broadcast receiver may provide a Social Network Service (SNS). SNS may refer to a service for establishing and maintaining online social networks among various individuals and may enable personal media and information sharing. Examples of SNS may include Twitter, MySpace, and facebook widely used in America as well as Cyworld and Me2 Day used in Korea, among others. SNS may be used for communication and information sharing among users. SNS assists users in making new connections or reinforcing existing connections with other users.

An electronic device as set forth herein is an intelligent electronic device equipped with a computer support function in addition to a broadcasting reception function, for example. Since an Internet function is added to a broadcasting reception function, the electronic device may have an interface which is more convenient than a hand-writing input device, a touch screen, a touch pad, or a remote controller. Further, because the electronic device supports wired or wireless Internet, the electronic device may include e-mail transmission/reception, Web browsing, banking, and gaming functions and the like when connected to the Internet or a computer. To implement these functions, the electronic device may operate based on a standard, general-purpose Operating System (OS).

Various applications may be freely added to or deleted from, for example, a general-purpose OS kernel of the electronic device according to the present disclosure. Therefore, the electronic device may perform a number of user-friendly functions. The electronic device may be a network TV, a Hybrid Broadcast Broadband TV (HBBTV), a smart TV, an Open Hybrid TV (OHTV), etc. and as occasion demands, is applicable to smart phones, Personal Computers (PC) and home appliances.

Embodiments of the present disclosure will be described in detail with reference to the attached drawings, but it should be understood that they are merely illustrative of the present disclosure and should not be interpreted as limiting the scope of the present disclosure.

In addition, although the terms used in the present disclosure are selected from generally known and used terms, some of the terms mentioned in the description of the present disclosure, the detailed meanings of which are described in relevant parts of the description herein, have been selected at the discretion of the applicant. Furthermore, the present disclosure must be understood, not simply by the actual terms used but by the meanings of each term lying within. Accordingly, the terms used herein should be understood not simply by the actual terms used but by the meaning lying within and the description disclosed herein.

FIG. 1 is a schematic diagram illustrating a configuration of an exemplary embodiment for a broadcast system in accordance with the present disclosure.

Referring to FIG. 1, the broadcast system 1 in accordance with the present disclosure may include a first server 10, a second server 20, a first digital TV 100, a second digital TV 110, a personal computer system 120, a notebook computer 130 and a mobile terminal 140. The first server 10, the second server 20, the first digital TV 100, the second digital TV 110, the personal computer system 120, the notebook computer 130 and the mobile terminal 140 may be connected to one another via a network 2. Broadcast system 1 may include other appropriate types of multi-functional display devices in addition to the examples as shown in FIG. 1.

The network 2 may include a backbone network and an access network. The backbone network may include an X.25 network, a frame relay network, an Asynchronous Transfer Mode (ATM) network, a Multi Protocol Label Switching (MPLS) network and a Generalized Multi Protocol Label Switching (GMPLS) network, alone or in combination. The access network may be a Fiber To The Home (FTTH) network, an Asymmetric Digital Subscriber Line (ADSL) network, a cable network, a wireless LAN (IEEE 802.11b, IEEE 802.11a, IEEE 802.11g, IEEE 802.11n) network, a Wireless Broadband (WIBro) network, a WiMax network and a High Speed Downlink Packet Access (HSDPA) network. In some embodiments, the network 2 may be an Internet network or mobile communication network.

The first server 10 may provide a service for connection between the first digital TV 100, the second digital TV 110, the personal computer system 120, the notebook computer 130 and the mobile terminal 140. The first server 10 may provide User Datagram Protocol (UDP) hole punching. In addition, the first server 10 may have a static IP address. The first digital TV 100, the second digital TV 110, the personal computer system 120, the notebook computer 130 and the mobile terminal 140 may be connected to the first server 10 using the static IP address.

The second server 20 may provide the first digital TV 100, the second digital TV 110, the personal computer system 120, the notebook computer 130 and the mobile terminal 140 with a human channel service. Here, a human channel refers to a communication channel for transmission of content provided by an individual. The human channel may refer to an identification sign for identification of the communication channel in terms of a user, and may refer to a communication channel corresponding to a channel number mapped to a human address in terms of a device, i.e. a communication channel accessible using the human address. As broadly described herein the human channel service may include, for example, a service to provide access to a Social Network Service (SNS) provided by an SNS service provider on a channel of a multi-functional display device (e.g., a social network channel service or SNS channel service). The human channel may be a particular channel on the multi-functional display device (e.g., digital TV) for accessing an SNS account for an individual or an entity. The human channel may also be referred to as a social network channel or SNS channel. A human channel may be associated with a channel number similar to a conventional broadcast channel on the multi-functional display device (e.g., digital TV), but unlike the broadcast channel, the human channel is also associated with a human address that identifies an SNS account.

The human address as broadly described herein refers to an identification character string for identification of a human or individual. The human address may also be referred to herein as an SNS identifier or a user identifier. The human address may correspond to a channel assigned to an individual, a group of individuals, or an entity and may be referred to as an SNS channel name. The human address may include at least one of an e-mail address, an account name, a family name and a Session Initiation Protocol-Uniform Resource Locator (SIP-URL), or another appropriate type of identifier or address. The human address may be an address or identifier given to a human or individual and is different from an address assigned to an electronic device. For example, the human address may include an SNS address for an individual or user (e.g., a social network address or SNS address). Moreover, the human address may include multiple SNS addresses for a particular user (e.g., a user's facebook and twitter accounts), or multiple SNS addresses for a group of users (e.g., dad's facebook account and mom's facebook account). As described above, the human channel service may refer to a service for providing a human channel of at least one individual. The second server 20 may be a conventional Social Network Service (SNS) server.

The first digital TV 100 and the second digital TV 110 may be a network TV, a smart TV, an HBBTV, a 3-dimensional (3D) TV, an OHTV, etc.

The personal computer system 120 may be a desktop, computer, a laptop computer, a tablet, a handheld computer, etc.

The mobile terminal 140 may be a cellular phone, a smart phone, a Digital Multimedia Broadcasting (DMB) terminal, a Personal Digital Assistant (PDA), a Portable Multimedia Player (PMP), a navigator, etc.

The first digital TV 100, the second digital TV 110, the personal computer system 120, the notebook computer 130 and the mobile terminal 140 may serve not only as a subject for providing the human channel service, but also as an object affected by the human channel service of the second server 20 or another first digital TV 100, second digital TV 110, personal computer system 120, notebook computer 130 and mobile terminal 140.

The first digital TV 100, the second digital TV 110, the personal computer system 120, the notebook computer 130 and the mobile terminal 140 may have a static IP address or a dynamic IP address, or may have a private IP address.

The first digital TV 100, the second digital TV 110, the personal computer system 120, the notebook computer 130 and the mobile terminal 140 may receive a dynamic IP address or a private IP address from the first server 10, if a device for providing a human channel has the dynamic IP address or the private IP address.

Alternatively, if the device has a static IP address, the user may input the static IP address to the first digital TV 100, the second digital TV 110, the personal computer system 120, the notebook computer 130 and the mobile terminal 140.

Figure 2:
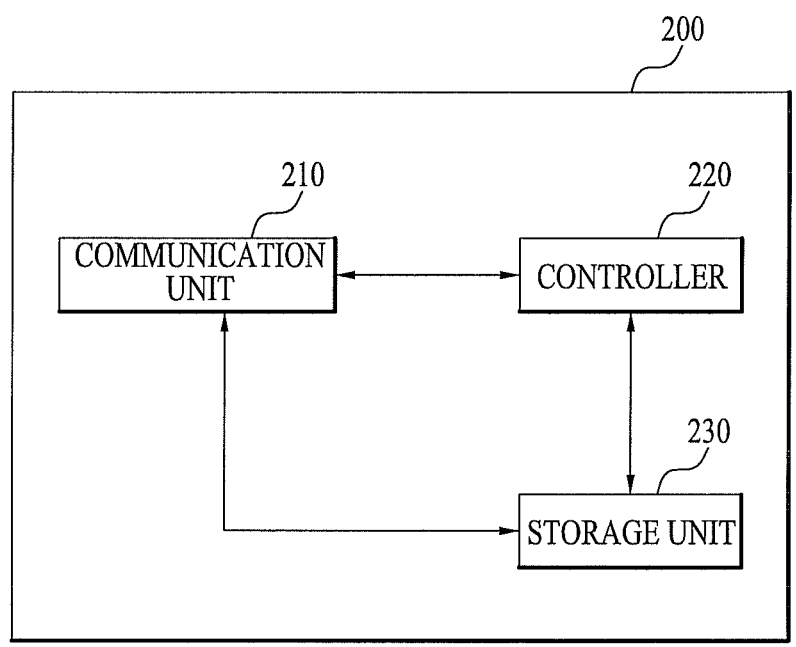
FIG. 2 is a block diagram illustrating a configuration of an exemplary embodiment for a server in accordance with the present invention.

FIG. 2 is a block diagram illustrating a configuration of an exemplary embodiment for a server in accordance with the present disclosure.

Referring to FIG. 2, a server 200 may function as the first server 10 or the second server 20, or may perform functions of both the first and second servers 10 and 20. The server 200 may include a communication unit 210, a controller 220 and a storage unit 230 (or storage device).

The communication unit 210 may receive packets transmitted through the network 2 and may transmit the packets to the first digital TV 100, the second digital TV 110, the personal computer system 120, the notebook computer 130 and the mobile terminal 140 through the network 2. The packets may be transmitted by a Session Initiation Protocol (SIP), User Datagram Protocol (UDP) and Transmission Control Protocol (TCP). The packets may include registration request signals, response signals, connection request signals, connection set-up signals, moving image streaming, Web pages and files.

The controller 220 may control transmission of the packets by the communication unit 210 based on at least one protocol of SIP, Simple Mail Transfer Protocol (SMTP), Hypertext Transfer Protocol (HTTP), File Transfer Protocol (FTP), Real-Time Streaming Protocol (RTSP) and Multi Media Streaming (MMS).

The controller 220 may control storing an address of an electronic device which transmits a registration request signal and a human address included in the registration request signal to the storage unit 230, in response to the received registration request signal. The address of the electronic device and the human address may be stored in association with each other. The controller 220 may extract the address of the electronic device from the registration request signal or from the packet including the registration request signal. The address of the electronic device may include at least one of a Media Access Control (MAC) address, an IP address, a port number, a Domain Name System (DNS) name and a URL. The IP address may include a static IP address, a dynamic IP address and a private IP address.

The controller 220 reads an address of an electronic device associated with a human address included in a connection request signal from the storage unit 230, in response to the received connection request signal. The controller 220 controls transmission of the read address of the electronic device to an electronic device which issues the connection request signal. Also, the controller 220 may control transmission of an address of the electronic device which issues the connection request signal to the electronic device, the address of which has been read.

The storage unit 230 may store the address of the electronic device address and the human address. The address of the electronic device address and the human address may be stored in association with each other.

Figure 3:
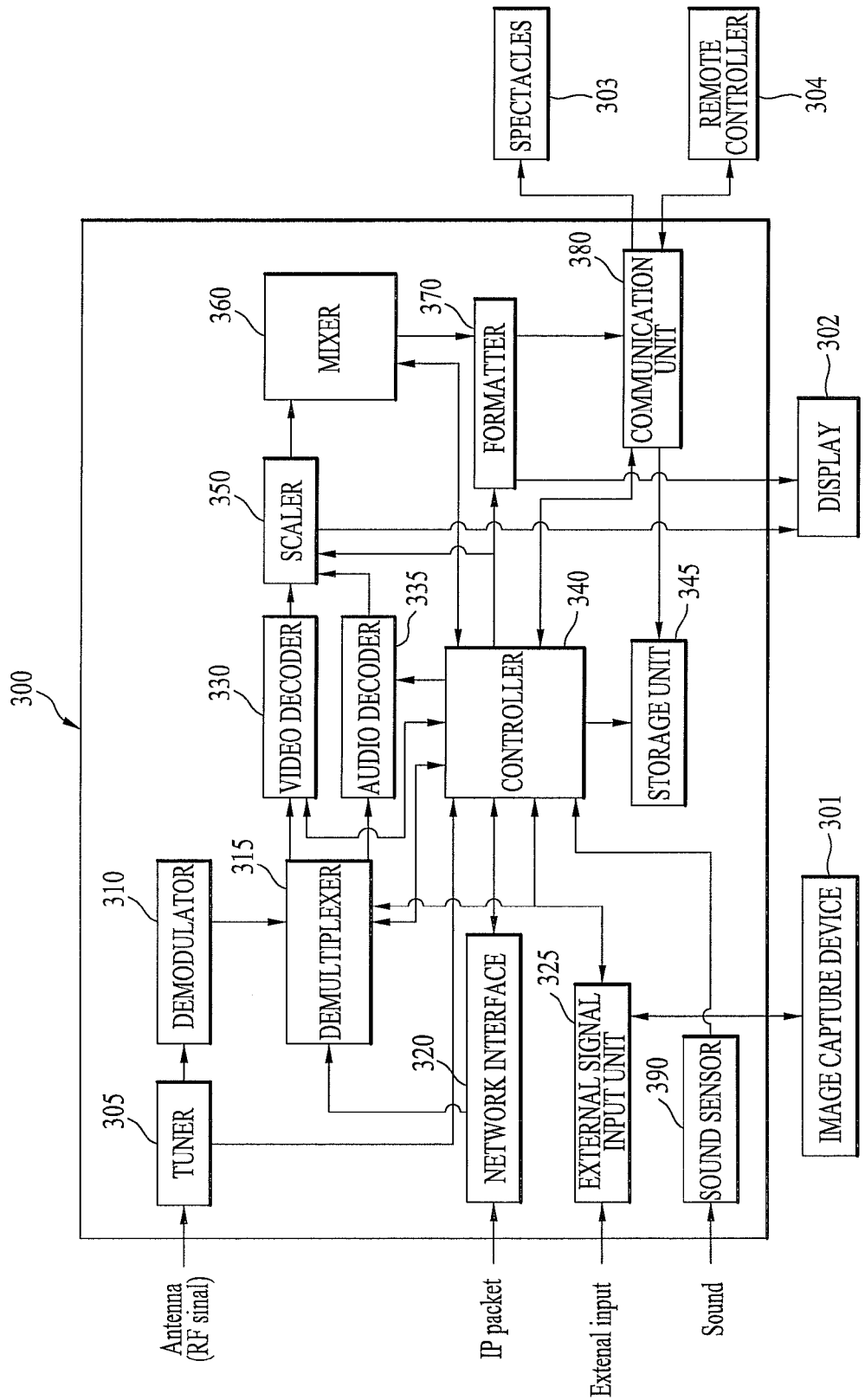
FIG. 3 is a block diagram illustrating a configuration of an exemplary embodiment for an electronic device in accordance with the present invention.

FIG. 3 is a block diagram illustrating a configuration of an exemplary embodiment for an electronic device in accordance with the present disclosure.

Referring to FIG. 3, the electronic device 300 may function as at least one of the first broadcast receiver 100, the second broadcast receiver 110, the personal computer system 120, the notebook computer 130 and the mobile terminal 140.

The electronic device 300 may include a tuner 305, a demodulator 310, a demultiplexer 315, a network interface 320, an external signal input unit 325, a video decoder 330, an audio decoder 335, a controller 340, a storage unit 345, a scaler 350, a mixer 360, a formatter 370, a communication unit 380 and a sound sensor 390. The electronic device 300 may further include an image capture device 301, a display 302, spectacles 303 and a remote controller 304.

The tuner 305 selects a Radio Frequency (RF) broadcast signal corresponding to a channel selected by the user from among RF broadcast signals transmitted through an antenna and converts the selected RF broadcast signal into an Intermediate Frequency (IF) signal or a base-band video or audio signal.

The demodulator 310 receives a Digital IF (DIF) signal converted by the tuner 305 and demodulates the DIF signal.

The demodulator 310 may also perform channel decoding. To this end, the demodulator 310 may include a Trellis decoder, a deinterleaver and a Reed Solomon decoder, to perform Trellis decoding, deinterleaving and Reed-Solomon decoding.

The demodulator 310 may output a Transport Stream (TS) signal after performing demodulation and channel decoding. An audio signal, a video signal or a data signal may be multiplexed in the TS signal.

The demultiplexer 315 may receive a stream signal from the demodulator 310, the network interface 320 and the external signal input unit 325. The demultiplexer 315 may demultiplex the received stream signal to a video signal, an audio signal and a data signal to output the demultiplexed signal to the video decoder 330, the audio decoder 335 and the controller 340.

The video decoder 330 receives a video signal from the demultiplexer 315 and restores the received video signal to output the restored video signal to the scaler 350. The video signal may include a 3D video signal.

The audio decoder 335 receives an audio signal from the demultiplexer 315 and restores the received audio signal to output the restored audio signal to the display 302 or the scaler 350.

The network interface 320 receives the packets from the network 2 and transmits the packets to the network 2. The network interface 320 may transmit a registration request signal and a connection request signal to the server 10 and may receive a response signal with respect to the transmitted registration request signal and connection request signal from the server 10. The registration request signal may include a human address, an address of the electronic device 300, an Identifier (ID) and a password. The connection request signal may include a human address.

The network interface 320 may receive content from the second server 20, the first digital TV 100, the second digital TV 110, the personal computer system 120, the notebook computer 130 and the mobile terminal 140 through the network 2. The content may include applications, moving image streams, moving image files, music files and picture files. The content may be provided through a particular human channel.

The network interface 320 may also receive an IP packet for transmission of broadcast data from a service provider through the network 2. The broadcast data may be real-time broadcast service data and Internet service data.

If the IP packet includes a stream signal, the network interface 320 may extract the stream signal from the IP packet to output the stream signal to the demultiplexer 315. The stream signal may be transmitted from the second server 20, the first digital TV 100, the second digital TV 110, the personal computer system 120, the notebook computer 130 and the mobile terminal 140. The stream signal may be provided through a particular human channel.

The network interface 320 may output the received signal and content to the controller 340.

The external signal input unit 325 may provide a user interface and an interface capable of connecting an external device and the electronic device 300 to each other. The external device may be a variety of types of video or audio output devices, such as a Digital Versatile Disk (DVD) player, a Blu-ray player, a gaming device, a camcorder and a computer (e.g., a notebook computer). The electronic device 300 may display video and audio signals transmitted from the external signal input unit 325 and may store or use data signals.

The external device may be the image capture device 301. The image capture device 301 may include a plurality of cameras. The image capture device 301 may capture an image of a human. In one example, the image capture device 301 may recognize, focus on, and capture a human hand shape by zooming in. Here, the captured hand shape may be recognized as a spatial gesture. More specifically, the controller 340 may recognize the captured hand shape as a spatial gesture and may execute commands for performing operations associated with the recognized spatial gesture. The spatial gesture may be defined as a gesture recognized from a video frame or an image which is mapped to one or more particular computing operations and is transmitted from the image capture device 301.

In some embodiments, the electronic device 300 may include the image capture device 301.

The external signal input unit 325 may be a touch pad or a touch screen. The touch screen may be integrally formed with the display 302, or may be a separate element. If the touch screen is integrally formed with the display 302, the display 302 may be called a touch screen display. The touch screen is arranged at the front of the display 302, which allows the user to directly operate a Graphical User Interface (GUI) displayed on a screen. For example, the user may place his or her finger on an object to be controlled.

With regard to the touch pad, the touch pad is separately put on a different plane from the display 302. For example, the display unit 302 is generally located on a vertical plane and the touch pad is generally located on a horizontal plane. Thus, the touch pad is less intuitive and therefore, is difficult to use as compared with the touch screen.

The touch pad and the touch screen may be a multi-point input device.

The controller 340 may recognize a touch gesture applied to the external signal input unit 325 and may control the electronic device 300 based on the touch gesture. The touch gesture may be defined as a stylized interaction with the external signal input unit 325, mapped to one or more particular computing operations. The touch gesture may be implemented through hand, more particularly, finger movement. Alternatively or additionally, the touch gesture may be implemented through a stylus. A subject implementing the touch gesture, such as a finger or a stylus, is called an object.

The external signal input unit 325 receives the touch gesture, and the controller 340 executes commands for performing operations associated with the touch gesture. The storage unit 345 may include a gesture operating program which may be a part of an operating system or an additional application. The gesture operating program includes a series of commands for recognizing the occurrence of a gesture (e.g., a touch gesture or a spatial gesture) and informing one or more software agents of the gesture and/or which actions should be taken in response to the gesture.

When the user performs one or more gestures, the external signal input unit 325 transmits gesture information to the controller 340. The controller 340 analyzes the touch gesture using commands from the storage unit 345, more particularly, using the gesture operating program and then, controls different constituent elements of the electronic device 300, such as the display 302, the demultiplexer 315, the network interface 320, the external signal input unit 325, the storage unit 345, the scaler 350, the mixer 360, the formatter 370 and the sound sensor 390. The gesture may be identified as commands for performing operations of applications stored in the storage unit 345, for correcting a GUI object represented on the display 302 and data stored in the storage unit 345 and for performing operations in the multiplexer 315, the network interface 320, the scaler 350, the mixer 360 and the formatter 370. In one example, these commands may be associated with zooming-in, panning, scrolling, page-eject, rotation, scaling, video channel switch, content reception, Internet connection and the like.

In another example, the commands may be associated with designating a channel number, designating a human address, selecting a displayed object, dragging a displayed object, dropping a displayed object, switching a channel, displaying a channel map, switching a displayed channel map, transmitting a channel viewing request signal, booting a particular program, requesting a particular GUI, opening a file or a document, looking at a menu, selecting a menu, executing a command, log-in to an Internet site, allowing an authorized person to access a limited system region, loading a user profile associated with a user preference arrangement on the desktop, and/or the like. The displayed object may include images, channels listed in a channel map, selected regions on a GUI, menu items and displayed content.

A wide range of different touch gestures may be used. For example, touch gestures may include a single-point or multi-point gesture, a static or dynamic gesture, a continuous or segmented gesture, and/or the like. The single point gesture may be performed through a single contact point. For example, the single-point gesture is performed by a single touch using a single finger, palm or stylus. The multi-point gesture may be performed through a plurality of points. For example, the multi-point gesture is performed by multiple touches using plural fingers, a finger and a palm, a finger and a stylus, plural styluses and/or combinations thereof. The static gesture does not contain movement, and the dynamic gesture contains movement. The continuous gesture is performed by a single stroke and the segmented gesture is performed by a sequence of separate steps or strokes.

Contact between the object and the touch screen conventionally has various different patterns. For example, the single-point gesture on the touch screen includes a down event and a subsequent up event, the down event and the up event occurring at the same or almost the same position. The dynamic gesture on the touch screen includes a down event, at least one dragging event subsequent to the down event, and other following events.

In some embodiments, parameters are used to describe a process in which a finger accesses, comes into contact with and moves away from a touch screen display. These parameters may be a mathematical function of at least one of a distance between the finger and the touch screen display, pressure applied to the touch screen display by the finger, a contact area between the finger and the touch screen display, a voltage between the finger and the touch screen, a capacitance between the finger and the touch screen display or other physical parameters.

In some embodiments, according to the magnitude of each parameter (e.g., capacitance) between the finger and the touch screen display, a down event occurs when the parameter exceeds a predetermined threshold value, a dragging event occurs when a position of a cursor corresponding to the finger is moved from position A to position B while the parameter exceeds the predetermined threshold voltage, and an up event occurs when the parameter falls below the threshold level.

The controller 340 executes a command and performs an operation associated with the electronic device 300. For example, the controller 340 may control data reception and processing and input and output of signals between constituent elements of the electronic device 300 using commands found in the storage unit 345. The controller 340 may be implemented as a single chip, a plurality of chips, or a plurality of electric components. For example, a variety of architectures including a dedicated or embedded processor, a single purpose processor, a controller, an Application Specific Integrated Circuit (ASIC), etc. may be used as the controller 340. The controller 340 may include at least one processor.

The controller 340 may detect a user action and may control the electronic device 300 based on the detected user action. The user action may include selecting a physical button of a display appliance or a remote controller, executing a prescribed touch gesture or selecting a soft button on a touch screen display, executing a prescribed spatial gesture recognized from an image captured through an image capture device, and producing prescribed sound by recognizing sound received by the sound sensor 390. The controller 340 may analyze a user action as at least one executable command. The controller 340 may control constituent elements of the electronic device 300 in response to the at least one analyzed command. That is, the controller 340 may control data reception and processing and input and output of signals between constituent elements of the electronic device 300 using the at least one command.

The controller 340 may detect a user action for requesting a GUI for designation of a human address and may control displaying the GUI for designation of the human address in response to the detected user action. The controller 340 may detect a user action for designating a human address and may control displaying a GUI for designation of a channel number in response to the detected user action. The controller 340 may detect a user action for designating a channel number and may store the designated channel number, the designated human address and information associating the designed channel number and human address with each other to a human channel map, in response to the detected user action. The human channel map as broadly described herein may be a channel map that correlates a channel with a human address (or SNS identifier). The human channel map may also be referred to herein as a social network channel map, SNS channel map, or SNS channel listing, and may be displayed in a similar manner and format as a broadcast channel map (e.g., broadcast channel listing).

The controller 340 may detect a user action for designating a channel number, may read a human address associated with the designated channel number from the human channel map in response to the detected user action, and may control acquiring an address of an electronic device to access, based on the read human address. In some embodiments, the controller 340 may read the address of the electronic device based on the human address from the storage unit 345. In some embodiments, the controller 340 may control transmitting a connection request signal including the read human address to the server 10 and may acquire the address of the electronic device to access from the server 10.

The controller 340 may control transmitting a registration request signal to the server 10 upon booting or when a user action for requesting server registration is detected. The registration request signal may include an address of an electronic device, a human address, an ID and a password.

The controller 340 may control transmitting a connection set-up signal to another electronic device. The connection set-up signal may include a human address. When the controller 340 receives a connection set-up signal from another electronic device, the controller 340 may initialize connection with the electronic device which transmits the connection set-up signal, in response to the received connection set-up signal, and may transmit a response signal to the electronic device. During initialization, the controller 340 may open a particular port based on information included in the connection set-up signal and may transmit a response signal including a port number of the port.

If the controller 340 receives the response signal with respect to the connection set-up signal from the electronic device, the controller 340 may confirm whether or not the response signal includes a particular port number. If the response signal includes the particular port number, the controller 340 may receive and transmit data from and to the electronic device through a port corresponding to the particular port number. In one example, the particular port number may correspond to a port for providing a human channel. In this case, the electronic device 300 may receive content of a human channel through the port.

The controller 340 may control routing a packet transmitted to the network interface 320 using at least one of an IP address or a port number included in the packet. That is, the controller 340 may control outputting a packet having a particular port to the demultiplexer 315 and may control storing the packet in the storage unit 345.

The controller 340 may extract data included in the packet and may perform routing of the extracted data using at least one of the IP address or the port number included in the packet. That is, the controller 340 may control outputting the packet having the particular port to the demultiplexer 315 and may control storing the packet in the storage unit 345. The controller 340 may directly process the data included in the packet and may control displaying the processed result on a screen.

The controller 340 executes a computer code together with an Operating System (OS) and generates and uses data. The OS is generally known and therefore a detailed description thereof is omitted. An example of the OS may include Windows OS, Unix, Linux, Palm OS, DOS, Android, and Mac OS. The OS, other computer codes and data may be present within the storage unit 345 which is linked to and operated by the controller 340.

The storage unit 345 generally stores program codes and data used by the electronic device 300. For example, the storage unit 345 may be implemented as a Read-Only Memory (ROM), a Random Access Memory (RAM), a hard disk drive, etc. The program codes and data may be stored in a separable storage medium and, if necessary, may be loaded or installed onto the electronic device 300. The separable storage medium may include a CD-ROM, a PC card, a memory card, a floppy disk, a magnetic tape and a network component.

The storage unit 345 may store a human channel map. The storage unit 345 may also catch port numbers and addresses of other electronic devices connected to the electronic device 300. The port numbers and addresses of the electronic devices may be stored in association with human addresses. If a human channel associated with a particular human address is redisplayed, the controller 340 may read a port number and address of an electronic device associated with the particular human address from among the caught port numbers and addresses of the electronic devices and may receive content of the human channel using the read port number and address of the electronic device.

The scaler 350 performs scaling of signals processed in the video decoder 330 and the audio decoder 335, so as to provide the signals with a magnitude suitable to be output through the display 302 or a speaker (not shown).

The scaler 350 adjusts and outputs combinations of at least two of a GUI, a video signal and an aspect ratio of a 3D image, according to the kind of content to be displayed or user set-up conditions. An aspect ratio value may be 21:9, 16:9, 4:3 or 3:2. The scaler 350 may perform scaling such that a ratio of a horizontal screen length to a vertical screen length has a particular value.

The mixer 360 mixes outputs of the scaler 350 and the controller 340.

The formatter 370 changes the format of audio and video signals output from the mixer 360 to suit the display 302. The formatter 370 passes input signals without implementing a format change function when a 2D image is displayed. When a 3D image is displayed, the formatter 370 may serve as a 3D formatter for processing a signal into a 3D video signal based on the format of a 3D image and the output frequency of the display 302 under control of the controller 340.

The formatter 370 may output the resultant 3D video signal to form a 3D image to the display 302 and may produce a Sync signal relating to the 3D video signal to output the sync signal to the communication unit 380. The sync signal is a signal for synchronizing display times of left eye viewpoint video data and right eye viewpoint video data and opening/closing times of a left eye lens and a right eye lens of the shutter spectacles 303.

The communication unit 380 is a communication module for providing omni-directional (or non-directional) communication and performs wireless communication with other communication appliances based on predetermined communication standards. The communication standards may be Zigbee, Bluetooth, Ultra WideBand (UWB), Radio Frequency Identification (RFID) and wireless Lan. The communication appliances may be the electronic device 300, the spectacles 303 and the remote controller 304.

The communication unit 380 may include an infrared receiver capable of receiving infrared light from the remote controller 304.

The sound sensor 390 may receive sound and output the received sound to the controller 340. The controller 340 may recognize sound output from the sound sensor 390 and may control the electronic device 300 based on the recognized sound.

Figure 4:
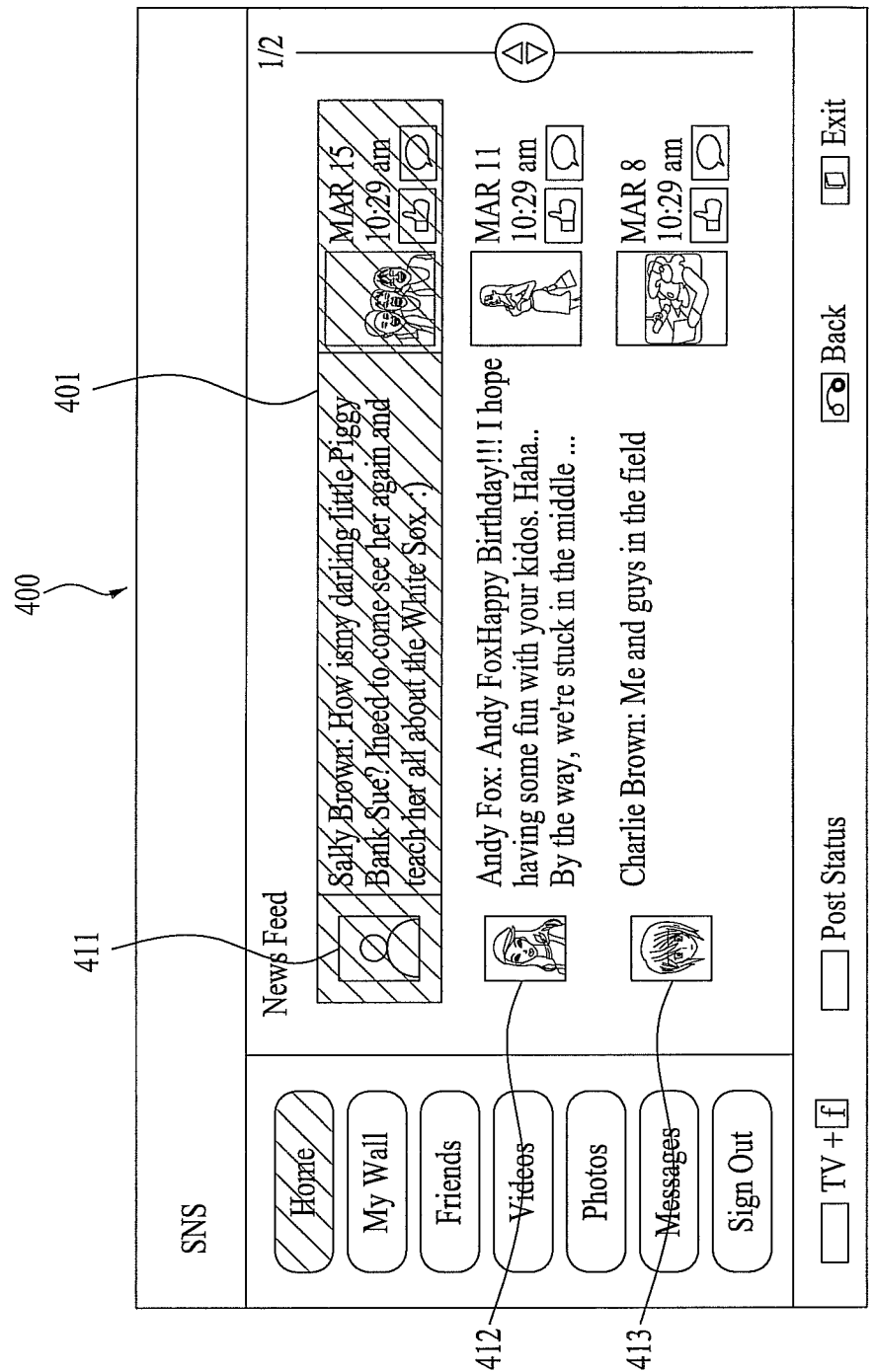
FIG. 4 is a diagram illustrating an exemplary embodiment of a screen on which a Web page of a Social Network Service (SNS) is displayed.

FIG. 4 is a diagram illustrating an exemplary embodiment of a screen on which a Web page of a Social Network Service (SNS) is displayed.

Referring to FIG. 4, the display 302 may display a Web page 400 of the server 200. The network interface 320 may receive the Web page 400 from the server 200, the controller 340 may produce video image data of the Web page 400 to enable displaying the received Web page 400, and the scaler 350 may adjust a resolution of the produced video image data. The display 302 may display the video image data 400, the resolution of which has been adjusted by the scaler 350.

The Web page 400 may list one or more human addresses 411, 412 and 413. The human address 411 represents 'Sally Brown', the human address 412 represents 'Andy Fox', and the human address 413 represents 'Charlie Brown'. The listed human addresses 411, 412 and 413 are selectable by an indicator 401.

In some embodiments, an indicator 401 may be provided to highlight one of the human addresses 411, 412 and 413, and/or a corresponding item (e.g., news feed). Once highlighted, the address or item may be selected to perform a prescribed process, for example, for designating the corresponding human address. The selection may be made through a remote controller by pressing a particular button (for example, an 'OK' button) or by performing a spatial gesture corresponding to a selection. The selection may be made by other methods, such as a touch input.

Figure 5:
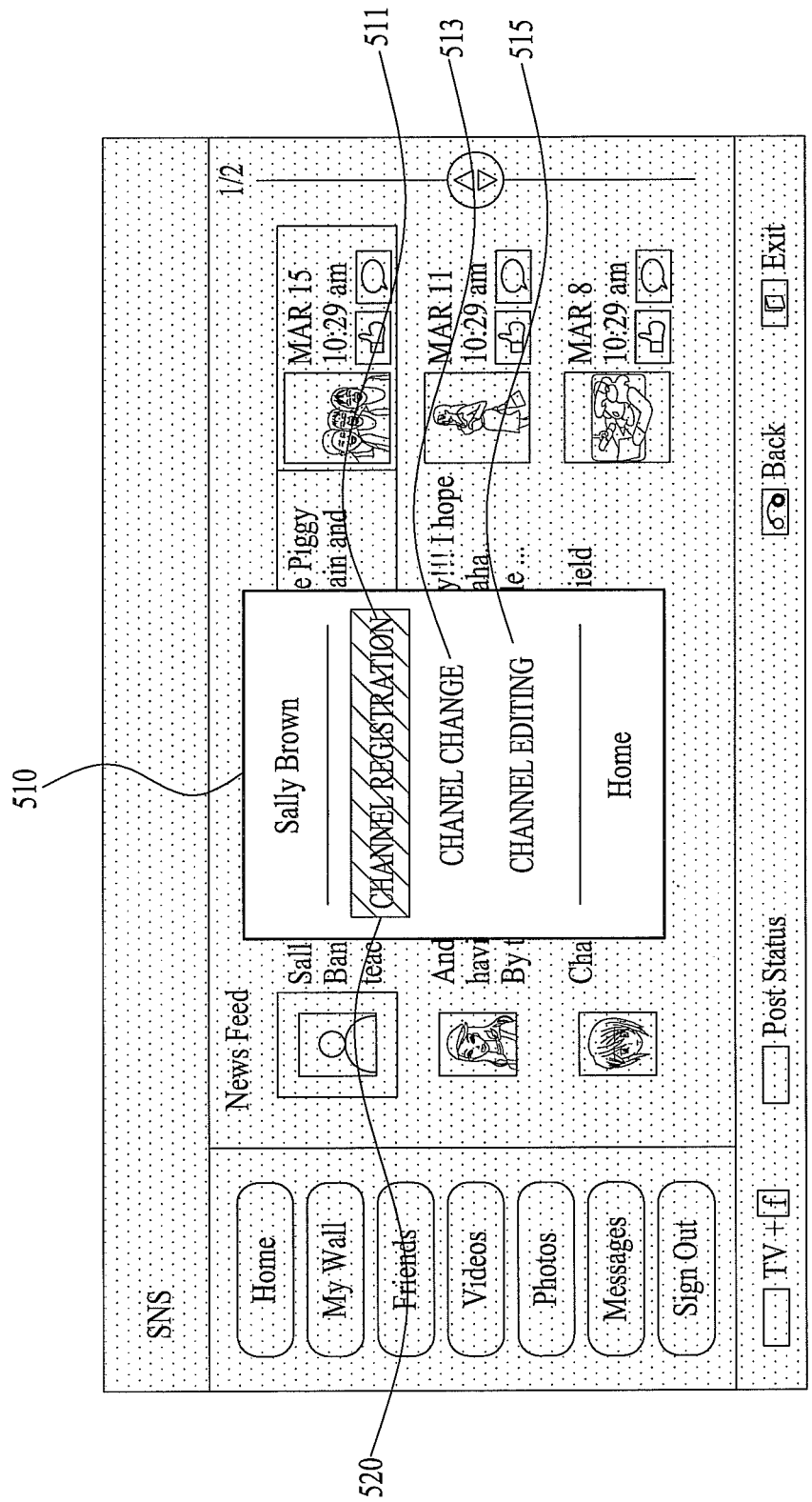
FIG. 5 is a diagram illustrating a screen on which an exemplary embodiment of a Graphical User Interface (GUI) for designation of a human address is displayed.

FIG. 5 is a diagram illustrating a screen on which an exemplary embodiment of a GUI for designation of a human address is displayed.

Referring to FIG. 5, if the electronic device 300 detects a user action for designating a human address, the electronic device 300 may display a GUI 510 in response to the detected user action. The GUI 510 may be a pop-up window.

The GUI 510 may include a menu item 511 for channel registration, a menu item 513 for channel switch, and a menu item 515 for channel editing. The menu items 511, 513 and 515 are selectable by an indicator 520.

If the electronic device 300 detects a user action for selecting the menu item 511, the electronic device 300 may display a GUI for designation of a channel number in response to the detected user action.

If the electronic device 300 detects a user action for selecting the menu item 513, the electronic device 300 may display a GUI for switching a channel number in response to the detected user action.

Also, if the electronic device 300 detects a user action for selecting the menu item 515, the electronic device 300 may display a GUI for editing a channel number in response to the detected user action.

Figure 6:
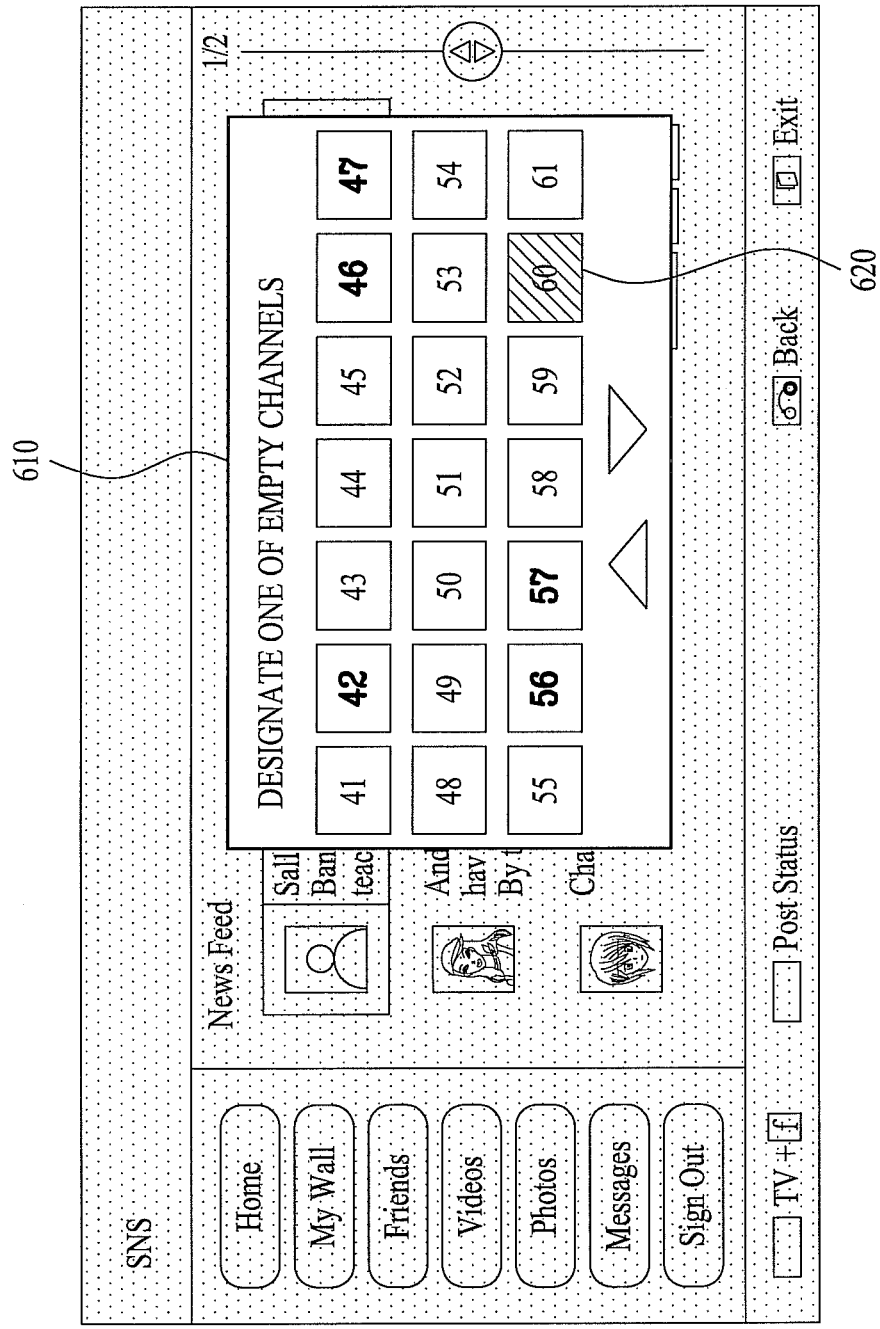
FIG. 6 is a diagram illustrating a screen on which an exemplary embodiment of a GUI for designation of a channel number is displayed.

FIG. 6 is a diagram illustrating a screen on which an exemplary embodiment of a GUI for designation of a channel number is displayed.

Referring to FIG. 6, if the electronic device 300 detects a user action for designating a human address, the electronic device 300 may display a GUI 610 in response to the detected user action. Also, if the electronic device 300 detects a user action for selecting the menu item 511, the electronic device 300 may display the GUI 610 in response to the detected user action.

The GUI 610 lists channel numbers from 41 to 61. The channel numbers from 41 to 61 are selectable by an indicator 620. The GUI 610 may display the channel numbers in such a manner that a channel number to which a human address has been assigned is discriminated from an empty channel number. In the drawing, the channel numbers '41', '43' to '45', '48' to '55', '58', '59' and '61' are channel numbers to which human addresses have been assigned, and the other channel numbers '42', '46', '47', '56', '57' and '60' may be empty channel numbers and distinguished by a bold font. The controller 340 may confirm the channel numbers and whether or not human addresses have been assigned to the channel numbers using a human channel map stored in the storage unit 345 and may produce the GUI 610 based on the confirmed results.

The channel numbers listed in the GUI 610 may be channel numbers to which human addresses have been assigned, or may be channel numbers to which channels are not assigned.

In some embodiments, a channel number to which a channel is not assigned may be a channel number which does not belong to any one of a sky wave broadcast channel, a cable channel, an IPTV channel or a satellite channel. Thus, the electronic device 300 may simultaneously perform browsing of a human channel and one of a sky wave broadcast channel, a cable channel, an IPTV channel or a satellite channel.

In some embodiments, a channel number to which a channel is not assigned may be a channel number which belongs to some kinds of channels including a broadcast channel and an App channel, but does not belong to a human channel.

Figure 7:
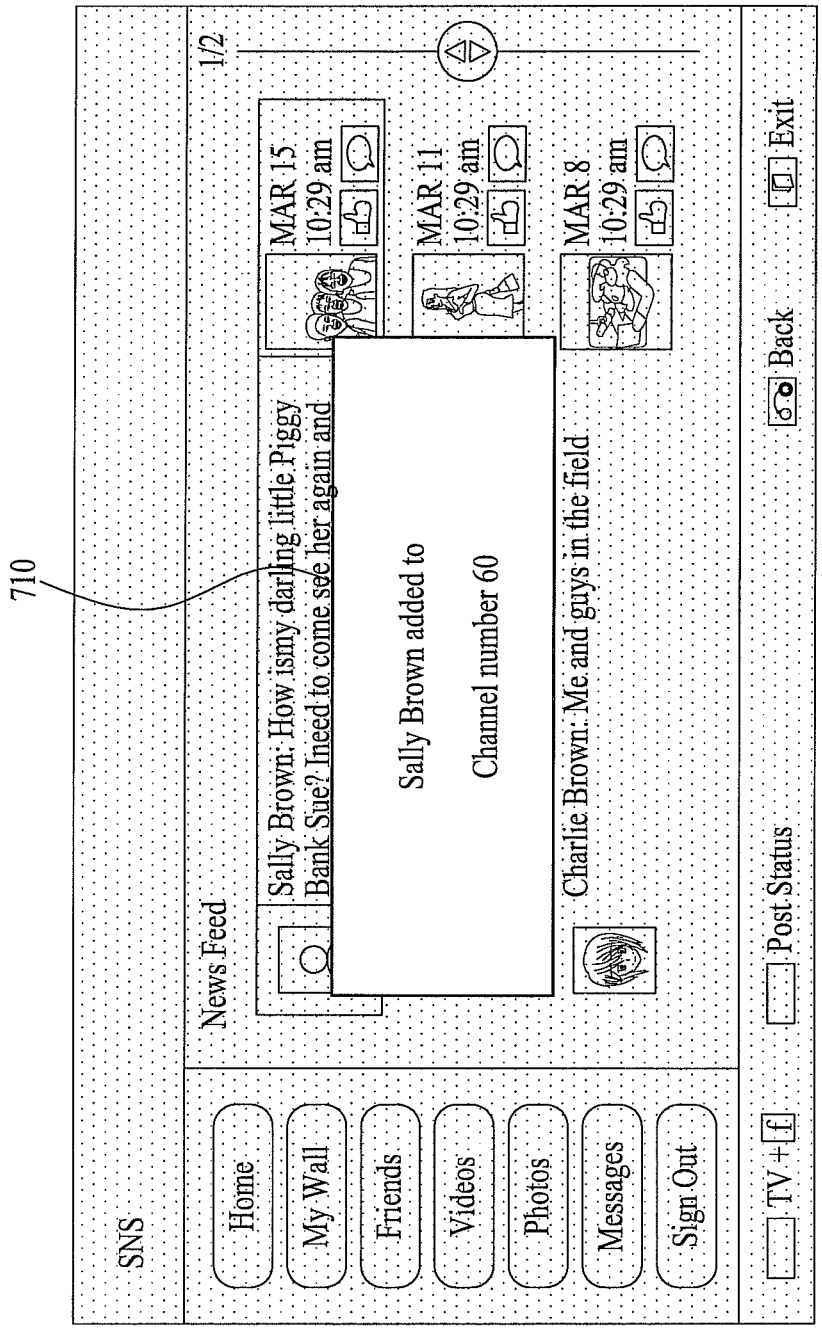
FIG. 7 is a diagram illustrating one example of a screen on which the result of assigning a human address to a channel number is displayed.

FIG. 7 is a diagram illustrating one example of a screen on which the result of assigning a human address to a channel number is displayed.

Referring to FIG. 7, if the user performs a user action for issuing a selection order to the indicator 620 in a state in which the indicator 620 is located at one of the channel numbers from 41 to 61 listed in the GUI 610, the electronic device 300 may detect a user action for designating a channel number and may display a message 710 in response to the detected user action. The message 710 may indicate that the designated channel number is assigned to the designated human address. For example, the message 710 indicates that the channel number '60' is assigned to 'Sally Brown'.

The electronic device 300 may store the human address 'Sally Brown', the channel number '60' and information associating the human address 'Sally Brown' and the channel number '60' with each other in a human channel map, in response to the detected user action.

Figure 8:
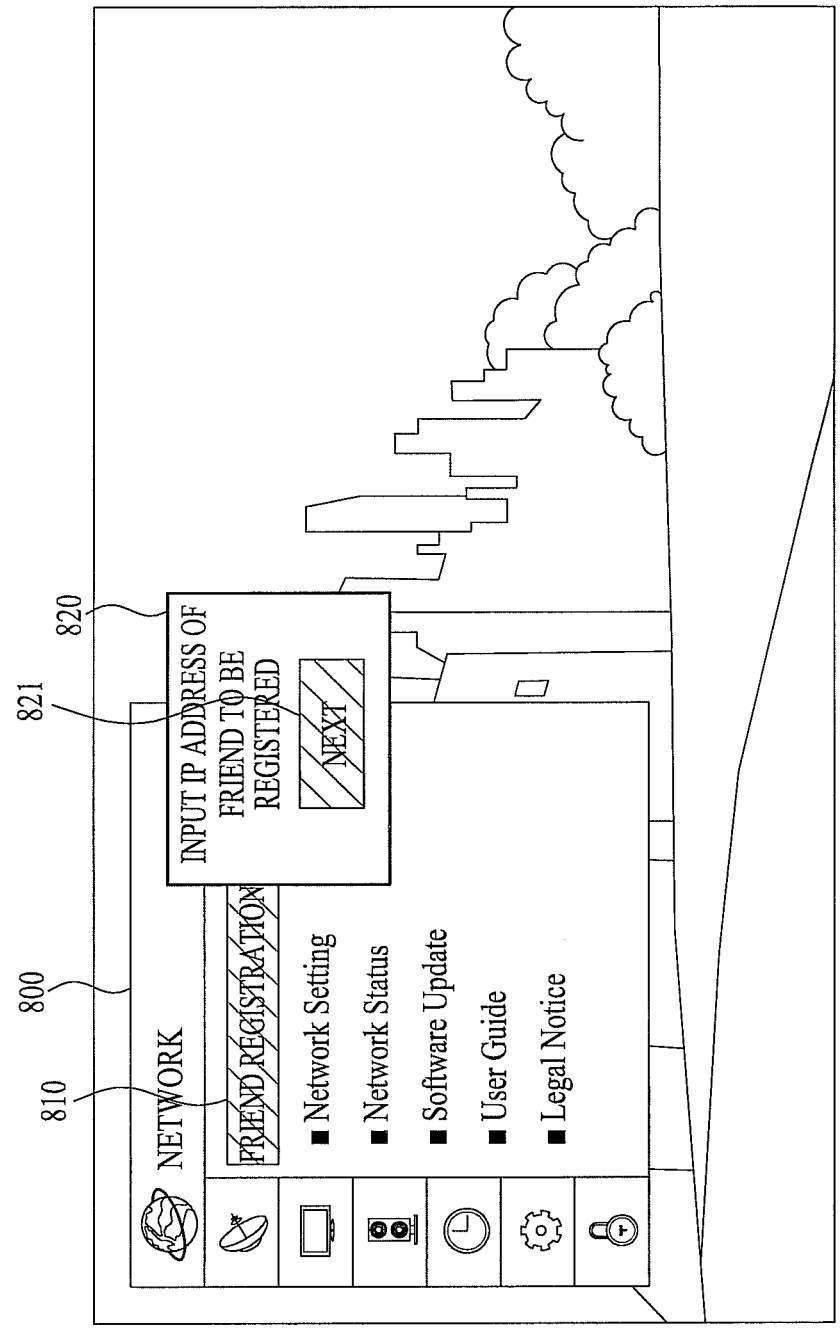
FIG. 8 is a diagram illustrating an exemplary embodiment of a screen on which a menu is displayed.

FIG. 8 is a diagram illustrating an exemplary embodiment of a screen on which a menu is displayed.

Referring to FIG. 8, the electronic device 300 may display a menu 800 including a menu item 810 for requesting displaying a GUI for designation of a human address.

If the user performs a user action for selecting the menu item 810, the electronic device 300 may detect the user action for selecting the menu item 810 and may display a message 820 in response to the detected user action.

Figure 9:
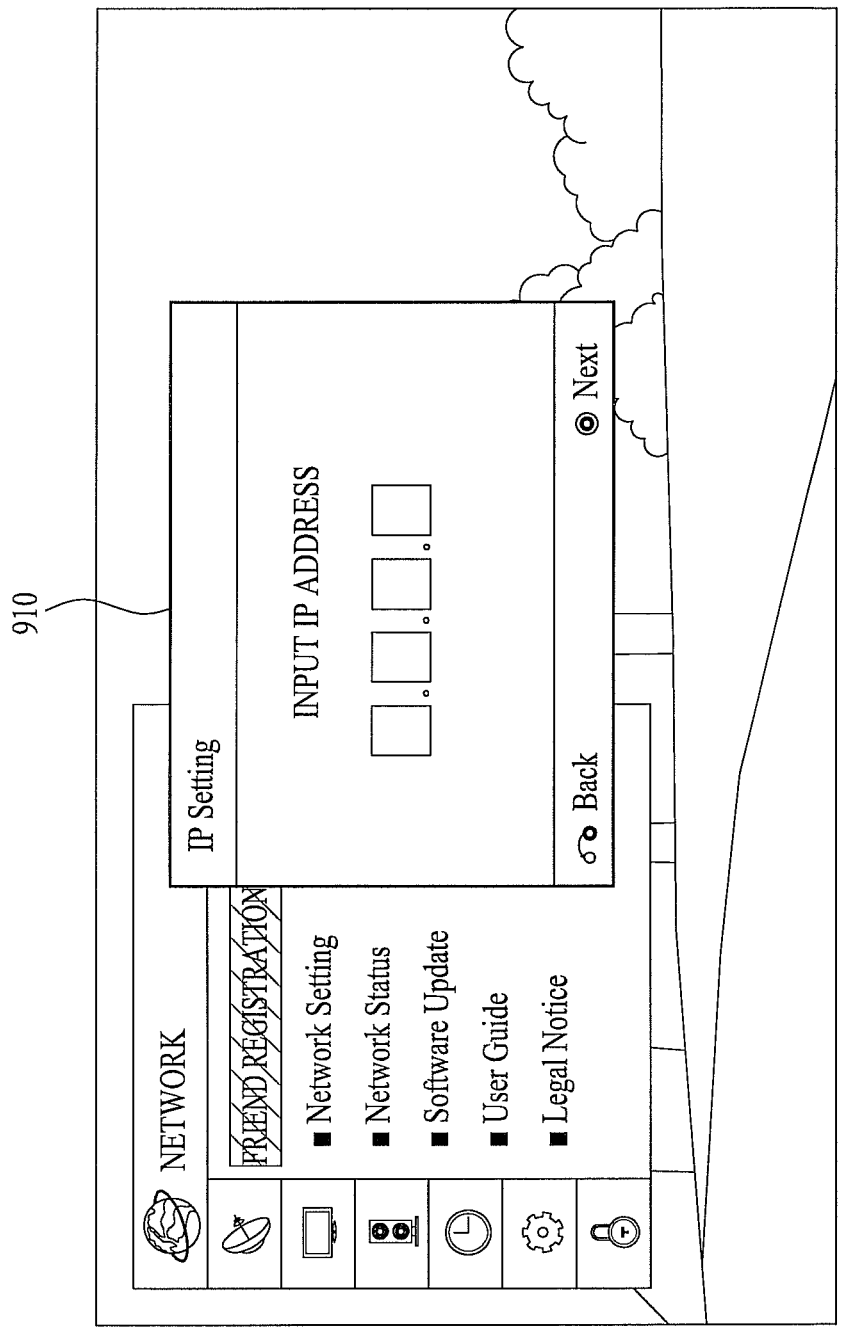
FIG. 9 is a diagram illustrating a screen on which another exemplary embodiment of a GUI for designation of a human address is displayed.

FIG. 9 is a diagram illustrating a screen on which another exemplary embodiment of a GUI for designation of a human address is displayed.

Referring to FIG. 9, if the user performs a user action for selecting a button 821, the electronic device 300 may detect the user action for selecting the button 821 and may display a GUI 910 in response to the detected user action. In another embodiment, if the user performs a user action for selecting the menu item 810, the electronic device 300 may detect the user action for selecting the menu item 810 and display the GUI 910 in response to the detected user action.

The user may input an IP address to the GUI 910. After the user completes the user action for inputting the IP address, the electronic device 300 may detect the user action and may display the GUI 610 in response to the detected user action.

If the user performs a user action for issuing a selection order to the indicator 620 in a state in which the indicator 620 is located at one of the channel numbers from 41 to 61 listed in the GUI 610, the electronic device 300 may detect the user action for designating a channel number and may display a message in response to the detected user action. The message may indicate that the designated channel number is assigned to the input IP address.

The electronic device 300 may store the input IP address, the channel number '60' and information associating the input IP address and the channel number '60' with each other in the human channel map, in response to the detected user action.

In some embodiments, the user may further input the human address 'Sally brown' via the GUI 910. If the user completes the user action for inputting the human address 'Sally Brown' and the IP address, the electronic device 300 may detect the user action and may display the GUI 610 in response to the detected user action. If the electronic device 300 detects a user action for designating the channel number '60' among the displayed channel numbers, the electronic device 300 may display a message 710 in response to the detected user action. The electronic device 300 may store the human address 'Sally Brown', the IP address, the channel number '60', and information associating the human address 'Sally Brown' and the IP address with each other and information associating the channel number '60' and the human address 'Sally Brown' with each other in the human channel map, in response to the detected user action.

Figure 10:
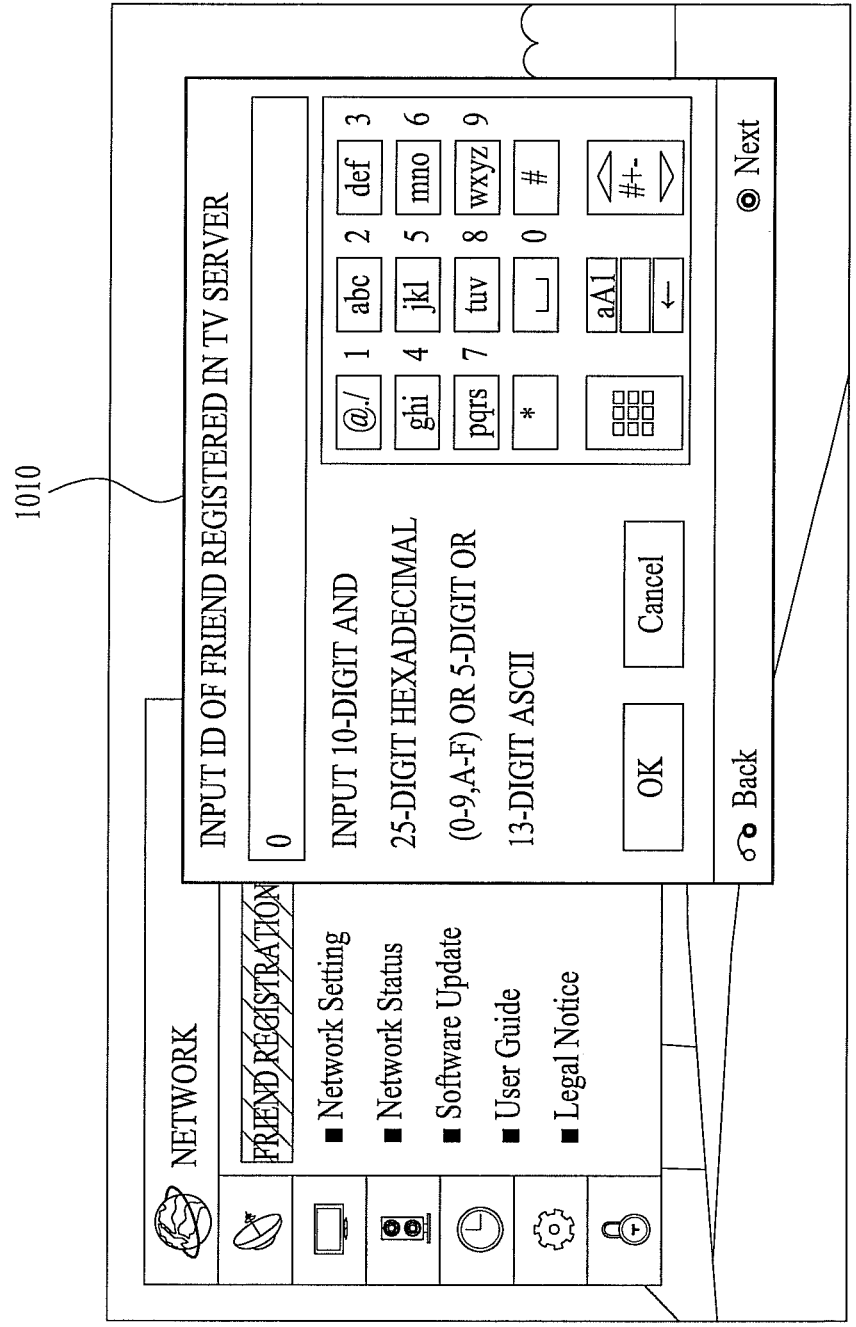
FIG. 10 is a diagram illustrating a screen on which another exemplary embodiment of a GUI for designation of a human address is displayed.

FIG. 10 is a diagram illustrating a screen on which another exemplary embodiment of a GUI for designation of a human address is displayed.

Referring to FIG. 10, if the user performs a user action for selecting the menu item 810, the electronic device 300 may detect the user action for selecting the menu item 810 and may display a GUI 1010 in response to the detected user action.

The user may input a human address to the GUI 1010. The human address may include at least one of an e-mail address, an account name, a family name or an SIP-URL. If the user completes the user action for inputting the human address, the electronic device 300 may detect the user action and may display the GUI 610 in response to the detected user action.

If the user performs a user action for issuing a selection order to the indicator 620 in a state in which the indicator 620 is located at one of the channel numbers from 41 to 61 of the GUI 610, the electronic device 300 may detect the user action for designating a channel number and may display a message in response to the detected user action. The message may indicate that the designated channel number is assigned to the input human address. The message may be the message 710 illustrated in FIG. 7.

The electronic device 300 may store the input human address, the channel number '60' and information associating the input human address and the channel number '60' with each other in the human channel map, in response to the detected user action.

Figure 11:
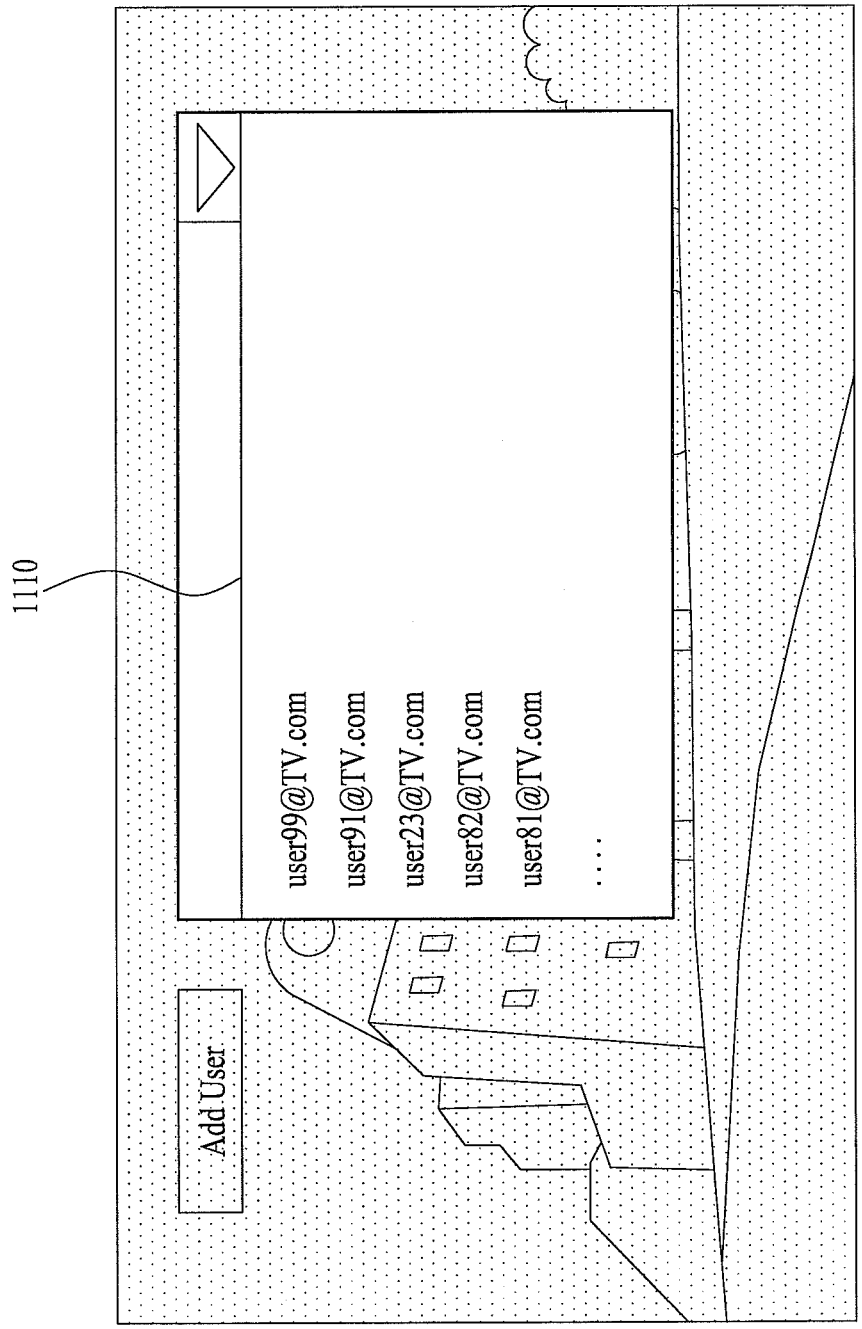
FIG. 11 is a diagram illustrating a screen on which a further exemplary embodiment of a GUI for designation of a human address is displayed.

FIG. 11 is a diagram illustrating a screen on which a further exemplary embodiment of a GUI for designation of a human address is displayed.

Referring to FIG. 11, if the user performs a user action for selecting the menu item 810, the electronic device 300 may detect the user action for selecting the menu item 810 and may display a GUI 1110 in response to the detected user action.

The user may input a human address to the GUI 1110. The GUI 1110 may be a pull-down menu, or the like, that lists one or more selectable human addresses. The human address may include at least one of an e-mail address, an account name or an SIP-URL. If the user completes the user action for inputting the human address, the electronic device 300 may detect the user action and may display the GUI 610 in response to the detected user action.

In some embodiments, the user may perform a user action for selecting one human address from among the human addresses listed in the GUI 1110. If the user completes the user action for inputting the human address, the electronic device 300 may detect the user action and may display the GUI 610 in response to the detected user action.

If the user performs a user action for issuing a selection order to the indicator 620 in a state in which the indicator 620 is located at one of the channel numbers from 41 to 61 listed in the GUI 610, the electronic device 300 may detect the user action for designating a channel number and may display a message in response to the detected user action. The message may indicate that the designated channel number is assigned to the input human address. The message may be the message 710 illustrated in FIG. 7.

The electronic device 300 may store the input human address, the channel number '60' and information associating the input human address and the channel number '60' with each other in the human channel map, in response to the detected user action.

Figure 12:
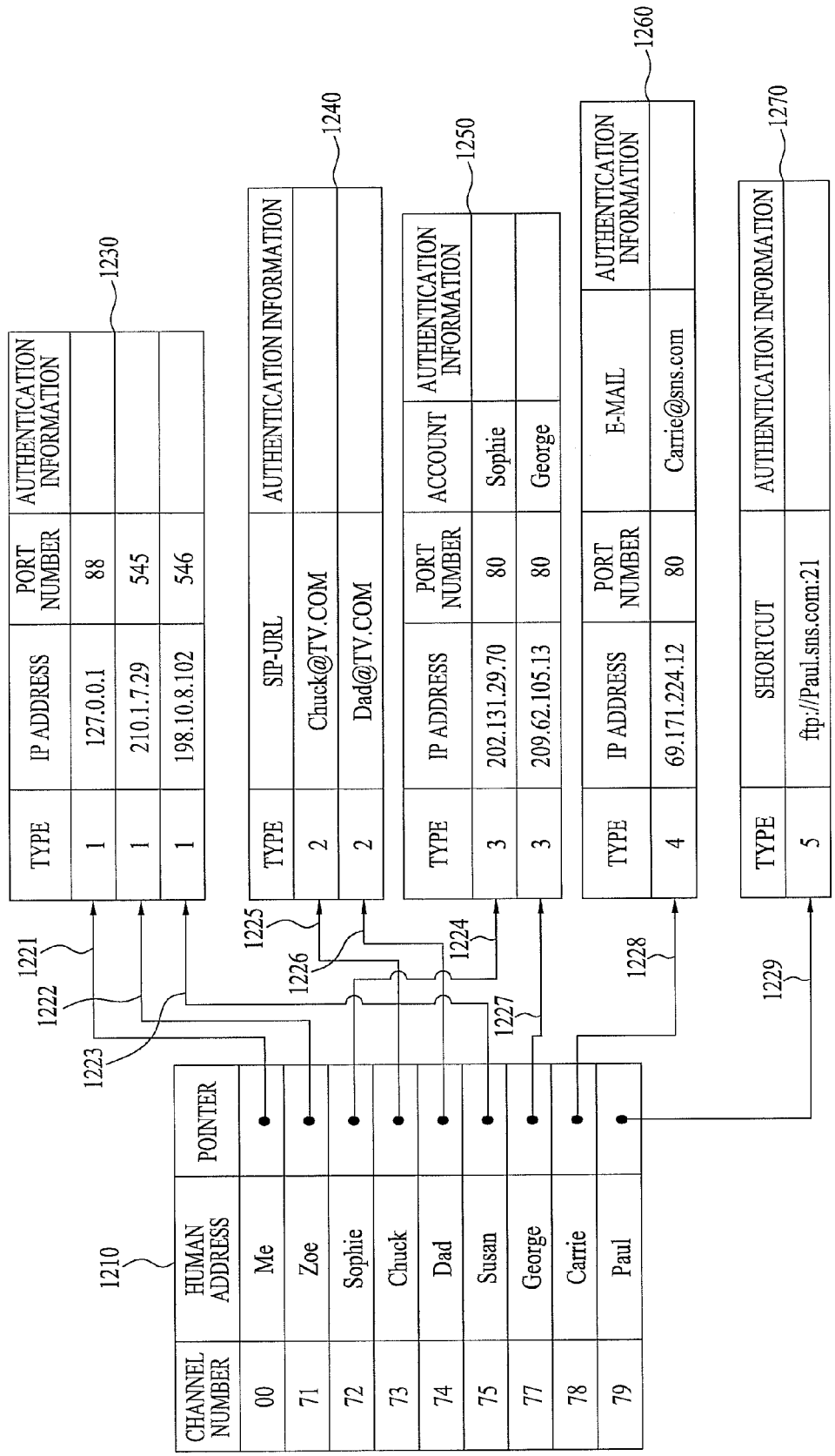
FIG. 12 is a diagram illustrating an exemplary embodiment for a human channel map.

FIG. 12 is a diagram illustrating an exemplary embodiment for a human channel map.

Referring to FIG. 12, a human channel map 1210 may include channel numbers, human addresses and pointers. In the human channel map, a channel number, a human address to which the channel number is assigned, and a pointer associated with the human address may be arranged in a single line. That is, information representing a line may be information associating a channel number and a human address with each other. In one example, since a channel number '71' and a human address 'Zoe' are located in the second line, the electronic device 300 may confirm that the channel number '71' is assigned to the human address 'Zoe'.

Access information maps 1230, 1240, 1250, 1260 and 1270 store information required to access the human channels. The access information maps 1230, 1240, 1250, 1260 and 1270 may respectively store different kinds of information according to access methods thereof. The first access information map 1230 may store type information indicating an access method, IP addresses, port numbers and authentication information. The second access information map 1240 may store type information indicating an access method, SIP-URLs and authentication information. The third access information map 1250 may store type information indicating an access method, IP addresses, port numbers, accounts and authentication information. The fourth access information map 1260 may store type information indicating an access method, IP addresses, port numbers, e-mail addresses and authentication information. The fifth access information map 1270 may store type information indicating an access method, shortcuts and authentication information. The information stored in the access information maps 1230, 1240, 1250, 1260 and 1270 may be input by the user, or may be transmitted from the server 10 and the server 20. In addition, the information may be stored in the access information maps before and after the information associating the channel number and the human address with each other is stored in the human channel map 1210.

An access method may be one of a first access method using IP addresses and port numbers, a second access method using SIP-URLs, a third access method for accessing a server and receiving a service associated with a particular account, a fourth access method for accessing an SNS server and receiving a service associated with a particular e-mail address and a fifth access method using shortcuts. The first access method, the second access method, the third access method, the fourth access method and the fifth access method may respectively be denoted by type 1, type 2, type 3, type 4 and type 5.

The pointers may indicate positions where information associated with the human addresses is stored. A pointer 1221 indicates a position where information associated with 'Me' is stored. That is, the pointer 1221 indicates the first line of the first access information map 1230. An IP address associated with 'Me' is 127.0.0.1, and a port number associated with 'Me' is 88. Access to a human channel of 'Me' may be implemented by the access method denoted by type 1. A pointer 1222 indicates a position where information associated with 'Zoe' is stored. That is, the pointer 1222 indicates the second line of the first access information map 1230. An IP address associated with 'Zoe' is 210.1.7.29, and a port number associated with 'Zoe' is 545. Access to a human channel of 'Zoe' may be implemented by the access method denoted by type 1. Also, a pointer 1223 indicates a position where information associated with 'Susan' is stored. That is, the pointer 1223 indicates the third line of the first access information map 1230. An IP address associated with 'Susan' is 198.10.8.102, and a port number associated with 'Susan' is 546. Access to a human channel of 'Susan' may be implemented by the access method denoted by type 1.

A pointer 1225 indicates a position where information associated with 'Chuck' is stored. That is, the pointer 1225 indicates the first line of the second access information map 1240. An SIP-URL associated with 'Chuck' is chuck@TV.com. Access to a human channel representing 'Chuck' may be implemented by the access method denoted by type 2. A pointer 1226 indicates a position where information associated with 'Dad' is stored. That is, the pointer 1226 indicates the second line of the second access information map 1240. An SIP-URL associated with 'Dad' is Dad@TV.com. Access to a human channel of 'Dad' may be implemented by the access method denoted by type 2.

A pointer 1224 indicates a position where information associated with 'Sophie' is stored. That is, the pointer 1224 indicates the first line of the third access information map 1250. An IP address associated with 'Sophie' is 202.131.29.70, a port number associated with 'Sophie' is 80, and an account name is Sophie. Access to a human channel of 'Sophie' may be implemented by the access method denoted by type 3. A pointer 1227 indicates a position where information associated with 'George' is stored. That is, the pointer 1227 indicates the second line of the third access information map 1250. An IP address associated with 'George' is 209.62.105.13, and a port number associated with 'George' is 80. Access to a human channel of 'George' may be implemented by the access method denoted by type 3.

A pointer 1228 indicates a position where information associated with 'Carrie' is stored. That is, the pointer 1228 indicates the first line of the fourth access information map 1260. An IP address associated with 'Carrie' is 69.171.224.12, a port number associated with 'Carrie' is 80, and an e-mail address associated with 'Carrie' is Carrie@SNS.com.

A pointer 1229 indicates a position where information associated with 'Paul' is stored. That is, the pointer 1229 indicates the first line of the fifth access information map 1270. A shortcut associated with 'Paul' is ftp://Paul.sns.com:21.

The authentication information of the access information maps 1230, 1240, 1250, 1260 and 1270 may include IDs and passwords as well as stored character strings. In addition, the authentication information may be encoded and stored.

Figure 13:
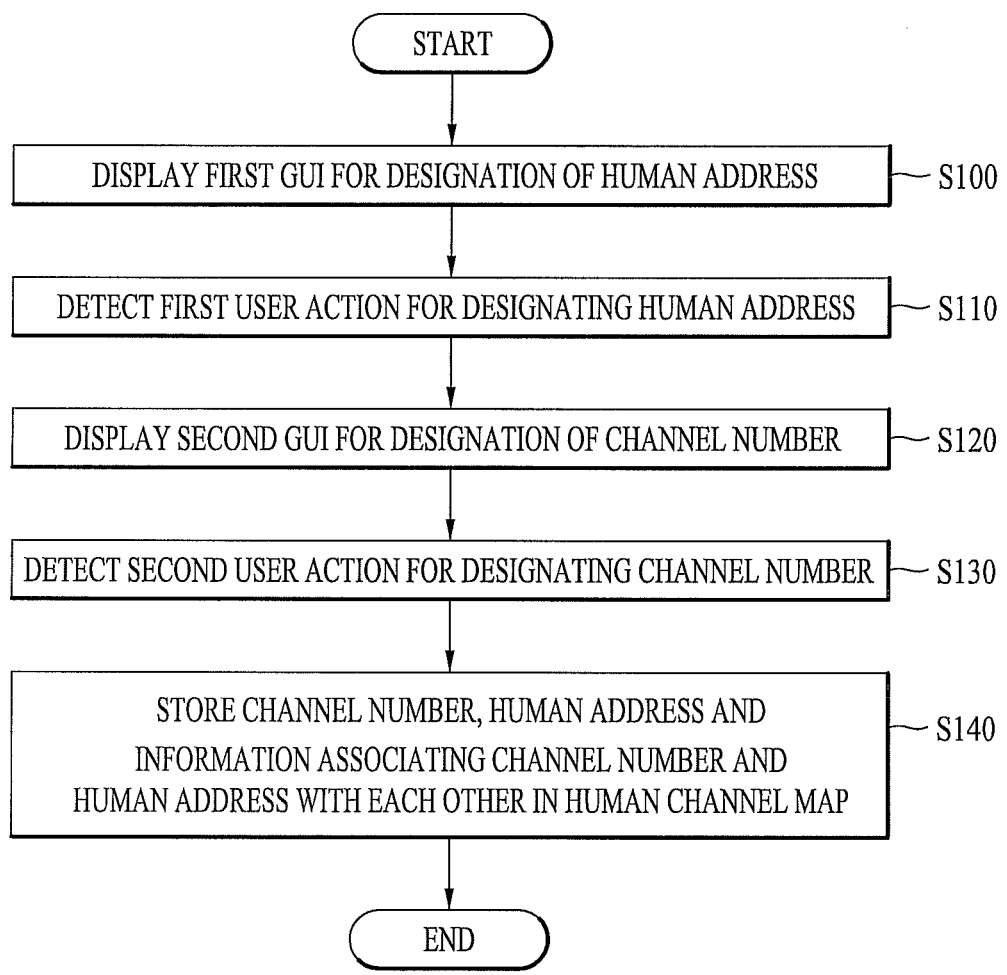
FIG. 13 is a flowchart illustrating an implementation procedure of one exemplary embodiment for a method of constructing a human channel map in accordance with the present invention.

FIG. 13 is a flowchart illustrating an implementation procedure of one exemplary embodiment for a method of constructing a human channel map in accordance with the present disclosure.

Referring to FIG. 13, the display 302 displays a first GUI for designation of a human address (S100). The displayed first GUI may list at least one selectable human address. The listed human address may be transmitted from one of the first server 10 and the second server 20. The network interface 320 may receive the human address from one of the first server 10 and the second server 20. The controller 340 may control displaying the first GUI which provides the human address. The first GUI may be one of the Web page 400 in FIG. 4, the GUI 910 in FIG. 9, the GUI 1010 in FIG. 10 and the GUI 1110 in FIG. 11.

The controller 340 detects a first user action for designating a human address (S110).

The display 302 displays a second GUI for designation of a channel number in response to the detected first user action (S120). The displayed second GUI may list a plurality of selectable channel numbers. The second GUI may include an indicia that indicates the channel numbers which are currently available. The second GUI may be the GUI 610 in FIG. 6.

The controller 340 detects a second user action for designating a channel number (S130).

The controller 340 stores a human address, a channel number and information associating the human address and the channel number with each other in a human channel map in response to the detected second user action (S140). The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Figure 14:
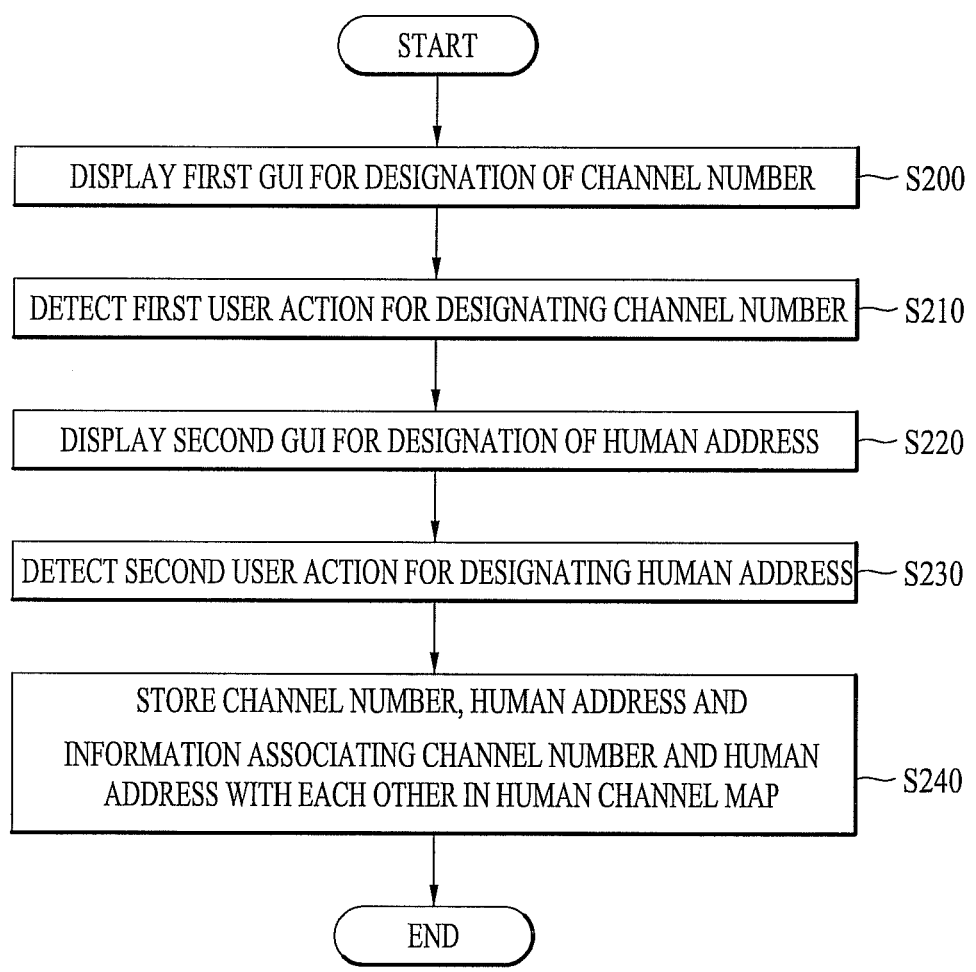
FIG. 14 is a flowchart illustrating an implementation procedure of another exemplary embodiment for a method of constructing a human channel map in accordance with the present invention.

FIG. 14 is a flowchart illustrating an implementation procedure of another exemplary embodiment for a method of constructing a human channel map in accordance with the present disclosure.

Referring to FIG. 14, the display 302 displays a first GUI for designation of a channel number (S200). The displayed first GUI may list a plurality of selectable channel numbers. The channel numbers may include an indicia identifying channel numbers which are available such as highlighting, bold text, or the like. The first GUI may be the GUI 610 in FIG. 6.

The controller 340 detects a first user action for designating a channel number (S210).

The display 302 displays a second GUI for designating a human address in response to the detected first user action (S220). The displayed second GUI may list at least one selectable human address. The listed human address may be transmitted from one of the first server 10 and the second server 20. The network interface 320 may receive the human address transmitted from one of the first server 10 and the second server 20, and the controller 340 may control displaying the second GUI which provides the received human address. The second GUI may be one of the Web page 400 in FIG. 4, the GUI 910 in FIG. 9, the GUI 1010 in FIG. 10 and the GUI 1110 in FIG. 11.

The controller 340 detects a second user action for designating a human address (S230).

The controller 340 stores a human address, a channel number and information associating the human address and the channel number with each other in a human channel map in response to the detected second user action (S240). The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Figure 15:
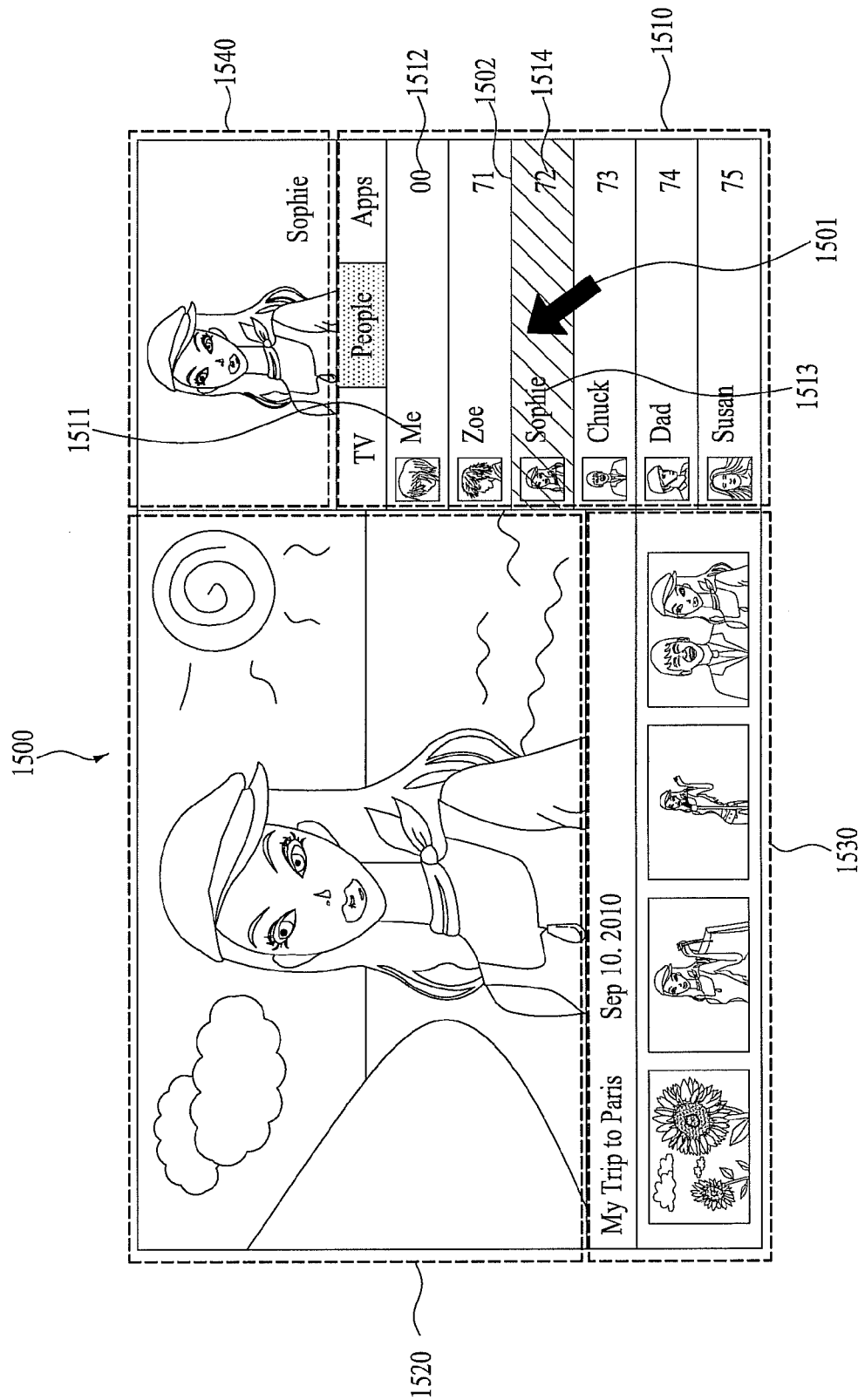
FIG. 15 is a diagram illustrating one exemplary embodiment of a screen on which a human channel map and content of a selected human channel are displayed.

FIG. 15 is a diagram illustrating one exemplary embodiment of a screen on which a human channel map and content of a selected human channel are displayed.

Referring to FIG. 15, the controller 340 may control displaying a screen 1500. The screen 1500 may include a channel map region 1510, a channel display region 1520, a content list region 1530 and a human display region 1540.

The channel map region 1510 provides a human address and a channel number mapped to the human address. In one example, the channel map region 1510 provides a human address 'Me', denoted by reference numeral 1511, and a channel number '00', denoted by reference numeral 1512, mapped to the human address 'Me'. The controller 340 may produce an image displayed on the channel map region 1510 using information of the human channel map. The human address and channel number of the channel map region 1510 may be selected using a cursor 1501 and an indicator 1502. For example, when the cursor 1501 is positioned over a particular human address (e.g., human address 'Sophie', denoted by reference numeral 1513, and channel number '72' denoted by reference numeral 1514), the indicator 1502 may be located over a designated human address and channel number, as illustrated in FIG. 15. The cursor 1501 may be a pointer, arrow, or the like, and the indicator 1502 may be a highlight, bold text, or the like.

The channel display region 1520 may display a human channel corresponding to a designated channel number. In FIG. 15, since the indicator 1502 and cursor 1501 are positioned over the channel number '72', a designated channel number is 72 and thus, the channel display region 1520 displays a human channel corresponding to the channel number '72'. The human channel corresponding to the channel number '72' is a human channel of the human address mapped to the channel number '72'. That is, the channel display region 1520 displays the human channel of 'Sophie'.

The content list region 1530 provides a content list provided by a human channel corresponding to a designated channel number. The content list region 1530 may provide a thumbnail of content. If a user action for selecting particular content from among content provided in the content list region 1530 is detected, the controller 340 may control displaying the selected content on the channel display region 1520 in response to the detected user action. In addition, it is possible to discriminate between content displayed on the channel display region 1520 and content displayed on the content list region 1530. To this end, for example, the content displayed on the channel display region 1520 may be highlighted in the content list region 1530.

The human display region 1540 displays a human having a human address associated with a selected channel number. The human display region 1540 may display a picture of an owner of a human channel indicated by the indicator 1501.

Figure 16:
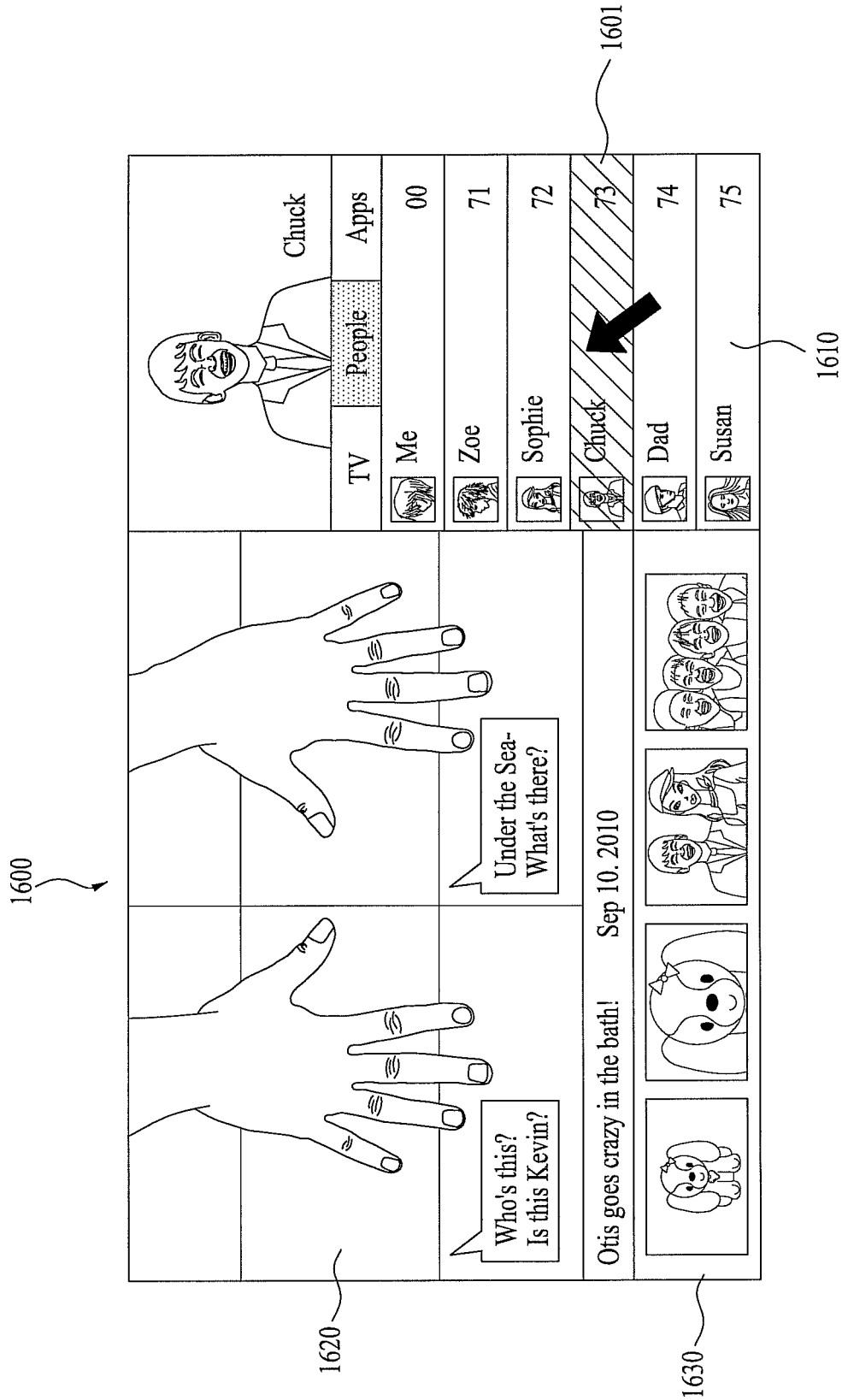
FIG. 16 is a diagram illustrating another exemplary embodiment of a screen on which a human channel map and content of a selected human channel are displayed.

FIG. 16 is a diagram illustrating another exemplary embodiment of a screen on which a human channel map and content of a selected human channel are displayed.

Referring to FIG. 16, the controller 340 may detect a user action for requesting channel switch to Channel 73. The user action for requesting channel switch may include executing a spatial gesture for requesting channel increment, or pressing a button of a remote controller for requesting channel increment.

The controller 340 may control displaying a screen 1600 in response to the detected user action. In a channel map region 1610, an indicator 1601 is located at the channel number '73' designated by the user action. A channel display region 1620 displays a human channel corresponding to the channel number '73', i.e. the human channel of 'Chuck'. A content list region 1630 displays a content list provided by the human channel mapped to the channel number '73'.

Figure 17:
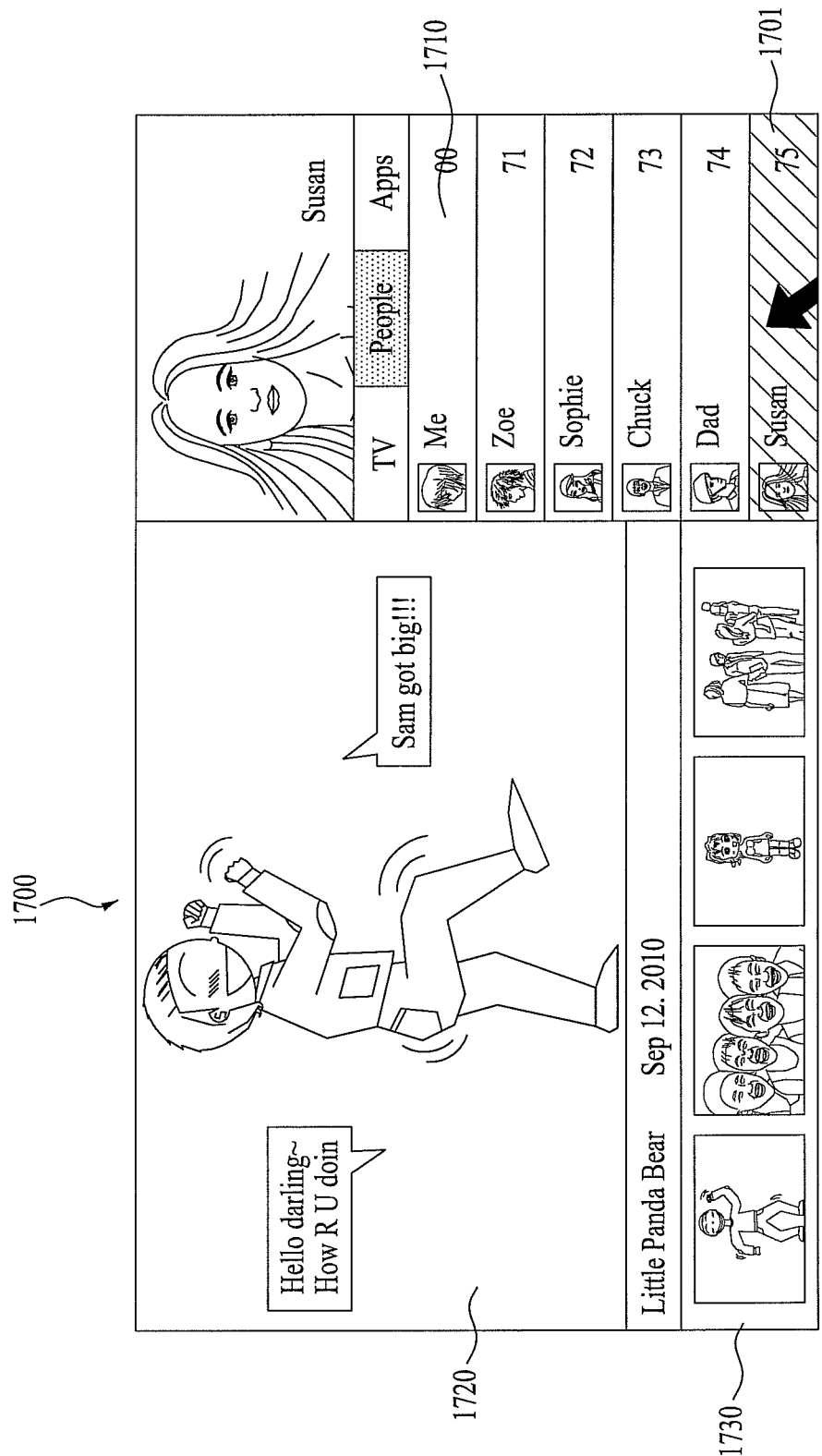
FIG. 17 is a diagram illustrating a further exemplary embodiment of a screen on which a human channel map and content of a selected human channel are displayed.

FIG. 17 is a diagram illustrating a further exemplary embodiment of a screen on which a human channel map and content of a selected human channel are displayed.

Referring to FIG. 17, the controller 340 may detect a user action for requesting channel switch to Channel 75. The controller 340 may control displaying a screen 1700 in response to the detected user action. In a channel map region 1710, an indicator 1701 is located at the channel number '75' designated by the user action. A channel display region 1720 displays a human channel corresponding to the channel number '75', i.e. the human channel of 'Susan'. A content list region 1730 displays a content list provided by the human channel mapped to the channel number '75'.

Figure 18:
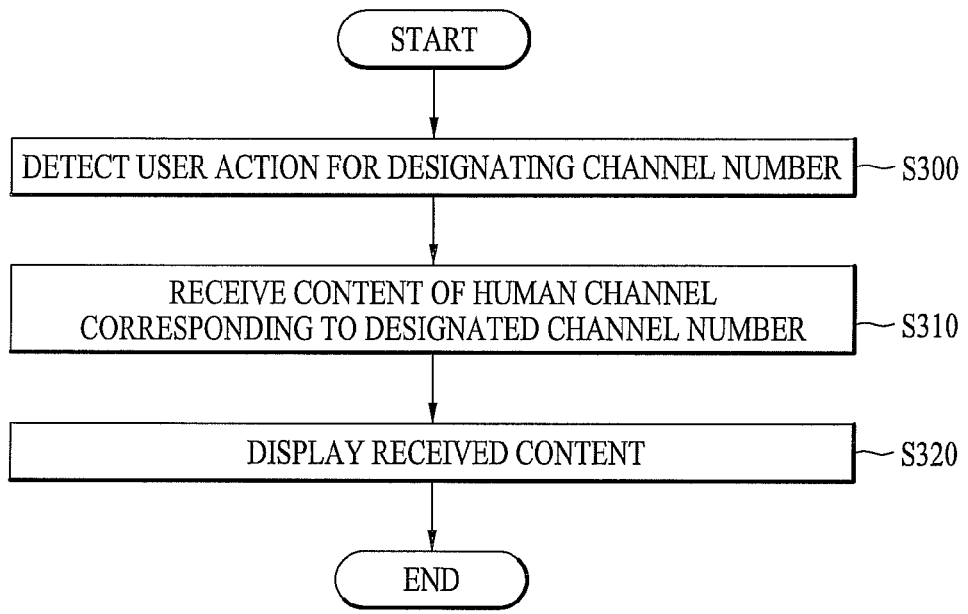
FIG. 18 is a diagram illustrating an implementation procedure of an exemplary embodiment for a method of providing a human channel service in accordance with the present invention.

FIG. 18 is a diagram illustrating an implementation procedure of an exemplary embodiment for a method of providing a human channel service in accordance with the present disclosure.

Referring to FIG. 18, the controller 340 detects a user action for designating a channel number (S300). Step S300 may be performed while the display 302 is displaying at least one of a human channel, a broadcast channel or an App channel. For example, the controller 340 may detect the user action for designating a channel number while the display 302 is displaying the screen 1500 of FIG. 15, the screen 1600 of FIG. 16 or the screen 1700 of FIG. 17. The broadcast channel may include at least one of a sky wave broadcast channel, a cable channel, a satellite channel or an IPTV channel.

The controller 340 receives content of a human channel indicated by the designated channel number in response to the detected user action (S310). The content may be first content of a content list provided by the human channel or initial content introducing the human channel.

The controller 340 controls displaying the received content (S320). The display 302 may display the screen 1500 of FIG. 15, the screen 1600 of FIG. 16 or the screen 1700 of FIG. 17.

Figure 19:
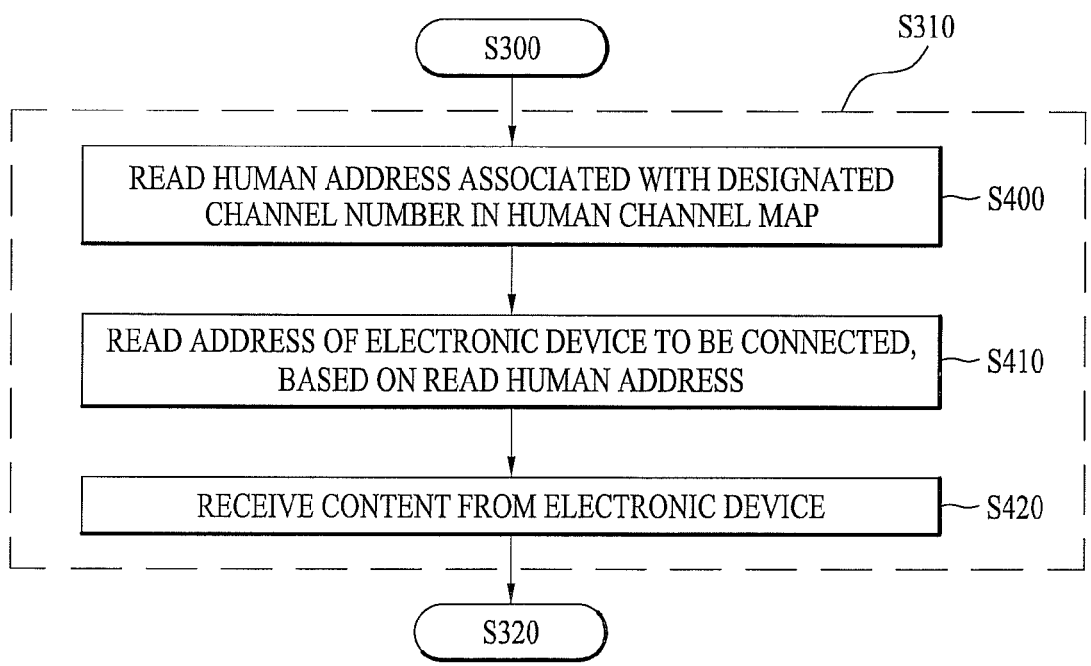
FIG. 19 is a diagram illustrating an implementation procedure of one exemplary embodiment for a method of receiving content of a human channel.

FIG. 19 is a diagram illustrating an implementation procedure of one exemplary embodiment for a method of receiving content of a human channel.

Referring to FIG. 19, the controller 340 reads a human address associated with a designated channel number from a human channel map (S400). The human channel map may be the human channel map 1210 of FIG. 12 or may include the human channel map 1210, the first access information map 1230, the second access information map 1240, the third access information map 1250, the fourth access information map 1260 and the fifth access information map 1270 as illustrated in FIG. 12.

The controller 340 reads an address of an electronic device to access, based on the read human address (S410). The electronic device to access may be one of the first digital TV 100, the second digital TV 110, the personal computer system 120, the notebook computer 130, the mobile terminal 140, or another appropriate type of multi-functional display device. The address of the electronic device to access may be stored in the access information map 1230 illustrated in FIG. 12. The address of the electronic device to access may include an IP address and a port number.

The network interface 320 receives content from the electronic device using the read address of the electronic device (S420). The electronic device 300 may set up communication with the electronic device using the address of the electronic device read in Step S410 and may receive content of a human channel from the electronic device. The content may be transmitted based on a protocol such as SMTP, HTTP, FTP, RTSP or MMS.

The method of receiving content of a human channel illustrated in FIG. 19 may be one example of the first access method as described with reference to FIG. 12.

Figure 20:
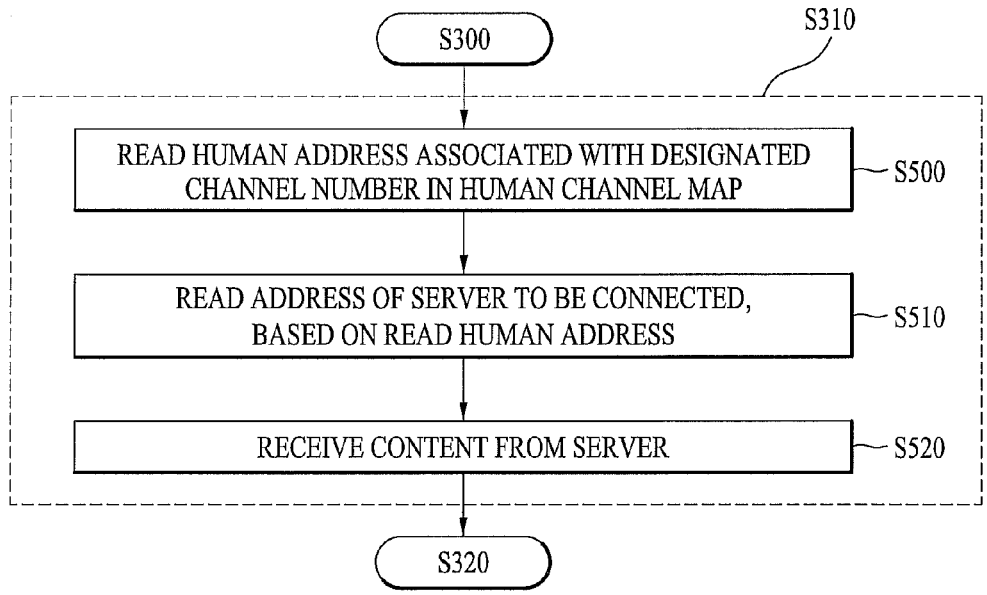
FIG. 20 is a diagram illustrating an implementation procedure of another exemplary embodiment for a method of receiving content of a human channel.

FIG. 20 is a diagram illustrating an implementation procedure of another exemplary embodiment for a method of receiving content of a human channel.

Referring to FIG. 20, the controller 340 reads a human address associated with a designated channel number from a human channel map (S500). The human channel map may be the human channel map 1210 of FIG. 12, or may include the human channel map 1210, the first access information map 1230, the second access information map 1240, the third access information map 1250, the fourth access information map 1260 and the fifth access information map 1270 as illustrated in FIG. 12.

The controller 340 reads an address of a server to be connected, based on the read human address (S510). The server may be the server 10 or the server 20. The address of the server may be stored in the access information map 1250, the access information map 1260 and the access information map 1270. The address of the server may include an IP address, a port number and an account name, or may include an IP address, a port number and an e-mail address, or may include a shortcut.

The network interface 320 receives content from the server using the read address of the server (S520). The electronic device 300 may access the server using the address of the server read in Step S510 and may receive content of a human channel from the server. The content may be transmitted based on a protocol such as SMTP, HTTP, FTP, RTSP or MMS.

The method of receiving content of a human channel illustrated in FIG. 19 may be one example of one of the third access method, the fourth access method and the fifth access method as described with reference to FIG. 12, according to the address of the server read in Step S510.

Figure 21:
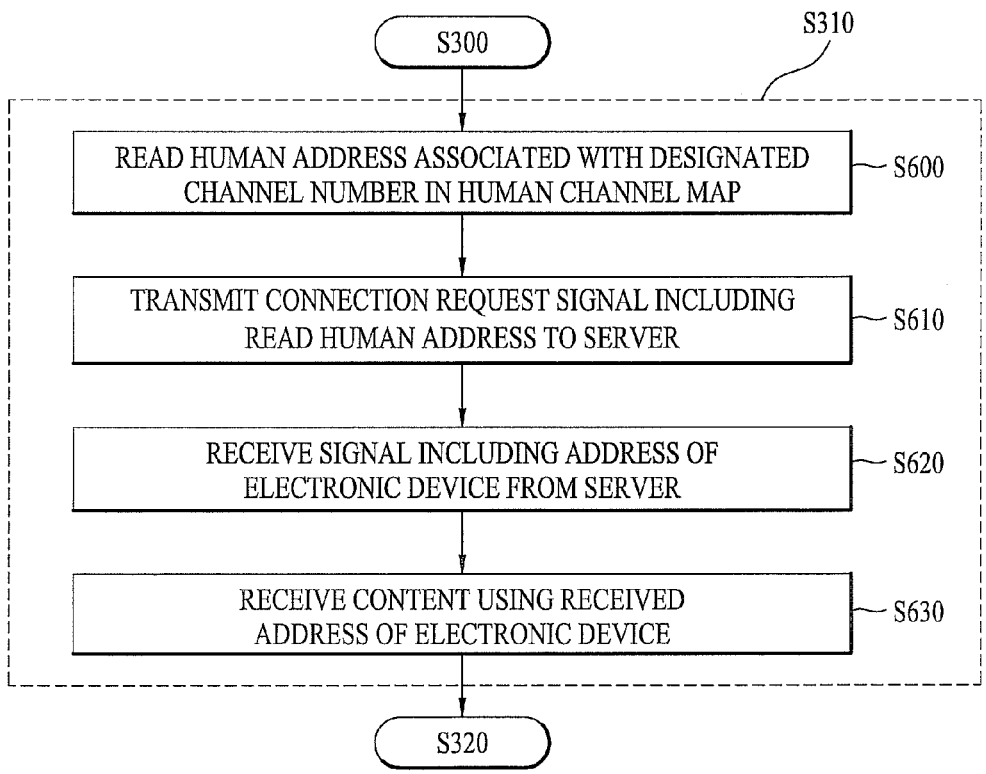
FIG. 21 is a diagram illustrating an implementation procedure of a further exemplary embodiment for a method of receiving content of a human channel.

FIG. 21 is a diagram illustrating an implementation procedure of a further exemplary embodiment for a method of receiving content of a human channel.

Referring to FIG. 21, the controller 340 reads a human address associated with a designated channel number from a human channel map (S600). The human channel map may be the human channel map 1210 of FIG. 12, or may include the human channel map 1210, the first access information map 1230, the second access information map 1240, the third access information map 1250, the fourth access information map 1260 and the fifth access information map 1270 as illustrated in FIG. 12. Also, the read human address may include an SIP-URL.

The network interface 320 transmits a connection request signal including the read human address to a server (S610). The connection request signal may include an SIP-URL. Also, the server may be the server 10.

The network interface 320 receives a signal including an address of an electronic device from the server (S620). The signal may be a response signal with respect to the connection request signal. The address of the electronic device 300 may include an IP address and a port number. The electronic device 300 may be one of the first digital TV 100, the second digital TV 110, the personal computer system 120, the notebook computer 130 and the mobile terminal 140.

The controller 340 controls receiving content using the received address of an electronic device (S630). The electronic device 300 may set up communication with the electronic device using the received address of the electronic device read in operation 620 and may receive content of a human channel from the electronic device. The content may be transmitted based on a protocol such as SMTP, HTTP, FTP, RTSP or MMS.

Figure 22:
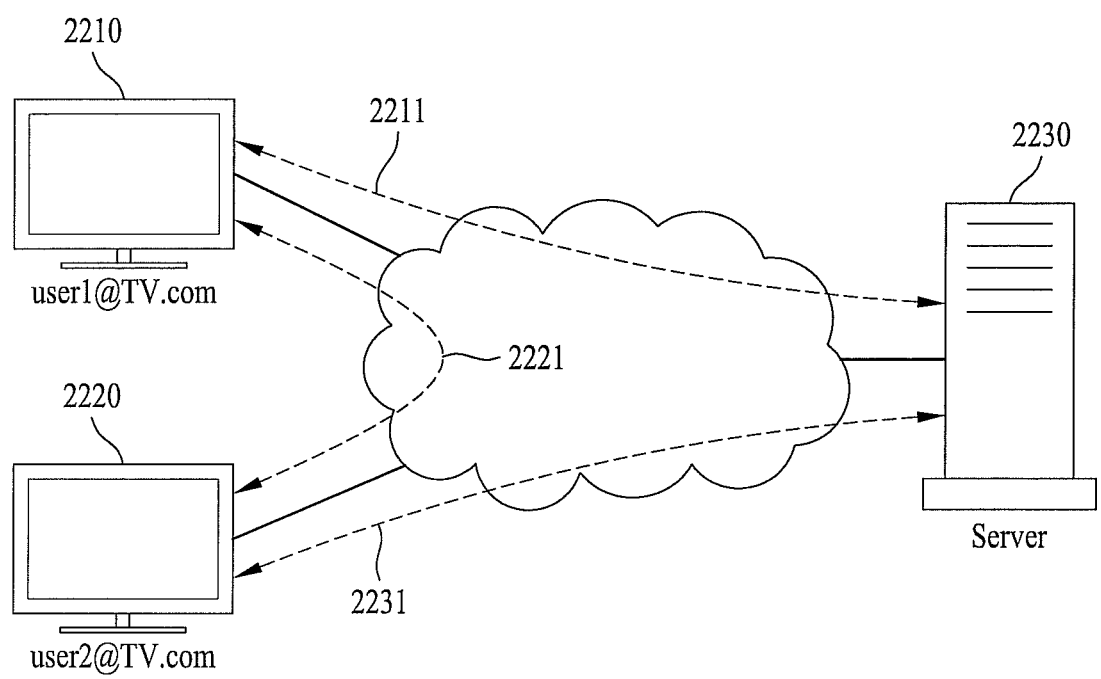
FIG. 22 is a diagram illustrating a method of setting up connection between two electronic devices.

FIG. 22 is a diagram illustrating a method of setting up connection between two electronic devices.

Referring to FIG. 22, an electronic device 2210 may set up (or configure) a first connection 2211 with a server 2230. During set up of the first connection 2211, the server 2230 acquires and stores an IP address and port number of the electronic device 2210. The first connection 2211 may be set up during booting of the electronic device 2210, or may be set up when a user requests connection between the electronic device 2210 and the server 2230. The electronic device 2210 may be one of the first digital TV 100, the second digital TV 110, the personal computer system 120, the notebook computer 130 or the mobile terminal 140, and the server 2230 may be the server 10, for example.

An electronic device 2220 may set up a second connection 2231 with the server 2230. During set up of the second connection 2231, the server 2230 acquires and stores an IP address and a port number of the electronic device 2220. The second connection 2231 may be set up during booting of the electronic device 2220, or may be set up when a user requests connection between the electronic device 2220 and the server 2230.

The second connection 2231 may be set up after the server 2230 completes set up of the first connection 2211 with the electronic device 2210. When requesting the second connection 2231, the server 2230 may use the previously stored IP address and port number of the electronic device 2220. The electronic device 2220 may be one of the first digital TV 100, the second digital TV 110, the personal computer system 120, the notebook computer 130 or the mobile terminal 140.

The electronic device 2210 may set up a third connection 2221 with the electronic device 2220. In this case, the electronic device 2210 may receive the IP address and port number of the electronic device 2220 from the server 2230 which has previously acquired the IP address and port number through the second connection 2231, and may transmit a signal to the electronic device 2220 using the received IP address and port number. The transmitted signal may be a connection set-up signal or a human channel request signal.

The electronic device 2220 may receive the IP address and port number of the electronic device 2210 from the server 2230 which has previously acquired the IP address and port number through the first connection 2211, and may transmit a response signal to the electronic device 2210 using the received IP address and port number. In some embodiments, the electronic device 2220 may extract the IP address and port number of the electronic device 2210 from the connection set-up signal transmitted from the electronic device 2210 and may transmit a response signal to the electronic device 2210 using the extracted IP address and port number.

Figure 23:
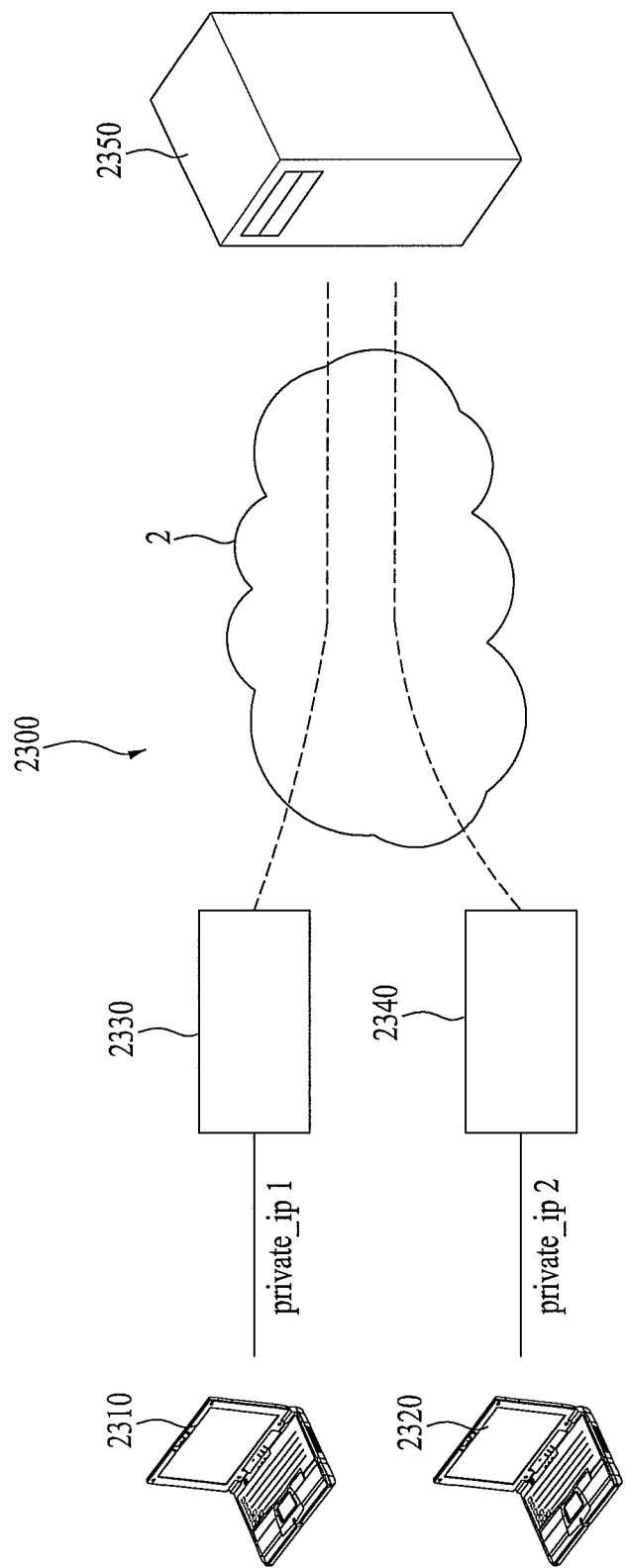
FIG. 23 is a schematic diagram illustrating a configuration of another exemplary embodiment of a broadcast system in accordance with the present invention.
Figure 24:
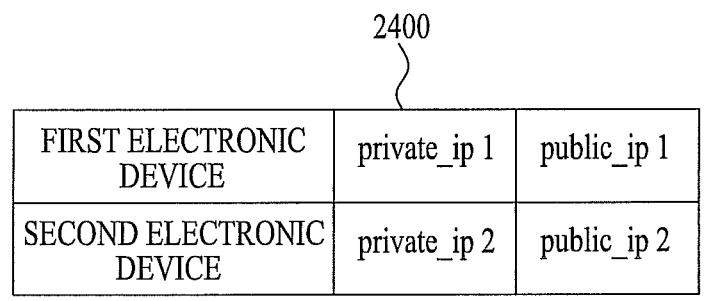
FIG. 24 is a diagram illustrating an exemplary embodiment of a Network Address Translation (NAT) table.
Figure 25:
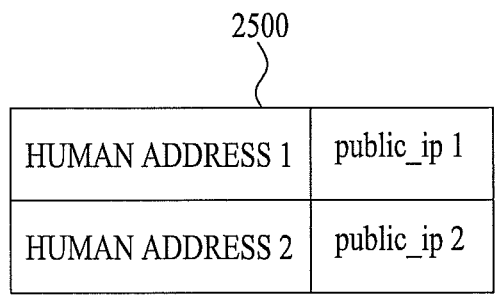
FIG. 25 is a diagram illustrating an exemplary embodiment of an address matching table recorded in a server.

FIG. 23 is a schematic diagram illustrating a configuration of another exemplary embodiment of a broadcast system in accordance with the present disclosure, and FIG. 24 is a diagram illustrating an exemplary embodiment of a Network Address Translation (NAT) table, and FIG. 25 is a diagram illustrating an exemplary embodiment of an address matching table recorded in a server.

Referring to FIGS. 23 to 25, the broadcast system 2300 may include a first electronic device 2310, a second electronic device 2320, a network device 2330, a network device 2340 and a server 2350.

The first electronic device 2310 and the second electronic device 2320 respectively have private IP addresses. Specifically, the private IP address of the electronic device 2310 is private_ip1 and the private IP address of the electronic device 2320 is private_ip2. The electronic device 2310 and the electronic device 2320 may be one of the first digital TV 100, the second digital TV 110, the personal computer system 120, the notebook computer 130 or the mobile terminal 140.

The network device 2330, as set up in the NAT table, translates the private IP address of the first electronic device 2310 into a public IP address, i.e. from private_ip1 to public_ip1. More specifically, the network device 2330 translates a source IP address of a packet, transmitted from the first electronic device 2310 to the server 2350, from pivate_ip1 into public_ip1. The network device 2330 may be one of a router, a sharer or a gateway.

The network device 2340, as set up in the NAT table, translates the private IP address of the second electronic device 2320 into a public IP address, i.e. from private_ip2 to public_ip2. More specifically, the network device 2340 translates a source IP address of a packet, transmitted from the second electronic device 2320 to the server 2350, from pivate_ip2 into public_ip2. The network device 2340 may be one of a router, a sharer or a gateway.

The server 2350 may be the server 10 illustrated in FIG. 1. The server 2350 may store an address matching table 2500. The address matching table 2500 may be permanently or temporarily stored in the storage unit. The address matching table 2500 may store a human address, an IP address and information associating the human address and the IP address with each other. The information associating the human address and the IP address with each other may be information representing a line of the table.

In the address matching table 2500, a human address 1 is associated with public_ip1, and a human address 2 is associated with public_ip 2. The human address 1 is user1@TV.com, which is a human address transmitted by the first electronic device 2310, and the human address 2 is user2@TV.com, which is a human address transmitted by the second electronic device 2320.

If the server 2350 receives a connection request signal including the human address 2 'user2@TV.com' from the first electronic device 2310, the server 2350 reads the IP address 'public_ip2' matching to the human address 2 from the address matching table 2500 and transmits a response signal including the read IP address 'public_ip2' to the first electronic device 2310. Also, the server 2350 reads the IP address 'public_ip1' of the first electronic device 2310 from the address matching table 2500 and transmits a signal including the read IP address 'public_ip1' to the second electronic device 2320. In conclusion, the first electronic device 2310 may implement data reception/transmission with the second electronic device 2320 having the private IP address using the received IP address 'public_ip2'.

Figure 26:
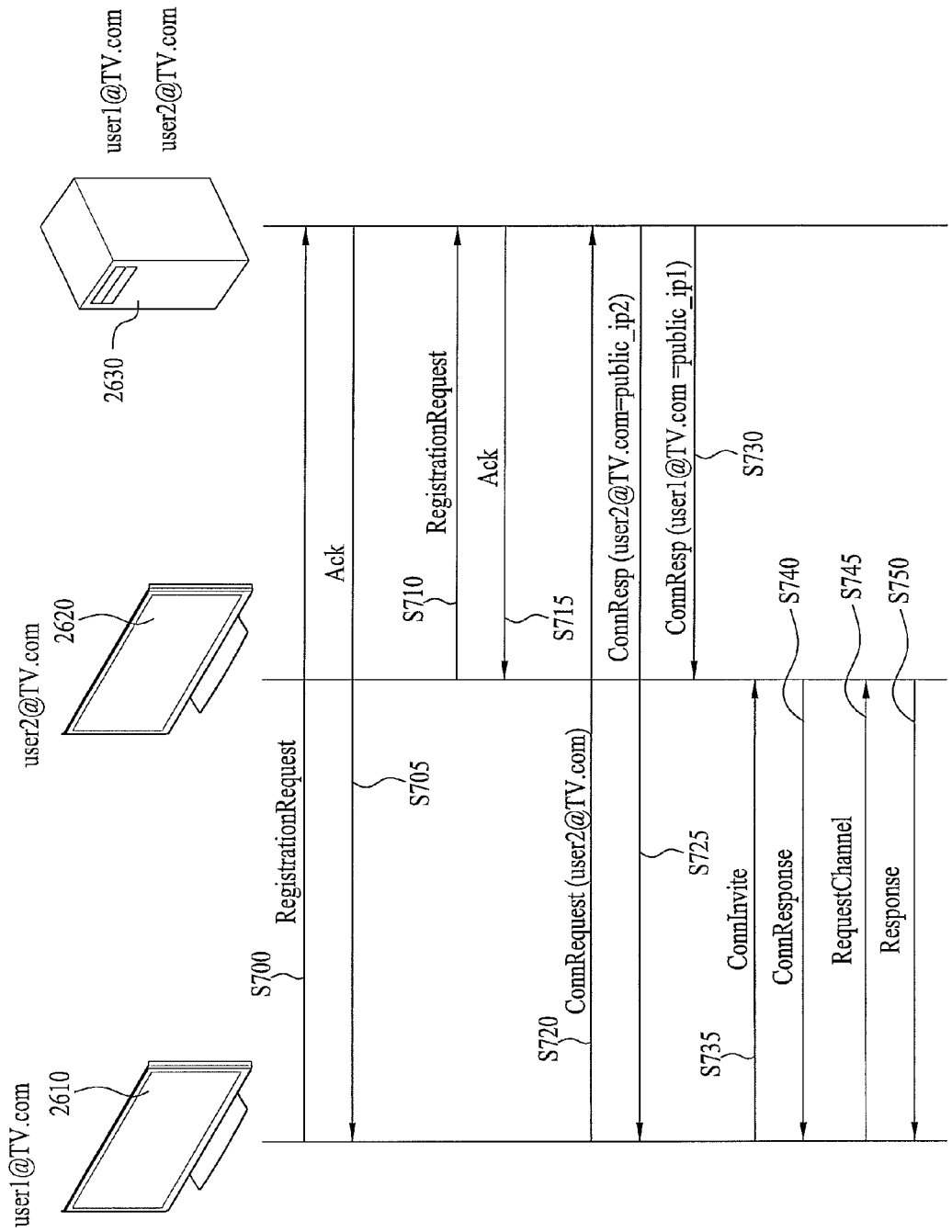
FIG. 26 is a diagram illustrating an implementation procedure of an exemplary embodiment for a method of setting up connection between two electronic devices.

FIG. 26 is a diagram illustrating an implementation procedure of an exemplary embodiment for a method of setting up connection between two electronic devices.

Referring to FIG. 26, the first electronic device 2610 transmits a registration request signal to a server 2630 (S700). The server 2630 may receive the registration request signal. The first electronic device 2610 may be one of the first digital TV 100, the second digital TV 110, the personal computer system 120, the notebook computer 130 or the mobile terminal 140. The registration request signal may include a human address 'user1@TV.com' and information required to log-in to the server 2630. The log-in information may be authentication information stored in a human channel map.

The server 2630 transmits a response signal with respect to the registration request signal to the first electronic device 2610 (S705). The server 2630 may store the human address 'user1@TV.com' included in the registration request signal and the address of the first electronic device 2610 in an address matching table. Also, the server 2630 may implement a log-in procedure using information included in the registration request signal. The address matching table may be the address matching table 2500 illustrated in FIG. 26. The server 2630 may be the server 10 illustrated in FIG. 1.

The second electronic device 2620 transmits a registration request signal to the server 2630 (S710). The server 2630 may receive the registration request signal. The second electronic device 2620 may be one of the first digital TV 100, the second digital TV 110, the personal computer system 120, the notebook computer 130 or the mobile terminal 140. The registration request signal may include the human address 'user2©TV.com' and information required to log-in to the server 2630.

The server 2630 transmits a response signal with respect to the received registration request signal to the second electronic device 2620 (S715). The server 2630 may store the human address 'user2@TV.com' included in the registration request signal and the address of the second electronic device 2620 in the address matching table. Also, the server 2630 may implement a log-in procedure using information included in the registration request signal.

The first electronic device 2610 transmits a connection request signal including the human address 'user2@TV.com' to the server 2630 (S720). The server 2630 receives the connection request signal.

The server 2630 transmits a connection response signal including 'public_ip2' to the first electronic device 2610 in response to the received connection request signal (S725). 'Public_ip2' is the public IP address of the second electronic device 2620. The first electronic device 2610 receives the connection response signal and acquires the address of the second electronic device 2620 using the connection response signal.

The server 2630 transmits a connection response signal including 'public_ip1' to the second electronic device 2620 (S730). 'Public_ip1' is the public IP address of the first electronic device 2610. The second electronic device 2620 receives the connection response signal and acquires the address of the first electronic device 2610 using the connection response signal.

The first electronic device 2610 transmits a connection set-up signal to the second electronic device 2620 using the IP address 'public-ip2' (S735). The second electronic device 2620 receives the connection set-up signal.

The second electronic device 2620 transmits a connection response signal with respect to the connection set-up signal to the first electronic device 2610 using the IP address 'public_ip1' (S740). The first electronic device 2610 receives the connection response signal. With Step S735 and Step S740, communication between the first electronic device 2610 and the second electronic device 2620 is initialized. The connection response signal may include a particular port number, and the second electronic device 2620 may open a port corresponding to the particular port number.

The first electronic device 2610 transmits a human channel request signal to the second electronic device 2620 in response to the received connection response signal (S745). The second electronic device 2620 receives the human channel request signal. The human channel request signal may be transmitted to a port corresponding to the port number included in the connection response signal.

The second electronic device 2620 transmits a response signal with respect to the received human channel request signal to the first electronic device 2610 (S750). The response signal may include content of a human channel or a content list of a human channel. The first electronic device 2610 receives the response signal. The first electronic device 2610 may display content when the content is transmitted as the response signal, or may display a content list when the content list is transmitted as the response signal.

Figure 27:
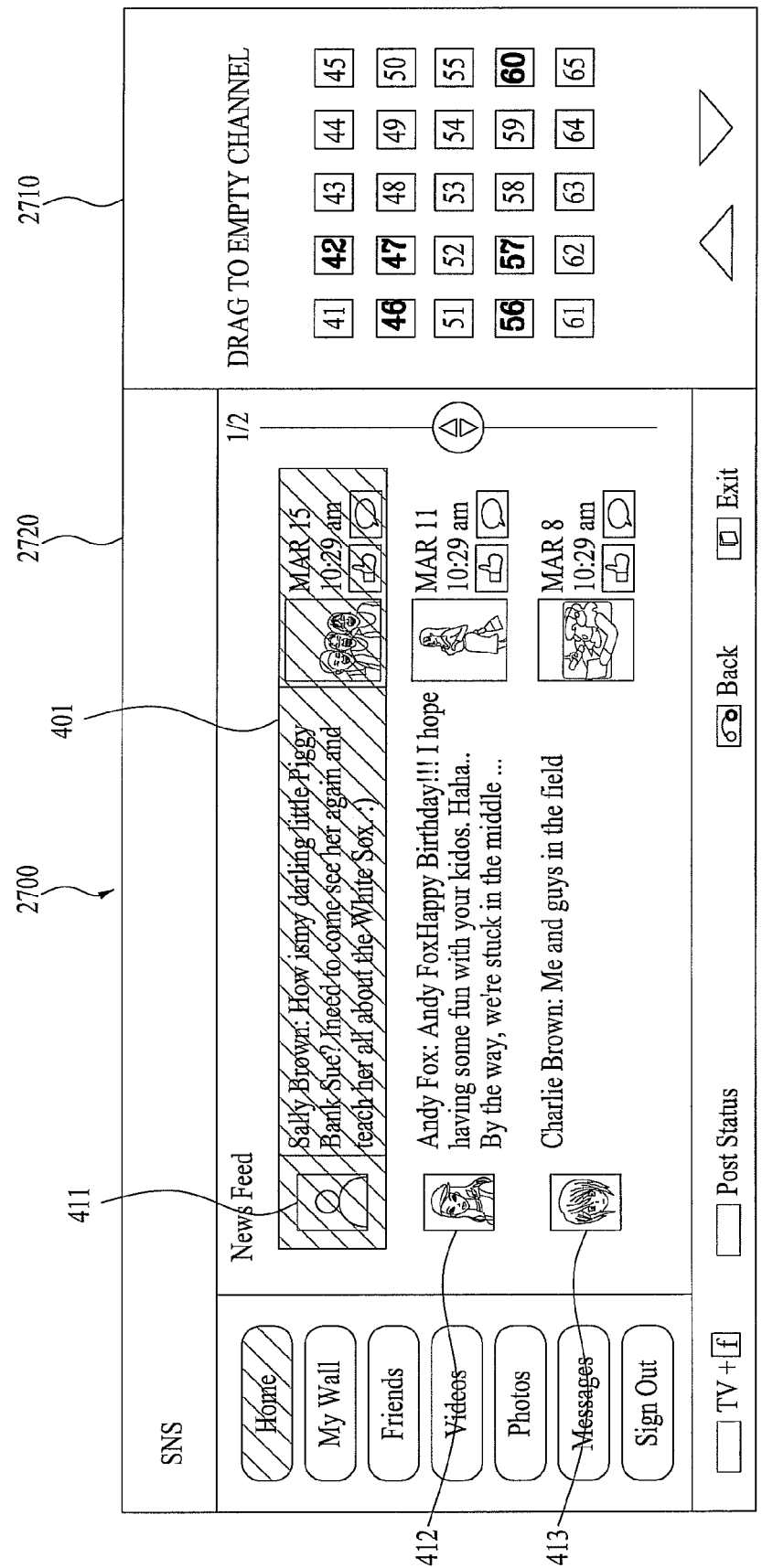
FIG. 27 is a diagram illustrating a screen on which one exemplary embodiment of a GUI for setting up a human channel is displayed.

FIG. 27 is a diagram illustrating a screen on which one exemplary embodiment of a GUI for setting up a human channel is displayed.

Referring to FIG. 27, the display 302 may display a GUI 2700. If the controller 340 detects a user action for setting up a human channel in a state in which the Web page 400 is displayed, the controller 340 may control displaying the GUI 2700 in response to the detected user action. In some embodiments, the controller 340 may control displaying the GUI 2700 after the Web page 400 is received.

The GUI 2700 includes a channel number region 2710 including at least one channel number and a human channel region 2720 including at least one human address. In one example, the Web page 400 illustrated in FIG. 4 may be displayed on the human channel region 2720, and the GUI 610 illustrated in FIG. 6 may be displayed on the channel number region 2710.

The user may drag each human address 411, 412 or 413 to the channel number region 2710 on the GUI 2700 and drop the dragged human address onto one of the channel numbers listed on the channel number region 2710. The human address 411, 412, and 413 may be represented by an icon, or another appropriate type of selectable object. The icon may have an image associated with the individual. Then, the controller 340 may store the channel number onto which the human address was dropped, the dropped human address and information associating the channel number and human address with each other in a human channel map. The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Figure 28:
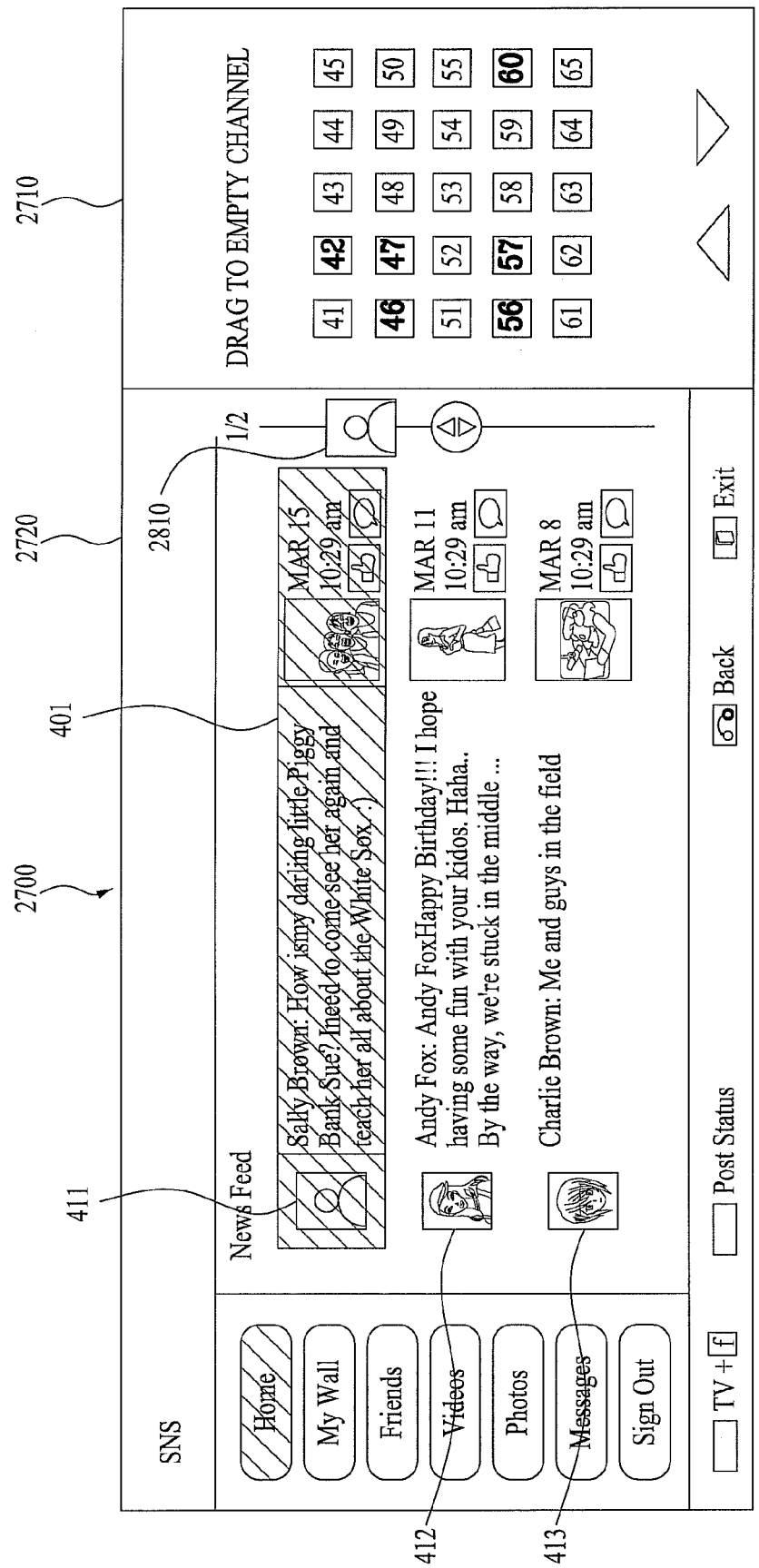
FIG. 28 is a diagram illustrating a screen in a state in which a human address is being dragged on the displayed GUI of FIG. 27.

FIG. 28 is a diagram illustrating a screen in a state in which a human address is being dragged on the displayed GUI of FIG. 27.

Referring to FIG. 28, an image 2810 represents a state in which the human address 411 is being dragged. If the image 2810 drops onto a channel number '60', the human address 411, the channel number '60' and information associating the human address 411 and the channel number '60' with each other may be stored in the human channel map.

Figure 29:
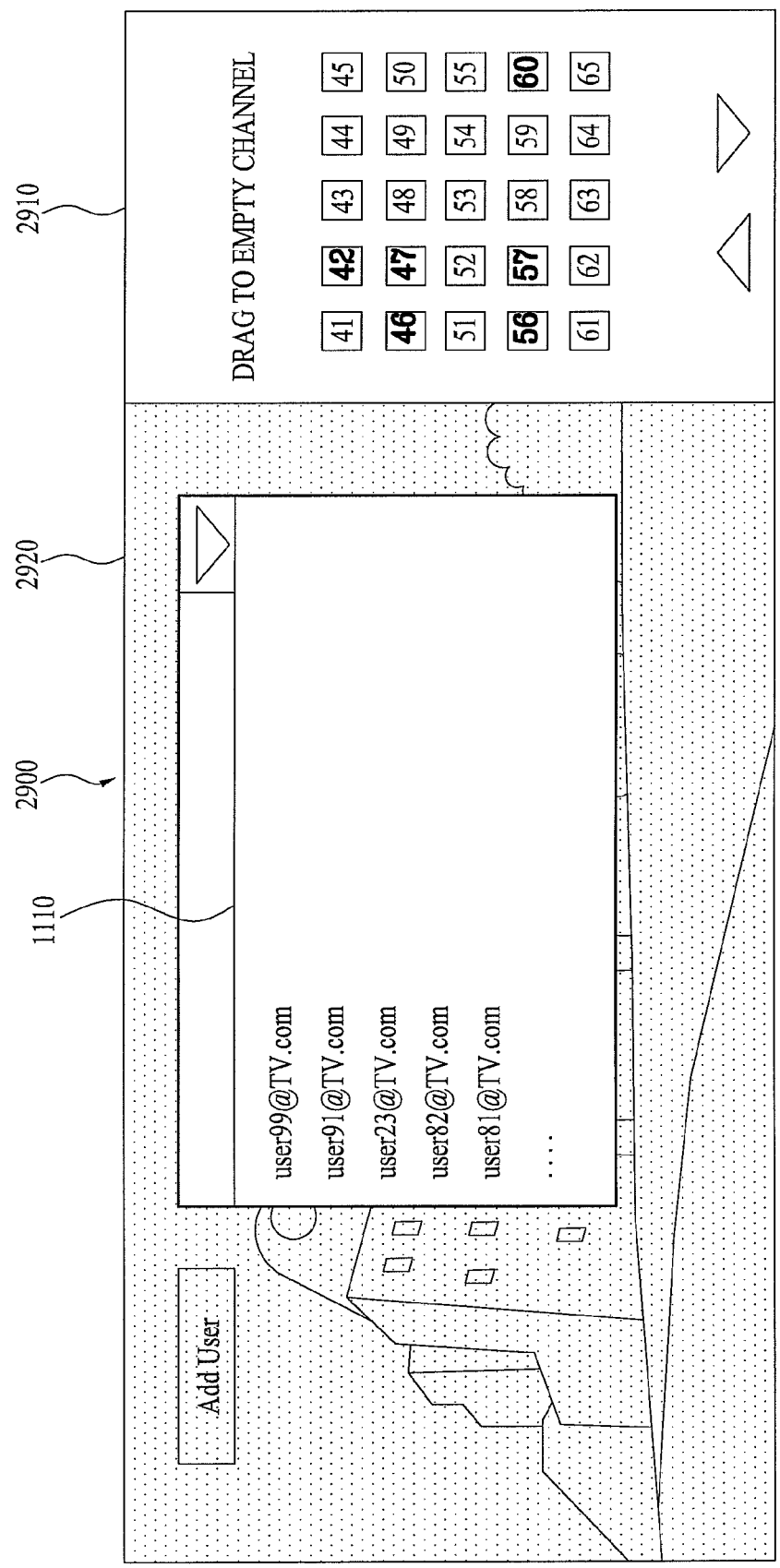
FIG. 29 is a diagram illustrating a screen on which another exemplary embodiment of a GUI for setting up a human channel is displayed.

FIG. 29 is a diagram illustrating a screen on which another exemplary embodiment of a GUI for setting up a human channel is displayed.

Referring to FIG. 29, the display 302 may display a GUI 2900. If the controller 340 detects a user action for setting up a human channel, the controller 340 may control display of the GUI 2900 in response to the detected user action. The user action is, for example, a user action for selecting the menu item 810 illustrated in FIG. 8, or a user action for selecting a separate channel set-up menu item.

The GUI 2900 includes a channel number region 2910 including at least one channel number and a human channel region 2920 including at least one human address. The GUI 1110 illustrated in FIG. 11 may be displayed on the human channel region 2920 and the GUI 610 illustrated in FIG. 6 may be displayed on the channel number region 2910.

The user may drag each human address 'user99@TV.com', 'user91@TV.com', 'user23@TV.com', etc., to the channel number region 2910 on the GUI 2900 and drop the dragged human address onto one of the channel numbers listed on the channel number region 2910. Then, the controller 340 may store the channel number to which the human address was dropped, the dropped human address and information associating the channel number and the human address with each other in a human channel map. The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Figure 30:
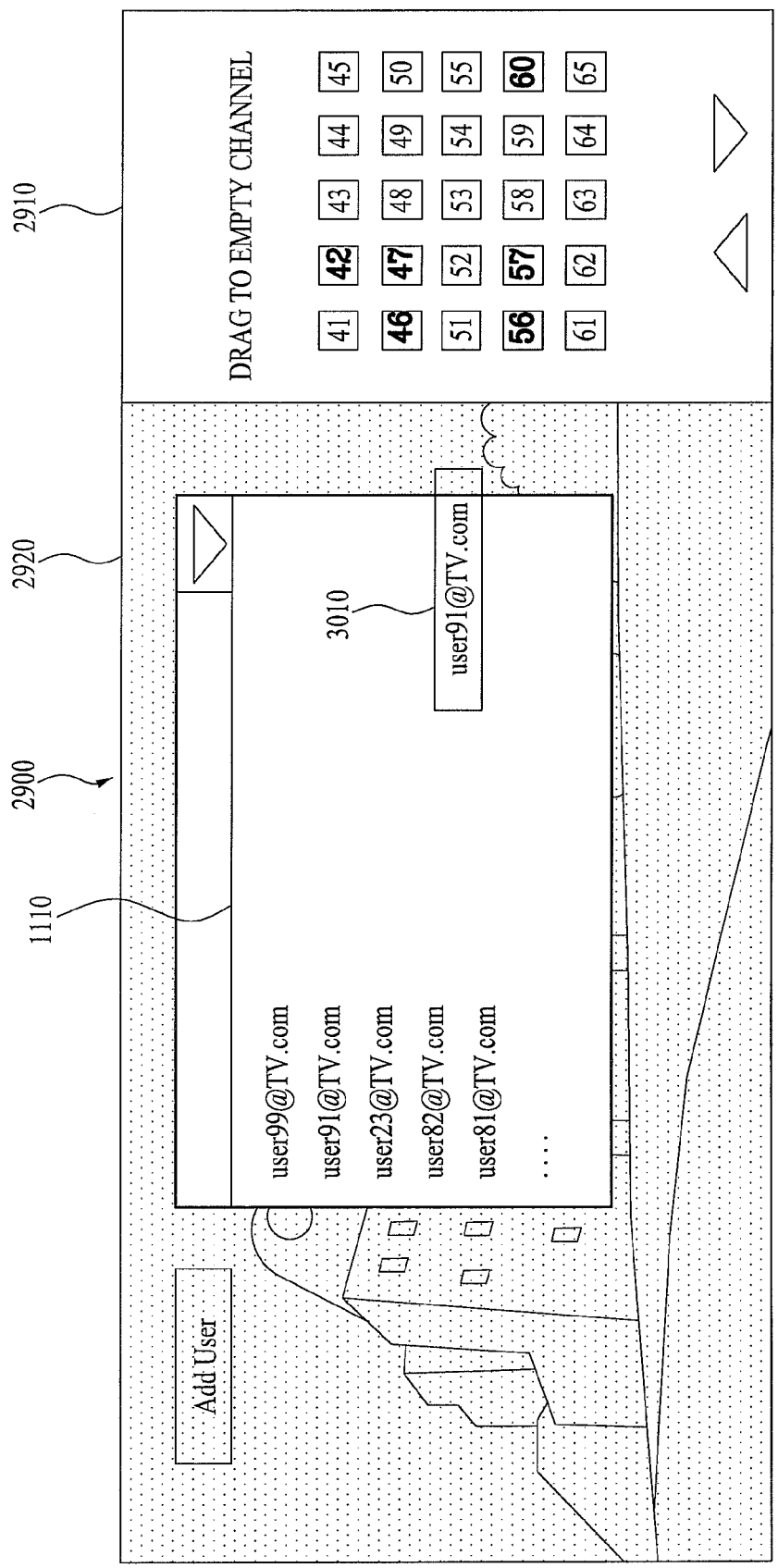
FIG. 30 is a diagram illustrating a screen in a state in which a human address is being dragged on the displayed GUI of FIG. 29.

FIG. 30 is a diagram illustrating a screen in a state in which a human address is being dragged on the displayed GUI of FIG. 29.

Referring to FIG. 30, an image 3010 represents a state in which the human address 'user91@TV.com' is being dragged. If the image 3010 is dragged onto the channel number '60', the human address 'user91@TV.com', the channel number '60' and information associating the human address 'user91@TV.com' and the channel number '60' with each other may be stored in the human channel map.

Figure 31:
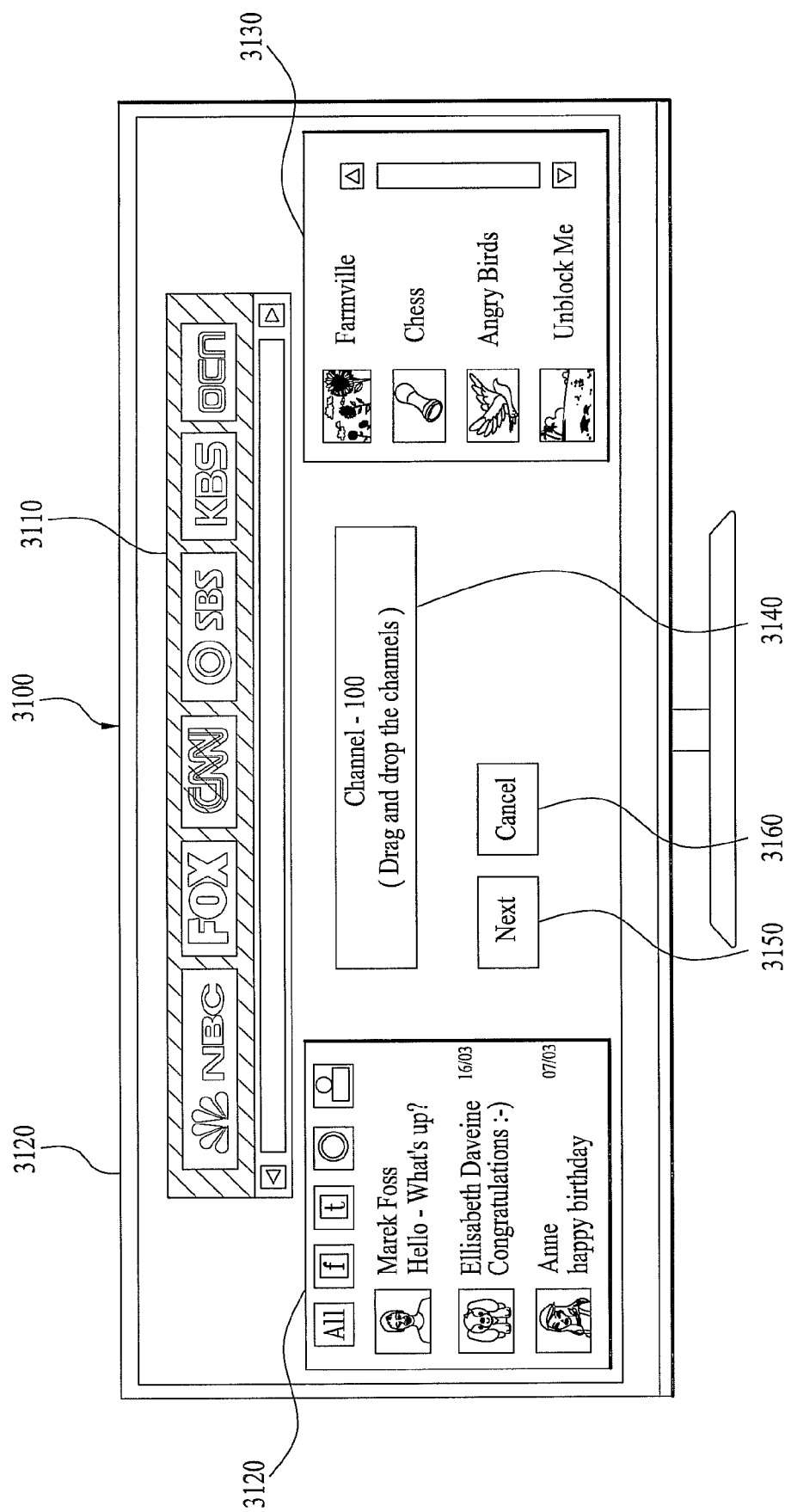
FIG. 31 is a diagram illustrating a screen on which an exemplary embodiment of a GUI for setting up a channel is displayed.

FIG. 31 is a diagram illustrating a screen on which an exemplary embodiment of a GUI for setting up a channel is displayed.

Referring to FIG. 31, the display 302 may display a GUI 3100. If the controller 340 detects a user action for setting up a channel, the controller 340 may control displaying the GUI 3100 in response to the detected user action. The user action is, for example, the user action for selecting the menu item 810 illustrated in FIG. 8, the user action for selecting the menu item 513 or the menu item 515 illustrated in FIG. 5, a user action for selecting a channel set-up menu item, or the like, which may be configured to display the GUI 3100.

The GUI 3100 includes a broadcast channel region 3110 including at least one broadcast channel, a human channel region 3120 including at least one human address and an App channel region 3130 including at least one App channel. The broadcast channel refers to a channel for providing real-time broadcasting received through a satellite, a terrestrial broadcast system or an IP network. The App channel may refer to a content provider or a service provider connectable through an IP network, or may refer to a channel for providing data reception/transmission with the content provider or the service provider. Also, the App channel may refer to a channel capable of receiving an Internet service provided by the content provider or the service provider. The Internet service refers to a Content on Demand (CoD) service, a YouTube service, an information service for providing weather, news and local information and enabling information retrieval and the like, an entertainment service related to gaming, singing and the like, a communication service related to TV mail and TV SMS services and the like, and other Internet services including an application providing service and the like.

The broadcast channel region 3110 lists broadcast channels, such as 'NBC', 'FOX', 'CNN', 'SBS', 'KBS' and 'OCN'. The human channel region 3120 lists human addresses, such as 'Marek Foss', 'Ellisabeth Daveine' and 'Anne'. The App channel region 3130 lists App channels, such as 'Farmville', 'Chess', 'Angry birds' and 'Unblock Me'.

The GUI 3100 further includes a channel number region 3140, a next channel call button 3150 and a cancel button 3160. The channel number region 3140 serves to indicate a particular channel number, and the next channel call button 3150 serves to switch the channel number indicated on the channel number region 3140 to another channel number. The cancel button 3160 serves to cancel a user action implemented on the GUI 3100.

The user may drag each human address 'Marek Foss', 'Ellisabeth Daveine' or 'Anne' to the channel number region 3140 on the GUI 3100 and may drop the dragged human address onto the channel number region 3140. Then, the controller 340 may store the channel number indicated on the channel number region 3140, the dropped human address and information associating the channel number and the human address with each other in a human channel map. The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Also, the user may drag each broadcast channel 'NBC', 'FOX', 'CNN', 'SBS', 'KBS' or 'OCN' to the channel number region 3140 on the GUI 3100 and may drop the dragged broadcast channel onto the channel number region 3140. Then, the controller 340 may store the channel number indicated on the channel number region 3140, the dropped broadcast channel and information associating the channel number and the broadcast channel with each other in a broadcast channel map. The broadcast channel map refers to a channel map in which the broadcast channel and the channel number are stored in association with each other.

The user may also drag each App channel 'Farmville', 'Chess', 'Angry bird' or 'Unblock Me' to the channel number region 3140 on the GUI 3100 and may drop the dragged App channel onto the channel number region 3140. Then, the controller 340 may store the channel number indicated on the channel number region 3140, the dropped App channel and information associating the channel number and the App channel with each other in an App channel map. The App channel map refers to a channel map in which the App channel and the channel number are stored in association with each other.

Figure 32:
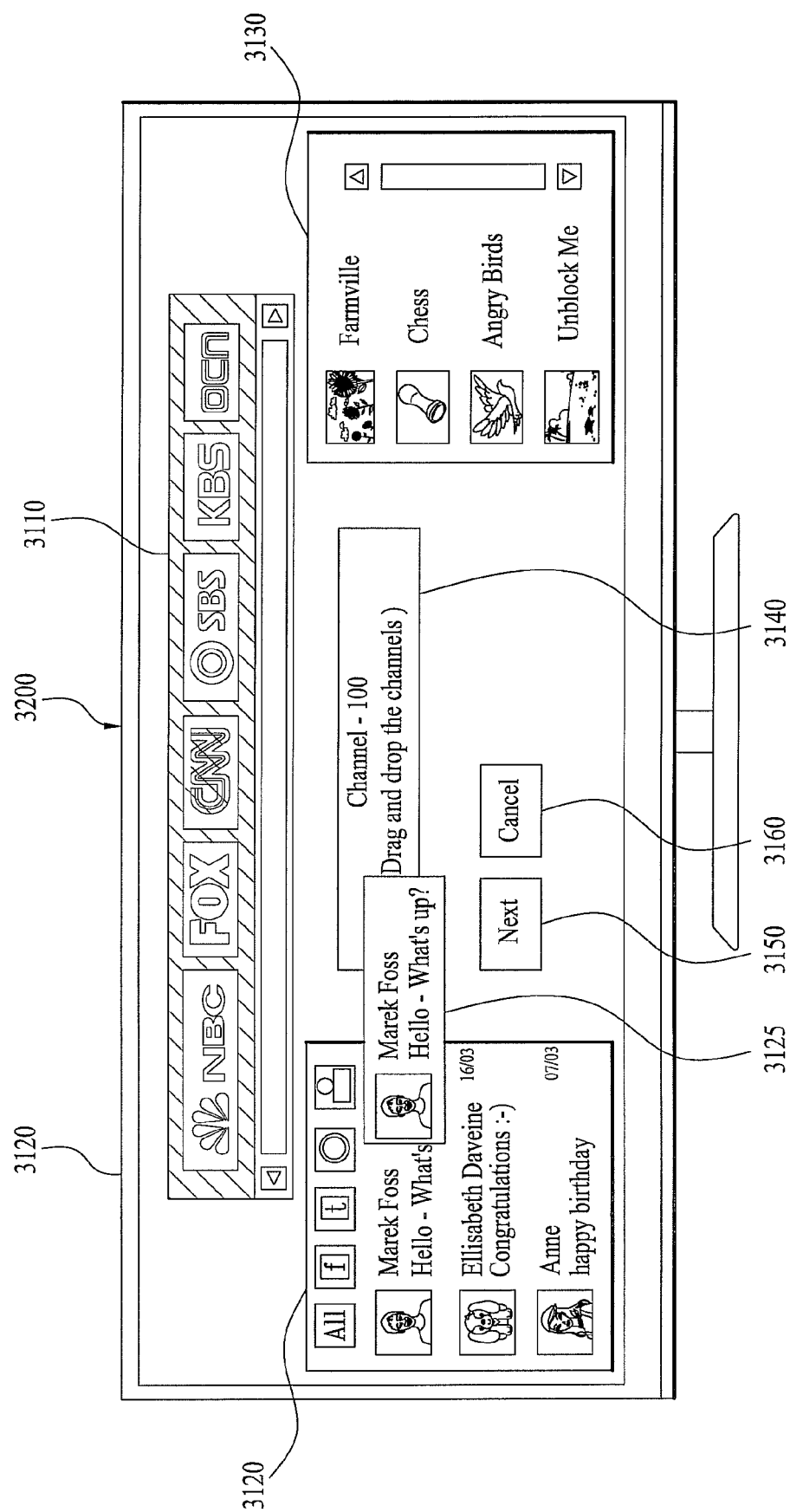
FIG. 32 is a diagram illustrating a screen in a state in which a human address is being dragged on the displayed GUI of FIG. 31.

FIG. 32 is a diagram illustrating a screen in a state in which a human address is being dragged on the displayed GUI of FIG. 31.

Referring to FIG. 32, a screen 3200 displays an image 3125 on the GUI 3100. The image 3125 represents a state in which the human address 'Marek Foss' is being dragged. If the image 3125 drops onto the channel number region 3140, the human address 'Marek Foss', the channel number '100' and information associating the human address 'Marek Foss' and the channel number '100' with each other may be stored in the human channel map.

Figure 33:
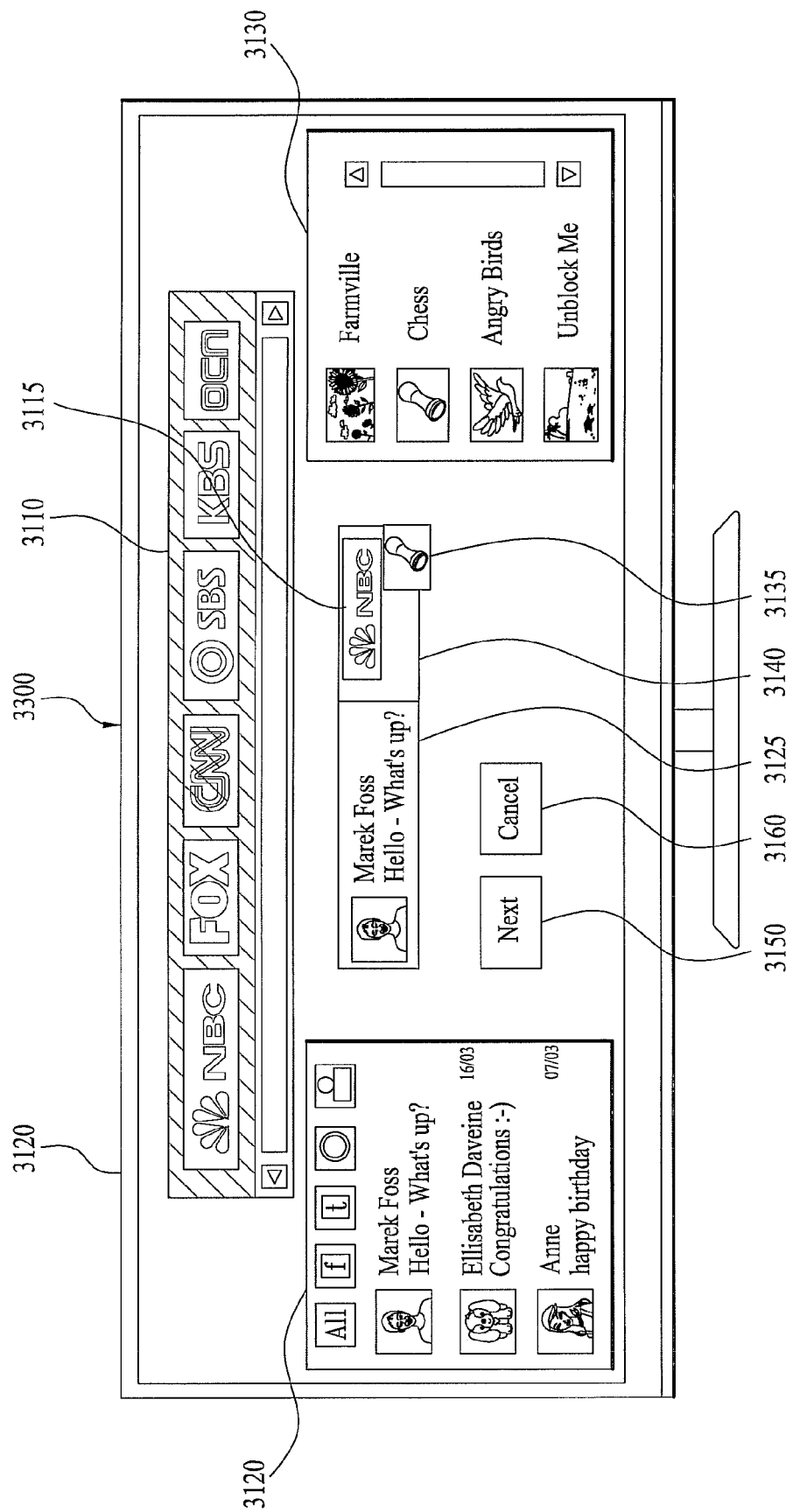
FIG. 33 is a diagram illustrating a screen in a state in which a broadcast channel, a human address and an App channel are dragged onto a channel number region of the displayed GUI of FIG. 31.

FIG. 33 is a diagram illustrating a screen in a state in which a broadcast channel, a human address and an App channel are dropped onto the channel number region of the displayed GUI of FIG. 31.

Referring to FIG. 33, a screen 3300 displays images 3115, 3125 and 3135 dropped onto the channel number region 3140. The image 3115 and the image 3135 respectively represent a state in which the broadcast channel 'NBC' and the App channel 'Chess' were dropped. In this case, the broadcast channel, the human address and the App channel may be mapped to the same channel number. In other words, the same channel number may be assigned to a broadcast channel, a human channel and an App channel.

It should be appreciated that a particular channel number may be assigned multiple SNS accounts associated with a particular individual or multiple individuals. For example, an individual may have multiple SNS accounts, such as a facebook account and a twitter account, each represented by an image or icon in the human channel region 3120. In this case, the images or icons corresponding to each of the SNS accounts may be dragged into the channel number region 3140 and associated with the corresponding channel number (e.g., channel 100). Alternatively, the multiple SNS accounts for a particular individual may be assigned to different channels. In another embodiment, icons for multiple SNS accounts of different users (e.g., SNS accounts corresponding to Marek Foss and Anne) may be dropped in the channel number region 3140 and associated with a particular channel number (e.g., channel 100). In this case, the group of SNS addresses may be given a human address (or SNS identifier) that represents the group, for example, "family." The human address for the group may be associated with a particular channel number.

Figure 34A:
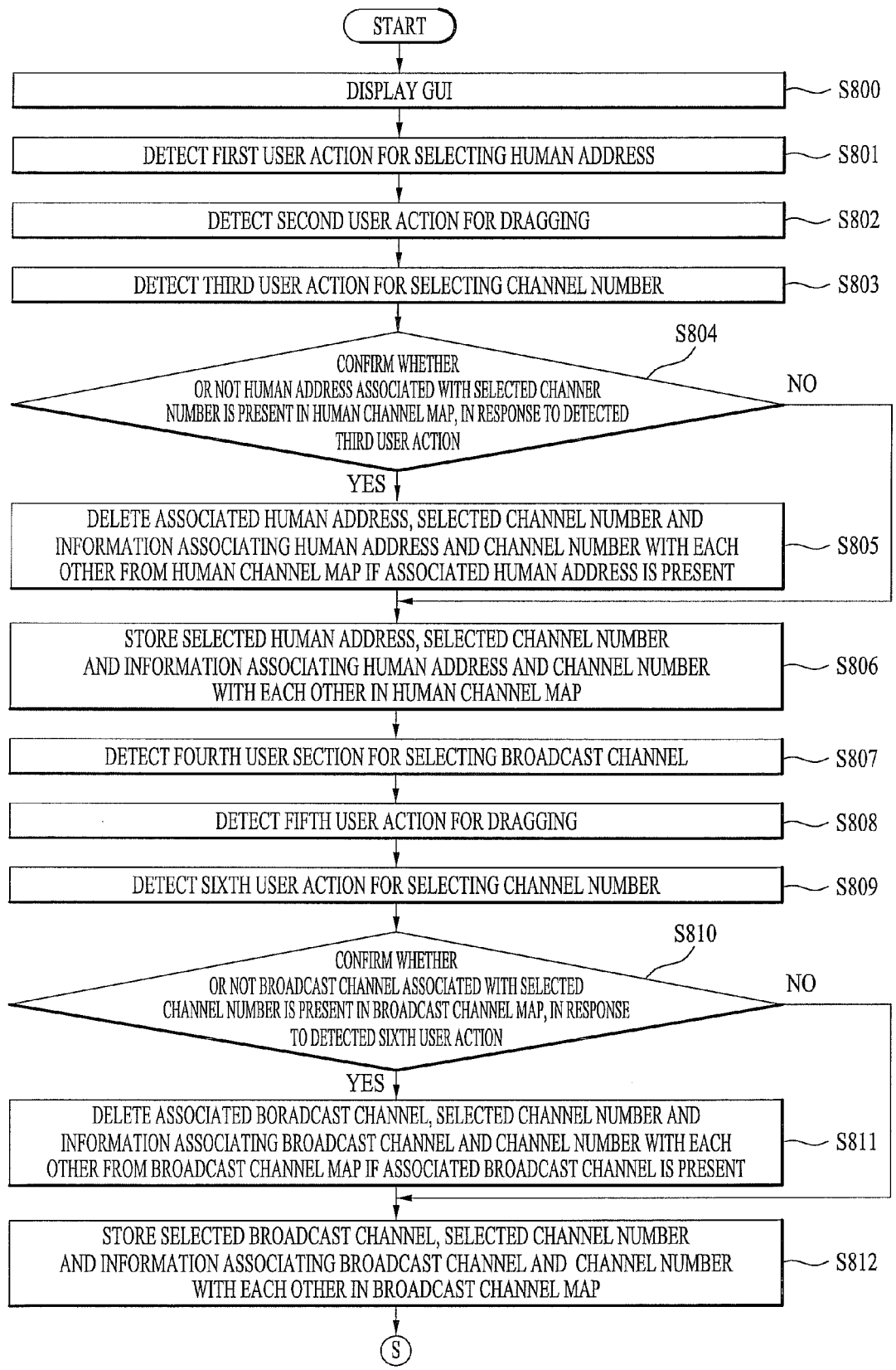
FIGS. 34A and 34B are flowcharts illustrating an implementation procedure of a further exemplary embodiment for a method of constructing a channel map in accordance with the present invention.
Figure 34B:
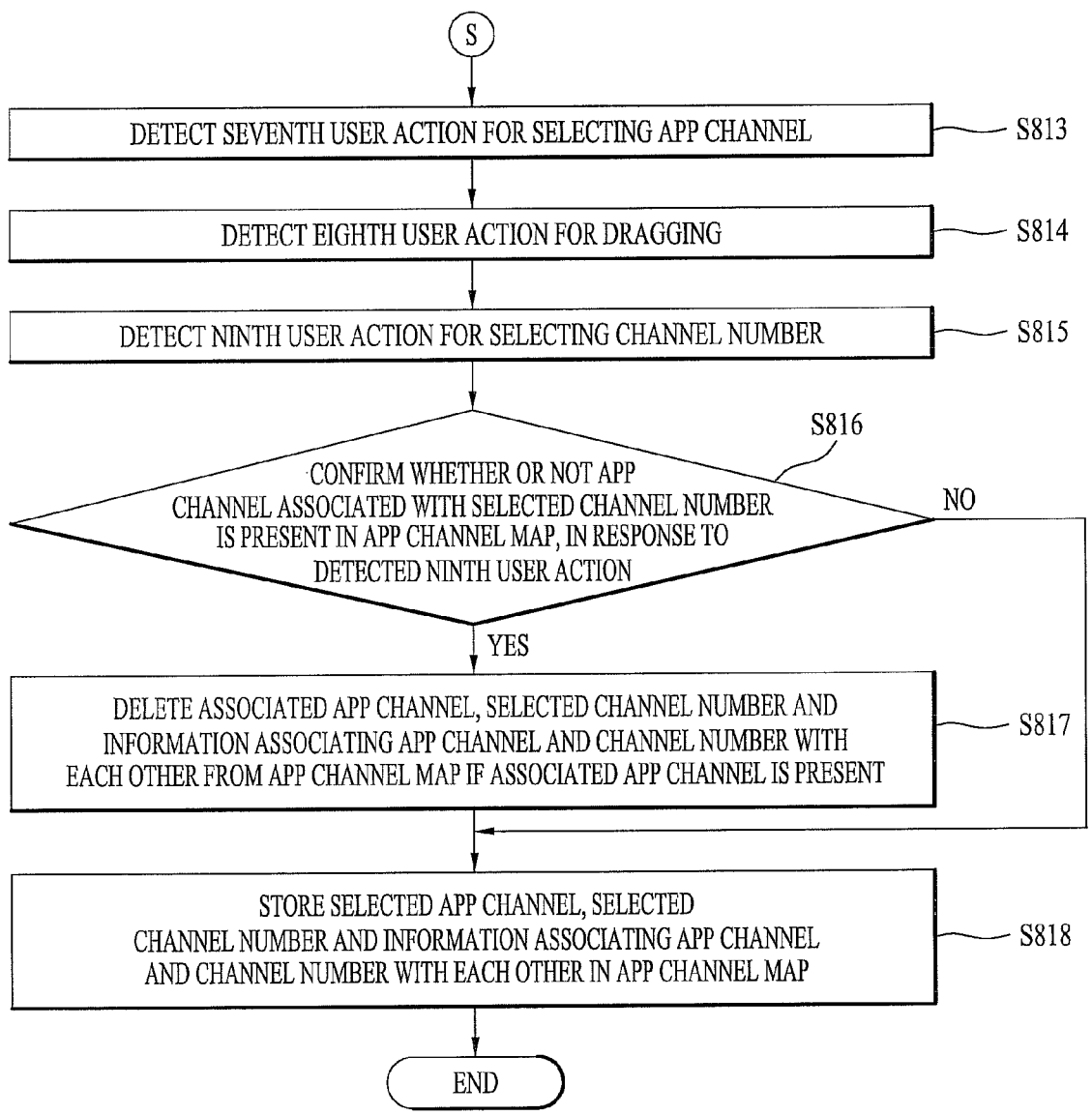

FIG. 34A and FIG. 34B are flowcharts illustrating an implementation procedure of a further exemplary embodiment for a method of constructing a channel map in accordance with the present disclosure.

Referring to FIG. 34A and FIG. 34B, the display 302 displays a GUI for setting up a channel (S800). The displayed GUI may be one of the GUI 2700 illustrated in FIG. 27, the GUI 2900 illustrated in FIG. 29 or the GUI 3100 illustrated in FIG. 31.

The controller 340 detects a first user action for selecting a human address (S801). The first user action may be a user action for generating a down event (e.g., a selection) in a region at which the human address is located.

The controller 340 detects a second user action for requesting dragging (S802). The second user action may occur consecutively after the first user action. The second user action may be a user action for successively generating a dragging event. The controller 340 controls dragging the human address selected by the first user action.

The controller 340 detects a third user action for selecting a channel number (S803). The third user action may be a user action for generating a drop event in a region at which the channel number is located. The controller 340 controls dropping the dragged human address onto the region at which the channel number selected by the third user action is located, in response to the detected third user action.

The controller 340 confirms whether or not a human address associated with the selected channel number is present in a human channel map, in response to the detected third user action (S804). The human channel map may be the human channel map 1210 in FIG. 12 or may include the human channel map 1210, the first access information map 1230, the second access information map 1240, the third access information map 1250, the fourth access information map 1260 and the fifth access information map 1270 as illustrated in FIG. 12.

If the associated human address is present, the controller 304 deletes the associated human address, the selected channel number and information associating the associated human address and the selected channel number with each other from the human channel map (S805).

Then, the controller 340 stores the selected human address, the selected channel number and information associating the selected human address and the selected channel number with each other in the human channel map (S806).

The controller 340 detects a fourth user action for selecting a broadcast channel (S807). The fourth user action may be a user action for generating a down event in a region at which the broadcast channel is located.

The controller 340 detects a fifth user action for requesting dragging (S808). The fifth user action may occur consecutively after the fourth user action. The fifth user action may be a user action for successively generating a dragging event. The controller 340 controls dragging the broadcast channel selected by the fourth user action, in response to the detected fifth user action.

The controller 340 detects a sixth user action for selecting a channel number (S809). The sixth user action may be a user action for generating a drop event in a region at which the channel number is located. The controller 340 controls dropping the dragged broadcast channel onto the region at which where the selected channel number is located, in response to the detected sixth user action.

The controller 340 confirms whether or not a broadcast channel associated with the selected channel number is present in a broadcast channel map, in response to the detected sixth user action (S810).

If the associated broadcast channel is present, the controller 304 deletes the associated broadcast channel, the selected channel number and information associating the associated broadcast channel and the selected channel number with each other from the broadcast channel map (S811).

Then, the controller 340 stores the selected broadcast channel, the selected channel number and information associating the selected broadcast channel and the selected channel number with each other in the broadcast channel map (S812).

The controller 340 detects a seventh user action for selecting an App channel (S813). The seventh user action may be a user action for generating a down event in a region at which the App channel is located.

The controller 340 detects an eighth user action for requesting dragging (S814). The eighth user action may occur consecutively after the seventh user action. The eighth user action may be a user action for successively generating a dragging event. The controller 340 controls dragging the App channel selected by the seventh user action, in response to the detected eighth user action.

The controller 340 detects a ninth user action for selecting a channel number (S815). The ninth user action may be a user action for generating a drop event in a region at which the channel number is located. The controller 340 controls dropping the dragged App channel onto the region at which the channel number selected by the ninth user action is present, in response to the detected ninth user action.

The controller 340 confirms whether or not an App channel associated with the selected channel number is present in an App channel map, in response to the detected ninth user action (S816).

If the associated App channel is present, the controller 304 deletes the associated App channel, the selected channel number and information associating the associated App channel and the selected channel number with each other from the App channel map (S817).

Then, the controller 340 stores the selected App channel, the selected channel number and information associating the selected App channel and the selected channel number with each other in the App channel map (S818).

FIG. 35 is a diagram illustrating an exemplary embodiment of a broadcast screen on which a human channel map is displayed.

Referring to FIG. 35, the display 302 may display a screen 3500. The screen 3500 displays a broadcast program 3510 of a broadcast channel and a human channel map. If the controller 340 detects a user action for requesting display of a human channel map in a state in which the broadcast program 3510 is displayed on the screen 3500, the controller 340 may control displaying a human channel map 3520 in response to the detected user action.

The human channel map 3520 displays a human address 3531 and a channel number 3533 associated with the human address 3531, which are stored in the human channel map 1210 of FIG. 12. The human channel map 3520 also displays a broadcast channel 3535 that a person indicated by the human address 3531 is viewing, a broadcast program 3537 and display time information 3539 of the broadcast program 3537. A channel guiding signal (or a signal or message for identifying a channel), which includes at least one of the broadcast channel 3535, the broadcast program 3537 or the display time information 3539, may be received according to Step S310 of FIG. 18. That is, instead of content, the channel guiding signal is received in Step S310.

In some embodiments, the channel guiding signal may be received from the server 10 illustrated in FIG. 1.

The controller 340 may transmit a channel guiding signal, which includes at least one of the broadcast program 3510 which is being displayed, a broadcast channel which broadcasts the broadcast program 3510 or display time information of the broadcast program 3510, to an electronic device or a server. The channel guiding signal may be transmitted in a constant period or whenever a broadcast program being displayed is switched. The controller 340 may transmit the channel guiding signal to the electronic device or the server according to an access method associated with the channel numbers included in the human channel map. The server for receiving the channel guiding signal may be the server 10 illustrated in FIG. 1. The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

Figure 36:
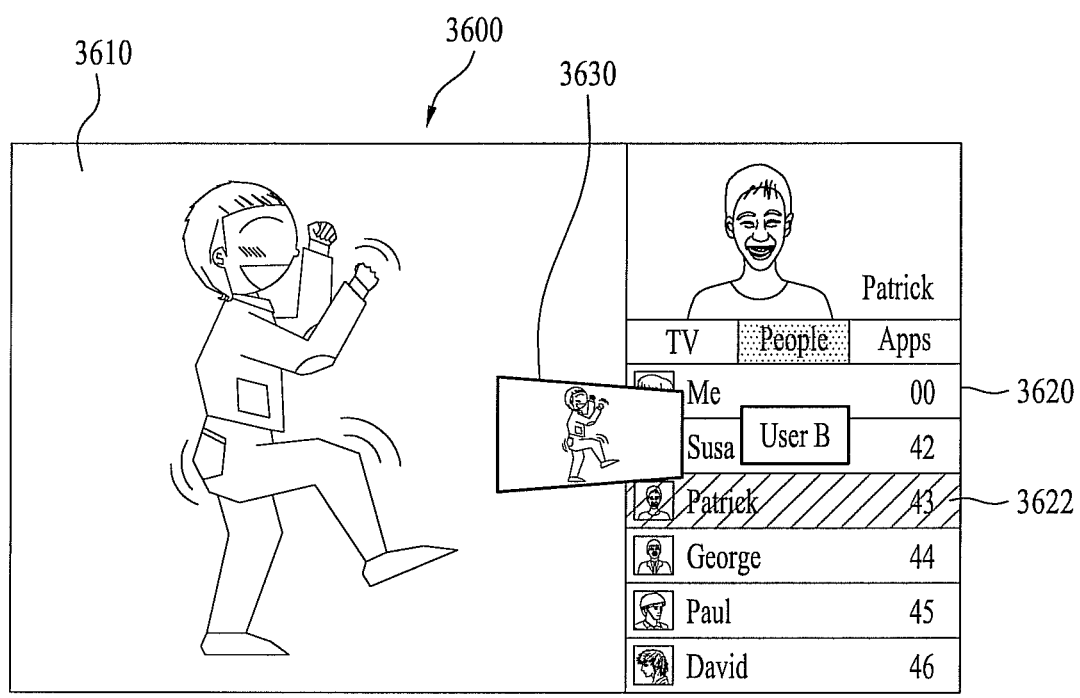
FIG. 36 is a diagram illustrating an exemplary embodiment of a screen for invitation to view a channel.

FIG. 36 is a diagram illustrating an exemplary embodiment of a screen for invitation to view a channel.

Referring to FIG. 36, the display 302 may display a GUI 3600. If the controller 340 detects a user action for requesting display of a human channel map while a broadcast program 3610 is being displayed on the screen 3600, the controller 340 may control displaying a human channel map 3620 in response to the detected user action.

The human channel map 3620 displays the human address 'Me' and the channel number '00' associated with the human address 'Me', which are stored in the human channel map 1210 of FIG. 12.

The user may drag a broadcast program from an original display region 3610 thereof to the human channel map 3620 and then, may drop the dragged broadcast program 3630 onto a position at which a human channel 3622 is located. The controller 340 may control displaying an image 3630 representing the dragged broadcast program on the screen, in response to the user dragging action. The controller 340 also generates and controls transmitting a channel viewing request signal for requesting viewing of the broadcast program 3630 to an electronic device (e.g., a remote multi-functional display device) associated with the human channel 3622. The channel viewing request signal may be transmitted to the electronic device or the server according to an access method associated with the channel numbers included in the human channel map. The human channel map may be the human channel map 1210 in FIG. 12, or may include the human channel map 1210, the first access information map 1230, the second access information map 1240, the third access information map 1250, the fourth access information map 1260 and the fifth access information map 1270 as illustrated in FIG. 12.

In some embodiments, the controller 340 may control transmission of the signal for requesting viewing of the broadcast program 3630 to the server. The server may be the server 10 illustrated in FIG. 1.

In some embodiments, when the image 3630 is located at the human channel, the controller 340 may control displaying a message 'User B' which represents a human address associated with the human channel.

In some embodiments, if the controller 340 detects a user action for selecting the broadcast program 3610 and a user action for selecting the channel number, the controller 340 controls transmitting a channel viewing request signal for requesting viewing of the broadcast program 3610 to an electronic device associated with the human channel indicated by the selected channel number, in response to the detected user action for selecting the channel number. The user action for selecting the broadcast program 3630 is, for example, touching a region where the broadcast program 3630 is displayed, pressing a predetermined button (e.g., a 'select' button) in a state in which an indicator is located at the region where the broadcast program 3630 is displayed, and pressing a predetermined button (e.g., a 'select' button) in a state in which the region where the broadcast program 3630 is displayed is focused. The user action for selecting the channel number is, for example, pressing a numeric key of a remote controller, touching the human channel listed in the human channel map 3620, pressing a predetermined button (e.g., a 'select' button) in a state in which an indicator is located at the human channel listed in the human channel map 3620, and pressing a predetermined button (e.g., a 'select' button) in a state in which the human channel listed in the human channel map 3620 is focused.

Figure 37:
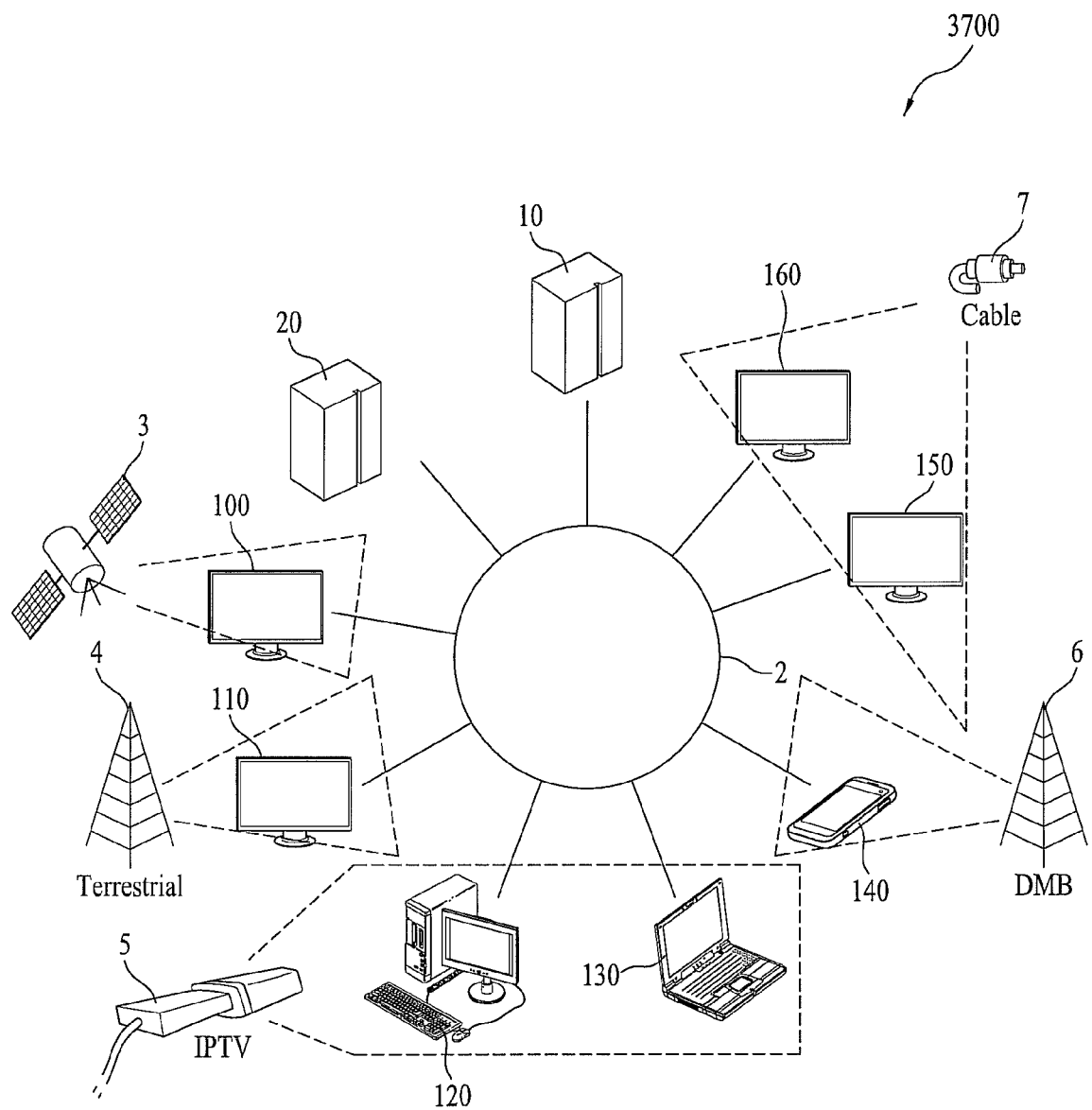
FIG. 37 is a schematic diagram illustrating a configuration of another exemplary embodiment of a broadcast system in accordance with the present disclosure.

FIG. 37 is a schematic diagram illustrating a configuration of another exemplary embodiment of a broadcast system in accordance with the present disclosure.

Referring to FIG. 37, a broadcast system 3700 in accordance with the present disclosure may include the first server 10, the second server 20, the first digital TV 100, the second digital TV 110, the personal computer system 120, the notebook computer 130, the mobile terminal 140, a third digital TV 150 and a fourth digital TV 160. The first server 10, the second server 20, the first digital TV 100, the second digital TV 110, the personal computer system 120, the notebook computer 130 and the mobile terminal 140 respectively correspond to the first server 10, the second server 20, the first digital TV 100, the second digital TV 110, the personal computer system 120, the notebook computer 130 and the mobile terminal 140 as described above with reference to FIG. 1 and thus, a detailed description thereof is omitted. Even the third digital TV 150 and the fourth digital TV 160 correspond to the first digital TV 100 and thus, a detailed description thereof is omitted hereinafter.

The first digital TV 100, the second digital TV 110, the personal computer system 120, the notebook computer 130, the mobile terminal 140, the third digital TV 150 and the fourth digital TV 160 may receive broadcast channels through different transmission media. The first digital TV 100 may receive broadcast channels through a satellite 3, the second digital TV 110 may receive broadcast channels through a terrestrial broadcast system 4, and the personal computer system 120 and the notebook computer 130 may receive broadcast channels through an IP network 5. Also, the mobile terminal 140 may receive broadcast channels through a Digital Multimedia Broadcasting (DMB) system 6, and the third digital TV 150 and the fourth digital TV 160 may receive broadcast channels through a cable 7.

The first digital TV 100, the second digital TV 110, the personal computer system 120, the notebook computer 130, the mobile terminal 140, the third digital TV 150 and the fourth digital TV 160 may receive broadcast channels from different service providers respectively.

The first digital TV 100, the second digital TV 110, the personal computer system 120, the notebook computer 130, the mobile terminal 140, the third digital TV 150 and the fourth digital TV 160 may receive broadcast channels from the same service provider, and kinds and range of broadcast channels transmitted from the service provider may be identical or different.

Even if the first digital TV 100, the second digital TV 110, the personal computer system 120, the notebook computer 130, the mobile terminal 140, the third digital TV 150 and the fourth digital TV 160 receive different kinds of broadcast services from different transmission media or service providers, the first digital TV 100, the second digital TV 110, the personal computer system 120, the notebook computer 130, the mobile terminal 140, the third digital TV 150 and the fourth digital TV 160 may search for a channel, which provides a broadcast program corresponding to the received channel viewing request signal, using Electronic Program Guide (EPG) data and information included in the received channel viewing request signal, and may receive the broadcast program through the channel.

Figure 38:
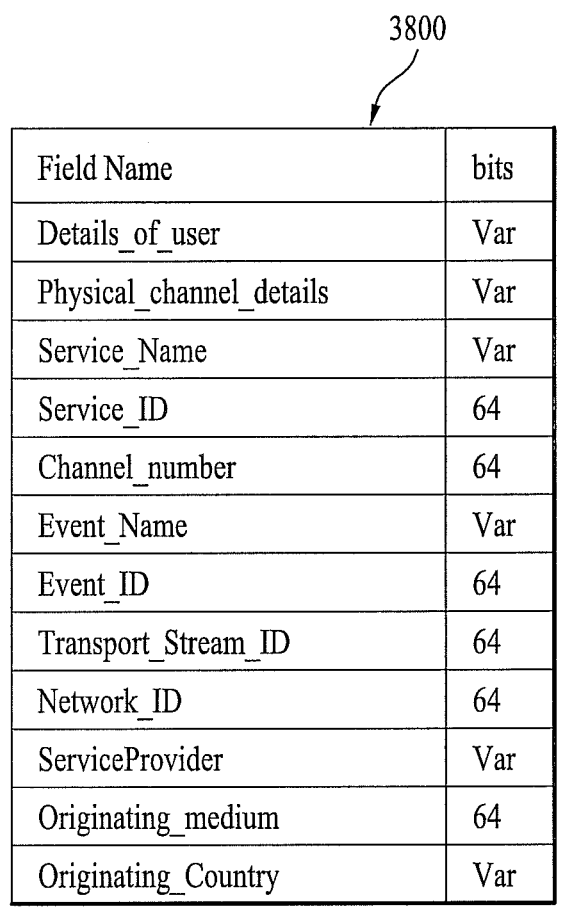
FIG. 38 is a diagram illustrating a configuration of an exemplary embodiment for a channel invitation packet.

FIG. 38 is a diagram illustrating a configuration of an exemplary embodiment for a channel invitation packet.

Referring to FIG. 38, the transmitted channel viewing request signal may have a format 3800. The packet 3800 may include a Details_of_user field, a Physical_channel_details field, a Service_Name field, a Service_ID field, a Channel_number field, an Event_Name field, an Event_ID field, a Transport_Stream_ID field, a Network_ID field, a Service-Provider field, an Originating_medium field and an Originating_Country field.

The Details_of_user field includes detailed user information. Specifically, the Details_of_user field includes detailed information about a user who sends a channel viewing request signal.

The Physical_channel_details field includes detailed information about a physical channel which transmits a broadcast program requested to view.

The Service_Name field includes a service name of a broadcast program requested to view.

The Service_ID field includes a service ID of a broadcast program requested to view.

The Channel_number field includes a channel number of a broadcast program requested to view.

The Event_Name field includes an event name of a broadcast program requested to view.

The Event_ID field includes an event ID of a broadcast program requested to view.

The Transport_Stream_ID field includes a transport stream ID of a broadcast program requested to view.

The Network_ID field includes a network ID of a broadcast program requested to view.

The ServiceProvider field includes information about a service provider for providing a broadcast program requested to view.

The Originating_medium field includes information about a transmission medium for transmitting a broadcast program requested to view.

The Originating_Country field includes information about a nation or an area (e.g., geographical area or region) from which a broadcast program, requested to view, is transmitted.

Figure 39:
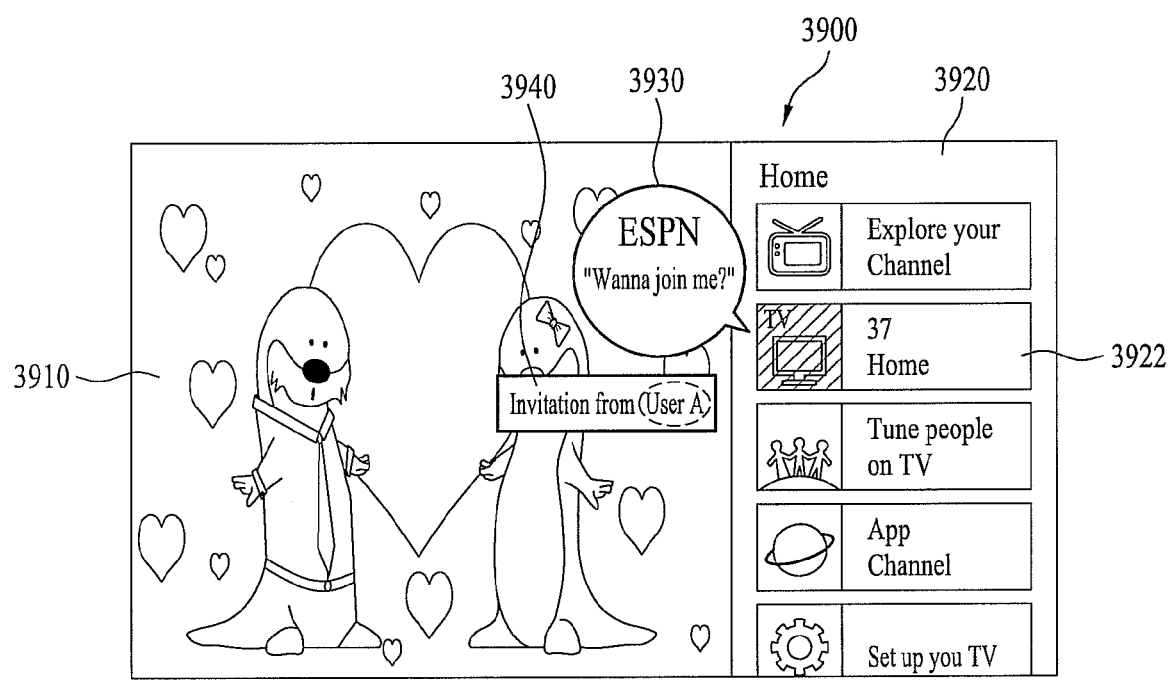
FIG. 39 is a diagram illustrating an exemplary embodiment of a screen displayed when invitation to view a channel is made.

FIG. 39 is a diagram illustrating an exemplary embodiment of a screen displayed when invitation to view a channel is made.

Referring to FIG. 39, the display 302 may display a screen 3900. The screen 3900 displays a broadcast program 3910 and a menu map 3920. The screen 3900 also displays a guidance message 3930, which indicates a broadcast channel included in a broadcast viewing request signal, and a message 3940 which indicates a user who sends a broadcast viewing request signal. The guidance message 3930 may be displayed as a message associated with a TV menu item 3922.

The controller 340 controls displaying the guidance message 3930 and the message 3940 when receiving the broadcast viewing request signal.

Figure 40:
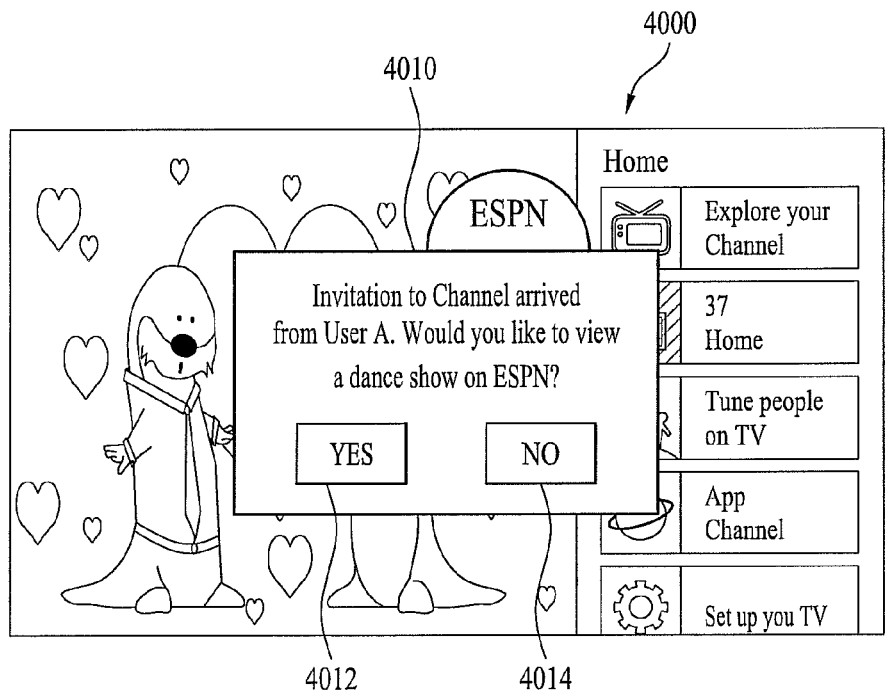
FIG. 40 is a diagram illustrating one exemplary embodiment of a guidance message with regard to invitation to view a channel.

FIG. 40 is a diagram illustrating one exemplary embodiment of a guidance message with regard to invitation to view a channel.

Referring to FIG. 40, the display 302 may display a guidance message 4010. If a broadcast viewing request signal is transmitted to the controller 340, the controller 340 may generate the guidance message 4010 and control displaying the generated guidance message 4010. In some embodiments, if the controller 340 detects a user action for selecting the guidance message 3930 illustrated in FIG. 39, the controller 340 may control displaying the guidance message 4010 in response to the detected user action.

The guidance message 4010 informs of a user A who sends a broadcast viewing request signal and makes inquiry about whether or not to view a requested broadcast program (e.g., a dance show on ESPN). The guidance message 4010 includes a 'Yes' button 4012 for accepting viewing and a 'No' button 4014 for rejecting viewing. In one embodiment, the guidance message 4010 may also display other users who are currently viewing the broadcast program or users who have been invited to view the broadcast program.

If the controller 340 detects a user action for accepting invitation to view a channel, the controller 340 controls displaying the requested broadcast program, in response to the detected user action. The user action may be a user action of pressing the button 4012.

If the controller 340 detects a user action for rejecting the invitation to view a channel, the controller 340 controls a screen 4000 to continuously display the broadcast program 3910. The user action may be a user action of pressing the button 4014.

Figure 41:
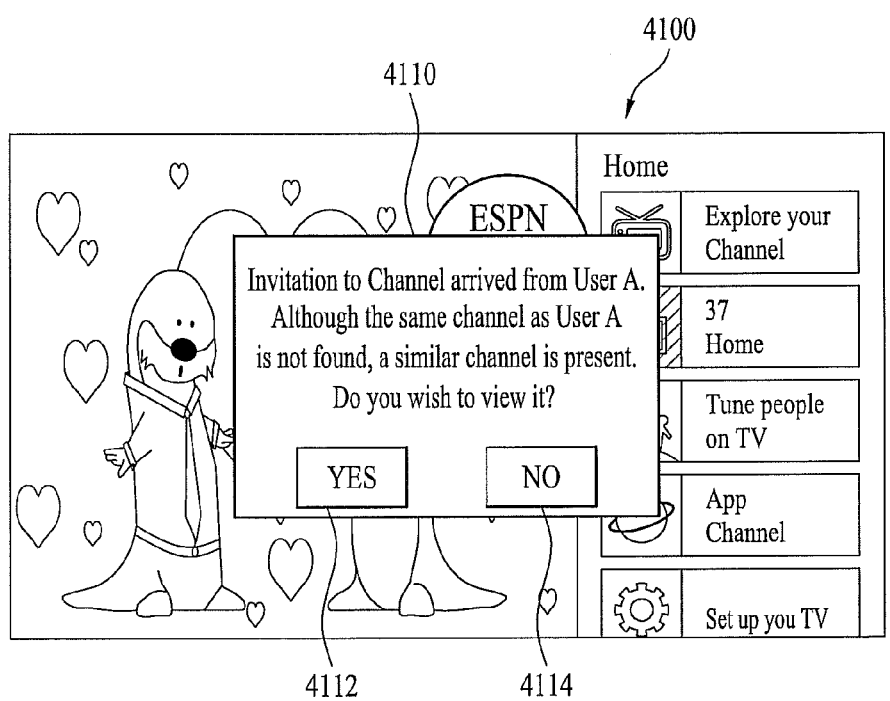
FIG. 41 is a diagram illustrating another exemplary embodiment of a guidance message with regard to invitation to view a channel.

FIG. 41 is a diagram illustrating another exemplary embodiment of a guidance message with regard to invitation to view a channel.

Referring to FIG. 41, the display 302 may display a message 4110. The controller 340 may control displaying the message 4110 when receiving a broadcast viewing request signal. In some embodiments, if the controller 340 detects a user action for selecting the guidance message 3930 illustrated in FIG. 39, the controller 340 may control displaying the guidance message 4110 in response to the detected user action.

The guidance message 4110 informs of a user A who sends a broadcast viewing request signal and makes inquiry about whether or not to view a channel similar to a requested broadcast channel because the requested broadcast channel is not found. The guidance message 4110 includes a 'Yes' button 4112 for accepting viewing and a 'No' button 4114 for rejecting viewing.

If the controller 340 detects a user action for accepting invitation to view a channel, the controller 340 controls displaying a similar broadcast program, in response to the detected user action. The user action may be a user action of pressing the button 4112.

If the controller 340 detects a user action for rejecting invitation to view a channel, the controller 340 controls a screen 4100 to continuously display the broadcast program 3910. The user action may be a user action of pressing the button 4114.

Figure 42:
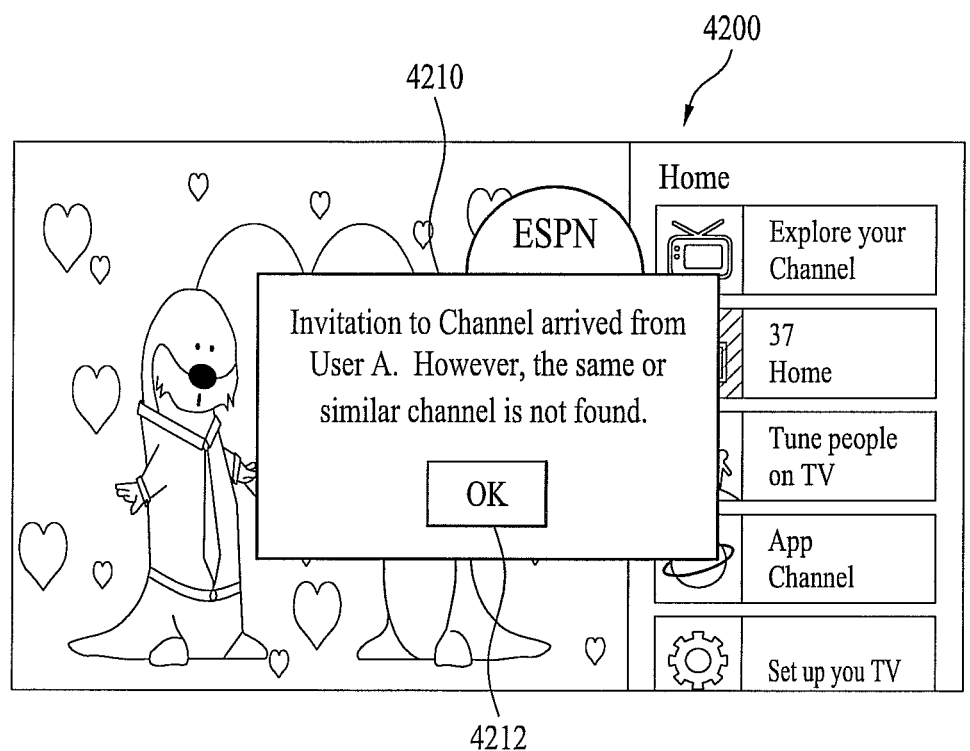
FIG. 42 is a diagram illustrating a further exemplary embodiment of a guidance message with regard to invitation to view a channel.

FIG. 42 is a diagram illustrating a further exemplary embodiment of a guidance message with regard to invitation to view a channel.

Referring to FIG. 42, the display 302 may display a guidance message 4210. The controller 340 may control displaying a guidance message 4210 when receiving a broadcast viewing request signal. In some embodiments, if the controller 340 detects a user action for selecting the guidance message 3930 illustrated in FIG. 39, the controller 340 may control displaying the guidance message 4210 in response to the detected user action.

The guidance message 4210 informs of a user A who sends a broadcast viewing request signal and also, informs that a channel, which is the same as or similar to a requested broadcast program, is not found. The guidance message 4210 includes an 'OK' button 4212.

If the controller 340 detects a user action for confirming that viewing of an invited channel is not possible, the controller 340 removes the guidance message 4210 from a screen 4200 in response to the detected user action and controls the screen 4200 to continuously display the broadcast program 3910. The user action may be a user action of pressing the button 4212.

Figure 43A:
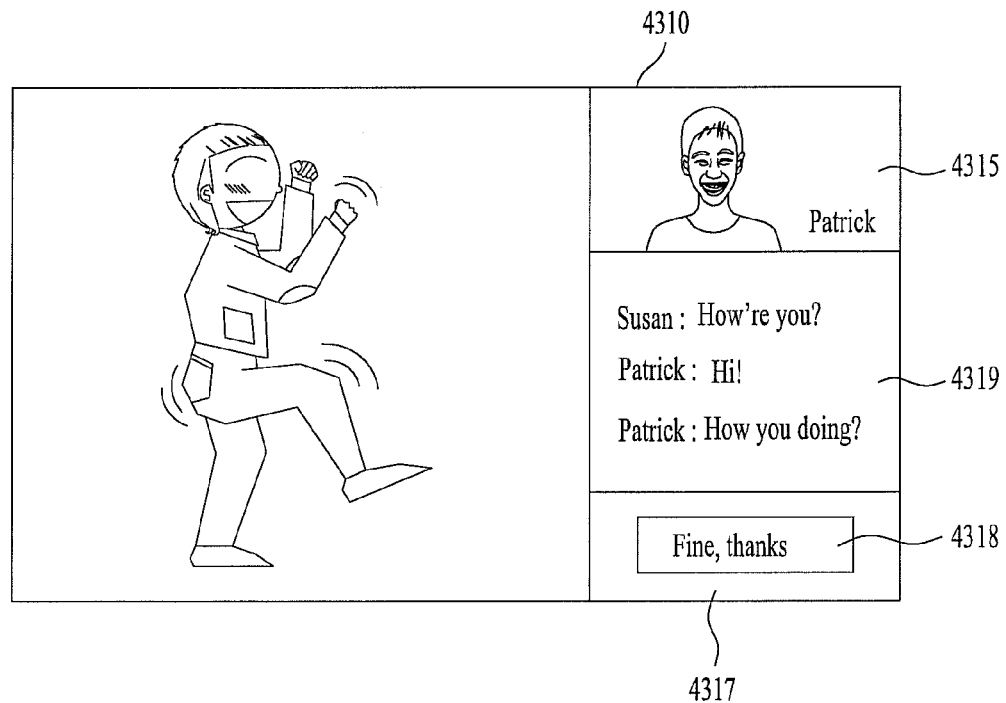
FIGS. 43A and 43B are diagrams illustrating an exemplary embodiment of a screen displayed when invitation to view a channel is accepted.
Figure 43B:
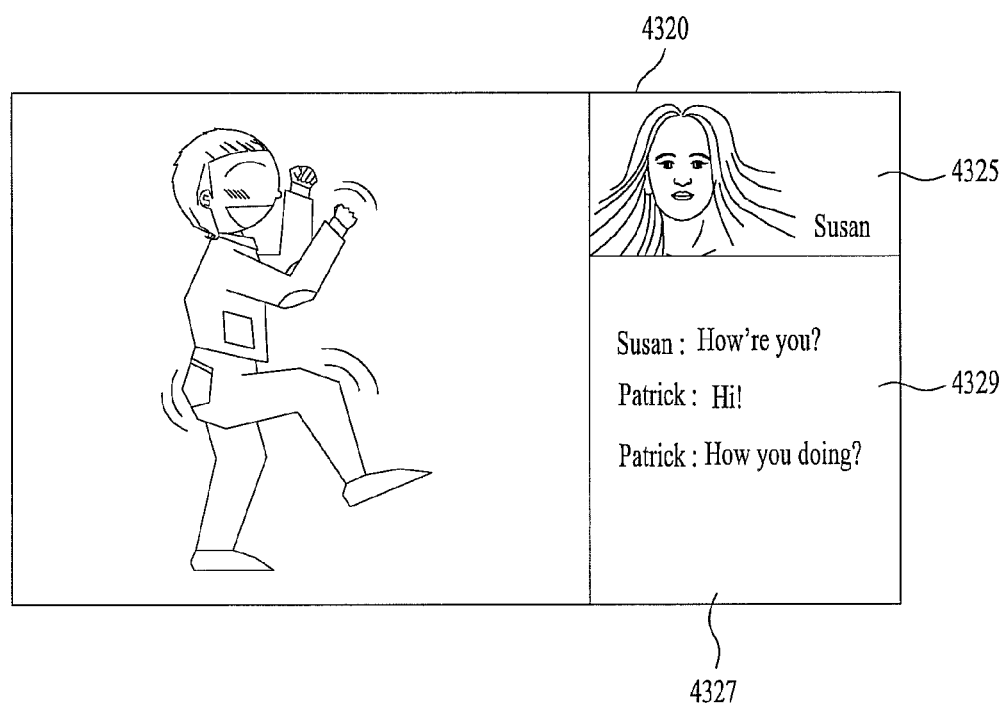

FIGS. 43A and 43B are diagrams illustrating an exemplary embodiment of a screen displayed when invitation to view a channel is accepted.

Referring to FIGS. 43A and 43B, if Patrick accepts a viewing request of Susan, an electronic device of Susan may display a screen 4310 and an electronic device of Patrick may display a screen 4320. Patrick may accept the viewing request of Susan by pressing the button 4012 of the guidance message 4010 illustrated in FIG. 40 or the button 4112 of the guidance message 4110 illustrated in FIG. 41.

As Patrick accepts the viewing request, the electronic device of Patrick stops displaying the broadcast program 3910 and displays the broadcast program 3610 indicated by a broadcast viewing request signal. Thus, the electronic devices of Susan and Patrick display the same broadcast program 3610.

The screen 4310 displays a picture 4315 of Patrick who views the same broadcast, a chat input window 4318 and a chat window 4319. Susan may chat with Patrick using the chat input window 4318 and the chat window 4319.

The screen 4320 displays a picture 4325 of Susan who views the same broadcast, a chat input window 4328 and a chat window 4329. Patrick may chat with Susan using the chat input window 4328 and the chat window 4329.

Figure 44:
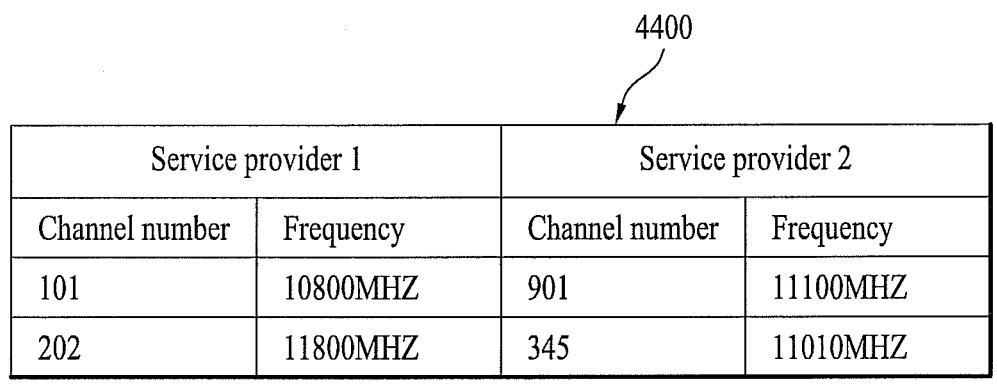
FIG. 44 is a diagram illustrating an exemplary embodiment of a channel matching table.

FIG. 44 is a diagram illustrating an exemplary embodiment of a channel matching table.

Referring to FIG. 44, the server 10 may store a channel matching table 4400. The server 10 may match channels of electronic devices to each other using the channel matching table 4400. The server 10 matches a channel indicated by a broadcast viewing request signal to a channel which is receivable by an electronic device to which the broadcast viewing request signal is transmitted, using the channel matching table 4400.

A first electronic device receives a broadcast channel from a service provider 1 and a second electronic device receives a broadcast channel from a service provider 2. If the first electronic device transmits a channel viewing request signal for inviting a user to view a channel to a user of the second electronic device, the server 10 receives the channel viewing request signal and reads a channel 901 of the service provider 2, which matches to a channel 101 indicated by the channel viewing request signal, from the channel matching table 4400. The server 10 amends the channel viewing request signal so as to indicate the channel 901 and transmits the amended channel viewing request signal to the second electronic device.

If the channel viewing request signal has the format 3800 illustrated in FIG. 38, the server 10 may confirm a service provider of the first electronic device based on information included in the ServiceProvider field. The server 10 may amend information, stored in the Physical_channel_detail field and in the Channel_number field, to detailed information (e.g., 11100 MHZ) about the physical channel 901 matching to the channel 101 indicated by the channel viewing request signal and the channel 901 respectively, and may transmit the amended channel viewing request signal to the second electronic device.

The channel matching table 4400 stores information in such a manner that the same channels of different service providers are associated with each other. If the channel 101 and the channel 202 of the service provider 1 are associated respectively with the channel 901 and the channel 345 of the service provider 2, the channel matching table 4400 may store the channel 910, the channel 101 and information associating the channels 101 and 910 with each other and also, may store the channel 202, the channel 345 and information associating the channels 202 and 234 with each other The channel matching table 4400 may store the frequency of each channel. In one example, the channel matching table 4400 stores the frequency of the channel 101 of 10800 MHZ and the frequency of the channel 901 of 11100 MHZ. The channel matching table 4400 may be stored on the originating electronic device (inviter), the destination electronic device (invitee), and/or a server.

Figure 45:
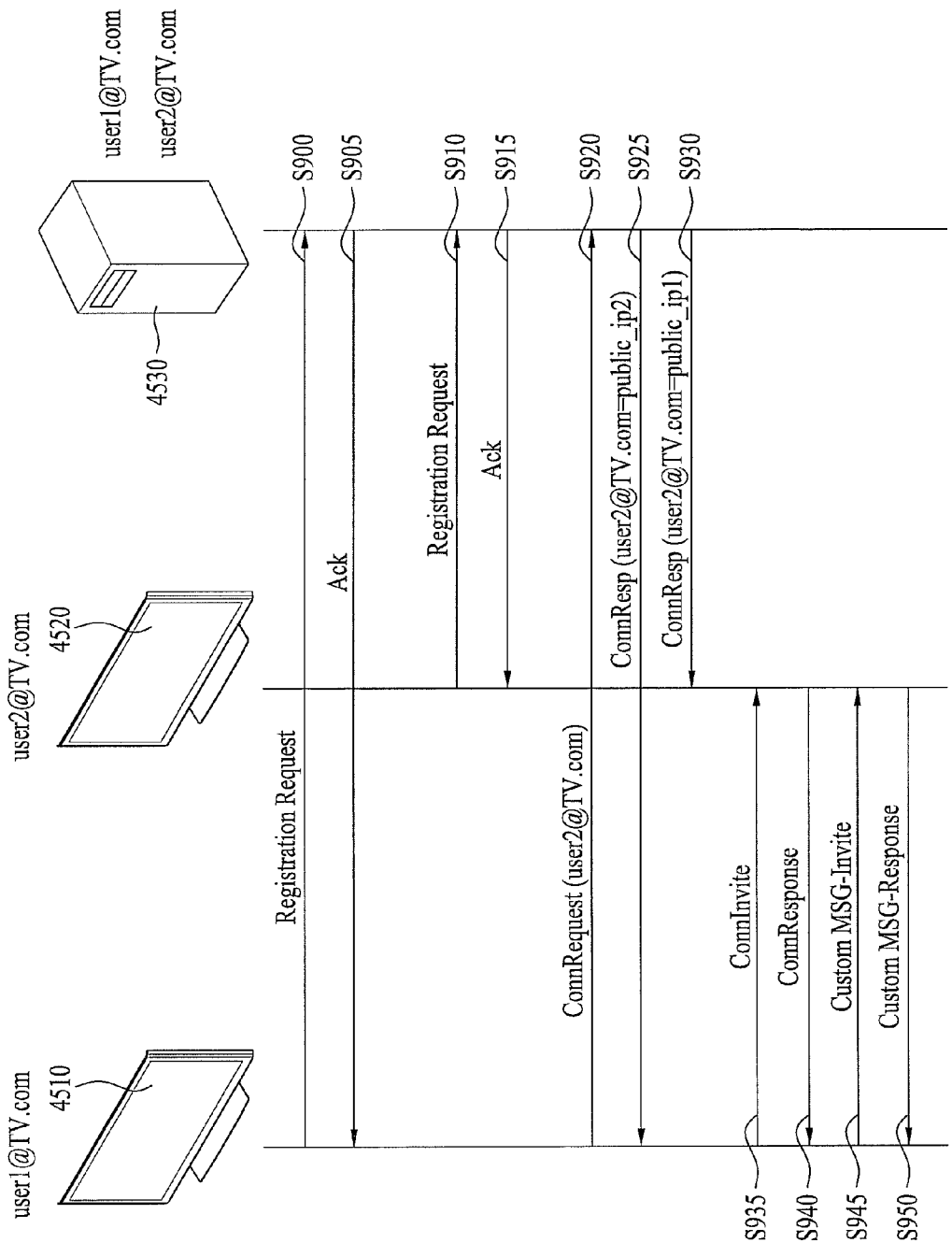
FIG. 45 is a diagram illustrating an implementation procedure of one exemplary embodiment for a method of making invitation to view a channel in accordance with the present disclosure.

FIG. 45 is a diagram illustrating an implementation procedure of one exemplary embodiment for a method of making invitation to view a channel in accordance with the present disclosure.

Referring to FIG. 45, Steps S900 to S940 correspond to Steps S700 to S740 and thus, a description with respect to Steps S900 to S940 refers to Steps S700 to S740 and is omitted hereinafter.

A first electronic device 4510 transmits a broadcast viewing request signal to a second electronic device 4520 in response to the received connection response signal transmitted in Step S940 (S945). The second electronic device 4520 receives the broadcast viewing request signal. The broadcast viewing request signal may be transmitted to a port indicated by a port number included in the connection response signal. The broadcast viewing request signal may have the format 3800 illustrated in FIG. 38.

The second electronic device 4520 transmits a response signal with respect to the broadcast viewing request signal to the first electronic device 4510 in response to the received broadcast viewing request signal (S950). The first electronic device 4510 receives the response signal. The response signal may be one of a viewing acceptance signal, a viewing not possible signal and a viewing rejection signal.

The electronic device 4510 and the electronic device 4520 may receive broadcast services from the same service provider or different service providers. Even when the electronic devices 4510 and 4520 receive broadcast services from the same service provider, the electronic devices 4510 and 4520 may receive different kinds of broadcast services and broadcast channels. The electronic device 4520 may confirm whether or not it receives a broadcast service from the same service provider as that in the first electronic device 4510 using information about the service provider included in the broadcast viewing request signal and EPG data. The electronic device 4520 may also confirm that it can receive a viewing requested channel using EPG data and at least one of detailed information about physical channels, service names, service IDs, channel numbers, event names, transport stream IDs or network IDs included in the broadcast viewing request signal.

If it is confirmed that the electronic device 4520 receives broadcast services from the same service provider as that in the electronic device 4510, but cannot receive a viewing requested channel from the service provider, the electronic device 4520 may search for and display a similar channel using EPG data and at least one of detailed information about physical channels, service names, service IDs, channel numbers, event names, transport stream IDs or network IDs included in the broadcast viewing request signal.

If the electronic device 4520 and the electronic device 4510 receive broadcast services from different service providers, the electronic device 4520 searches for a channel, which is the same as or similar to a viewing requested channel, from among channels provided by other service providers, based on EPG data and at least one of detailed information about physical channels, service names, service IDs, channel numbers, event names, transport stream IDs, network IDs, nation information or local information included in the channel viewing request signal. The electronic device 4520 may display the located channel. The electronic device 4520 may display one of the guidance message 4010, the guidance message 4110 and the guidance message 4210 based on the search results.

The electronic device 4520 and the electronic device 4510 may receive broadcast services from different transmission media. The electronic device 4520 may confirm this kind of reception using information about a transmission medium included in a broadcast viewing request signal. If it is confirmed that the electronic device 4520 and the electronic device 4510 receive broadcast services from different transmission media, the electronic device 4520 searches for a channel, which is the same as or similar to a viewing requested channel, from among channels provided by other service providers, based on EPG data and at least one of detailed information about physical channels, service names, service IDs, channel numbers, event names, transport stream IDs, network IDs, nation information or local information included in the channel viewing request signal. The electronic device 4520 may display the located channel. The electronic device 4520 may display one of the guidance message 4010, the guidance message 4110 and the guidance message 4210 based on the search results.

If the response signal is a viewing acceptance signal, the first electronic device 4510 may display a screen on which a chat window and a chat input window are displayed, and the second electronic device 4520 may display a screen on which a chat window and a chat input window are displayed. The screen displayed by the first electronic device 4510 may be the screen 4310 and the screen displayed by the second electronic device 4520 may be the screen 4320.

If the response signal is a viewing not possible signal, the first electronic device 4510 may transmit a broadcast program invited to view to the second electronic device 4520.

Figure 46:
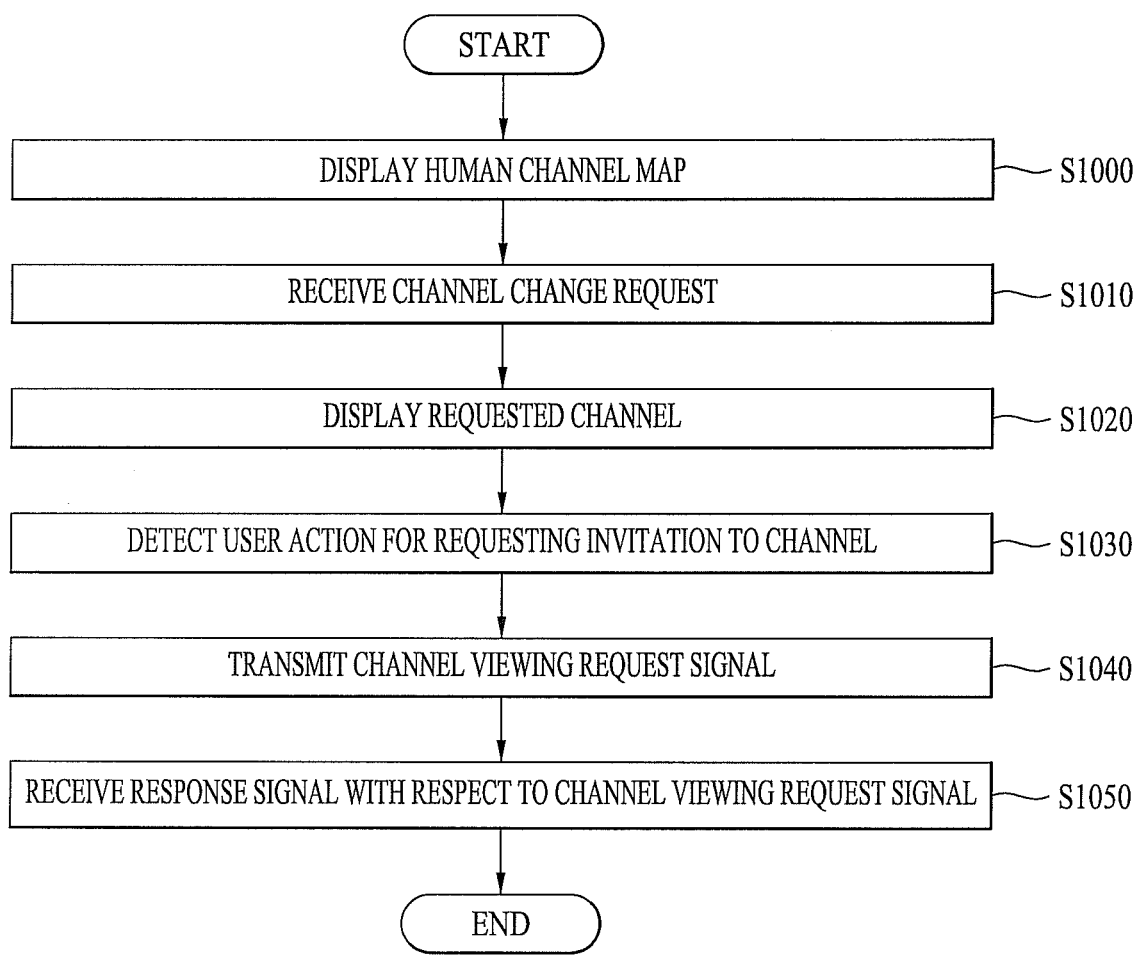
FIG. 46 is a flowchart illustrating an implement procedure of another exemplary embodiment for a method of making invitation to view a channel in accordance with the present disclosure.

FIG. 46 is a flowchart illustrating an implement procedure of another exemplary embodiment for a method of making invitation to view a channel in accordance with the present disclosure.

Referring to FIG. 46, the display 302 displays a human channel map (S1000). The human channel map may be the human channel map 3520 illustrated in FIG. 35 or the human channel map 3620 illustrated in FIG. 36.

The external signal input unit 325 receives a signal for requesting channel switch (S1010). The controller 340 detects the received channel switch request signal. The channel switch request signal may be generated when the user performs an action of pressing a predetermined key of a remote controller, or may be a video signal with regard to a spatial gesture for requesting channel switch.

The controller 340 controls a screen to display content of a requested channel in response to the detected channel switch request signal (S1020). The channel may be a broadcast channel, a human channel or an App channel. The screen may be the screen 1600 illustrated in FIG. 16 or the screen 3500 illustrated in FIG. 35.

The controller 304 detects a user action for requesting invitation to view a channel (S1030). The user action is, for example, an action of dragging a screen on which content is displayed and dropping the dragged screen onto a human channel listed in a human channel map. In one example, the controller 340 may drag the image 3630 illustrated in FIG. 36 to the human channel '43' and may detect a user action for requesting invitation to view the human channel '43' when the image 3630 drops onto the human channel '43'. In another example, the user action may be a combination of a user action for selecting a displayed broadcast program and a user action for selecting a human channel (or a channel number).

The controller 340 transmits a channel viewing request signal in response to the detected user action (S1040). The channel viewing request signal may have the format 3800 illustrated in FIG. 38.

In some embodiments, the controller 340 may control transmitting the channel viewing request signal to the electronic device which provides the human channel indicated by the channel number designated by the user action in Step S1030. The address of the electronic device may be acquired by the above described method as illustrated in FIGS. 19 to 21.

In some embodiments, the controller 340 may control transmitting the channel viewing request signal to a server. The server may be the server 10 illustrated in FIG. 1.

The controller 340 receives a response signal with respect to the transmitted channel viewing request signal (S1050). The response signal may be one of a viewing acceptance signal, a viewing not possible signal and a viewing rejection signal.

If the response signal is a viewing acceptance signal, the controller 340 may display a screen on which a chat window and a chat input window are displayed. The screen may be the screen 4310 illustrated in FIGS. 43A and 43B.

If the response signal is a viewing not possible signal, the controller 340 may transmit a broadcast program invited to view to the electronic device which provides the human channel indicated by the channel number designated by the user action in Step S1030.

Figure 47:
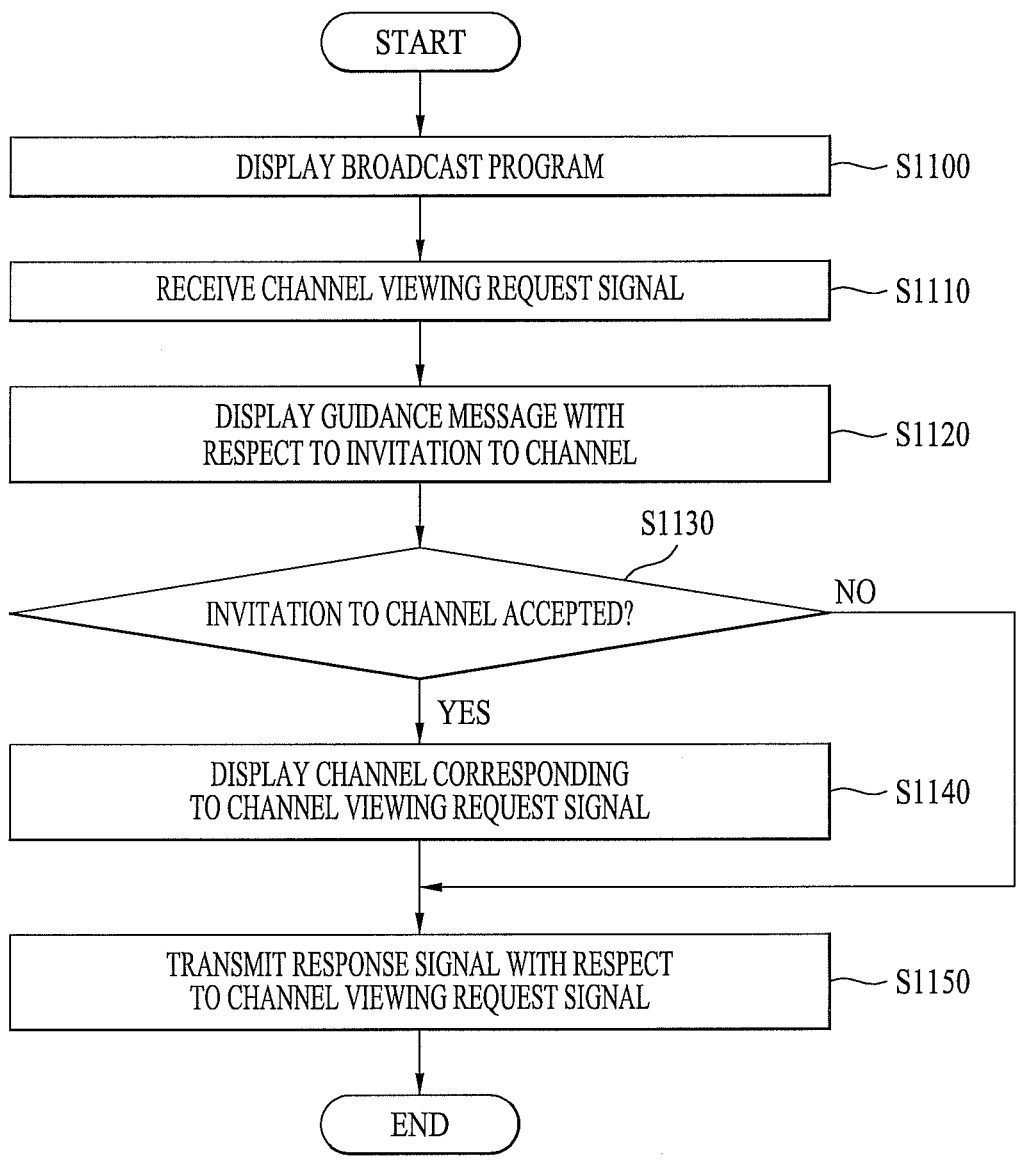
FIG. 47 is a flowchart illustrating an implement procedure of an exemplary embodiment for a method of processing invitation to view a channel in accordance with the present disclosure.

FIG. 47 is a flowchart illustrating an implement procedure of an exemplary embodiment for a method of processing invitation to view a channel in accordance with the present disclosure.

Referring to FIG. 47, the display 302 displays a broadcast program (S1100).

The network interface 302 receives a channel viewing request signal (S1110). The controller 340 generates a guidance message with regard to invitation to view a channel using information included in the received channel viewing request signal. The generated guidance message may be the message 3930 and the message 3940 illustrated in FIG. 39, the guidance message 4010 illustrated in FIG. 40, the guidance message 4110 illustrated in FIG. 41, or the guidance message 4210 illustrated in FIG. 42.

The controller 340 may confirm whether or not it can receive a viewing requested channel using information included in the channel viewing request signal. The controller 340 may confirm whether or not it can receive a viewing requested channel from a service provider using stored EPG data and information about the service provider included in the channel viewing request signal. The controller 340 generates a guidance message 4010 when it can receive the viewing requested channel from the service provider.

Even when the electronic device 300 can receive a broadcast service from a service provider indicated by the channel viewing request signal, the electronic device 300 may fail to receive the viewing requested channel from the service provider according to terms of a contract with the service provider. If this failure to receive the channel is confirmed, the controller 340 may search for a similar channel using EPG data and at least one of detailed information about physical channels, service names, service IDs, channel numbers, event names, transport stream IDs or network IDs included in the channel viewing request signal. If the electronic device 300 succeeds in searching for the similar channel, the controller 340 may generate the guidance message 4110 and if not, may generate the guidance message 4210.

If the controller 340 cannot receive the viewing requested channel from the service provider, the controller 304 confirms whether or not the viewing requested channel is receivable from another service provider. The controller 340 searches for the same channel as the viewing requested channel from among channels provided by another service provider based on EPG data and at least one of detailed information about physical channels, service names, service IDs, channel numbers, event names, transport stream IDs or network IDs included in the channel viewing request signal. If the channel is found, the controller 340 may generate the guidance message 4010. If the same channel is not found, but a similar channel is found, the controller 340 may generate the guidance message 4110. If the same channel and the similar channel are not found, the controller 340 may generate the guidance message 4210. Here, another service provider may be a service provider which provides a broadcast service to the electronic device 300.

The controller 340 may confirm whether or not it can receive the viewing requested channel, using information about a transmission medium included in the channel viewing request signal. If the controller 340 receives a broadcast service from a transmission medium different from that indicated by the channel viewing request signal, the controller 340 searches for the same channel as the viewing requested channel from among channels provided by the different transmission medium, based on EPG data and at least one of detailed information about physical channels, service names, service IDs, channel numbers, event names, transport stream IDs or network IDs included in the channel viewing request signal. If the same channel is found, the controller 340 may generate the guidance message 4010. If the same channel is not found, but a similar channel is found, the controller 340 may generate the guidance message 4110. If the same channel and the similar channel are not found, the controller 340 may generate the guidance message 4210.

The display 302 displays the guidance message generated in Step S1110 on a screen (S1120). The screen may be one of the screen 3900, the screen 4000, the screen 4100 and the screen 4200 as illustrated in FIGS. 39 to 42. After the display 302 displays the screen 3900, one of the screen 4000, the screen 4100 and the screen 4200 may be displayed under control of the controller 340. If the controller 340 detects a user action for selecting the message 3930 in a state in which the screen 3900 is displayed, the controller 340 may control displaying one of the screen 4000, the screen 4100 and the screen 4200.

The controller 340 confirms whether or not a user action for accepting invitation to view a channel is detected (S1130). The controller 340 may detect a user action for rejecting invitation to view a channel and also, may detect a user action for confirming that viewing of an invited channel is not possible. The user actions may be performed according to the above described method as illustrated in FIGS. 40 to 42.

The controller 340 controls displaying content of a channel indicated by the channel viewing request signal in response to the detected user action for accepting invitation to view the channel (S1140). If the guidance message 4110 is displayed in Step S1120, the controller 340 controls displaying content of a channel similar to the channel indicated by the channel viewing request signal.

The controller 340 controls transmitting a response signal with respect to the channel viewing request signal to the electronic device which transmits the channel viewing request signal (S1150). The response signal may include a viewing acceptance signal, a viewing not possible signal or a viewing rejection signal. The controller 340 transmits the viewing acceptance signal when detecting a user action for accepting invitation to view a channel, the viewing rejection signal when detecting a user action for rejecting invitation to view a channel, and the viewing not possible signal when detecting a user action confirming that viewing of a channel is not possible.

When the viewing not possible signal is transmitted, the electronic device, which transmits the channel viewing request signal, may directly transmit the viewing requested broadcast program to the network interface 320. The controller 340 may control displaying the broadcast program received by the network interface 320.

Figure 48:
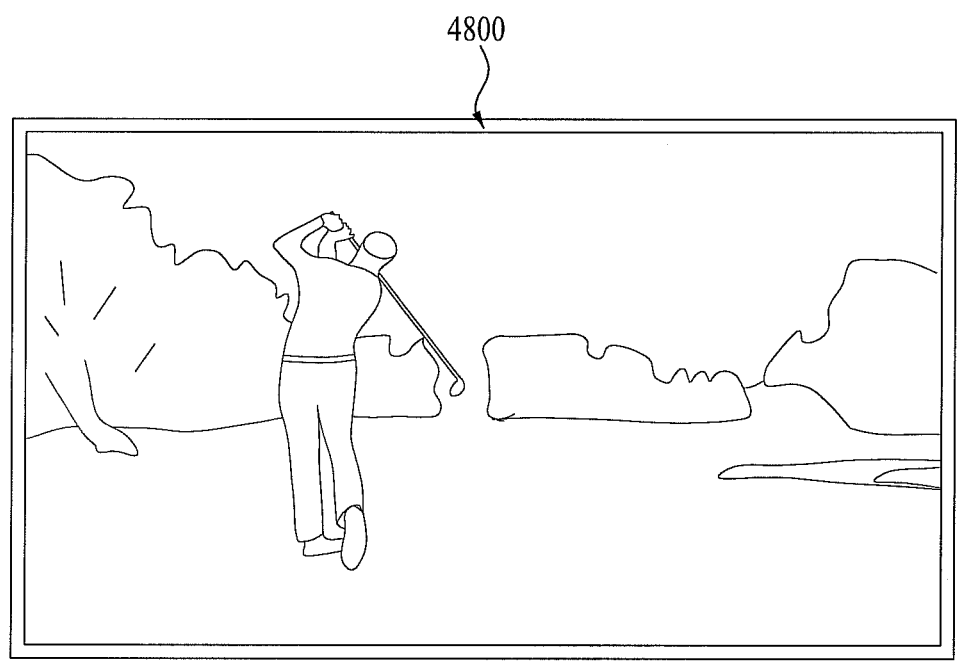
FIG. 48 is a diagram illustrating an embodiment of a screen on which content is displayed.
Figure 49:
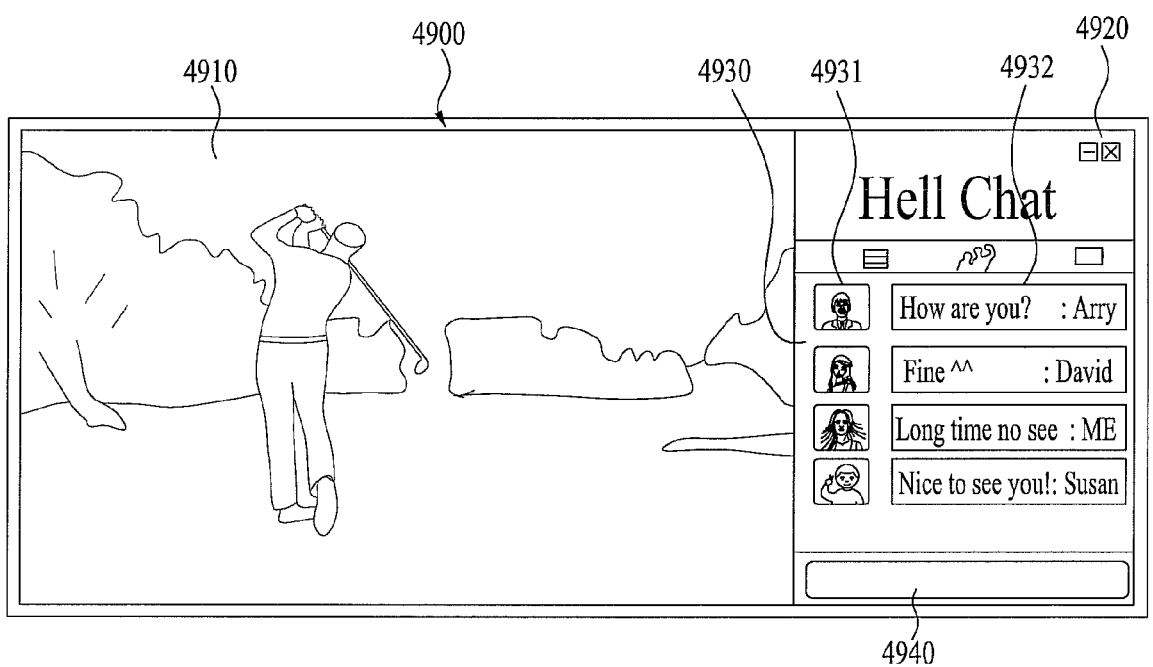
FIG. 49 is a diagram illustrating one embodiment of a screen on which content is displayed in a simultaneous viewing mode.
Figure 50:
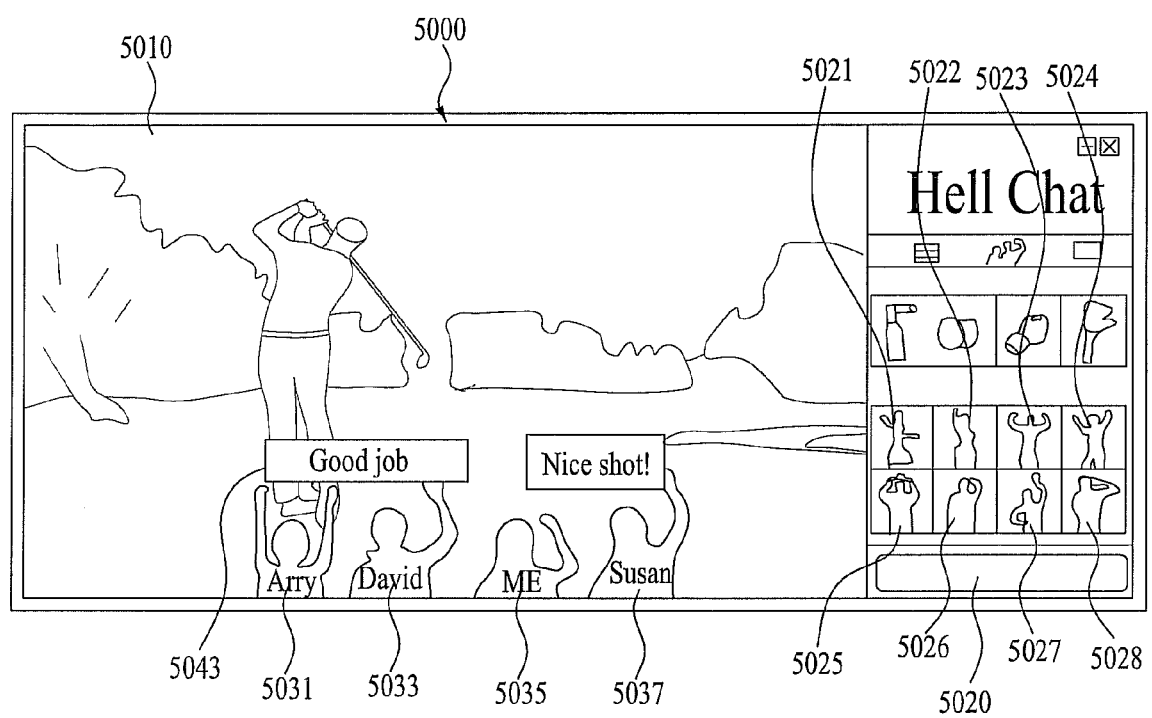
FIG. 50 is a diagram illustrating another embodiment of a screen on which content is displayed in a simultaneous viewing mode.

FIG. 48 is a diagram illustrating an embodiment of a screen on which content is displayed, FIG. 49 is a diagram illustrating one embodiment of a screen on which content is displayed in a simultaneous viewing mode, and FIG. 50 is a diagram illustrating another embodiment of a screen on which content is displayed in a simultaneous viewing mode.

Referring to FIGS. 48 to 50, the display 302 may display a screen 4800. The screen 4800 displays content.

If the controller 340 detects a user action for requesting display of content, the controller 340 may control displaying the screen 4800 in response to the detected user action. Also, if the controller 340 detects a user action for requesting a simultaneous viewing mode during display of the screen 4800, the controller 340 may control display of a screen 4900 or a screen 5000. The controller 340 may convert the screen 4900 to the screen 5000 or convert the screen 5000 to the screen 4900 according to a user action for requesting mode conversion.

The screen 4900 includes a content display region 4910 and a chat region 4920. The content display region 4910 displays content of the screen 4800, and the chat region 4920 includes a chat window 4930 and a chat input window 4940. The chat window 4930 shows a chat partner 4931 and a chat phrase 4932 input by a chat partner. The user can input a chat phrase into the chat input window 4940.

The screen 5000 may include a content display region 5010, a chat input window 5020, silhouette selecting marks 5021 to 5028, and silhouettes 5031, 5033, 5035 and 5037. The silhouettes 5031, 5033, 5035 and 5037 respectively represent chat partners. The silhouette 5031 represents a chat partner 'Arry', the silhouette 5033 represents a chat partner 'David', the silhouette 5035 represents the user who is in charge of the chat, and the silhouette 5037 represents a chat partner 'Susan'. A chat phrase may be displayed at a location associated with the user or the chat partner who inputs the chat phrase. For example, if the chat partner 'David' inputs a chat phrase 5043, the chat phrase 5043 is displayed at a location associated with the silhouette 5033 of 'David'.

If the controller 340 detects a user action for selecting one of the silhouette selecting marks 5021 to 5028, the controller 340 controls display of the silhouette 5035 of the user in response to the detected user action such that the silhouette 5035 is converted to a silhouette image associated with the selected silhouette selecting mark. Additionally, the controller 340 may transmit a signal to request conversion to the silhouette image to the server 10, the server 20, or other electronic devices.

A human channel owner who is viewing the same content may be determined as a chat partner. More particularly, the human channel owner who is viewing the same content as that displayed on the screen 4800 may be automatically determined as a chat partner. In some embodiments, the controller 340 may confirm the owner based on information included in the above described channel guiding signal of FIG. 35. In some embodiments, the controller 340 may receive an owner list, including the human channel owner who is viewing the same content, from the server 10 and confirm the owner via the received owner list.

Figure 51:
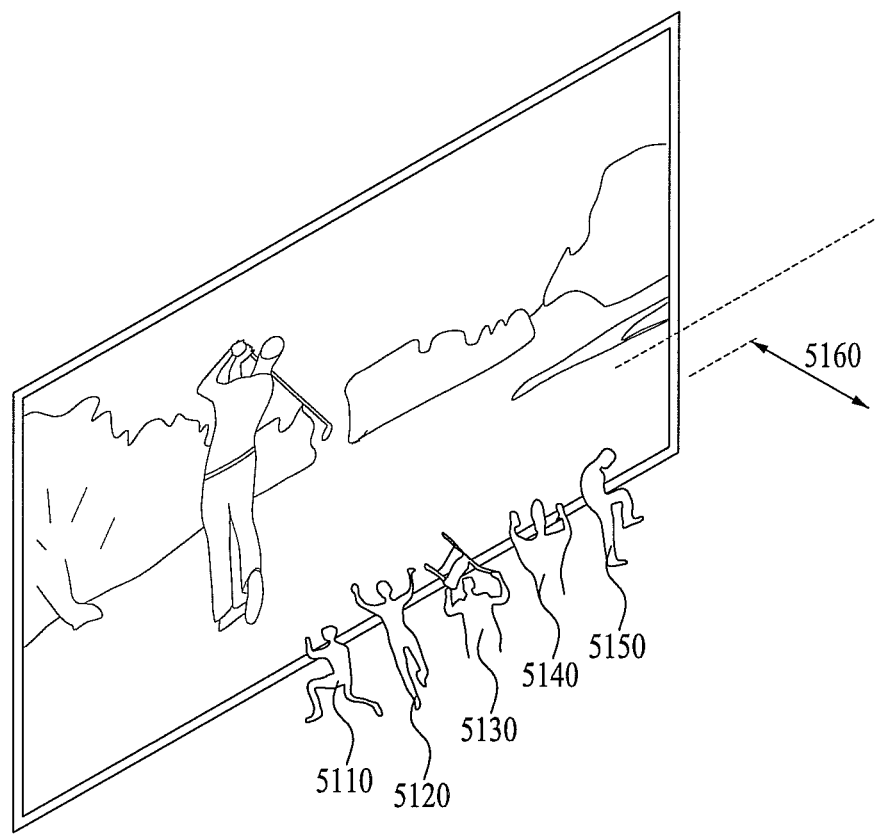
FIG. 51 is a diagram illustrating a further embodiment of a screen on which content is displayed in a simultaneous viewing mode.

FIG. 51 is a diagram illustrating a further embodiment of a screen on which content is displayed in a simultaneous viewing mode.

Referring to FIG. 51, silhouettes 5110, 5120, 5130, 5140 and 5150 may be displayed as 3D images having a particular depth value 5160. More particularly, the silhouettes 5031, 5033, 5035 and 5037 of FIG. 50 may be respectively displayed as the 3D images 5110, 5120, 5130 and 5140.

Figure 52:
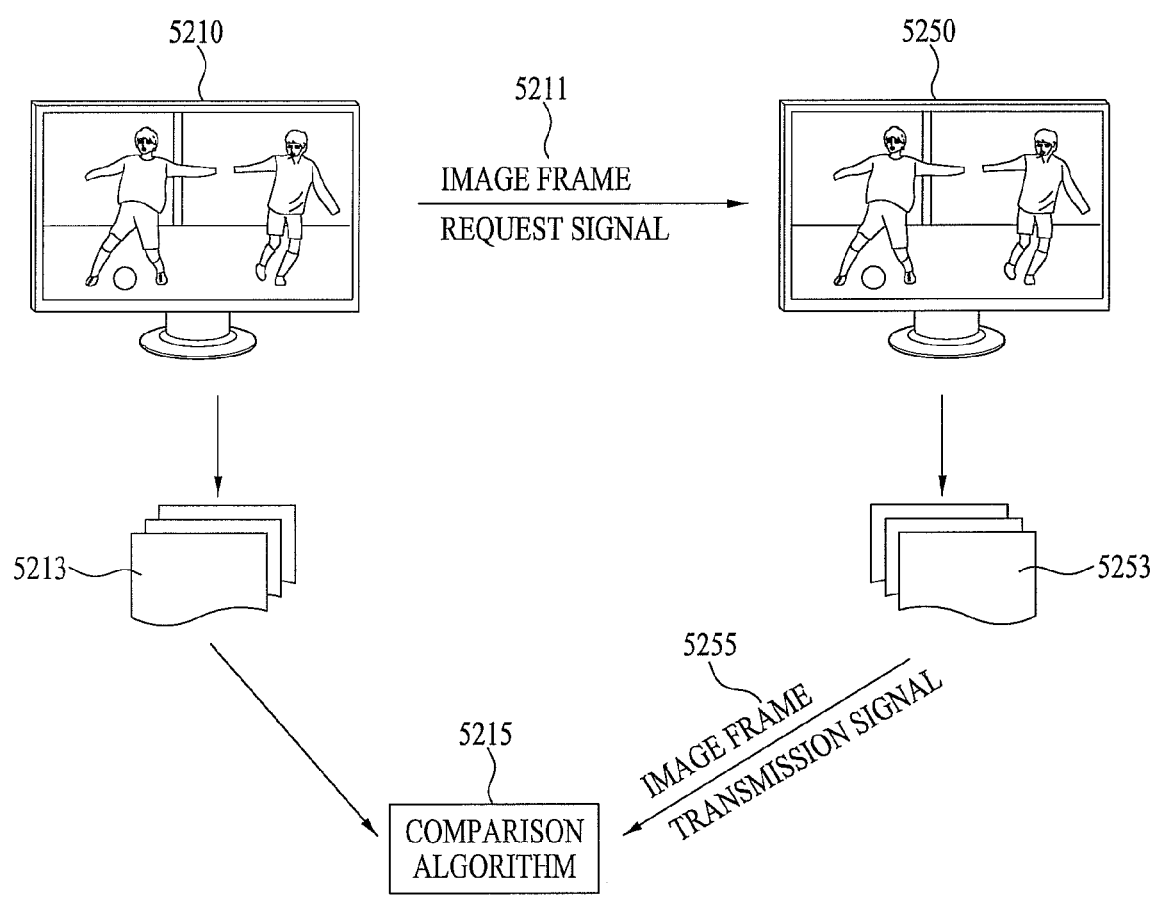
FIG. 52 is a diagram explaining an embodiment of a method for confirming viewing of the same content.

FIG. 52 is a diagram explaining an embodiment of a method for confirming viewing of the same content.

Referring to FIG. 52, a controller of an electronic device 5210 may control transmission of an image frame request signal 5221 to an electronic device 5250. The electronic device 5250 may be an electronic device associated with a human channel included in a human channel map that is stored in the electronic device 5210. The image frame request signal 5211 may be transmitted to the electronic device or the server according to a connection method associated with a channel number included in the human channel map.

The image frame request signal 5211 may be a signal to request that an image frame be displayed for a particular period of time M starting from a particular time T. The electronic device 5250 receives the image frame request signal 5211 and acquires an image frame 5253 to be displayed for a particular period of time M starting from a particular time T according to the received image frame request signal 5211. The controller of the electronic device 5210 controls acquisition of an image frame 5213 to be displayed for a particular period of time M starting from a particular time T.

The electronic device 5250 transmits an image frame transmission signal 5255 to the electronic device 5210. The image frame transmission signal 5255 includes the image frame 5253.

The electronic device 5210 receives the transmitted image frame transmission signal 5255 and executes a comparison algorithm 5215 to confirm whether or not the image frame 5253 included in the received image frame transmission signal 5255 is equal to the image frame 5213. If the two image frames are equal to each other, the controller of the electronic device 5210 confirms that an owner of a human channel associated with the electronic device 5210 is viewing the same content. If the two image frames are not equal to each other, the controller of the electronic device 5210 can confirm that the owner is not viewing the same content. The comparison algorithm 5215 can confirm the equality of image frames in sequence starting from a particular time T. In this case, if the image frames have different resolutions, confirmation of the equality may be performed after equalizing the resolutions of the image frame 5213 and the image frame 5253.

With the method for confirming viewing of the same content as described in relation to FIG. 52, a controller of one electronic device can confirm whether or not content displayed thereon is equal to content displayed on another electronic device, irrespective of different service providers and transmission media.

Figure 53:
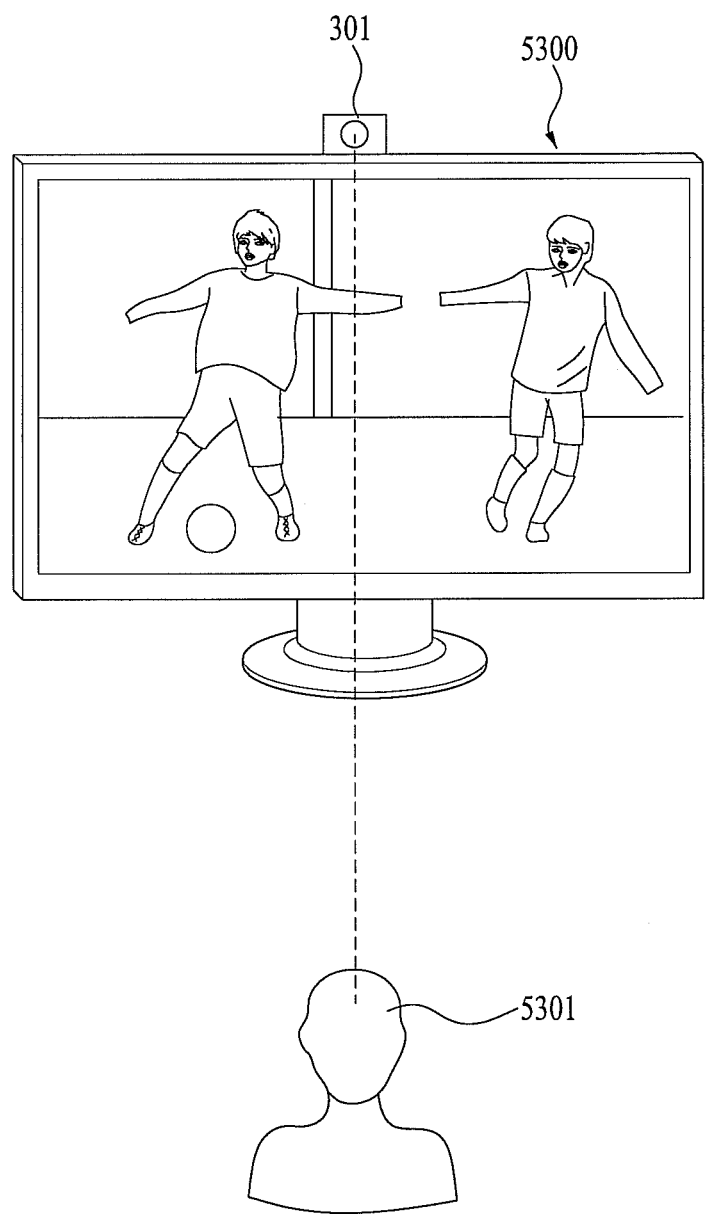
FIG. 53 is a diagram explaining a method for detecting user emotions.

FIG. 53 is a diagram explaining a method for detecting user emotions.

Referring to FIG. 53, while a viewer 5301 is viewing content 5300, the image capture device 301 may capture an image of the viewer 5301.

The controller 340 detects a face zone from the captured image frame of the viewer 5301 output by the image capture device 301. Then, the controller 340 confirms the emotions of the viewer 5301 based on the detected face zone. The controller 340 may produce emotion data indicating the confirmed emotions and then, control transmission of the produced emotion data to an electronic device of a chat partner.

The image capture device 301 may capture the image of the viewer 5301 at a preset interval. The controller 340 may confirm the emotions of the viewer 5301 at the preset interval and then, produce emotion data if emotion change occurs, thereby controlling transmission of the emotion data to the electronic device of the chat partner.

Figure 54:
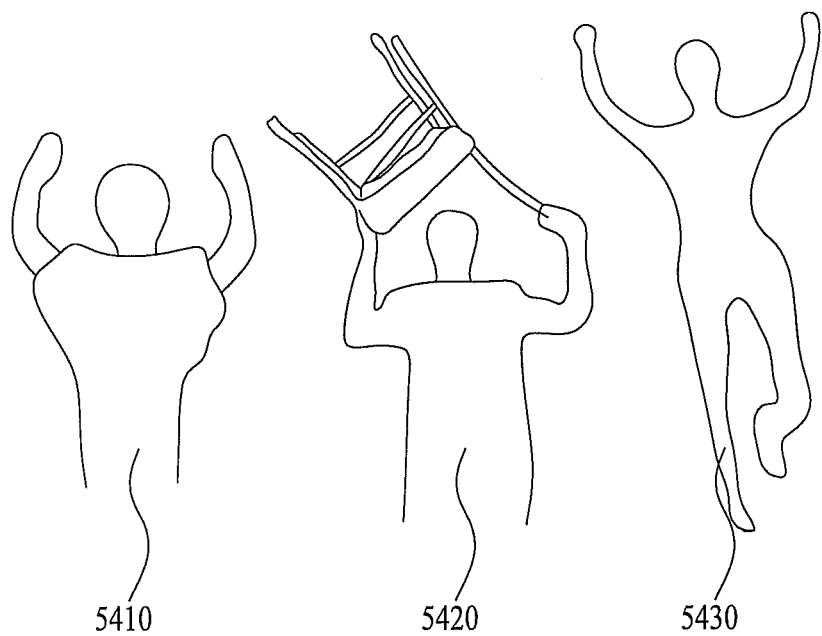
FIG. 54 is a diagram illustrating the contour of a silhouette mapped to user emotions.

FIG. 54 is a diagram illustrating the contour of a silhouette mapped to user emotions.

Referring to FIG. 54, the storage unit 345 may store the contour of a silhouette associated with particular emotions. For example, the storage unit 345 may store the contour of a silhouette 5410 associated with sadness, the contour of a silhouette 5420 associated with anger, and the contour of a silhouette 5430 associated with happiness.

Figure 55:
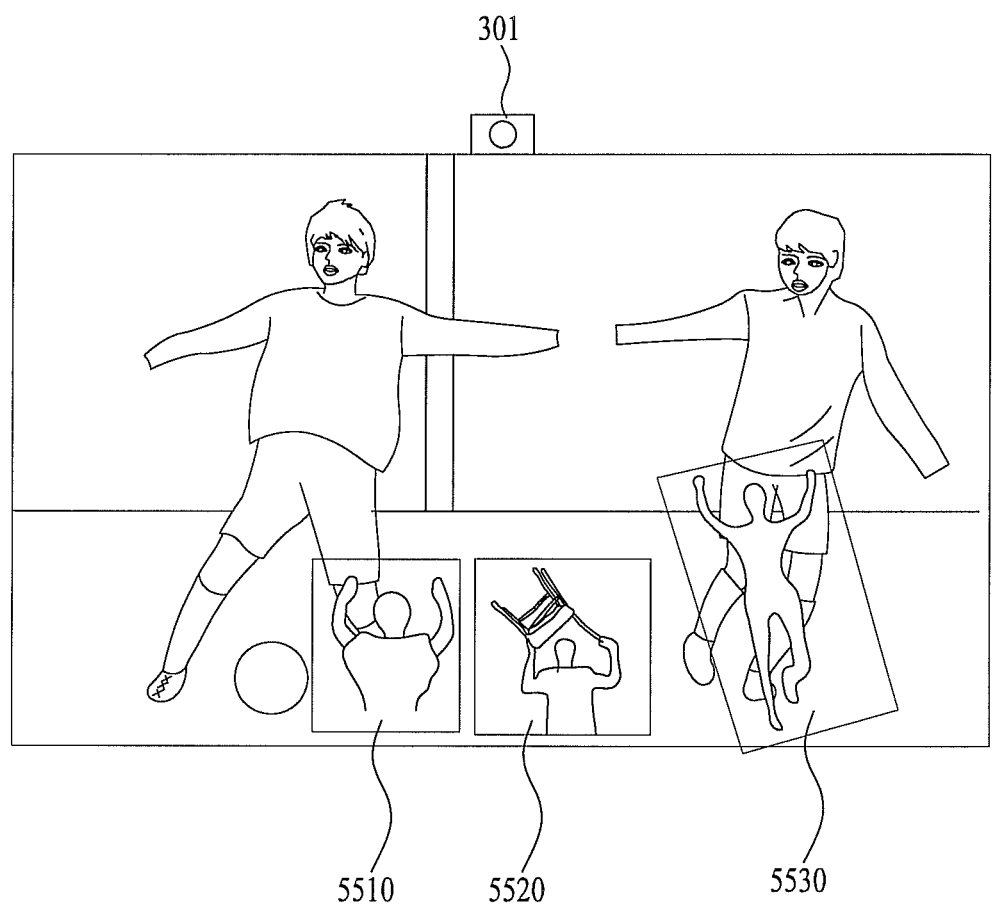
FIG. 55 is a diagram illustrating an embodiment of a screen on which different silhouettes depending on user emotions are displayed.

FIG. 55 is a diagram illustrating an embodiment of a screen on which different silhouettes depending on user emotions are displayed.

Referring to FIG. 55, the controller 340 may acquire the contour of a silhouette associated with the confirmed emotions from the storage unit 345 and control display of a silhouette of an owner of the electronic device 300 such that the silhouette is converted to the acquired contour of a silhouette. Also, the controller 340 may acquire the contour of a silhouette, associated with emotions indicated by emotion data transmitted from the electronic device of the chat partner, from the storage unit 345 and control display of a silhouette of the chat partner such that the silhouette is converted to the acquired contour of a silhouette.

In one example, if it is confirmed that the owner of the electronic device 300 is angry, the controller 340 controls display of a silhouette 5520. If the controller 340 receives emotion data indicating sadness from an electronic device of a first chat partner, the controller 340 controls display of a silhouette of the first chat partner as a silhouette 5510. In addition, if the controller 340 receives emotion data indicating happiness from an electronic device of a second chat partner, the controller 340 controls display of a silhouette of the second chat partner as a silhouette 5530.

Figure 56:
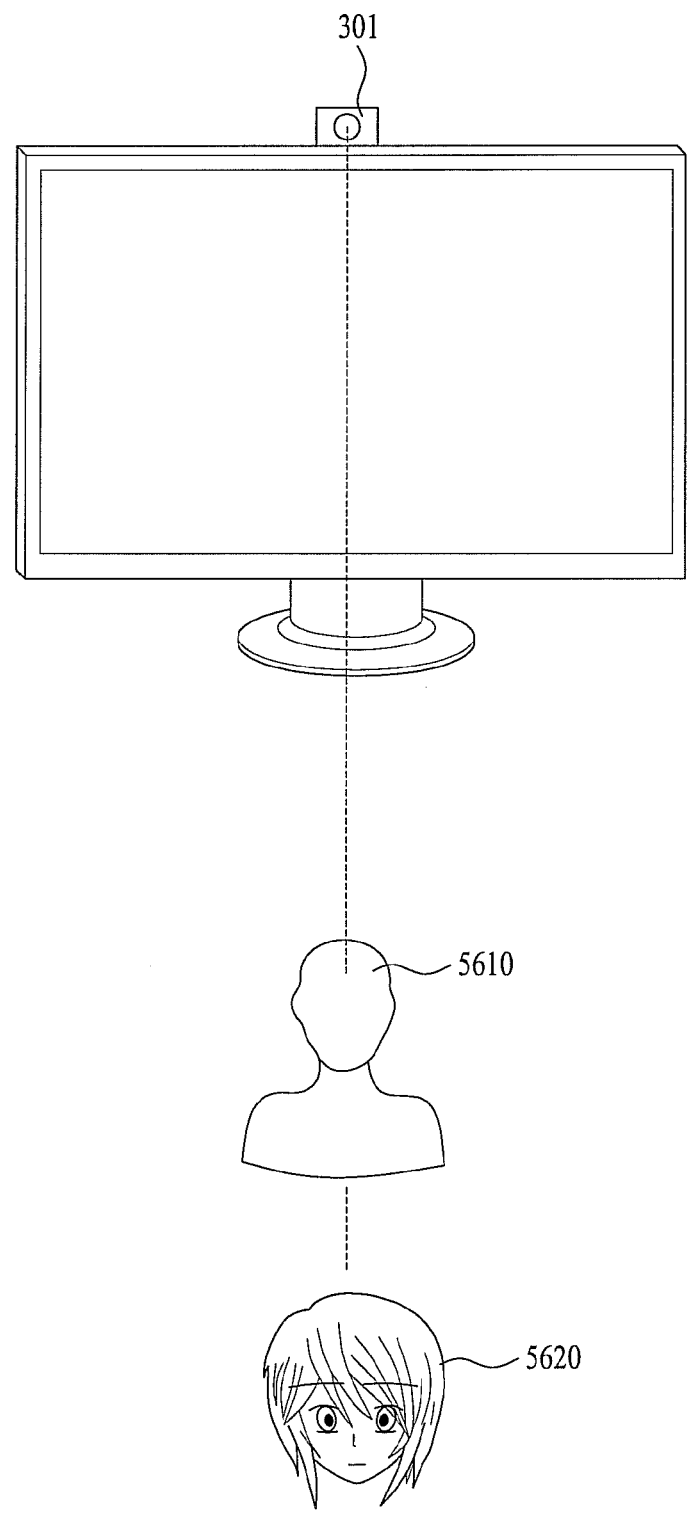
FIG. 56 is a diagram explaining a procedure for registering a facial image.
Figure 57:
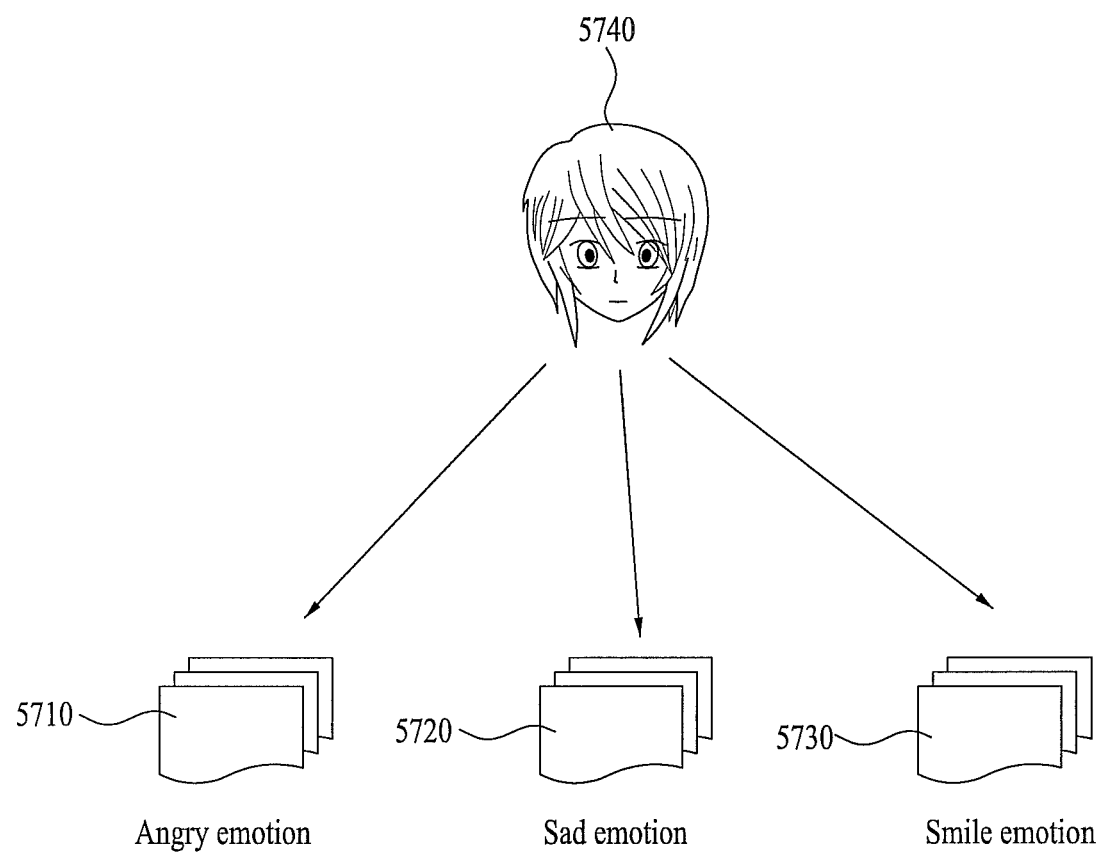
FIG. 57 is a diagram explaining a procedure for training a facial image.

FIG. 56 is a diagram explaining a procedure for registering a facial image, and FIG. 57 is a diagram explaining a procedure for training a facial image.

Referring to FIGS. 56 and 57, the electronic device 300 may receive a user facial image 5620 on a per emotion basis registered by a user 5610. In one example, the electronic device 300 may receive an angry facial image 5710, a sad facial image 5720 and a happy facial image 5730, which are registered by the user 5610. The storage unit 345 may store the respective registered facial images 5710, 5720 and 5730 on a per emotion basis.

The controller 340 may compare the facial images on a per emotion basis stored in the storage unit 345 with a facial image 5740 detected from an image frame of a viewer which is captured while the viewer is viewing content and then, confirm one of the stored facial images that is most similar to the facial image 5740. The controller 340 may confirm the emotions of the confirmed facial image as the emotions of the viewer. Also, the controller 340 may store the facial image 5740 as a facial image having the confirmed emotions in the storage unit 345. In one example, if it is confirmed that the facial image 5740 is most similar to the facial image 5710, the controller 340 may add the facial image 5740 as an angry emotional facial image, similar to the facial image 5710, to the storage unit 345. With such addition of the facial image, the electronic device 300 can more accurately confirm the emotions of the viewer.

Figure 58:
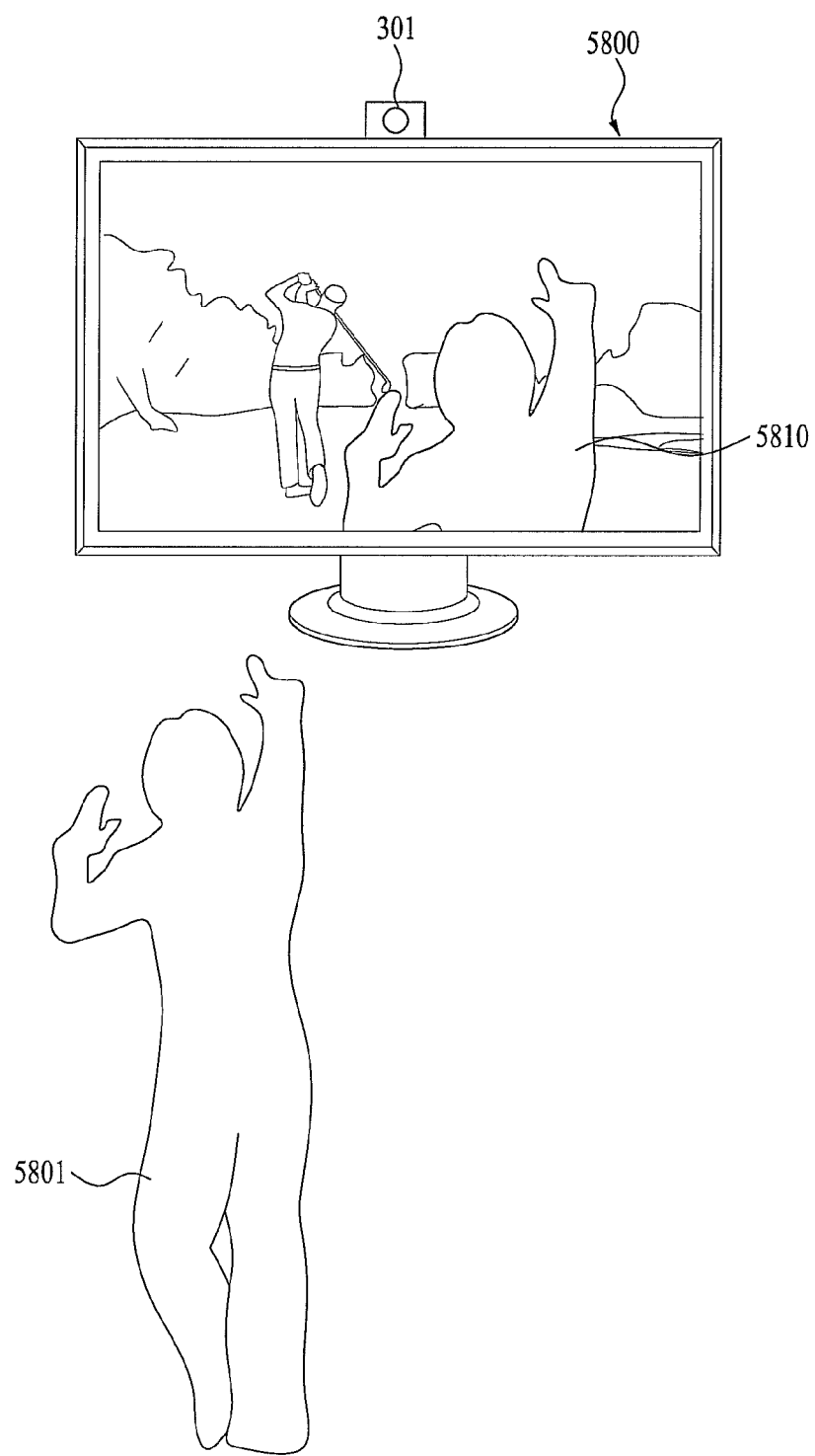
FIG. 58 is a diagram explaining a method for detecting a user motion.
Figure 59A:
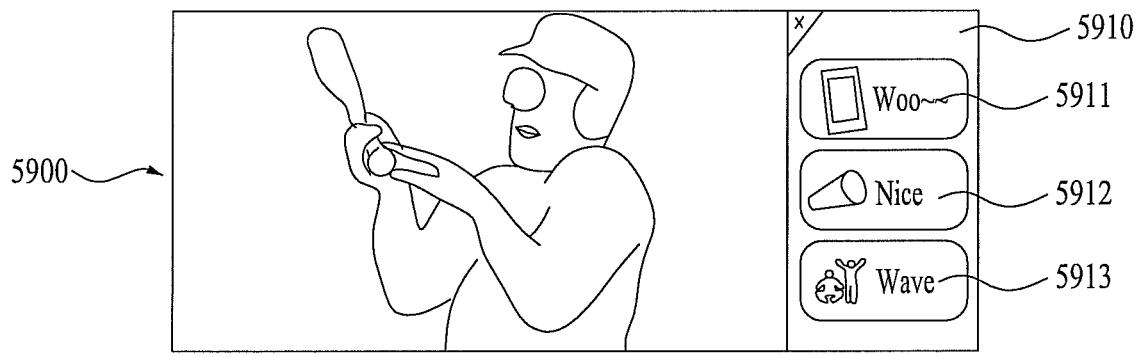
FIGS. 59A to 59D are diagrams explaining a method for reflecting a screen effect on content.
Figure 59B:
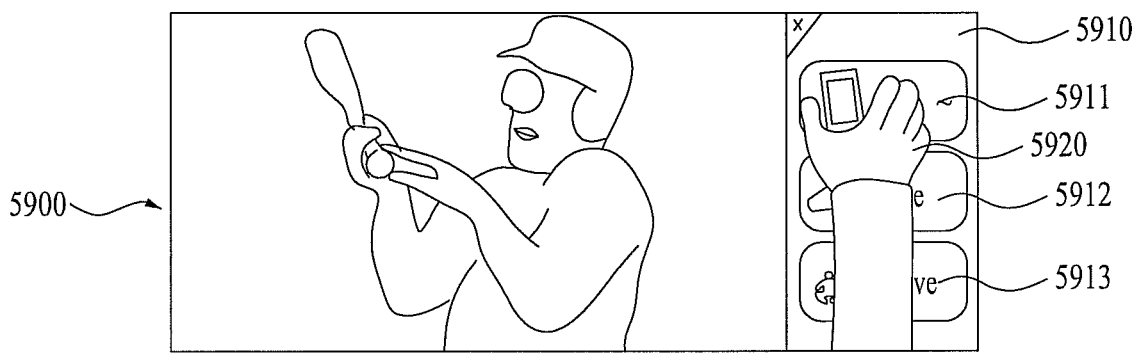
Figure 59C:
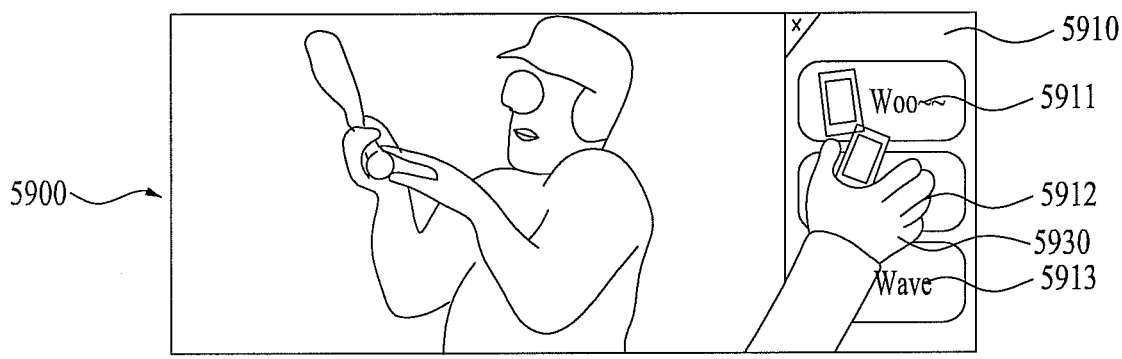
Figure 59D:
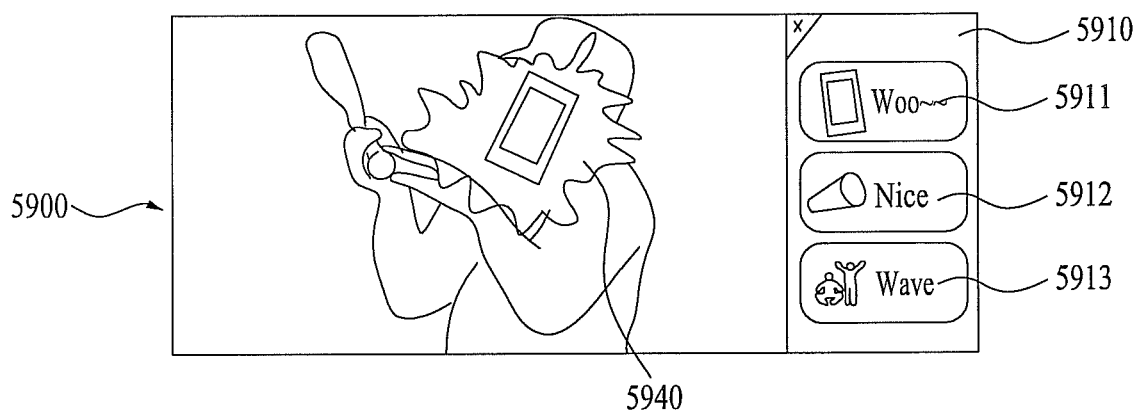

FIG. 58 is a diagram explaining a method for detecting a user motion.

Referring to FIG. 58, while a viewer 5801 is viewing content 5800, the image capture device 301 may capture an image of the viewer 5801.

The controller 340 detects a user motion 5810 from a captured image frame of the viewer 5801 output by the image capture device 301. Then, the controller 340 may produce motion data indicating the confirmed motion 5810 and then, control transmission of the produced motion data to the electronic device of the chat partner.

The image capture device 301 may capture the image of the viewer 5801 at a preset interval. The controller 340 may confirm the motion of the viewer 5301 at the preset interval and then, produce motion data if motion change occurs, thereby controlling transmission of the motion data to the electronic device of the chat partner.

The controller 340 may control display of a silhouette of the owner of the electronic device 300 such that the silhouette represents the confirmed motion 5810. Also, the controller 340 may control display of a silhouette of the chat partner such that the silhouette is converted to the contour of a silhouette representing a motion indicated by the motion data transmitted from the electronic device of the chat partner.

FIGS. 59A to 59D are diagrams explaining a method for reflecting a screen effect on content.

Referring to FIGS. 59A to 59D, a screen effect window 5910 may be displayed on a screen 5900. The screen effect window 5910 may include one or more screen effect selecting regions 5911, 5912 and 5913. The user may perform a user action for selecting one of the screen effect selecting regions 5911, 5912 and 5913, and the controller 340 may detect the user action as a user action for requesting a screen effect. The controller 340 may detect the user action for requesting a screen effect, produce screen effect data indicating the screen effect in response to the detected user action, and control transmission of the produced effect data to the electronic device of the chat partner. In one example, if the user performs a user action 5920 for selecting the screen effect selecting region 5911, the controller 340 may produce screen effect data indicating a screen effect of the screen effect selecting region 5911 and then, control transmission of the produced screen effect data to the electronic device of the chat partner.

In addition, if the user performs the user action 5920 for selecting the screen effect selecting region 5911, the controller 340 controls display of a mark 5930 indicating that the screen effect selecting region 5911 is selected and then, controls reflection of a screen effect 5940 of the screen effect selecting region 5911 on the displayed content 5900. Here, a position of the screen effect 5940 may be selected as the user clicks a corresponding region.

If the controller 340 receives the screen effect data from the electronic device of the chat partner, the controller 340 may control reflecting an effect indicated by the received screen effect data on the displayed content 5900.

The controller 340 may control the video decoder 330 to change pixel data of the image frame according to the screen effect. Additionally, the controller 340 may produce On Screen Display (OSD) according to the screen effect, thereby controlling display of the OSD on a content display region.

Figure 60:
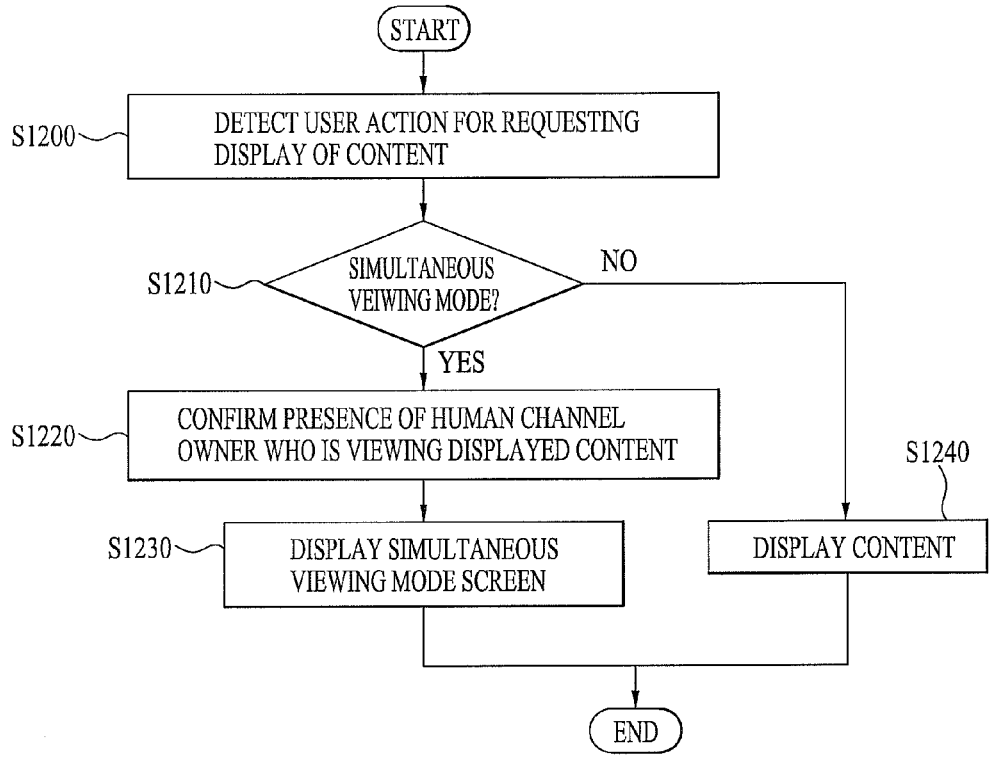
FIG. 60 is a flowchart illustrating an implementation procedure of an exemplary embodiment in relation to a method for remotely viewing content at the same time.

FIG. 60 is a flowchart illustrating an implementation procedure of an exemplary embodiment in relation to a method for remotely viewing content at the same time.

Referring to FIG. 60, the controller 340 detects a user action for requesting display of content (S1200).

The controller 340 confirms whether or not a viewing mode is a simultaneous viewing mode in response to the detected user action (S1210). The simultaneous viewing mode may be setup by initial values, or may be setup by the user as necessary.

If the viewing mode is the simultaneous viewing mode, the controller 340 confirms the presence of a human channel owner who is viewing the requested content (S1220). Here, Step S1220 may include an implementation procedure of a method for confirming viewing of the same content that will be described hereinafter with reference to FIG. 64 or 65.

The controller 340 controls display of content in the simultaneous viewing mode (S1230). The display 302 may display one of the screen 4900, the screen 5000 and the screen 5100. The screen 4900, the screen 5000 and the screen 5100 may represent the owner confirmed in Step S1220 as a chat partner. That is, the owner confirmed in Step S1220 becomes a chat partner.

If the viewing mode is not the simultaneous viewing mode, the controller 340 controls display of the requested content (S1240). The display 302 may display the screen 4800.

The method for remotely viewing content at the same time of FIG. 60 may further include an implementation procedure of a method that will be described hereinafter with reference to FIGS. 67 to 70.

Figure 61:
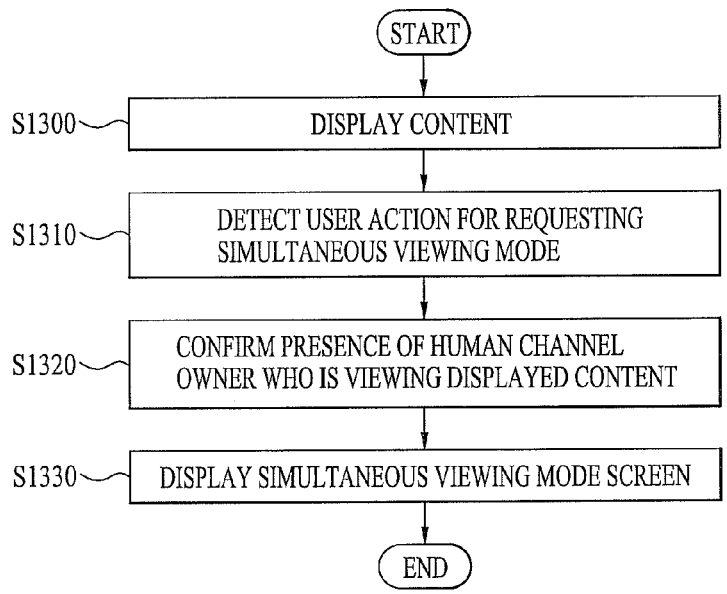
FIG. 61 is a flowchart illustrating an implementation procedure of another exemplary embodiment in relation to a method for remotely viewing content at the same time.

FIG. 61 is a flowchart illustrating an implementation procedure of another exemplary embodiment in relation to a method for remotely viewing content at the same time.

Referring to FIG. 61, the display 302 displays content (S1300). The display 302 may display the screen 4800.

The controller 340 detects a user action for requesting a simultaneous viewing mode (S1310).

The controller 340 confirms the presence of a human channel owner who is viewing the displayed content in response to the detected user action (S1320). Here, Step S1320 may include the implementation procedure of the method for confirming viewing of the same content that will be described hereinafter with reference to FIG. 64 or 65.

The controller 340 controls display of content in the simultaneous viewing mode (S1330). The display 302 may display one of the screen 4900, the screen 5000 and the screen 5100. The screen 4900, the screen 5000 and the screen 5100 may represent the owner confirmed in Step S1320 as a chat partner. That is, the owner confirmed in Step S1320 becomes a chat partner.

The method for remotely viewing content at the same time of FIG. 61 may further include the implementation procedure of the method that will be described hereinafter with reference to FIGS. 67 to 70.

Figure 62:
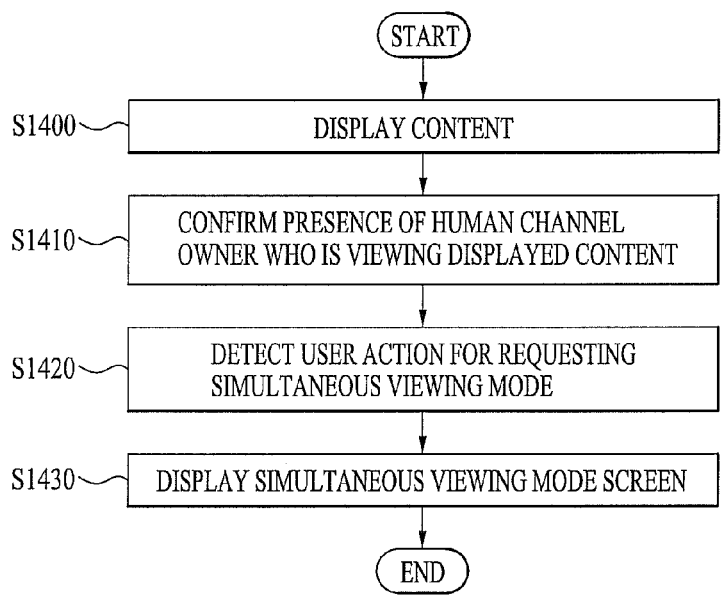
FIG. 62 is a flowchart illustrating an implementation procedure of another exemplary embodiment in relation to a method for remotely viewing content at the same time.

FIG. 62 is a flowchart illustrating an implementation procedure of another exemplary embodiment in relation to a method for remotely viewing content at the same time.

Referring to FIG. 62, the display 302 displays content (S1400). The display 302 may display the screen 4800.

The controller 340 confirms the presence of a human channel owner who is viewing the displayed content (S1410). Here, Step S1410 may include the implementation procedure of the method for confirming viewing of the same content that will be described hereinafter with reference to FIG. 64 or 65.

The controller 340 detects a user action for requesting a simultaneous viewing mode (S1420).

The controller 340 controls display of content in the simultaneous viewing mode in response to the detected user action (S1430). The display 302 may display one of the screen 4900, the screen 5000 and the screen 5100. The screen 4900, the screen 5000 and the screen 5100 may represent the owner confirmed in Step S1410 as a chat partner. That is, the owner confirmed in Step S1410 becomes a chat partner.

The method for remotely viewing content at the same time of FIG. 62 may further include the implementation procedure of the method that will be illustrated hereinafter with reference to FIGS. 67 to 70.

Figure 63:
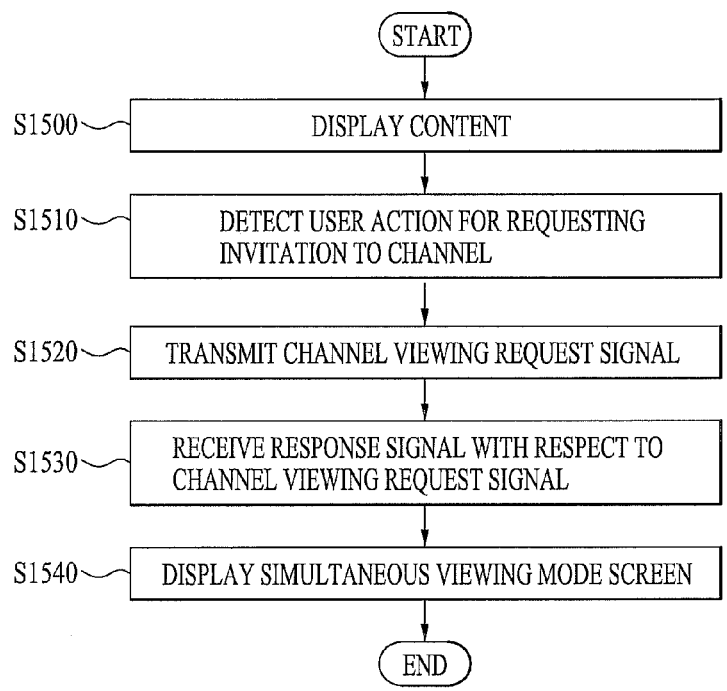
FIG. 63 is a flowchart illustrating an implementation procedure of a further exemplary embodiment in relation to a method for remotely viewing content at the same time.

FIG. 63 is a flowchart illustrating an implementation procedure of a further exemplary embodiment in relation to a method for remotely viewing content at the same time.

Referring to FIG. 63, the display 302 displays content (S1500). The display 302 may display the screen 1600, the screen 3500, or the screen 4800.

The controller 340 detects a user action for requesting invitation to view a channel (S1510). In one example, the user action may be an action for dragging a screen on which content is displayed and dropping the content to a human channel listed in a human channel map. More particularly, the controller 340 may detect the user action for requesting invitation to view a channel if the image 3630 illustrated in FIG. 36 is dragged to and drops onto the human channel number '43'. In another example, the user action may be a combination of a user action for selecting a displayed broadcast program and a user action for selecting a human channel (or a channel number).

The controller 340 controls transmission of a channel viewing request signal in response to the detected user action (S1520). The channel viewing request signal may have the format 3800 illustrated in FIG. 38.

In some embodiments, the controller 340 may control transmission of the channel viewing request signal to the electronic device which provides the human channel indicated by the channel number designated by the user action in Step S1510. An address of the electronic device may be acquired by the above described method of FIGS. 19 to 21.

In some embodiments, the controller 340 may control transmission of the channel viewing request signal to the server. The server may be the server 10 illustrated in FIG. 1.

The network interface 320 receives a response signal with respect to the channel viewing request signal (S1530). The response signal may be one of a viewing acceptance signal, a viewing not possible signal and a viewing rejection signal.

If the response signal is a viewing acceptance signal, the controller 340 controls display of content in the simultaneous viewing mode (S1540). The display 302 may display one of the screen 4900, the screen 5000 and the screen 5100. Also, the screen 4900, the screen 5000 and the screen 5100 may represent an owner of a human channel associated with the electronic device which has transmitted the viewing acceptance signal. The owner becomes a chat partner.

The method for remotely viewing content at the same time of FIG. 63 may further include the implementation procedure of the method that will be described hereinafter with reference to FIGS. 67 to 70.

Figure 64:
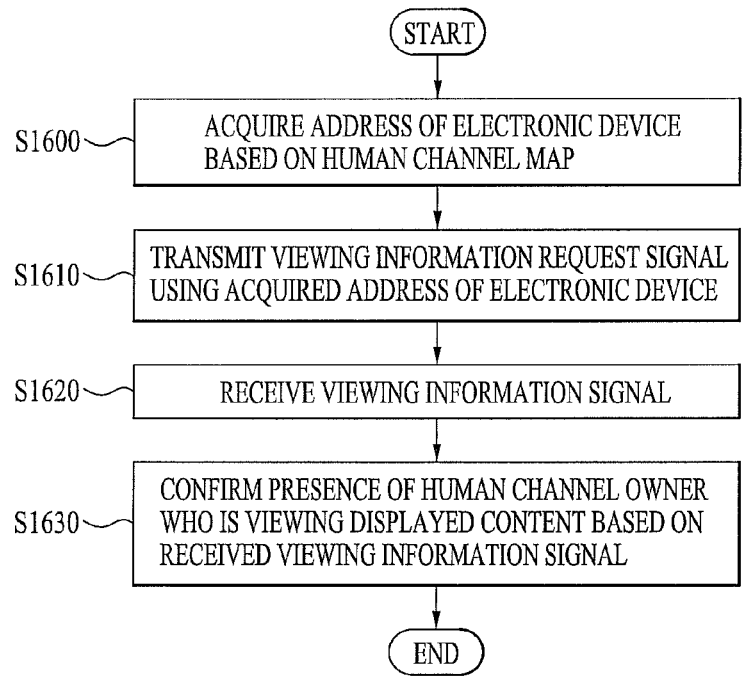
FIG. 64 is a flowchart illustrating an implementation procedure of an exemplary embodiment in relation to a method for confirming viewing of the same content.

FIG. 64 is a flowchart illustrating an implementation procedure of an exemplary embodiment in relation to a method for confirming viewing of the same content.

Referring to FIG. 64, the controller 340 acquires an address of the electronic device based on a human channel map (S1600). The human channel map may be the human channel map 1210 of FIG. 12, or may include the human channel map 1210, the first connection information map 1230, the second connection information map 1240, the third connection information map 1250, the fourth connection information map 1260 and the fifth connection information map 1270 as illustrated in FIG. 12. The address of the electronic device may be acquired by the above described method of FIGS. 19 to 21. The electronic device may be limited to an online electronic device.

The controller 340 controls transmission of a viewing information request signal using the acquired address of the electronic device (S1610). The viewing information request signal may be the image frame request signal as described above in relation to FIG. 52.

The network interface 320 receives a viewing information signal (S1620). In some embodiments, the viewing information signal may have the format 3800 illustrated in FIG. 38. In some embodiments, the viewing information signal may be the image frame transmission signal as described above in relation to FIG. 52.

The controller 340 confirms the presence of a human channel owner who is viewing the displayed content based on the received viewing information signal (S1630). In some embodiments, the controller 340 may confirm the owner by comparing the above described information of FIG. 38. In some embodiments, the controller 340 may confirm the owner based on the above described comparison algorithm 5215 of FIG. 52.

Figure 65:
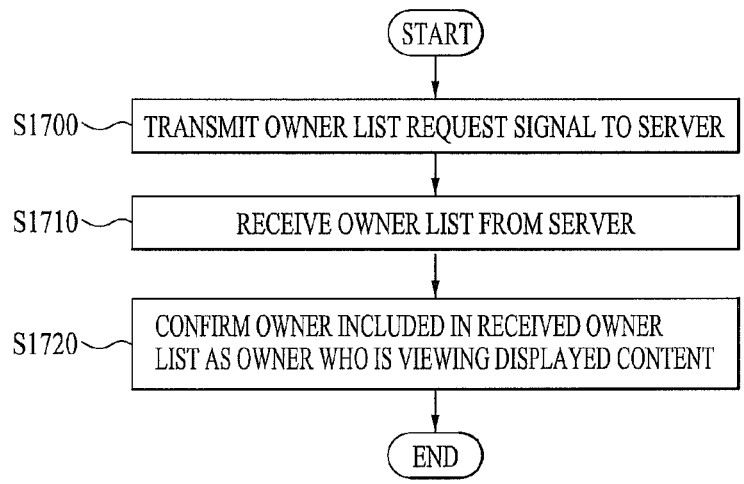
FIG. 65 is a flowchart illustrating an implementation procedure of another exemplary embodiment in relation to a method for confirming viewing of the same content.

FIG. 65 is a flowchart illustrating an implementation procedure of another exemplary embodiment in relation to a method for confirming viewing of the same content.

Referring to FIG. 65, the controller 340 controls transmission of an owner list request signal to the server (S1700). The transmitted owner list request signal may be a signal to request a list of owners who are viewing the displayed content. The server may be the server 10.

The network interface 320 receives an owner list from the server (S1710). The owner list includes owners who are viewing the displayed content. In some embodiments, the owner list may further include at least one of emotion data or motion data of owners included therein.

The controller 340 confirms the owners included in the received owner list as owners who are viewing the displayed content (S1720).

Figure 66:
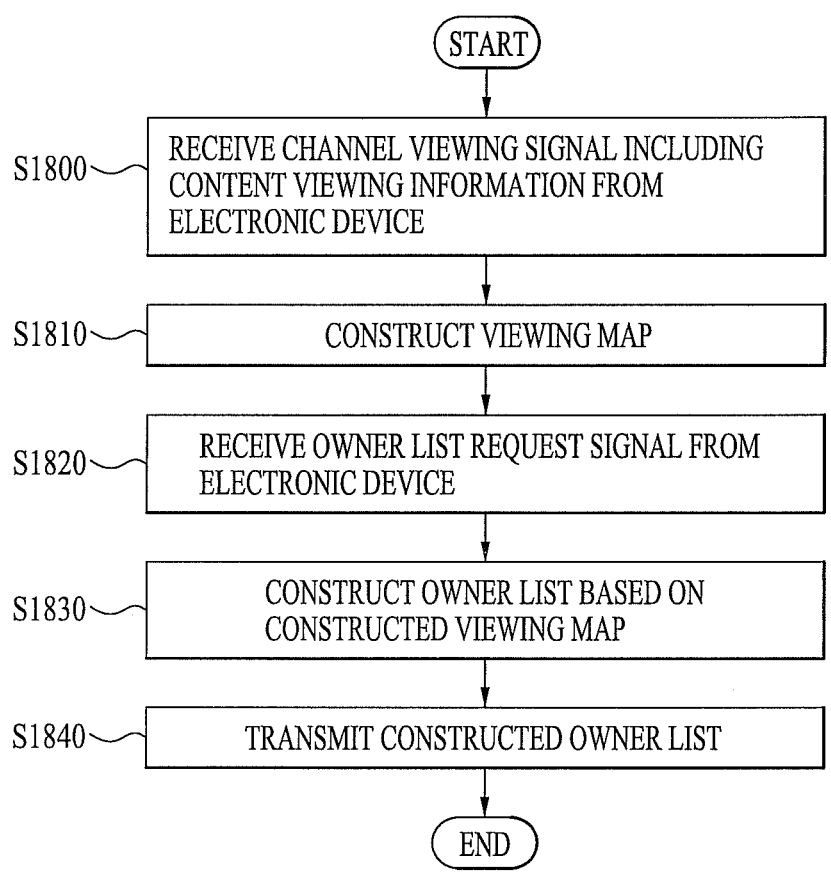
FIG. 66 is a flowchart illustrating an implementation procedure of an exemplary embodiment in relation to a method for providing a viewing list.

FIG. 66 is a flowchart illustrating an implementation procedure of an exemplary embodiment in relation to a method for providing a viewing list.

Referring to FIG. 66, the server 10 receives a channel viewing signal including content viewing information from the electronic device (S1800). The received content viewing information may include the above described information of FIG. 38. In some embodiments, the content viewing information may further include at least one of emotion data or motion data of the owner of the human channel associated with the electronic device.

The server 10 constructs a viewing map using the received content viewing information (S1810). The constructed viewing map may include at least one of identification information about content that every human channel owner is viewing, emotion data, motion data or group information. The group information indicates a group of owners who are viewing the same content.

The server 10 receives an owner list request signal from the electronic device (S1820). The owner list request signal corresponds to the above described owner list request signal of FIG. 65.

The server 10 constructs an owner list using the constructed viewing map (S1830). The owner list corresponds to the above described owner list of FIG. 65. The server 10 may add owners having the same group information to the owner list.

The server 10 transmits the constructed owner list to the electronic device that has transmitted the owner list request signal (S1840).

Figure 67:
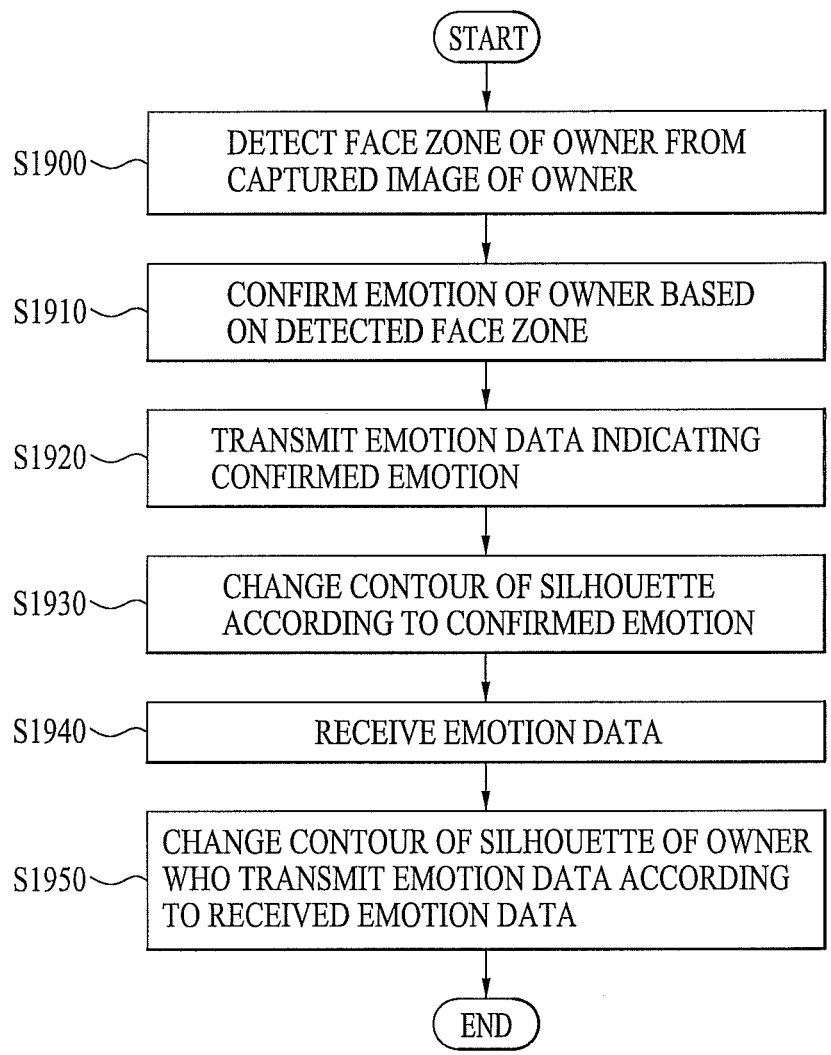
FIG. 67 is a flowchart illustrating an implementation procedure of an exemplary embodiment in relation to a method for displaying a silhouette.

FIG. 67 is a flowchart illustrating an implementation procedure of an exemplary embodiment in relation to a method for displaying a silhouette.

Referring to FIG. 67, the controller 340 detects a face zone of an owner from an image captured by the owner (S1900). The owner may be a human channel owner or a viewer who is viewing content. In one example, the owner may be the viewer 5301 of FIG. 53. The image capture device 301 may capture an image of the owner at a preset interval, and the controller 340 may detect a face of the owner from the captured image at the preset interval.

The controller 340 confirms the emotions of the owner based on the detected face zone (S1910). The controller 340 may confirm the emotions of the owner by the above described method of FIGS. 56 and 57. Then, the controller 340 may produce emotion data indicating the confirmed emotions. In some embodiments, the controller 340 may produce emotion data if emotion change occurs.

The controller 340 controls transmission of the emotion data indicating the confirmed emotions (S1920). In some embodiments, the controller 340 may control transmission of the emotion data if emotion change occurs.

The controller 340 controls change of the contour of a silhouette according to the confirmed emotions (S1930). The controller 340 may change the contour of a silhouette using the above described method of FIG. 55.

The network interface 320 receives emotion data (S1940). In some embodiments, the emotion data may be transmitted from the electronic device of the chat partner. In some embodiments, the emotion data may be transmitted from the server 10.

The controller 340 controls change of the contour of a silhouette of an owner who has transmitted the emotion data according to the received emotion data (S1950). The controller 340 may change the contour of a silhouette using the above described method of FIG. 55.

Figure 68:
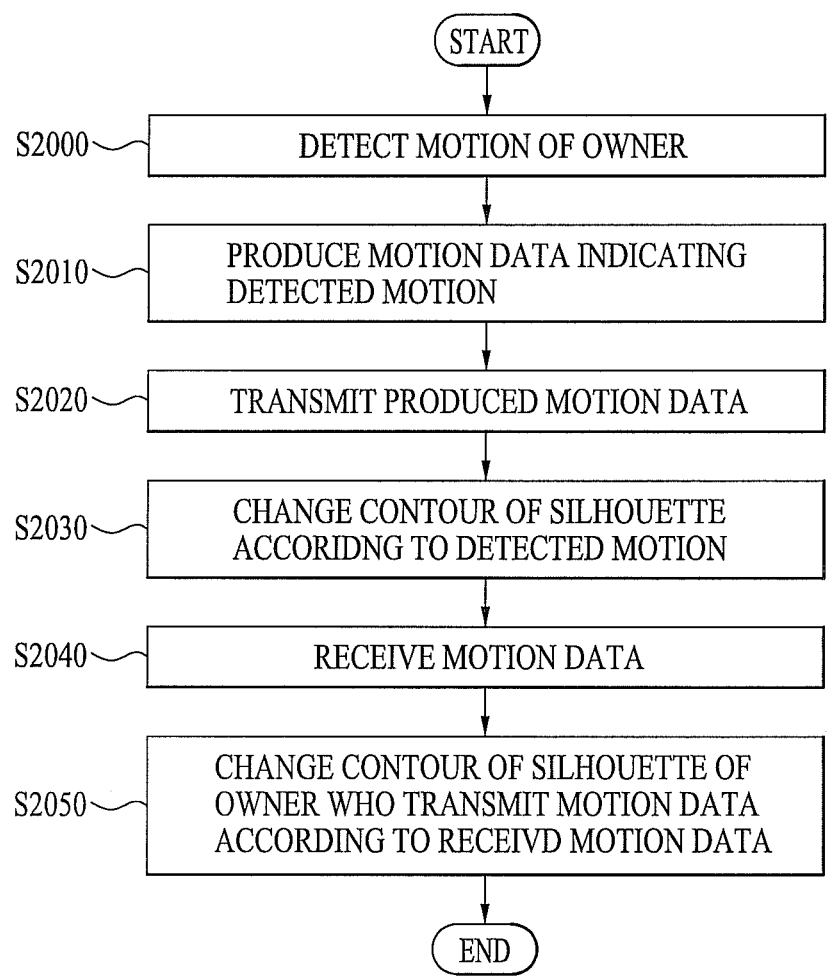
FIG. 68 is a flowchart illustrating an implementation procedure of another exemplary embodiment in relation to a method for displaying a silhouette.

FIG. 68 is a flowchart illustrating an implementation procedure of another exemplary embodiment in relation to a method for displaying a silhouette.

Referring to FIG. 68, the controller 340 detects a motion of an owner (S2000). The owner may be an owner of a human channel and may be a viewer who is viewing content. In one example, the owner may be the viewer 5801 of FIG. 58, and the controller 340 may detect a motion of the owner by the above described method of FIG. 58.

In some embodiments, the image capture device 301 may capture an image of the owner, and the controller 340 may detect a motion of the owner from an image frame included in the captured image of the owner.

The controller 340 produces motion data indicating the detected motion (S2010). In some embodiments, the controller 340 may produce motion data if motion change occurs.

The controller 340 controls transmission of the produced motion data (S2020). In some embodiments, the controller 340 may control transmission of the motion data if motion change occurs.

The controller 340 controls change of the contour of a silhouette according to the detected motion (S2030). The controller 340 may change the contour of a silhouette using the above described method of FIG. 58.

The network interface 320 receives motion data (S2040). In some embodiments, the motion data may be transmitted from the electronic device of the chat partner. In some embodiments, the motion data may be transmitted from the server 10.

The controller 340 controls change of the contour of a silhouette of an owner who has transmitted motion data according to the received motion data (S2050). The controller 340 may change the contour of a silhouette using the above described method of FIG. 58.

Figure 69:
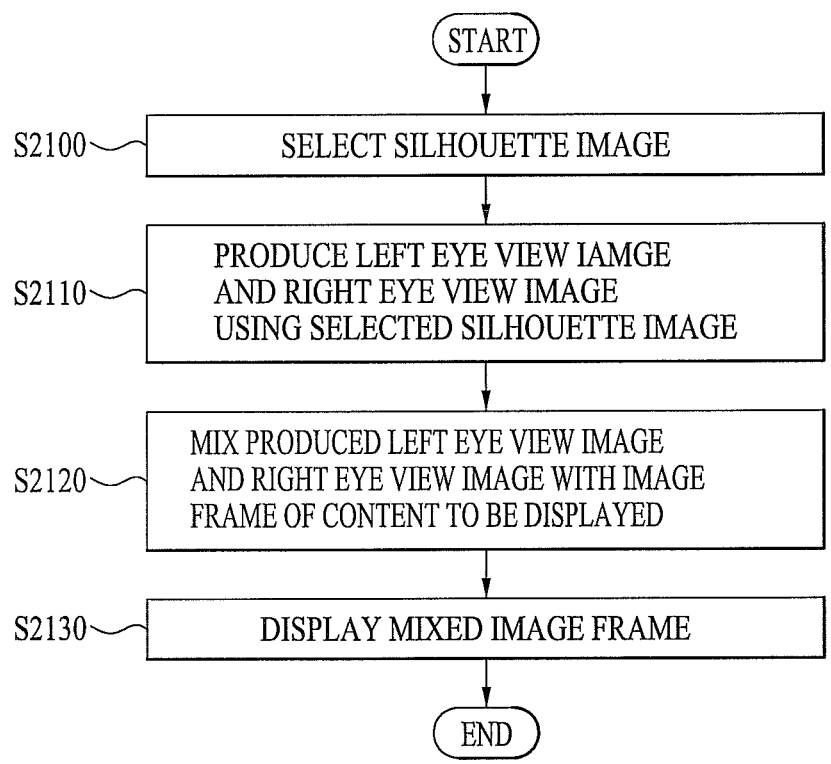
FIG. 69 is a flowchart illustrating an implementation procedure of an exemplary embodiment in relation to a method for displaying a silhouette as a 3D image.

FIG. 69 is a flowchart illustrating an implementation procedure of an exemplary embodiment in relation to a method for displaying a silhouette as a 3D image.

Referring to FIG. 69, the controller 340 selects a silhouette image (S2100). The silhouette image may be selected by the above described method of FIG. 67 or 68. More particularly, the silhouette image may be selected according to the detected emotions or emotions indicated by the received emotion data, or may be selected according to the detected motion or a motion indicated by the detected motion data.

The controller 340 produces a left view image and a right view image using the selected silhouette image (S2110). In one example, the produced left view image and the produced right view image may be utilized to display the silhouette 5110 of FIG. 51.

The controller 340 controls mixing of each of the produced left view image and the produced right view image with an image frame of content to be displayed (S2120). The mixer 360 may mix the left view image with the image frame of the content to thereby produce a left view image frame, or may mix the right view image with the image frame of the content to thereby produce a right view image frame. In one example, the image frame may be the image frame displayed on the screen of FIG. 51.

The formatter 370 may perform sampling of the left view image frame and the right view image frame output by the mixer 360 to obtain a 3D output format that can be displayed as a 3D image by the display 302.

The display 302 displays a mixed image frame (S2130). The mixed image frame may be an image frame having the 3D output format obtained by sampling the left view image frame and the right view image frame produced by the mixer 360 in Step S2120. In one example, the display 302 may display the screen 5100 in Step S2130.

Figure 70:
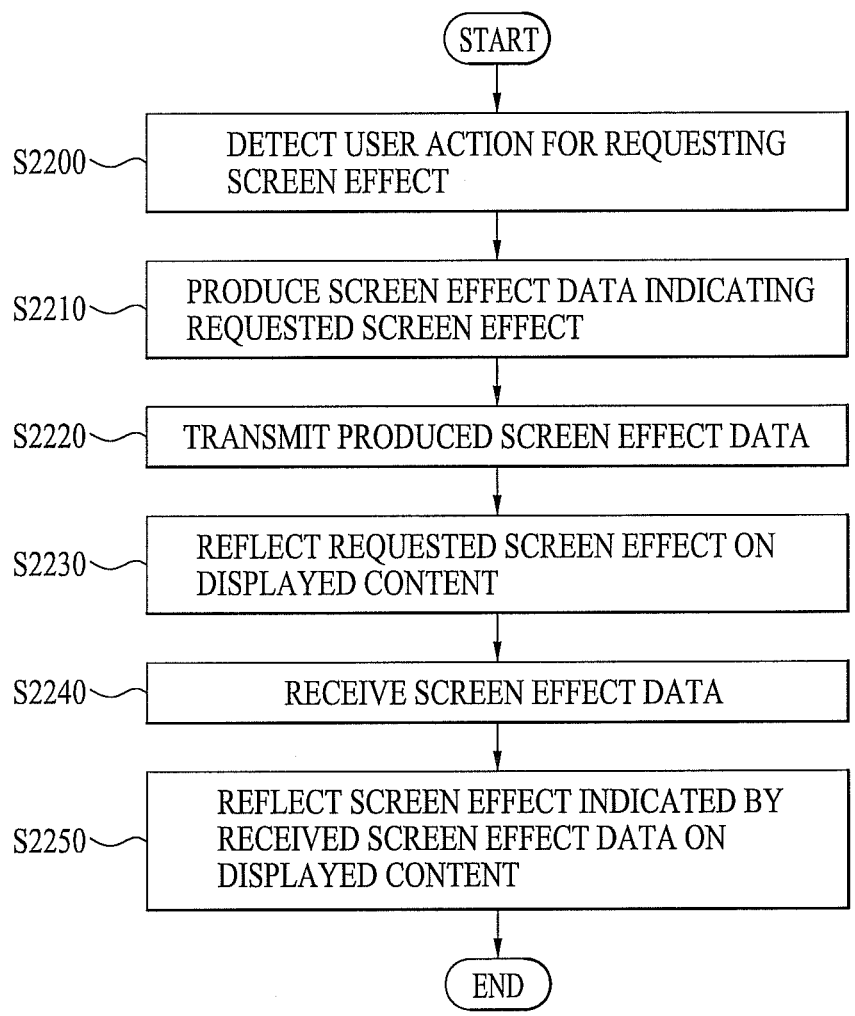
FIG. 70 is a flowchart illustrating an implementation procedure of an exemplary embodiment in relation to a method for sharing a screen effect.

FIG. 70 is a flowchart illustrating an implementation procedure of an exemplary embodiment in relation to a method for sharing a screen effect.

Referring to FIG. 70, the controller 340 detects a user action for requesting a screen effect (S2200). The user action may be a user action for selecting one of the screen effect selecting regions 5911, 5912 and 5913 of FIGS. 59A to 59D.

The controller 340 produces screen effect data indicating the requested screen effect in response to the detected user action (S2210).

The controller 340 transmits the produced screen effect data to the electronic device of the chat partner or the server 10 (S2220).

The controller 340 controls reflection of the requested screen effect on the displayed content (S2230). The display 302 may display the screen 5900 of FIG. 59D.

The network interface 320 receives screen effect data from the electronic device of the chat partner or the server 10 (S2240).

The controller 340 controls reflection of the screen effect indicated by the received screen effect data on the displayed content (S2250). The display 302 may display the screen 5900 of FIG. 59D.

Figure 71:
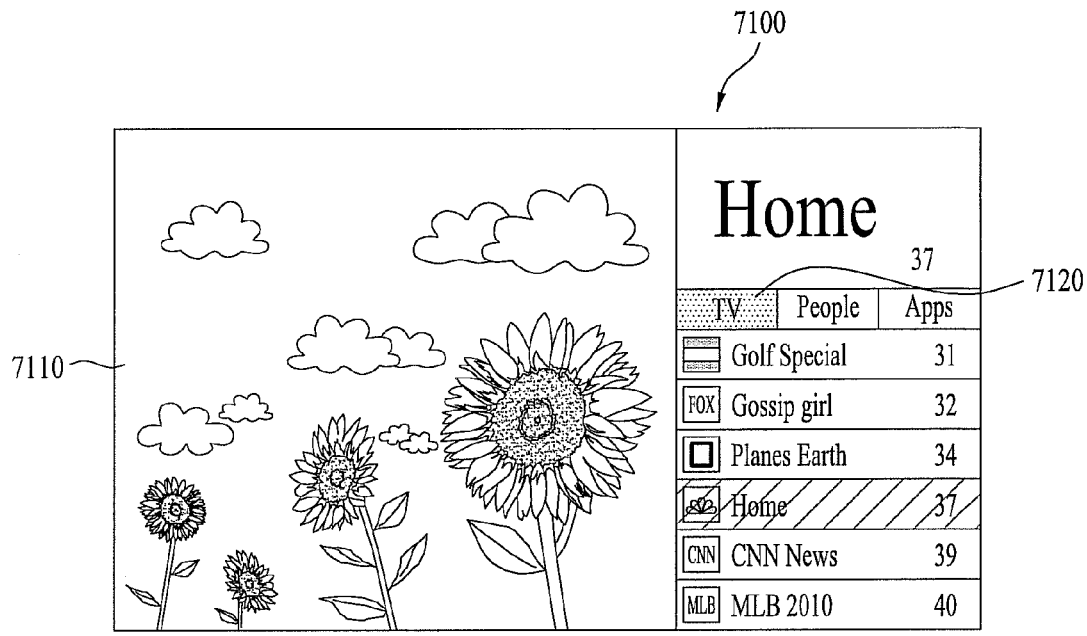
FIG. 71 is a diagram illustrating a broadcast screen on which one exemplary embodiment of a channel map is displayed.

FIG. 71 is a diagram illustrating a broadcast screen on which one exemplary embodiment of a channel map is displayed.

Referring to FIG. 71, the display 302 may display a screen 7100. If the controller 340 detects a user action for requesting a channel map in a state in which a broadcast program 7110 is displayed on the screen 7100, the controller 340 controls displaying a broadcast channel map 7120 on the screen 7100 in response to the detected user action. In some embodiments, the user action for requesting the channel map may be an action in which the user presses a hot key for the channel map or a menu item for the channel map.

Figure 72:
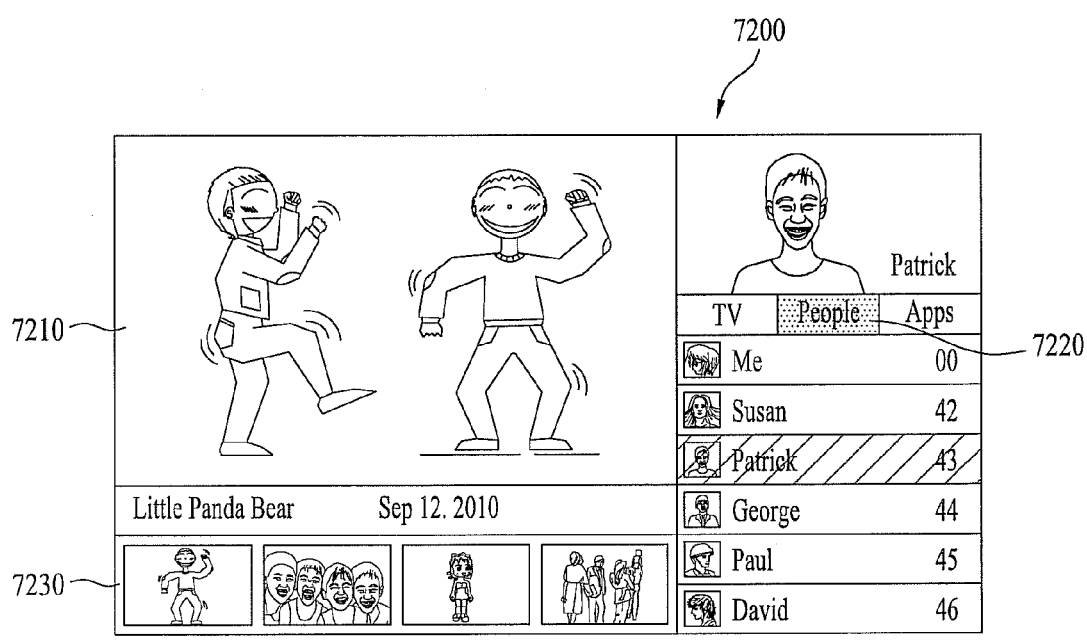
FIG. 72 is a diagram illustrating a broadcast screen on which another exemplary embodiment of a channel map is displayed.
Figure 73:
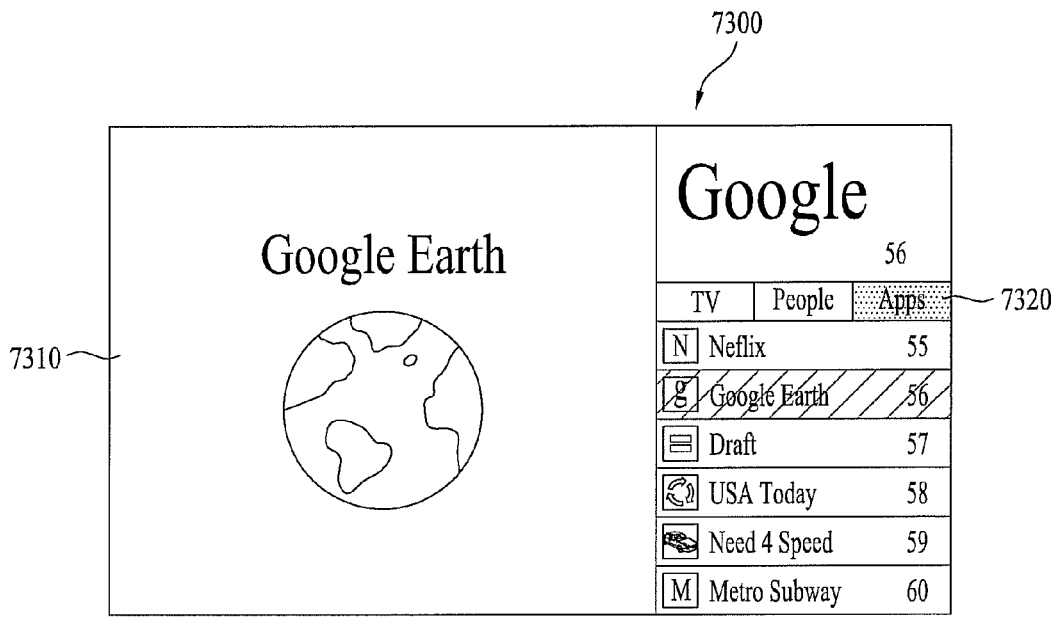
FIG. 73 is a diagram illustrating a broadcast screen on which a further exemplary embodiment of a channel map is displayed.

If the controller 340 detects a user action for requesting channel map switch in a state in which a human channel map 7220 illustrated in FIG. 72 or an App channel map 7320 illustrated in FIG. 73 is displayed, the controller 340 controls displaying the broadcast channel map 7120.

The broadcast channel map 7120 lists broadcast channels (e.g., CNN), today's broadcast content on broadcast channels (e.g., CNN News) and channel numbers associated with the broadcast channels (e.g., 39). With relation to the broadcast program 7110 being displayed, a corresponding broadcast channel 'NBC', broadcast program name or title 'Home' and channel number '37' are listed in a line indicated by an indicator. If the user performs a user action for selecting one of the broadcast channels listed in the broadcast channel map 7120, the controller 340 controls displaying a broadcast program of the selected broadcast channel.

FIG. 72 is a diagram illustrating a broadcast screen on which another exemplary embodiment of a channel map is displayed.

Referring to FIG. 72, the display 302 may display a screen 7200. If the controller 340 detects a user action for requesting channel map switch in a state in which the broadcast channel map 7120 illustrated in FIG. 71 or the App channel map 7320 illustrated in FIG. 73 is displayed, the controller 340 controls displaying the human channel map 7220. In some embodiments, the user action may be an action in which the user presses one of a left key and a right key of a remote controller.

During display of the human channel map 7220, the controller 340 may control displaying content of one human channel listed in the human channel map 7220. The content may be received according to Step S310 of FIG. 18. The human channel map 7220 may be identical to the human channel map 1510 illustrated in FIG. 15.

FIG. 73 is a diagram illustrating a broadcast screen on which a further exemplary embodiment of a channel map is displayed.

Referring to FIG. 73, the display 302 may display a screen 7300. If the controller 340 detects a user action for requesting channel map switch in a state in which the broadcast channel map 7120 illustrated in FIG. 71 or the human channel map 7220 illustrated in FIG. 72 is displayed, the controller 340 controls displaying the App channel map 7320. In some embodiments, the user action may be an action in which the user presses one of a left key and a right key of a remote controller.

The App channel map 7320 lists App channels (e.g., Netflix), App content and channel numbers associated with the App channels (e.g., 55). The controller 340 may control display of the App channel map 7320 in such a manner that a line, on which an App channel 'Google' which provides App content 'Google Earth', denoted by reference numeral 7310, displayed on the screen 7300, and a channel number '56' are listed, is indicated by an indicator. The controller 340 may control display of the App channel map 7320 in such a manner that App content of one App channel listed in the App channel map 7320 is displayed. If the user performs a user action for selecting one of the App channels listed in the App channel map 7320, the controller 340 may control displaying App content of the selected App channel.

Figure 74:
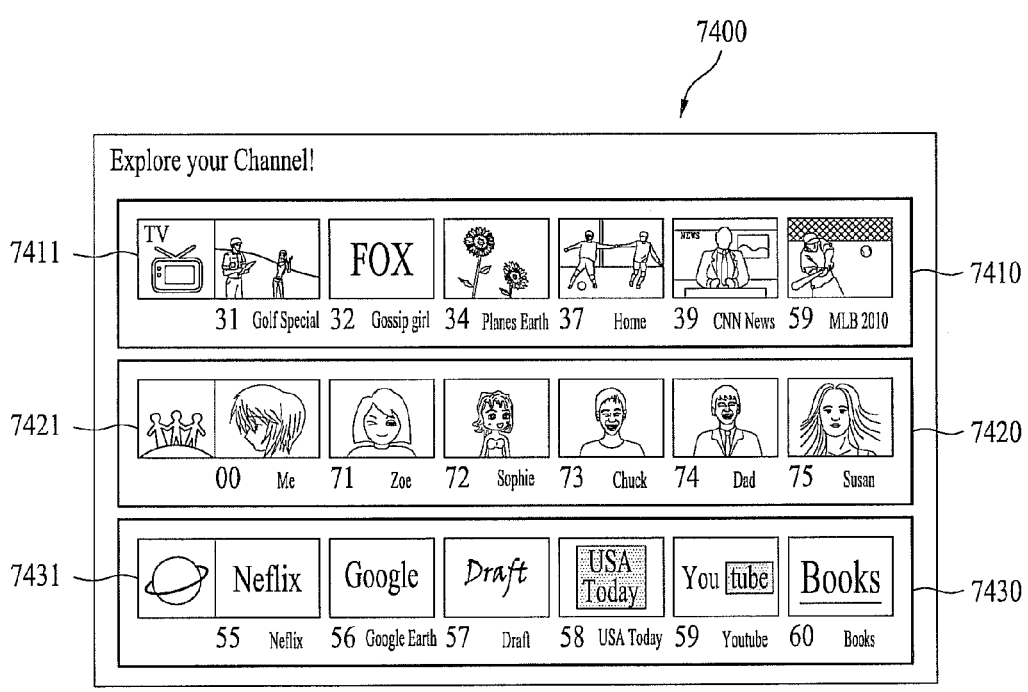
FIG. 74 is a diagram illustrating a screen on which one exemplary embodiment of a full channel map is displayed.

FIG. 74 is a diagram illustrating a screen on which one exemplary embodiment of a full channel map is displayed.

Referring to FIG. 74, the display 302 may display a screen 7400. If the controller 340 detects a user action for requesting a full channel map, the controller 340 may control displaying a full channel map on the screen 7400 in response to the detected user action. The full channel map may be a channel map that is displayed in a full channel mode, for example, on the entire display area or a full screen image. In some embodiments, the user action may be an action in which the user presses a hot key for the full channel map or a menu item for the full channel map.

The full channel map 7400 may display multiple channels maps corresponding to different types of content, for example, broadcast content, SNS content, and application content. The different types of content may be associated with different types of channels. The full channel map 7400 includes a line 7410 on which at least one broadcast channel is listed, a line 7420 on which at least one human channel is listed and a line 7430 on which at least one App channel is listed. These lines 7410, 7420 and 7430 are respectively provided at the first cell thereof with a mark 7411, 7421, 7431 indicating which one of the broadcast channel, human channel or App channel is listed. The mark 7411, 7421, 7431 may be an icon or a selectable link, and may include an image representative of the type of channel. In one embodiment, a selection of a mark may display a channel map of the corresponding type on the full screen. For example, if the mark 7411 for broadcast channel is selected, each of the three rows 7410, 7420, 7430 may broadcast channels.

In some embodiments, the full channel map may be organized in such a manner that at least one broadcast channel is listed on one line, at least one human channel is listed on another line and at least one App channel is listed on the other line.

In the full channel map 7400, movement between channels in the same line may depend upon input of a left key or a right key, and movement between different lines may depend upon input of an up key or a down key. If the user performs a user action for designating one of the channels listed in the full channel map 7400, the controller 340 may control displaying content of the designated channel. The content may be received according to Step S310 illustrated in FIG. 18.

Figure 75:
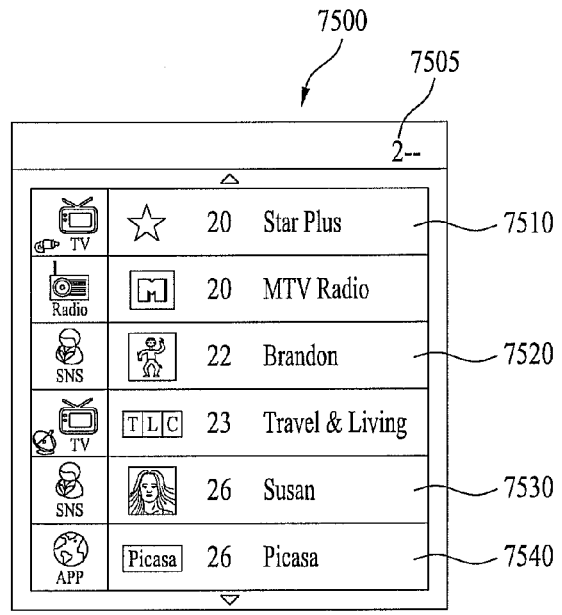
FIG. 75 is a diagram illustrating a screen on which another exemplary embodiment of a full channel map is displayed.

FIG. 75 is a diagram illustrating a screen on which another exemplary embodiment of a full channel map is displayed.

Referring to FIG. 75, the display 302 may display a screen 7500. If the controller 340 detects a user action for requesting a full channel map, the controller 340 may control displaying a full channel map on the screen 7500 in response to the detected user action. In some embodiments, the user action may be an action in which the user presses a hot key for the full channel map or a menu item for the pull channel map.

The full channel map 7500 lists broadcast channels 7510, human channels 7520 and 7530 and App channels 7540. The full channel map 7500 may list these channels in order of channel numbers. The full channel map 7500 may be sorted alphabetically, by user rating (e.g., favorites), based on type of channel, or the full channel map 7500 may be displayed in a custom order as set by a user. In the example as illustrated in FIG. 75, in the full channel map 7500, a broadcast channel 'Star Plus' corresponding to a channel number '20' is located at an uppermost position, a radio channel 'MTV Radio' corresponding to a channel number '21' is located immediately below the broadcast channel 'Star Plus', and a human channel 'Brandon' corresponding to a channel number '22' is located immediately below the radio channel 'MTV Radio'. An App channel 'Picasa' corresponding to a channel number '26' is located at a lowermost position. Channels of different types may be assigned the same channel numbers (e.g., SNS channel 26 for Susan and App Channel 26 for Picasa). In this case, channels may be sorted based on type as predetermined or set by the user.

When the user inputs a particular number, channel numbers associated with the particular number may be listed in the full channel map 7500. A region 7505 of the full channel map 7500 shows a number input by the user. In the drawing, as the region 7505 shows "2-", channels, which have channel numbers in a range of 20 to 29 associated with "2-", are displayed on the full channel map 7500.

If the user performs a user action for designating one of the channels listed in the full channel map 7500, the controller 340 may control displaying content of the designated channel. The content may be received according to Step S310 illustrated in FIG. 18.

Figure 76:
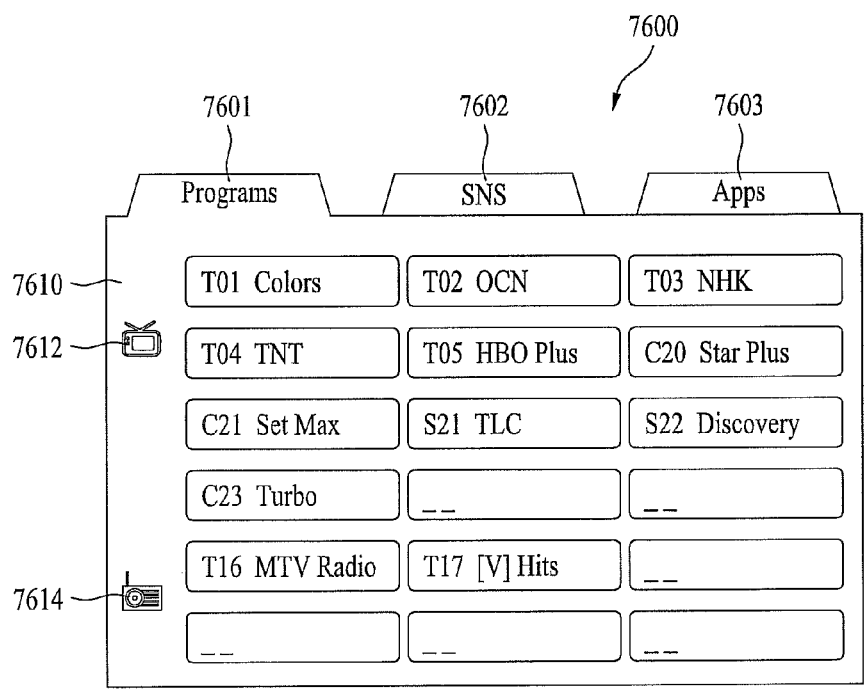
FIG. 76 is a diagram illustrating a screen on which another exemplary embodiment of a full channel map is displayed.

FIG. 76 is a diagram illustrating a screen on which another exemplary embodiment of a full channel map is displayed.

Referring to FIG. 76, the display 302 may display a full channel map 7600. If the controller 340 detects a user action for requesting a full channel map, the controller 340 may control displaying a full channel map 7600 on a screen in response to the detected user action. In some embodiments, the user action may be an action in which the user presses a hot key for the full channel map or a menu item for the full channel map.

The full channel map 7600 includes a broadcast channel sheet (or page), a human channel sheet and an App channel sheet. The broadcast channel sheet, human channel sheet and App channel sheet may be selected respectively using a sheet tab 7601, a sheet tab 7602 and a sheet tab 7603. Specifically, if the user performs an action of pressing one of the sheet tabs 7601, 7602 and 7603, the controller 340 may control displaying a sheet associated with the pressed sheet tab.

During display of the full channel map 7600 on the screen, the controller 340 may control displaying one of the broadcast channel sheet, human channel sheet and App channel sheet. In FIG. 76, a broadcast channel sheet 7610 is displayed. The broadcast channel sheet 7610 may include a mark 7612 indicating that the broadcast channel is a TV channel and a mark 7614 indicating that the broadcast channel is a radio channel. Each cell of the broadcast channel sheet 7610 includes a broadcast channel (e.g., Colors) and a channel number (e.g., T01) associated with the broadcast channel. If the user performs an action of pressing one of cells on the broadcast channel sheet 7610, the controller 340 controls displaying a broadcast program on the broadcast channel of the pressed cell.

Figure 77:
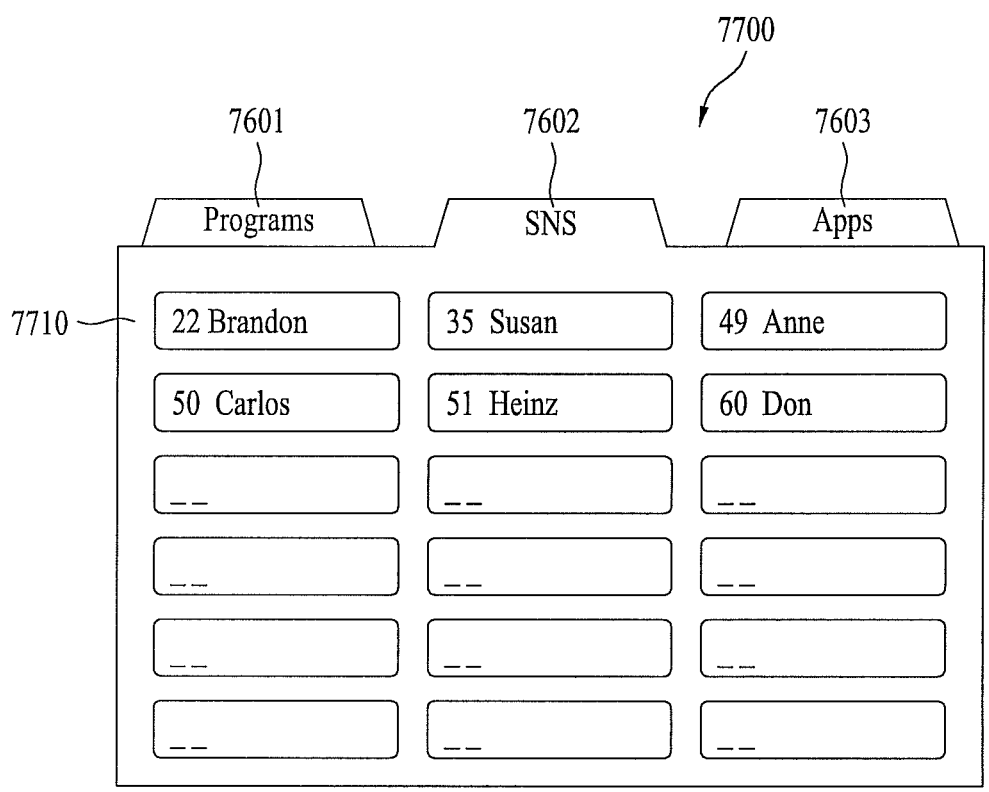
FIG. 77 is a diagram illustrating a screen on which a human channel sheet of the full channel map of FIG. 76 is displayed.

FIG. 77 is a diagram illustrating a screen on which the human channel sheet of the full channel map of FIG. 76 is displayed.

Referring to FIG. 77, if the user performs a user action for selecting the sheet tab 7602, the controller 340 detects the user action and controls displaying a human channel sheet 7710 of the full channel map 7700 in response to the detected user action.

Each cell of the human channel sheet 7710 includes a human channel (e.g., Brandon) and a channel number (e.g., 22) associated with the human channel. If the user performs an action of pressing one of cells on the human channel sheet 7710, the controller 340 may control displaying content of the human channel of the pressed cell. The content may be received according to Step S310 illustrated in FIG. 18.

Figure 78:
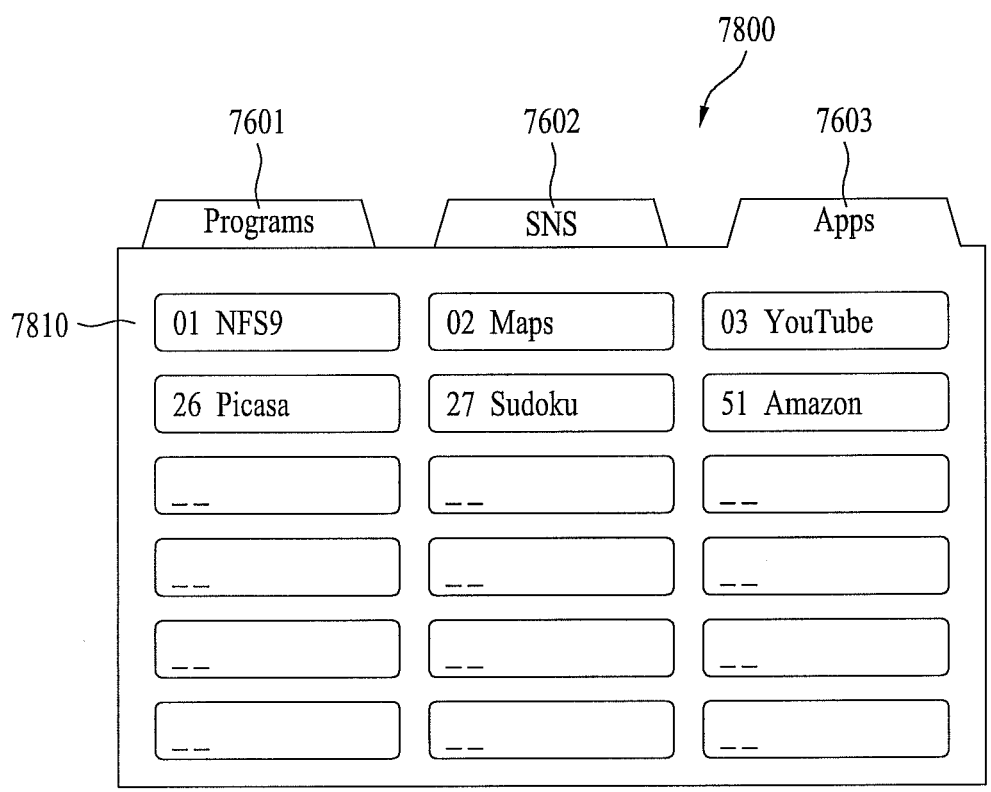
FIG. 78 is a diagram illustrating a screen on which an App channel sheet of the full channel map of FIG. 76 is displayed.

FIG. 78 is a diagram illustrating a screen on which the App channel sheet of the full channel map of FIG. 76 is displayed.

Referring to FIG. 78, if the user performs an action for selecting the sheet tab 7603, the controller 340 detects the user action and controls displaying an App channel sheet 4210 on the full channel map 7800 in response to the detected user action.

Each of the App channel sheet 7810 includes an App channel (e.g., NFS9) and a channel number (e.g., 01) associated with the App channel. If the user performs an action of pressing one of cells on the App channel sheet 7810, the controller 340 may control displaying content of the App channel of the pressed cell.

Figure 79:
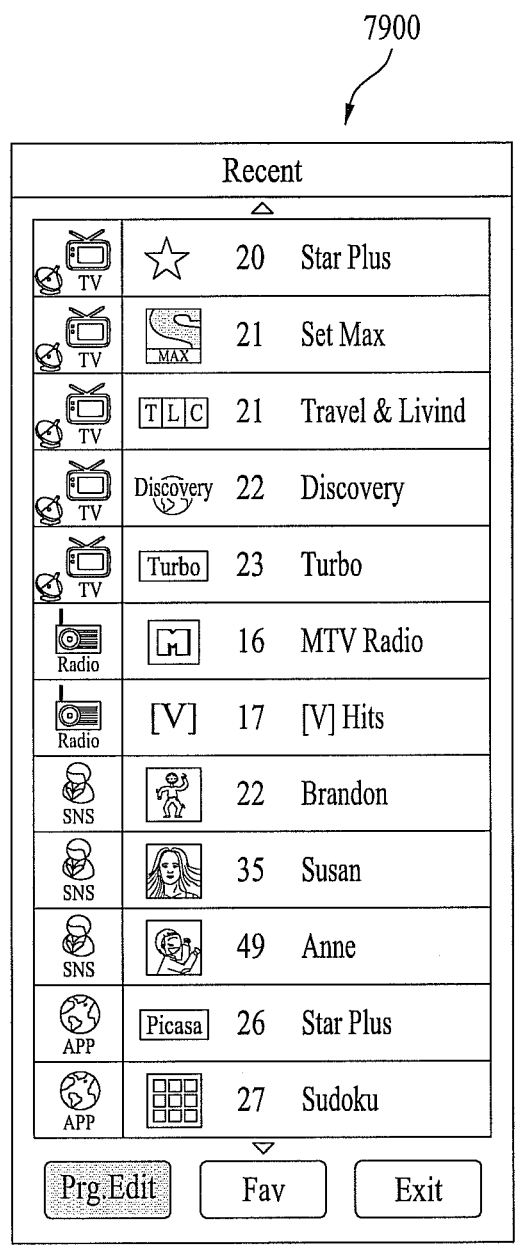
FIG. 79 is a diagram illustrating a screen on which an exemplary embodiment of a recently viewed channel map is displayed.

FIG. 79 is a diagram illustrating a screen on which an exemplary embodiment of a recently viewed channel map is displayed.

Referring to FIG. 79, the display 302 may display a recently viewed channel map 7900. If the controller 340 detects a user action for requesting a recently viewed channel map, the controller 340 may control displaying the recently viewed channel map 7900 on a screen in response to the detected user action. In some embodiments, the user action may be an action in which the user presses a hot key for the recently viewed channel map or a menu item for the recently viewed channel map.

The recently viewed channel map 7900 lists broadcast channels, human channels and App channels displayed within a preset period. The preset period may be 1 day, 7 days, 10 days, 15 days and 30 days. The preset period may be an initially set value, or may be set by the user.

The recently viewed channel map 7900 displays channels on a per line basis. The first cell of each line indicates that the channel corresponds to which one of the broadcast channel, human channel and App channel. For example, a mark 'TV' on the first cell indicates a broadcast channel, a mark 'Radio' indicates a radio channel, a mark 'SNS' indicates a human channel and a mark 'APP' indicates an App channel.

The recently viewed channel map 7900 may list the channels in reverse order of displayed time. For example, in the recently viewed channel map 7900, a broadcast channel 'Set Max', which was broadcast before a broadcast channel 'Star Plus', is located behind the broadcast channel 'Start Plus'.

If the user performs a user action of pressing one of the lines listed in the recently viewed channel map 7900, the controller 340 may control displaying content of the channel indicated by the pressed line. The content may be received according to Step S310 illustrated in FIG. 18.

Figure 80:
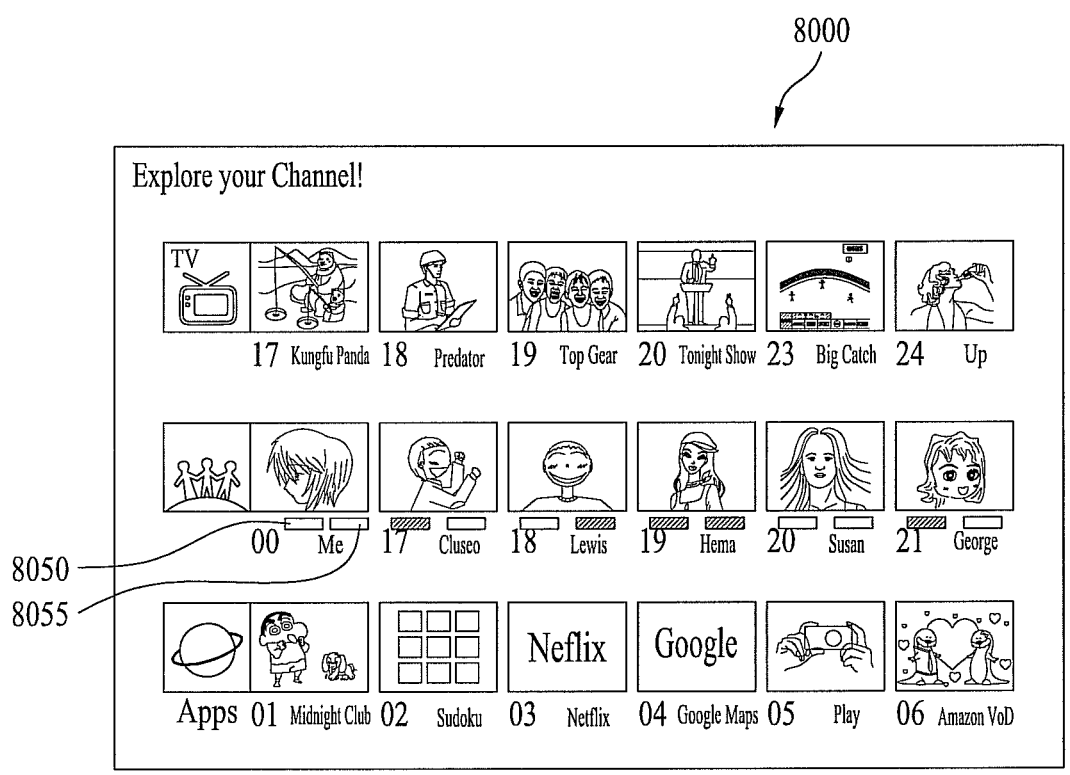
FIG. 80 is a diagram illustrating a screen on which a further exemplary embodiment of a full channel map is displayed.

FIG. 80 is a diagram illustrating a screen on which a further exemplary embodiment of a full channel map is displayed.

Referring to FIG. 80, the display 302 may display a full channel map 8000. If the controller 340 detects a user action for requesting a full channel map, the controller 340 may control displaying the full channel map 8000 on a screen in response to the detected user action. The user action may be an action in which the user presses a hot key for the full channel map or a menu item for the full channel map.

The full channel map 8000 has the same configuration as the full channel map 7400 and further includes connection state marks 8050 and 8055 (also status indicator) for indicating the online state of an owner of a human channel. A first connection state mark 8050 indicates a first online state which represents whether or not the owner of the human channel is online via an electronic device. A second connection state mark 8055 indicates a second online state which represents whether or not the owner is logged in to a server. The server may be the server 10 or the server 20 illustrated in FIG. 1, and the electronic device may be the first digital TV 100, the second digital TV 110, the personal computer system 120, the notebook computer 130 or the mobile terminal 140 illustrated in FIG. 1. That the owner is online via the electronic device means that another electronic device is connectable to the electronic device through a human channel. That the owner is logged in to the server means that another owner may communicate with the owner through the network 1. For example, if the first connection state mark 8050 is inactive (off) and the second connection state mark 8055 is active (on), the owner is not connected through their digital TV but is connected through their SNS account.

Information about the online state of the owner may be received from the electronic device or the server. The electronic device may periodically receive information about the first online state or information about the second online state from the server.

The electronic device may transmit information about the first online state to an electronic device or server associated with the human channel stored in the human channel map. In some embodiments, the electronic device may transmit information about the first online state to all electronic devices associated with the human channel. In some embodiments, the electronic device may transmit information about the first online state to an electronic device which is online, among the electronic devices associated with the human channel.

FIGS. 81A to 81D are diagrams illustrating the online state of the owner of the human channel.

The online state of the owner of the human channel may be illustrated as in FIGS. 81A to 81D. The human channel map 8000 may provide human channels listed therein with connection state marks as illustrated in FIGS. 81A to 81D.

In FIG. 81A, a connection state mark 8111 indicates the first online state for representing that the owner of the human channel is not online, and a connection state mark 8115 indicates the second online state for representing that the owner is not logged in to the server.

In FIG. 81B, a connection state mark 8121 indicates the first online state for representing that the owner of the human channel is online, and a connection state mark 8125 indicates the second online state for representing that the owner is not logged in to the server.

Figure 81C:

In FIG. 81C, a connection state mark 8131 indicates the first online state for representing that the owner of the human channel is not online, and a connection state mark 8135 indicates the second online state for representing that the owner is logged in to the server.

Figure 81D:

In FIG. 81D, a connection state mark 8141 indicates the first online state for representing that the owner of the human channel is online, and a connection state mark 8145 indicates the second online state for representing that the owner is logged in to the server.

Figure 82:
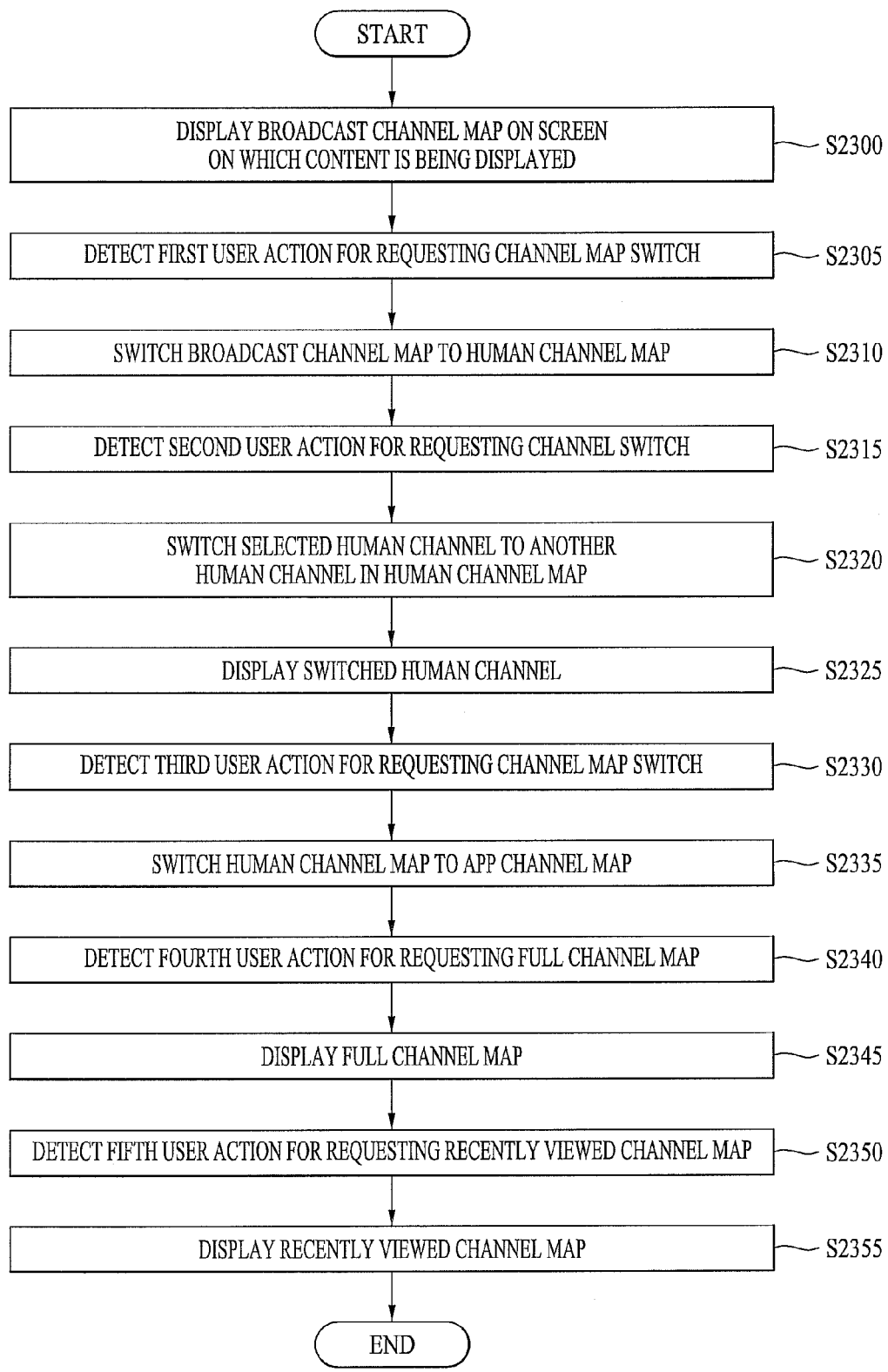
FIG. 82 is a flowchart illustrating an implement procedure of an exemplary embodiment for a method of providing a channel map service in accordance with the present disclosure.

FIG. 82 is a flowchart illustrating an implement procedure of an exemplary embodiment for a method of providing a channel map service in accordance with the present disclosure.

Referring to FIG. 82, the display 302 displays a broadcast channel map including at least one broadcast channel on a screen on which content is being displayed (S2300). The broadcast channel map may be the broadcast channel map 7120 illustrated in FIG. 71.

The controller 340 detects a first user action for requesting channel map switch (S2305). In some embodiments, the first user action may be an action in which the user presses one of an up key, a down key, a left key and a right key of a remote controller.

The controller 340 switches the displayed broadcast channel map to a human channel map including at least one human channel in response to the detected first user action (S2310). The controller 340 may control displaying content of one of human channels included in the human channel map on the screen. The selected human channel may have a first channel number, a medium channel number or a last channel number, and may be a human channel more recently displayed than other human channels. The human channel map may be the human channel map 7220 illustrated in FIG. 72.

The controller 340 detects a second user action for requesting channel switch (S2315). In some embodiments, the second user action may be an action in which the user presses one of an up key, a down key, a left key and a right key of a remote controller. In some embodiments, if the first user action for requesting channel map switch is an action of pressing the left key or right key of a remote controller, the second user action for requesting channel switch may be an action of pressing the up key or down key of the remote controller.

The controller 340 switches a selected human channel to another human channel in the human channel map in response to the detected second user action (S2320).

The controller 340 controls displaying content of the switched human channel (S2325). The content may be received according to Step S310 in FIG. 18.

The controller 340 detects a third user action for requesting channel map switch (S2330).

The controller 340 switches the human channel map to an App channel map including at least one App channel in response to the detected third user action (S2335). The App channel map may be the App channel map 7320 illustrated in FIG. 73.

The controller 340 detects a fourth user action for requesting a full channel map (S2340). In some embodiments, the fourth user action may be an action in which the user presses a hot key for the full channel map or a menu item for the full channel map.

The controller 340 controls displaying a full channel map including the at least one broadcast channel, the at least one human channel and the at least one App channel in response to the detected fourth user action (S2345). The full channel map may be one of the full channel map 7400 illustrated in FIG. 74, the full channel map 7500 illustrated in FIG. 75, the full channel map 7600 illustrated in FIG. 76 and the full channel map 8000 illustrated in FIG. 80.

The controller 340 detects a fifth user action for requesting a recently viewed channel map (S2350). In some embodiments, the fifth user action may be a user action of pressing a hot key for the recently viewed channel map or a menu item for the recently viewed channel map.

The controller 340 controls displaying the recently viewed channel map including broadcast channels, human channels and App channels displayed within a preset period in response to the detected fifth user action (S2355). The recently viewed channel map may be the recently viewed channel map 7900 illustrated in FIG. 79. The preset period may be 1 day, 7 days, 10 days, 15 days and 30 days. The preset period may be an initially set value, or may be set by the user.

Figure 83:
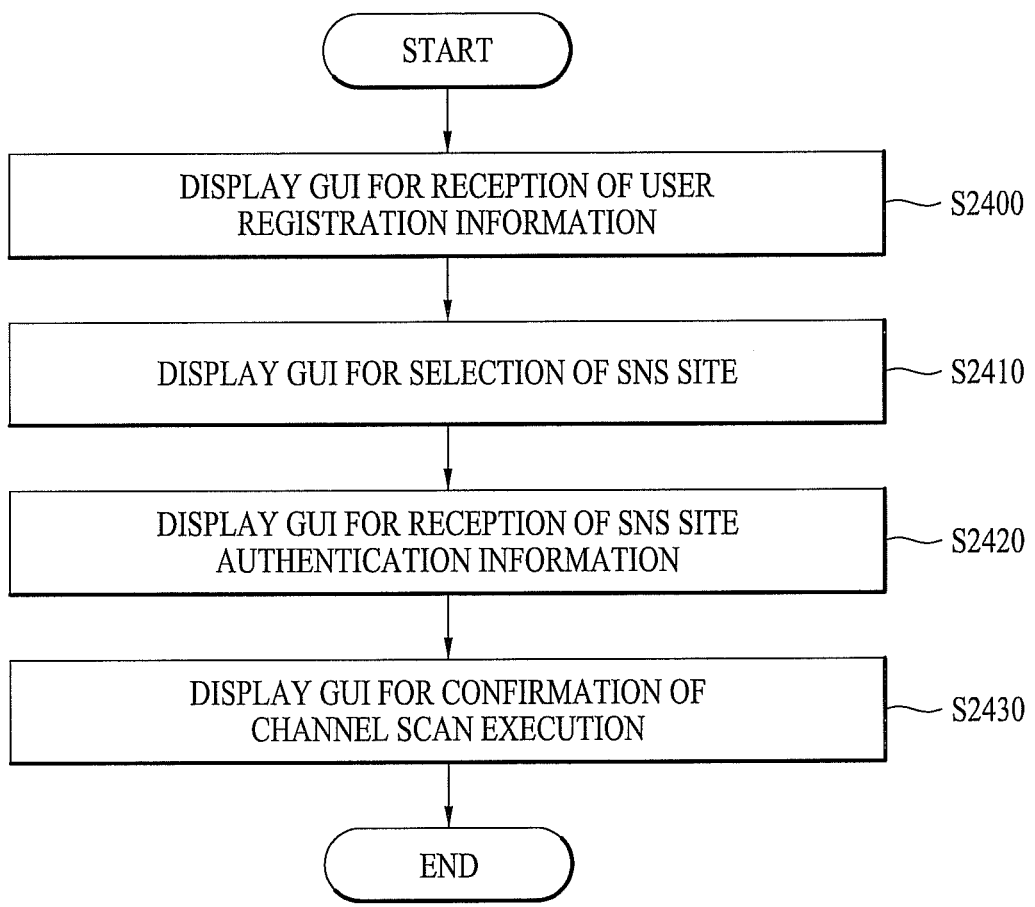
FIG. 83 is a flowchart illustrating an implementation procedure of an exemplary embodiment in relation to a user registration method in accordance with the present disclosure.

FIG. 83 is a flowchart illustrating an implementation procedure of an exemplary embodiment in relation to a user registration method in accordance with the present disclosure.

Referring to FIG. 83, the controller 340 controls display of a GUI for reception of user registration information (S2400). The GUI may be displayed upon initial execution (booting) of the electronic device 300 or upon receiving a user request. The user registration information may include at least one of a device serial number, a user name, a user ID, a password, connection information, gender information, the date of a birth, nation information or locale information. The connection information may include at least one of an e-mail address, an SIP address, an IP address, a port number, a MAC address, an SNS account or URL.

Figure 84:
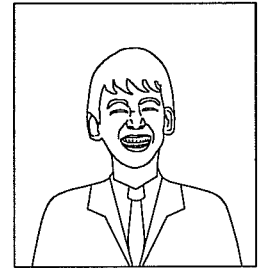
FIG. 84 is a diagram illustrating an embodiment of a GUI to receive user registration information.

FIG. 84 is a diagram illustrating an embodiment of a GUI for reception of user registration information.

Referring to FIG. 84, the display 302 may display a GUI 8400 in Step S2400. The GUI 8400 serves to receive user registration information. The GUI 8400 includes input boxes to input a user ID, a password, a first name and a last name, check boxes to select gender information and list boxes to select the date of a birth. A 'Next' button serves to display a next screen, an 'Exit' button serves to end the user registration method. The controller 340 may control display of a screen of a next step in response to a detected user action pushing the 'Next' button, and may control end of the user registration method in response to a detected user action pushing the 'Exit' button.

The controller 340 controls display of a GUI for selection of an SNS site (S2410). If the controller 340 detects a user action for pushing the 'Next' button, the controller 340 may control display of the GUI in response to the detected user action. A list of SNS sites may be previously stored and the controller 340 may control display of the previously stored list on the GUI.

Figure 85:
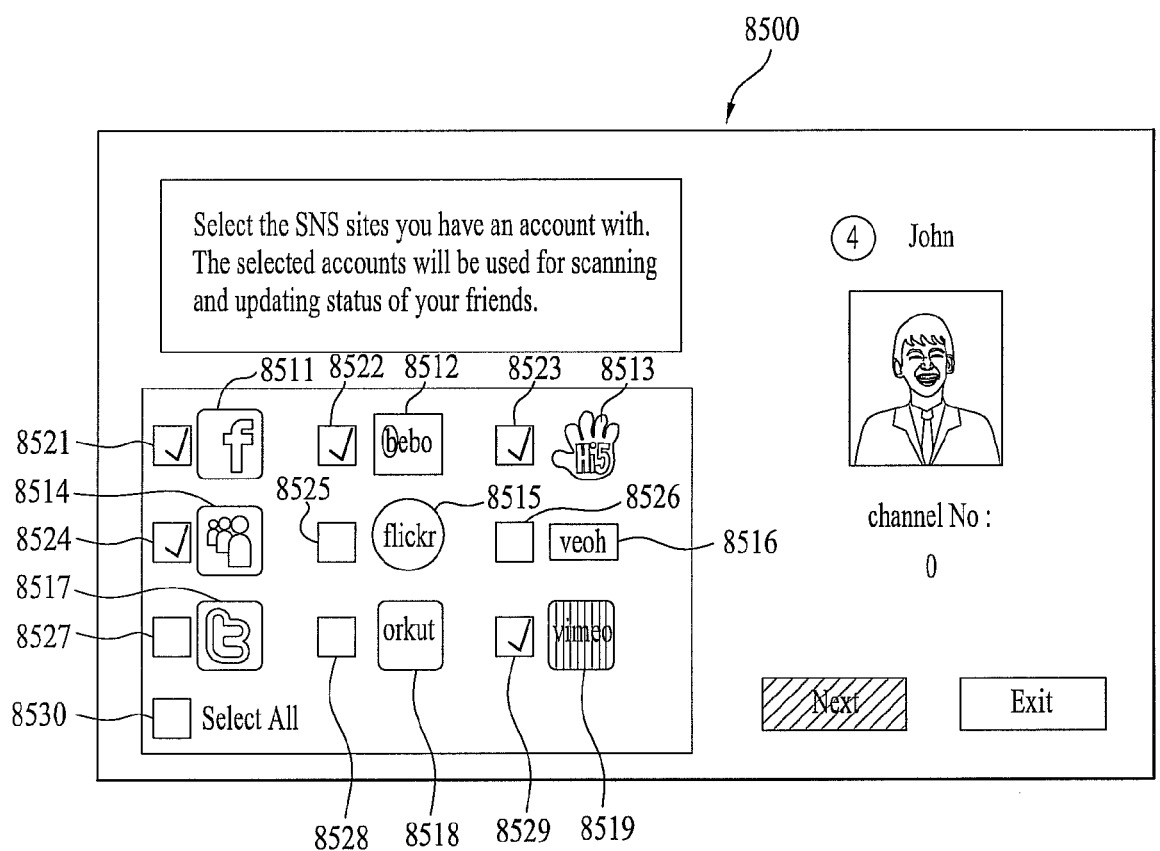
FIG. 85 is a diagram illustrating an embodiment of a GUI to select an SNS site.

FIG. 85 is a diagram illustrating an embodiment of a GUI for selection of an SNS site.

Referring to FIG. 85, the display 302 may display a GUI 8500 in Step S2410. The GUI 8500 includes SNS sites 8511 to 8519, check boxes 8521 to 8529 to select the SNS sites 8511 to 8519 respectively, and a check box 8530 to select the SNS sites 8511 to 8519 in all. A list of the SNS sites 8511 to 8519 may be previously stored in the storage unit 345. Also, the list of the SNS sites 8511 to 8519 may be updated.

The controller 340 controls display of a GUI for reception of SNS site authentication information (S2420). If the controller 340 detects a user action for pushing the 'Next' button, the controller 340 may control display of the GUI in response to the detected user action. The authentication information may include a user ID and a password. The user ID may be an e-mail address registered in an SNS site.

The number of the GUI to be displayed may be equal to the number of SNS sites selected in Step S2410. That is, the GUI for reception of authentication information with respect to each selected SNS site may be displayed.

Figure 86:
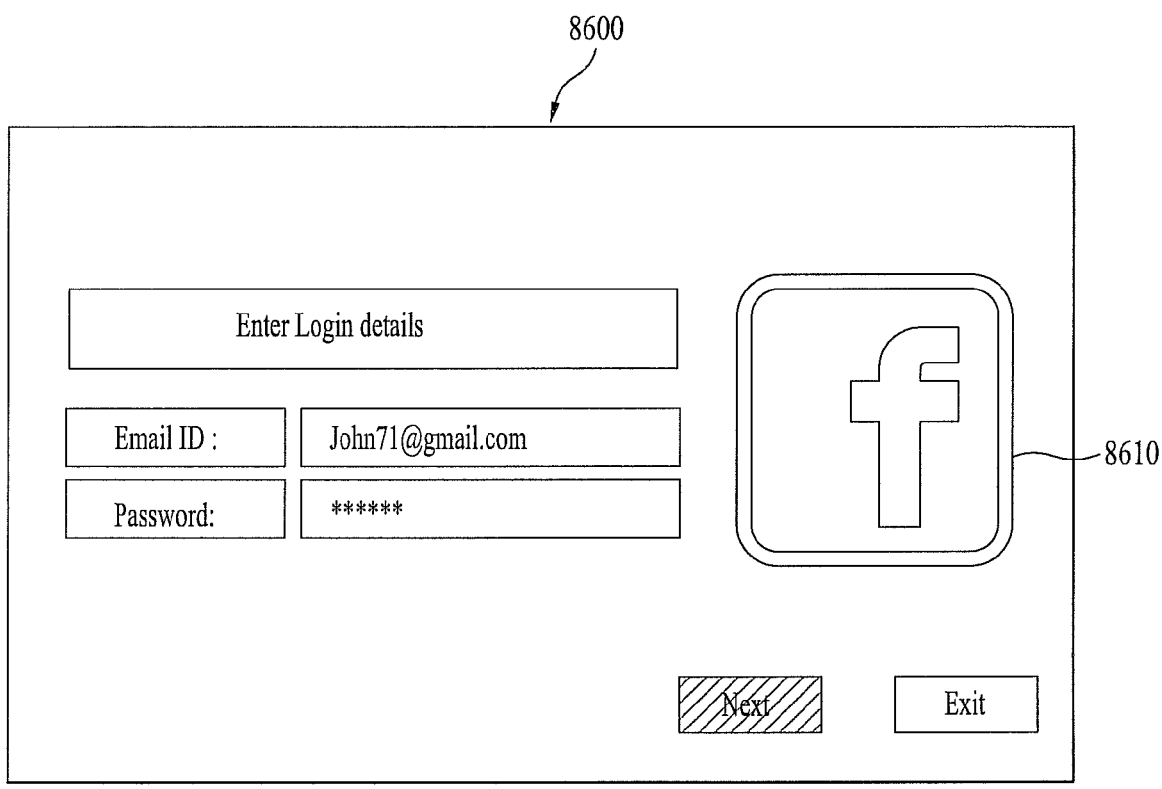
FIG. 86 is a diagram illustrating an embodiment of a GUI to receive authentication information for an SNS site.

FIG. 86 is a diagram illustrating an embodiment of a GUI for reception of authentication information for an SNS site.

Referring to FIG. 86, the display 302 may display a GUI 8600 in Step S2420. The GUI 8600 includes an icon 8610, and input boxes to input an e-mail ID and a password for an SNS site indicated by the icon 8610.

The controller 340 controls display of a GUI for confirmation of channel scan execution (S2430). If the controller 340 detects a user action for pushing the 'Next' button, the controller 340 may control display of the GUI in response to the detected user action.

Figure 87:
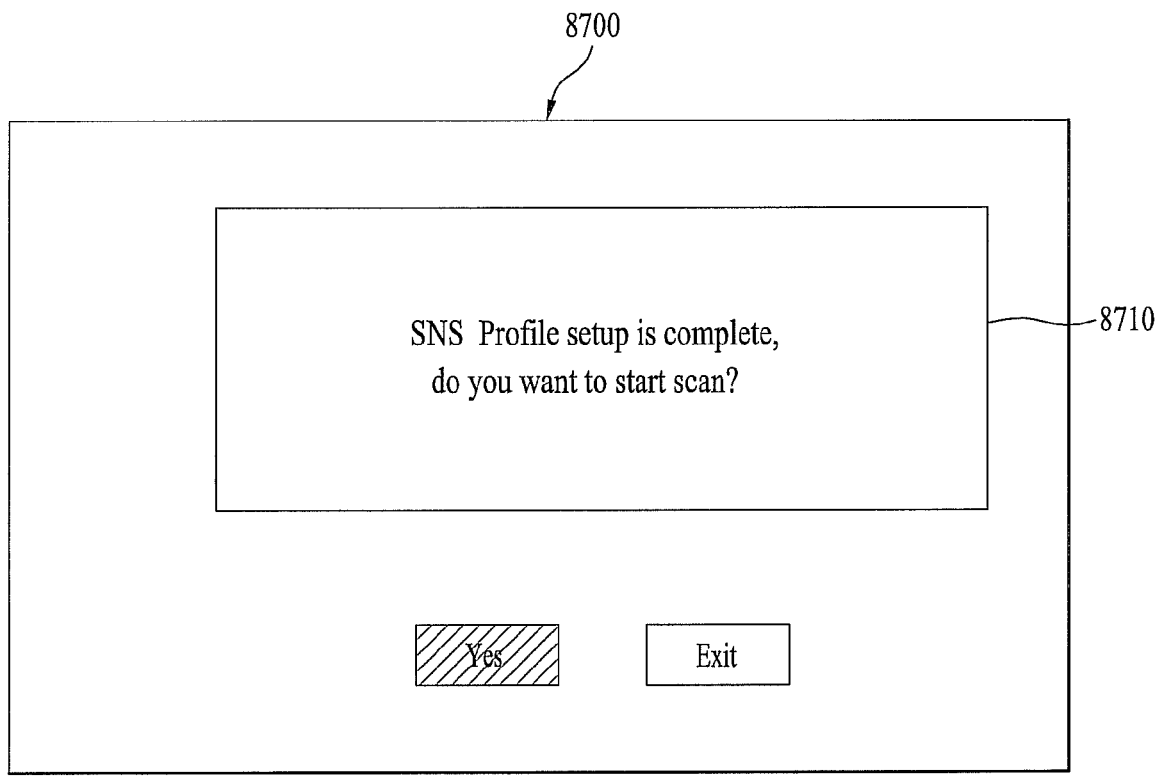
FIG. 87 is a diagram illustrating an embodiment of a GUI to confirm execution of a channel scan.

FIG. 87 is a diagram illustrating an embodiment of a GUI for confirmation of channel scan execution.

Referring to FIG. 87, the display 302 may display a GUI 8700 in Step S2430. The GUI 8700 includes a guidance phrase 8710 to ask whether or not to execute a channel scan, a 'Yes' button to select execution of a channel scan, and an 'Exit' button to prevent execution of the channel scan. The controller 340 may control the progress of a method for providing a channel scan interface of FIG. 88 in response to a detected user action selecting the 'Yes' button.

The user registration information and the SNS site authentication information, which are input during implementation of the user registration method of FIG. 83, may be transmitted to the server 10 in each input step and may be transmitted to the server 10 after completion of Step S2430.

Figure 88:
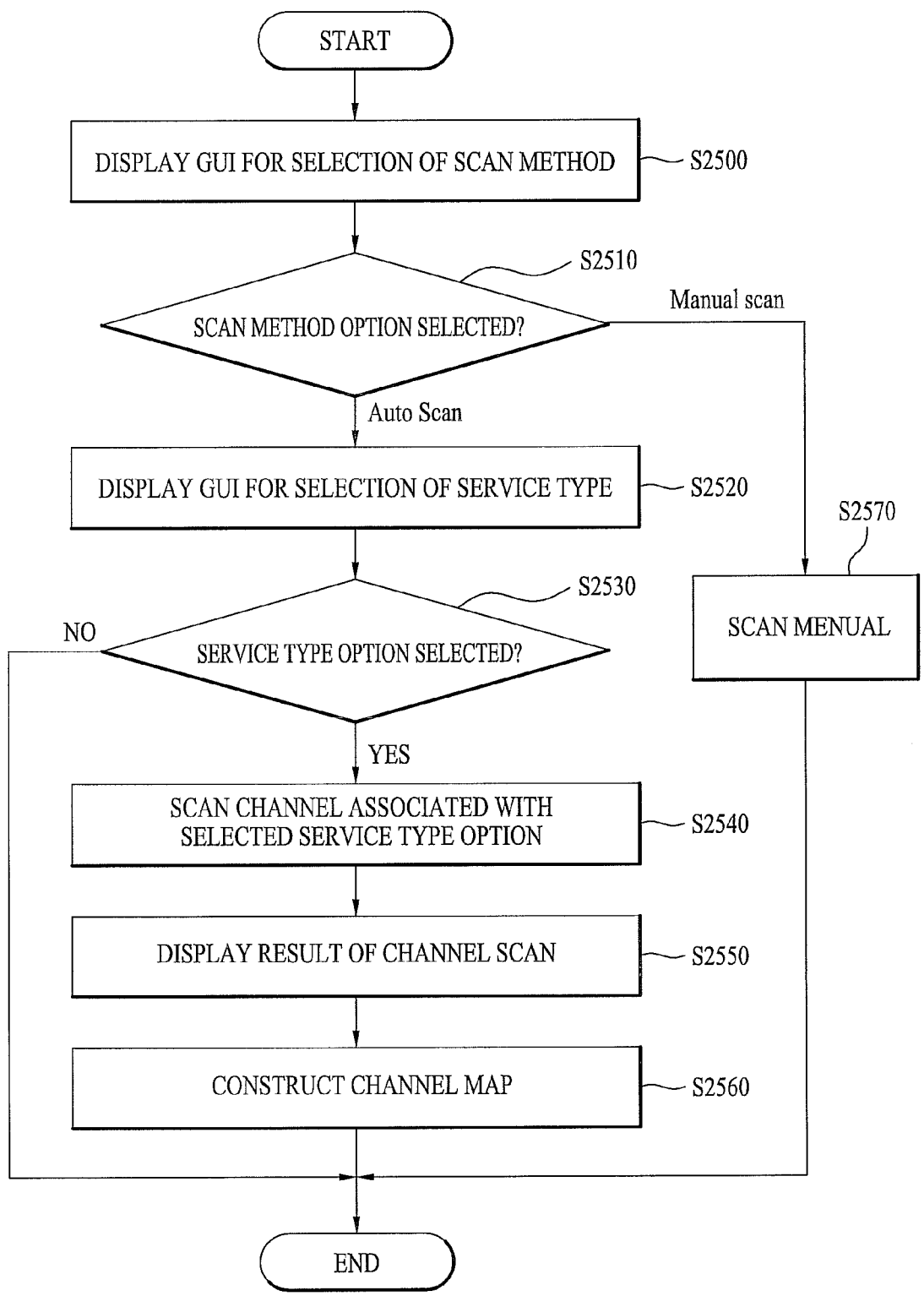
FIG. 88 is a flowchart illustrating an implementation procedure of an exemplary embodiment in relation to a method for providing a channel scan interface in accordance with the present disclosure.

FIG. 88 is a flowchart illustrating an implementation procedure of an exemplary embodiment in relation to a method for providing a channel scan interface in accordance with the present disclosure.

Referring to FIG. 88, the controller 340 controls display of a GUI for selection of a scan method (S2500). The GUI may be displayed automatically or by a user request after implementation of a server registration method. Alternatively, the GUI may be displayed at an optional time by a user request, or may be displayed during update. The scan method may include at least one of auto scan or manual scan. The GUI may include a scan method option to select at least one scan method.

Figure 89:
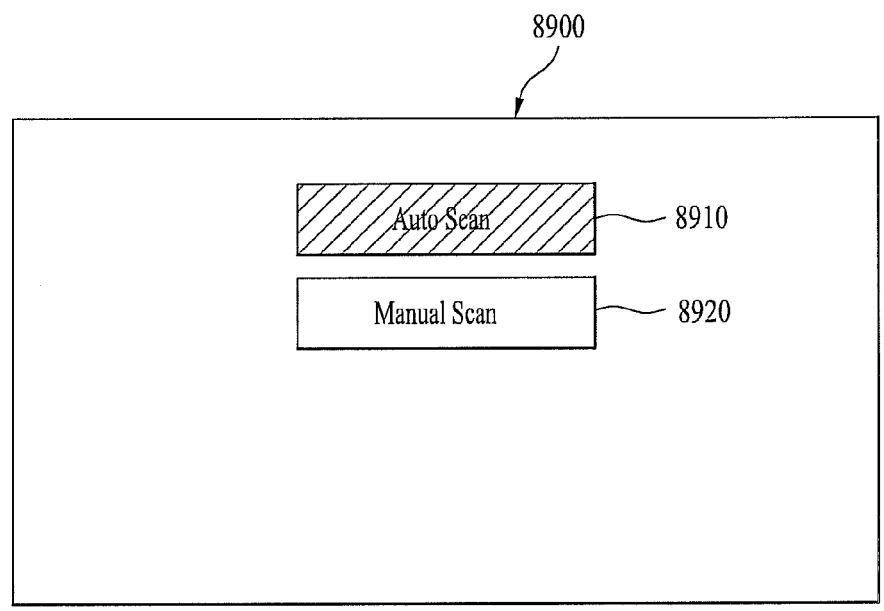
FIG. 89 is a diagram illustrating an embodiment of a GUI to select a scan method.

FIG. 89 is a diagram illustrating an embodiment of a GUI for selection of a scan method.

Referring to FIG. 89, the display 302 may display a GUI 8900 in Step S2500. The GUI 8900 includes a scan method option 8910 to select auto scan and a scan method option 8920 to select manual scan.

The controller 340 confirms whether or not the scan method option is selected (S2510).

If the scan method option indicating auto scan is selected, the controller 340 controls display of a GUI for selection of a service type (S2520). The GUI may include a service type option to select at least one service type. The service type indicates one of a broadcast channel, an App channel or a human channel.

Figure 90:
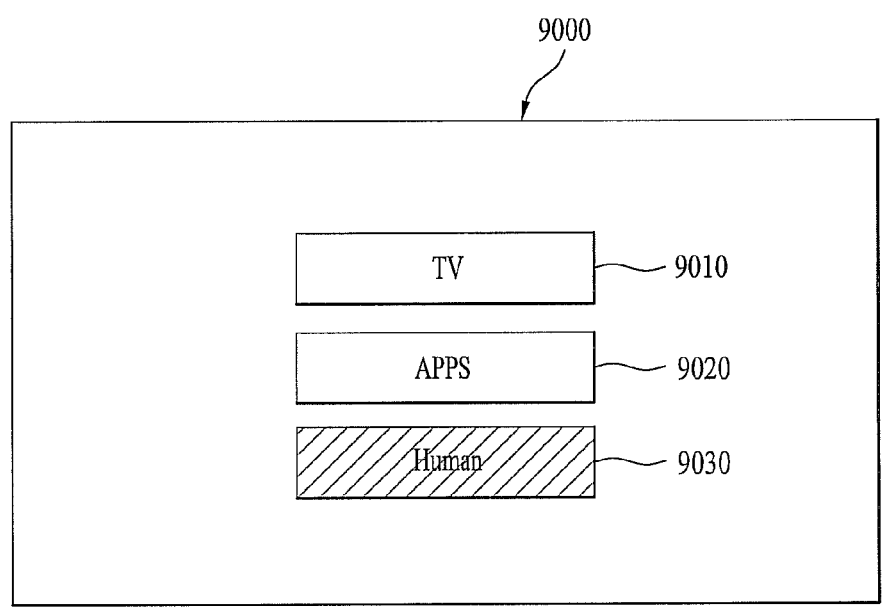
FIG. 90 is a diagram illustrating an embodiment of a GUI to select a service type.

FIG. 90 is a diagram illustrating an embodiment of a GUI for selection of a service type.

Referring to FIG. 90, the display 302 may display a GUI 9000 in Step S2520. The GUI 9000 may include a service type option 9010 (TV) to select a channel scan of a broadcast channel, a service type option 9020 (APPS) to select a channel scan of an App channel, and a service type option 9030 (Human) to select a channel scan of a human channel.

The controller 340 confirms whether or not a particular service type option among the service type options provided by the GUI 9000 for selection of a service type option is selected (S2530).

If the particular service type option is selected, the controller 340 controls execution of a channel scan with respect to a channel associated with the selected service type option (S2540). In one example, if the service type option 9010 is selected, the controller 340 controls execution of a channel scan with respect to a broadcast channel. If the service type option 9030 is selected, the controller 340 controls execution of a channel scan with respect to a human channel.

Figure 91:
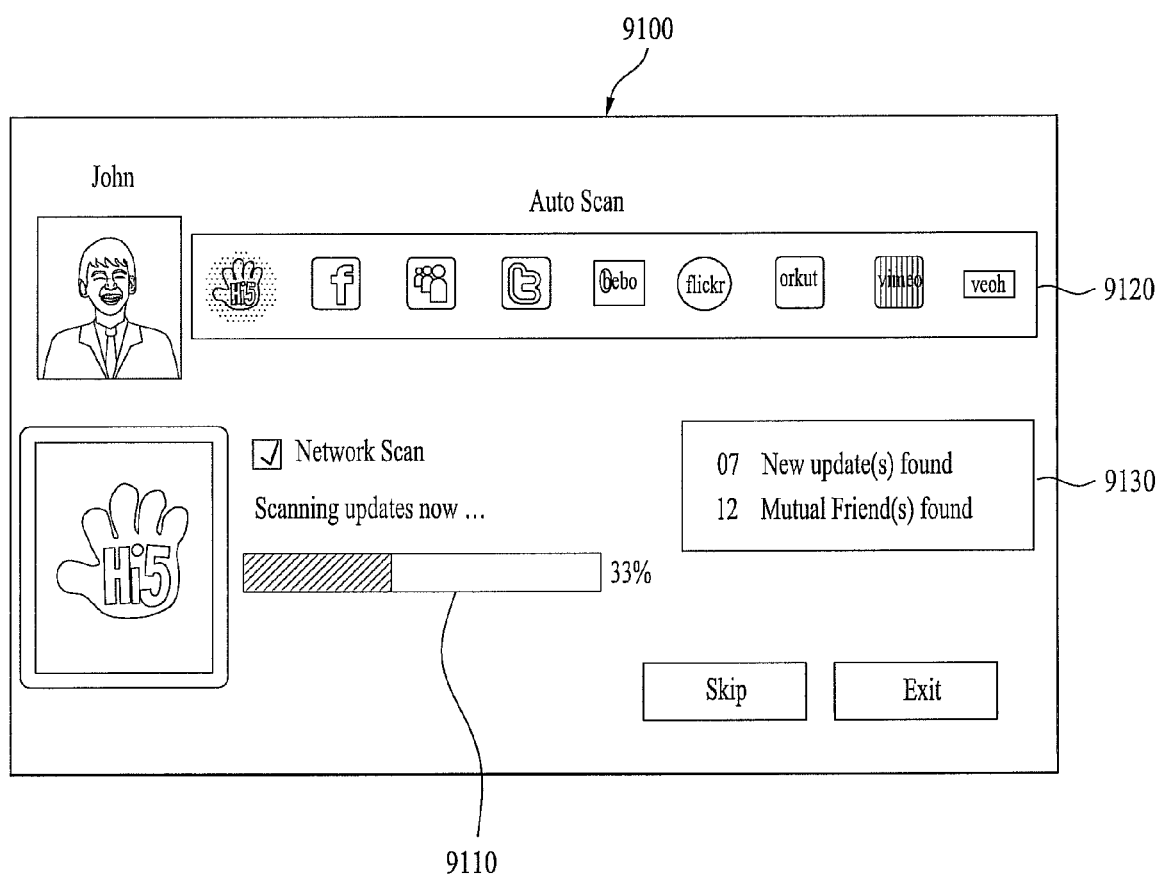
FIG. 91 is a diagram illustrating an embodiment of a screen which displays the progress of a human channel scan.

FIG. 91 is a diagram illustrating an embodiment of a screen, which displays the progress of a human channel scan.

Referring to FIG. 91, the display 302 may display a screen 9100 in Step S2540. The screen 9100 displays a status bar 9110 representing the degree of progress of the human channel scan. The screen 9100 displays a list 9120 of SNS sites as an object of the human channel scan. The SNS sites included in the SNS site list 9120 may be SNS sites selected during implementation of the user registration method of FIG. 83. The screen 9100 may further display a region 9130 to display the result of scan up to now. In the screen 9100, a 'Skip' button serves to stop a channel scan and select display of the result of scan up to that time, and an 'Exit' button serves to select end of a channel scan. The controller 340 may stop channel scan in response to a detected user action selecting the 'Skip' button and then, proceed to Step 2550. Also, the controller 340 controls end of a channel scan in response to a detected user action selecting the 'Exit' button.

The controller 340 controls display of the result of a channel scan (S2550). The controller 340 may control display of the result of a channel scan if channel scan is completed.

If the controller 340 detects a user action for selecting the 'Skip' button of the screen 9100, the controller 340 may control display of the result of a channel scan in response to the detected user action. The displayed result of a channel scan is the result of channel scan up to a time when the channel scan is stopped. In one embodiment, the 'Skip' button may be configured to skip current SNS service provider to scan the next SNS service provider, rather than skipping all remaining SNS service providers.

Figure 92:
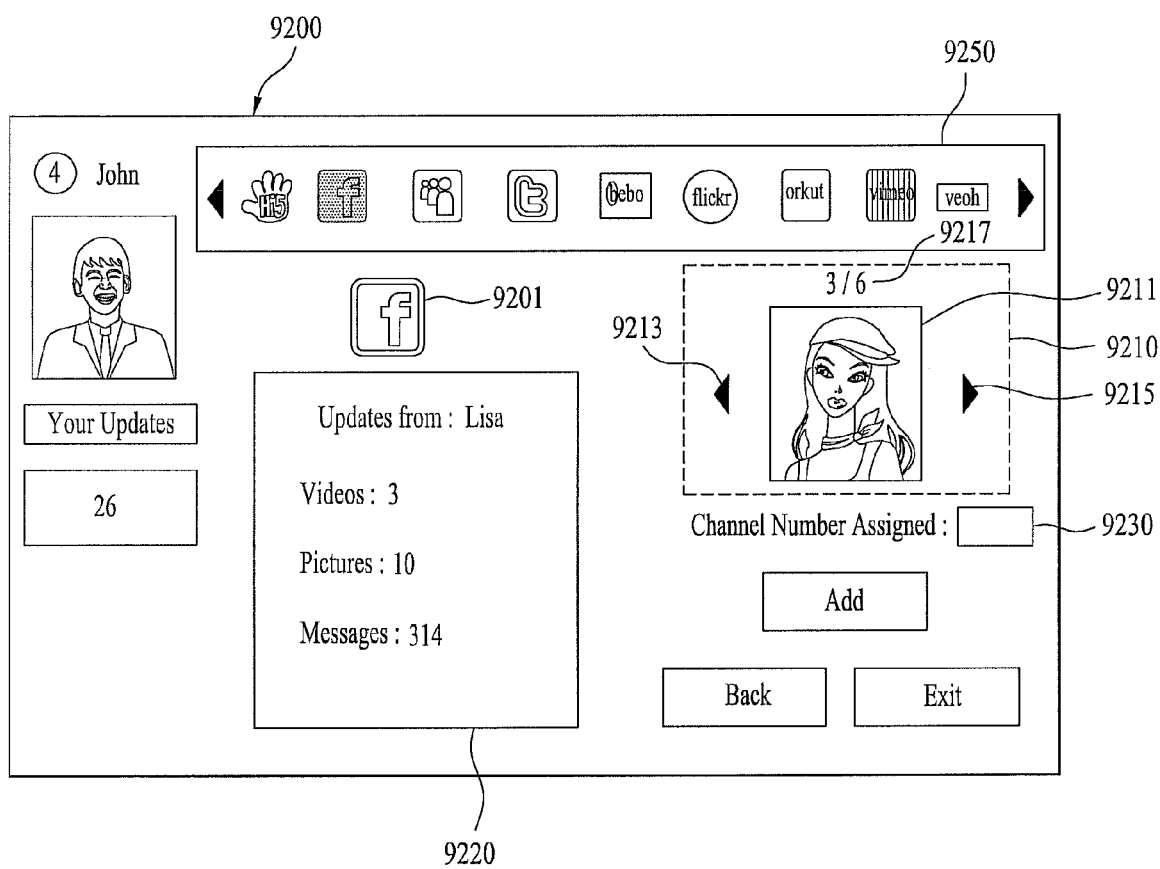
FIG. 92 is a diagram illustrating an embodiment of a screen which displays the result of a human channel scan.

FIG. 92 is a diagram illustrating an embodiment of a screen, which displays the result of a human channel scan.

Referring to FIG. 92, the display 302 may display a screen 9200 in Step S2550. The screen 9200 displays the result of a human channel scan.

The screen 9200 displays an SNS account selecting region 9210, an update statistical information region 9220, a channel input box 9230, an SNS site selecting region 9250, an icon 9201 to display a selected SNS site, an 'Add' button, a 'Back' button and a 'Home' button. The SNS account selecting region 9210 includes a picture 9211 of a selected SNS account, a button 9213 to select a previous SNS account, a button 9215 to select a next SNS account, and a mark 9217 to display the total number of SNS accounts scanned in a selected SNS site and the order of a selected SNS account.

The update statistical information region 9220 displays update statistical information about the selected SNS account 9211. The update statistical information may include at least one of the number of updated videos, the number of updated pictures or the number of updated messages.

The channel input box 9230 displays a channel number assigned to the selected SNS account 9211. If a channel number is not assigned to the selected SNS account 9211, the channel input box 9230 may be a blank. The user may input a channel number to be assigned to the selected SNS account 9211 into the channel input box 9230. In one embodiment, a selection of channel input box 9230 may display a pop-up window to display available channel number from which to choose from to assign to the SNS account.

The SNS site selecting region 9250 displays icons of SNS sites or SNS providers. If the user selects any one of the icons displayed on the SNS site selecting region 9250, the controller 340 controls selection of SNS accounts, scanned in the SNS site indicated by the selected icon, from the SNS account selecting region 9210.

The icon 9201 displays a selected SNS site. The user may select an SNS account, scanned in the SNS site indicated by the icon 9201, from the SNS account selecting region 9210.

The 'Add' button serves to receive a request for construction of a channel map, the 'Back' button serves to receive a request for display of a previous screen, and the 'Home' button serves to receive a request for display of a home page.

Figure 93:
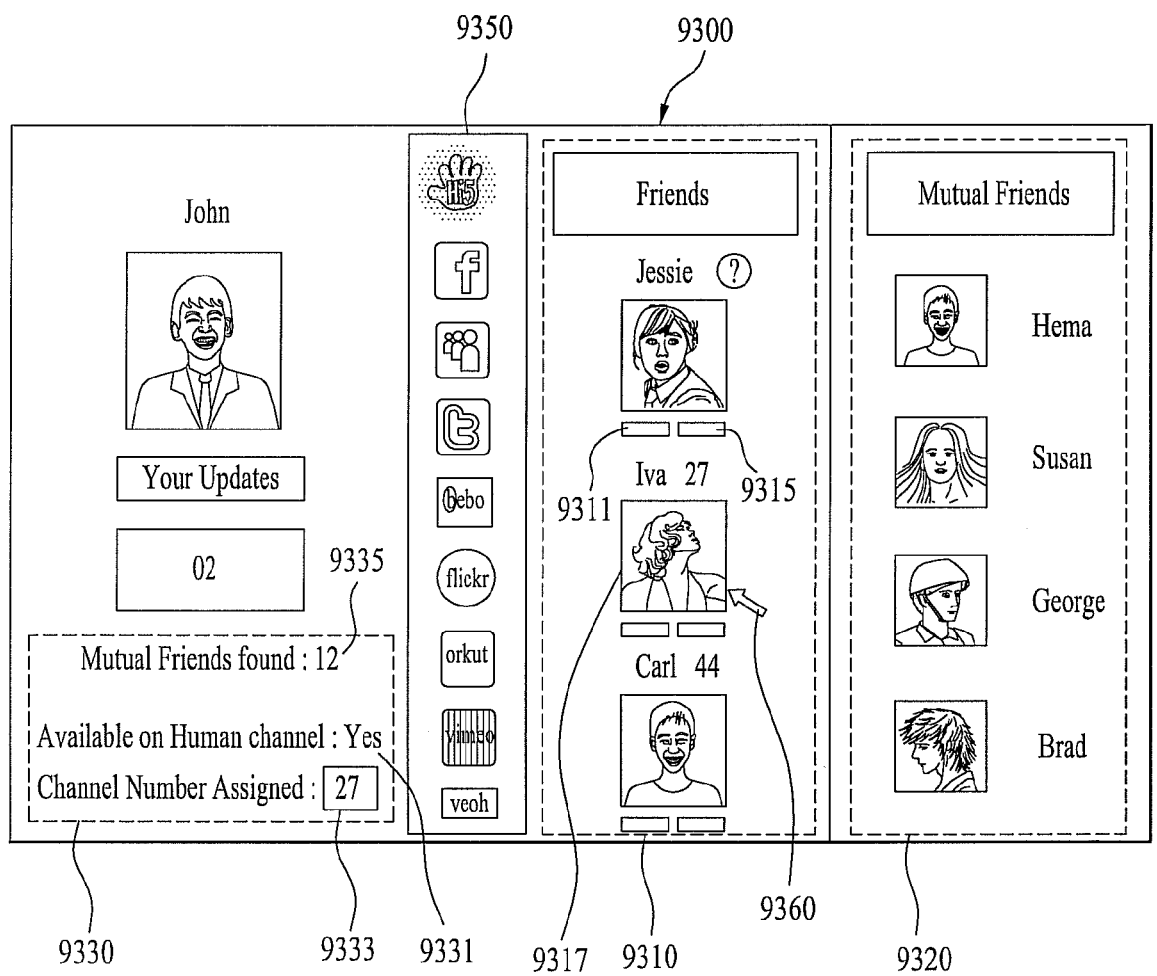
FIG. 93 is a diagram illustrating another embodiment of a screen which displays the result of a human channel scan.

FIG. 93 is a diagram illustrating another embodiment of a screen which displays the result of a human channel scan.

Referring to FIG. 93, the display 302 may display a screen 9300 in Step S2550. The screen 9300 is a screen to display the result of a human channel scan. The screen 9300 may include a friend list (or contact list) region 9310, a mutual friend list region 9320, a scan result statistical information region 9330 and an SNS site selecting region 9350.

The SNS site selecting region 9350 is a region corresponding to the SNS site selecting region 9250 of FIG. 92 and thus, a detailed description thereof is substituted by the description of FIG. 92. The friend list region 9310 displays a list of friends registered in an SNS site selected from the SNS site selecting region 9350. The user can select a particular friend (or contact) from the friend list region 9310. For example, a pointer 9360 may be used to select an icon 9317 for Iva's SNS account. The friend list region 9310 may display SNS accounts of the friends.

Connection state marks 9311 and 9315 serve to display whether or not a corresponding friend is connected. More particularly, the connection state mark 9311 may represent an online state displayed by one of the connection state marks 8111, 8121, 8131 and 8141 of FIG. 81, and the connection state mark 9315 may represent an online state displayed by one of the connection state marks 8115, 8125, 8135 and 8145 of FIG. 81.

The mutual friend list region 9320 displays a list of mutual friends of the friend selected from the friend list region 9310. The mutual friend list region 9320 may display SNS accounts of the mutual friends. For example, if icon 9317 for Iva's SNS account is selected, mutual friends of both Iva and John may be displayed in the mutual friend list region 9320.

In one embodiment, region 9320 may display a list of SNS accounts for friends of the friends for whom the information is requested. For example, referring to FIG. 93, if icon 9317 is selected for Iva's SNS account (e.g., Hi5 account) region 9320 may display a list of potential or possible friends between John and Iva's friends, e.g., a list of friends of friends. The icons for these friends may also include connection state marks 9311, 9315 to indicate whether the users are online using their electronic device or logged in to their SNS account at a server. In one embodiment, the list of mutual friends and the list of friends of friends may list only those users who have registered to use their electronic device to access human channels, e.g., their SNS accounts through a channel on their multi-purpose display device, or the list may include only those users who are currently logged in. These preference settings for the user may store the configuration and other settings for the display regions.

The information region 9330 displays a message 9331 for representing whether or not a human channel of the friend selected from the friend list region 9310 is available, a message 9333 for representing a human channel number assigned to the selected friend, and a message 9335 for representing the number of mutual friends of the selected friend. For example, if the icon 9317 for Iva's SNS account is selected, the scan result statistical information region 9330 may display information related to Iva's account. In this Example, Iva has 12 friends in common with John's SNS account and Iva's SNS account is accessible on channel number 27 of the electronic device 100.

The user may select a particular SNS account from among SNS accounts displayed on the friend list region 9310 and the mutual friend list region 9320 and then, assign a channel number to the selected particular SNS account.

The controller 340 constructs a channel map (S2560). The controller 340 may proceed to Step S2560 if the controller 340 detects a user action for requesting assignment of a channel with respect to the particular SNS account from a screen on which the result of a channel scan is displayed. The user action may be a user action for selecting the 'Add' button of FIG. 92.

If the controller 340 detects the user action for selecting the 'Add' button of FIG. 92, the controller 340 assigns a channel number, which has input into the channel input box 9230, to the selected SNS account 9211 in response to the detected user action. The controller 340 may store the selected SNS account 9211, the channel number input into the channel input box 9230 and information associating the selected SNS account 9211 and the channel number input into the channel input box 9230 with each other. The human channel map may be a human channel map illustrated in FIG. 12, or may be a human channel map illustrated in FIG. 97 that will be described hereinafter.

Step S2560 may include the implementation procedure of the method for constructing a human channel map in relation to FIG. 13 or the implementation procedure of the method for constructing a human channel map in relation to FIGS. 34A and 34B. The screen 9200 of FIG. 92 and the screen 9300 of FIG. 93 may be a first GUI for designation of the human address in Step S100. The SNS accounts displayed on the SNS account selecting region 9210, the friend list region 9320 and the mutual friend list region 9330 may be selectable human addresses listed in the first GUI.

Figure 94:
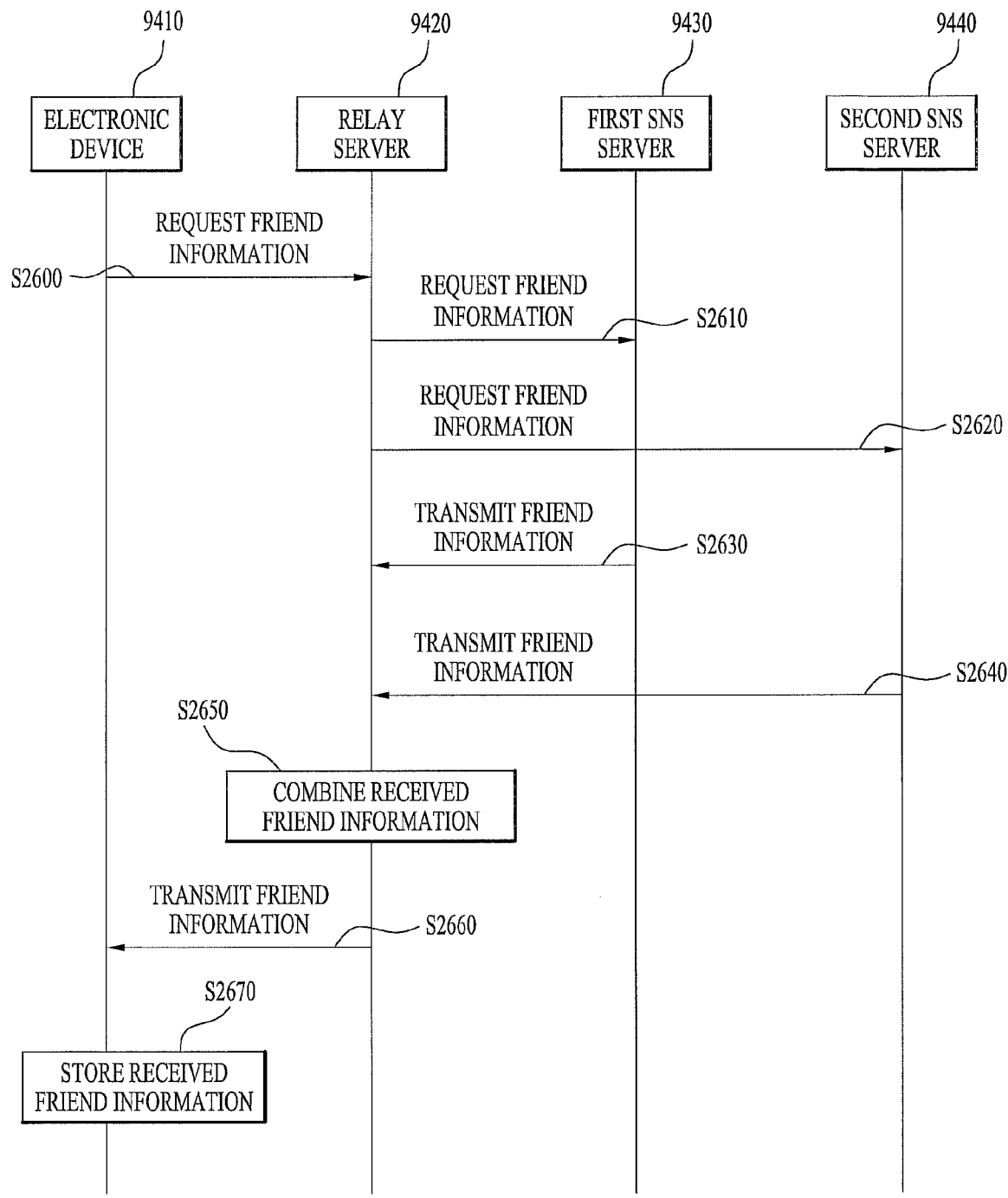
FIG. 94 is a flowchart illustrating an implementation procedure of an exemplary embodiment in relation to a method for scanning a human channel in accordance with the present disclosure.

FIG. 94 is a flowchart illustrating an implementation procedure of an exemplary embodiment in relation to a method for scanning a human channel in accordance with the present disclosure.

Referring to FIG. 94, an electronic device 9410 transmits a friend information request signal to request information about friends to a relay server 9420 (S2600). The information about friends may include, for example, a list of new or potential friends, mutual friends, or updates for existing friends such as status updates, newly uploaded content, whether they are using human channel services, or another appropriate type of information. The transmission of the friend information request signal may be performed in Step S2540 of FIG. 88 to scan one or more SNS servers for friend information. Step S2540 may include the implementation procedure of the method for scanning a human channel in relation to FIG. 94. The friend information request signal may include a user ID. The user ID may be an account of the relay server 9420, or may be information registered in the server 10 during implementation of the user registration method of FIG. 83. In some embodiments, the friend information request signal may further include a single or a plurality of SNS accounts, passwords with respect to the included SNS accounts and site names of the SNS sites.

The relay server 9420 transmits the friend information request signal to request friend information to a first SNS server 9430 (S2610). The server 9420 may be the server 10, and the transmitted friend information request signal may include an account information for an account on the first SNS server 9430 and may further include a password for the account. The account information on the first SNS server 9430 and the password for the account may be previously stored in the relay server 9420, may have been transmitted to the server 10 during implementation of the user registration method of FIG. 83, or may be included in the friend information request signal transmitted in Step S2600.

The relay server 9420 may associate a single or a plurality of SNS accounts with user IDs and store the associated information. If the relay server 9420 receives the friend information request signal from the electronic device 9410, the relay server 9240 may search for a user ID and an associated SNS account, and then, transmit the friend information request signal to an SNS server including the searched SNS account.

For example, the relay server 9420 may request information from multiple SNS servers if the request for friend information from the electronic device 9410 (or the user account associated with the user ID received from the electronic device 9410) includes SNS accounts served on multiple servers (e.g., facebook, twitter). the relay server 9420 transmits the friend information request signal to request friend information to the second SNS server 9440 (S2620). The transmitted friend information request signal may include account information for an account on the second SNS server 9440 and may further include a password for this account. The account information for the account on the second SNS server 9440 may be stored in the relay server 9420, received from another server, or included in the friend information request.

The first SNS server 9430 transmits a friend information signal including friend information to the relay server 9420 (S2630). The friend information may include SNS accounts with respect to friends included in the friend information request signal transmitted in Step S2610. The friend information may further include at least one of names of the friends, SNS site IP addresses, port numbers, SNS site names or update information about SNS accounts. The first SNS server 9430 may be the server 20, or may be one of SNS servers selected during implementation of the user registration method of FIG. 83. Additionally, the first SNS server 9430 may have an SNS site name included in the friend information request signal transmitted in Step S2600.

The second SNS server 9440 transmits a friend information signal including friend information to the relay server 9420 (S2640). The friend information may include SNS accounts with respect to friends included in the friend information request signal transmitted in Step S2620. The friend information may further include at least one of names of the friends, SNS site IP addresses, port numbers, SNS site names or update information about SNS accounts. The second SNS server 9440 may be the server 20, or may be one of SNS servers selected during implementation of the user registration method of FIG. 83. Additionally, the second SNS server 9440 may have an SNS site name included in the friend information request signal transmitted in Step S2600.

The relay server 9420 combines the received friend information (S2650). The relay server 9420 may combine the friend information transmitted from the first SNS server 9430 with the friend information transmitted from the second SNS server 9440. In addition, the relay server 9420 may combine previously stored information with the friend information transmitted from the first SNS server 9430 or the friend information transmitted from the second SNS server 9440. Here, the previously stored information may be the SNS site authentication information and the user registration information transmitted by the electronic device 300 during the user registration method of FIG. 83. The relay server 9420 may combine the previously stored information and the received friend information with each other based on names or SNS accounts.

The relay server 9420 transmits the friend information signal including the friend information to the electronic device 9410 (S2660). The friend information may be information combined in Step 2650, or may be information selected from the combined information. In some embodiments, the friend information may include at least one of names of friends, SNS site names, SNS accounts or user IDs. In some embodiments, the friend information may include names of friends, connection information and user IDs. In some embodiments, the friend information may include names of friends, connection information, SNS site names, SNS accounts and user IDs.

The electronic device 9410 stores the received friend information (S2670). The electronic device 9410 may temporarily or permanently store the received friend information. The stored information may be displayed as the result of a channel scan in Step S2550 of FIG. 88.

The electronic device 9410 may construct a human channel map using the received friend information. Information included in the connection information maps 1230, 1240, 1250, 1260 and 1270 of FIG. 97 may be acquired from the received friend information.

In some embodiments, the relay server 9420 may perform Step S2650 and Step 2660 whenever the friend information is received. For example, the relay server 9420 may perform Step S2640 and Step S2660 using the friend information received in Step S2630, or may perform Step S2640 and Step S2660 using the friend information received in Step S2640. Steps S2640 and S2660 may be initiated based on friend information received within a predetermined period of time of each other, for example.

Figure 95:
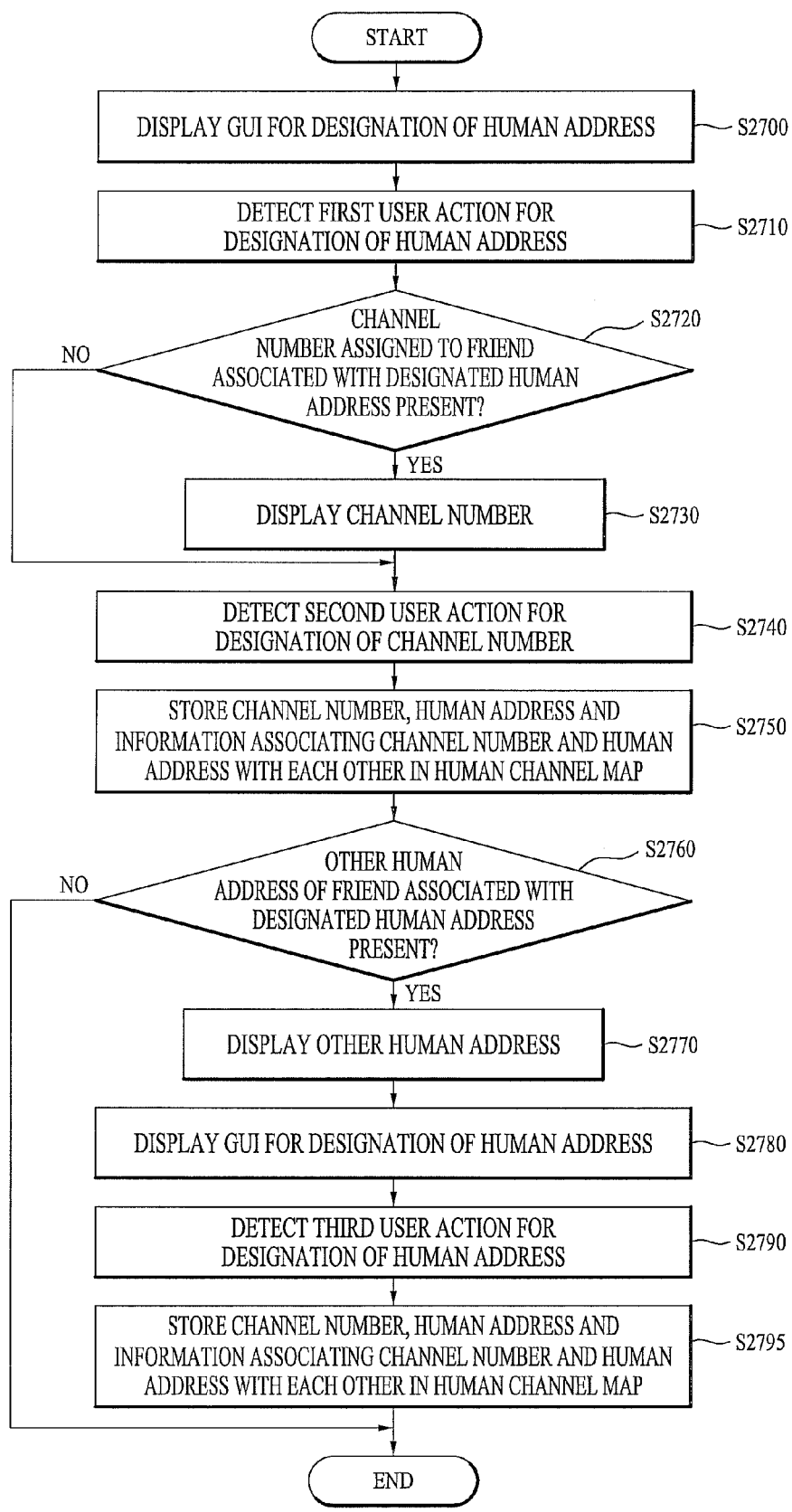
FIG. 95 is a flowchart illustrating an implementation procedure of another exemplary embodiment in relation to a method for constructing a channel map in accordance with the present disclosure.

FIG. 95 is a flowchart illustrating an implementation procedure of another exemplary embodiment in relation to a method for constructing a channel map in accordance with the present disclosure.

Referring to FIG. 95, the display 302 displays a GUI for designation of a human address (S2700). The GUI may be one of a Web page of FIG. 4, the GUI 910 of FIG. 9, the GUI 1010 of FIG. 10, the GUI 1110 of FIG. 11, the GUI 2700 of FIG. 27, the GUI 2900 of FIG. 29, the GUI 3100 of FIG. 31, the screen 9200 of FIG. 92 and the screen 9300 of FIG. 93.

The controller 340 detects a first user action for designation of a human address (S2710) of a friend or contact.

The controller 340 confirms whether or not a channel number assigned to the friend who is associated with the designated human address is present, in response to the detected first user action (S2720).

If the channel number is present, the controller 340 displays the channel number (S2730). In one example, the channel number may be displayed on the input box 9230 of FIG. 92, may be displayed on the input box 9333 of FIG. 93, or may be displayed on a separately displayed message. The channel number may be highlighted among the channel numbers listed in the channel number region 2710 of the GUI 2700 of FIG. 27 or among the channel numbers listed in the channel number region 2910 of the GUI 2900 of FIG. 29, or may be displayed on the channel number region 3140 of the GUI 3100 of FIG. 31.

The controller 340 detects a second user action for designation of a channel number (S2740). In the embodiment of the screen 9200 of FIG. 92, the second user action may be a user action for pushing the 'Add' button. In the embodiment of the screen 9300 of FIG. 93, the second user action may be a user action for pushing a button for completing input of a channel number into the input box 9333 (for example, an 'OK' button on a remote controller). In the embodiments of the GUI 2700 of FIG. 27, the GUI 2900 of FIG. 29 and the GUI 3100 of FIG. 31, the second user action may be a user action including the second user action of Step S802 of FIGS. 34A and 34B and the third user action of Step S803. The channel number may be equal to the channel number searched in Step S2720.

The controller 340 stores the human address, the channel number and information associating the human address and the channel number with each other in a human channel map in response to the detected second user action (S2750). If the channel number is equal to the channel number searched in Step S2720, a plurality of human addresses of a single person is assigned to a single channel number.

The controller 340 confirms whether or not other human addresses of the friend who is associated with the designated human address are present (S2760). For example, the friend may have multiple SNS accounts such as a human address corresponding to a facebook account and another human address corresponding to an MSN account.

If other human addresses are present, the controller 340 controls display of the other human addresses (S2770).

Figure 96:
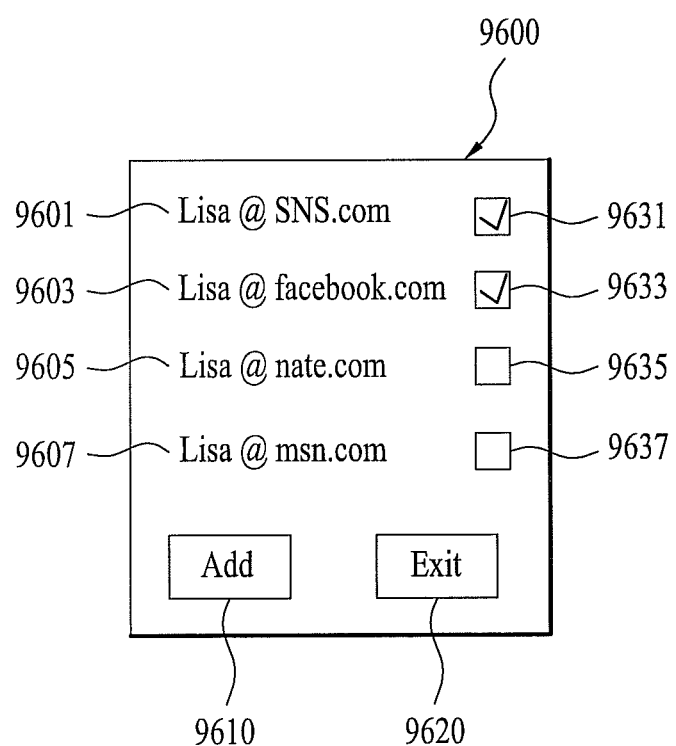
FIG. 96 is a diagram illustrating an embodiment of a GUI for display of other human addresses of a friend who has a human address associated with a channel number.

FIG. 96 is a diagram illustrating an embodiment of a GUI for display of other human addresses of a friend who has a human address associated with a channel number.

Referring to FIG. 96, the display 302 may display a message 9600 in Step S2770. The message 9600 lists SNS accounts of the other human addresses. In this example, it may be assumed that the human address designated in Step S2710 is a human address of Lisa. The message 9600 may list SNS accounts 9601, 9603, 9605 and 9607 as the other human addresses of Lisa, and may include a button 9610 to add additional addresses and a button 9620 to cancel the process. In Step S2770, check boxes 9631, 9633, 9635 and 9637 need not be displayed.

The controller 340 displays a GUI for designation of a human address (S2780). The GUI may be displayed if the controller 340 detects a user action for pushing the button 9610 of FIG. 96. The display 302 may display the message 9600 including the SNS accounts 9601, 9603, 9605 and 9607, the check boxes 9631, 9633, 9635 and 9637, the button 9610 and the button 9620.

In some embodiments, Step S2770 and Step S2780 may be combined into a single step for displaying a GUI for provision of other human addresses and designation of a particular human address among the other human addresses. The GUI may be the message 9600 including the SNS accounts 9601, 9603, 9605 and 9607, the check boxes 9631, 9633, 9635 and 9637, the button 9610 and the button 9620.

The controller 340 detects a third user action for designation of a human address (S2790). The third user action may be a user action for pushing the button 9610 of the message 9600 displayed in Step S2780.

The controller 340 stores the human address, the channel number and information associating the human address and the channel number with each other in the human channel map in response to the detected third user action (S2795). The human address may be a human address checked in the check boxes 9631, 9633, 9635 and 9637, and the channel number may be the channel number stored in Step S2750.

Figure 97:
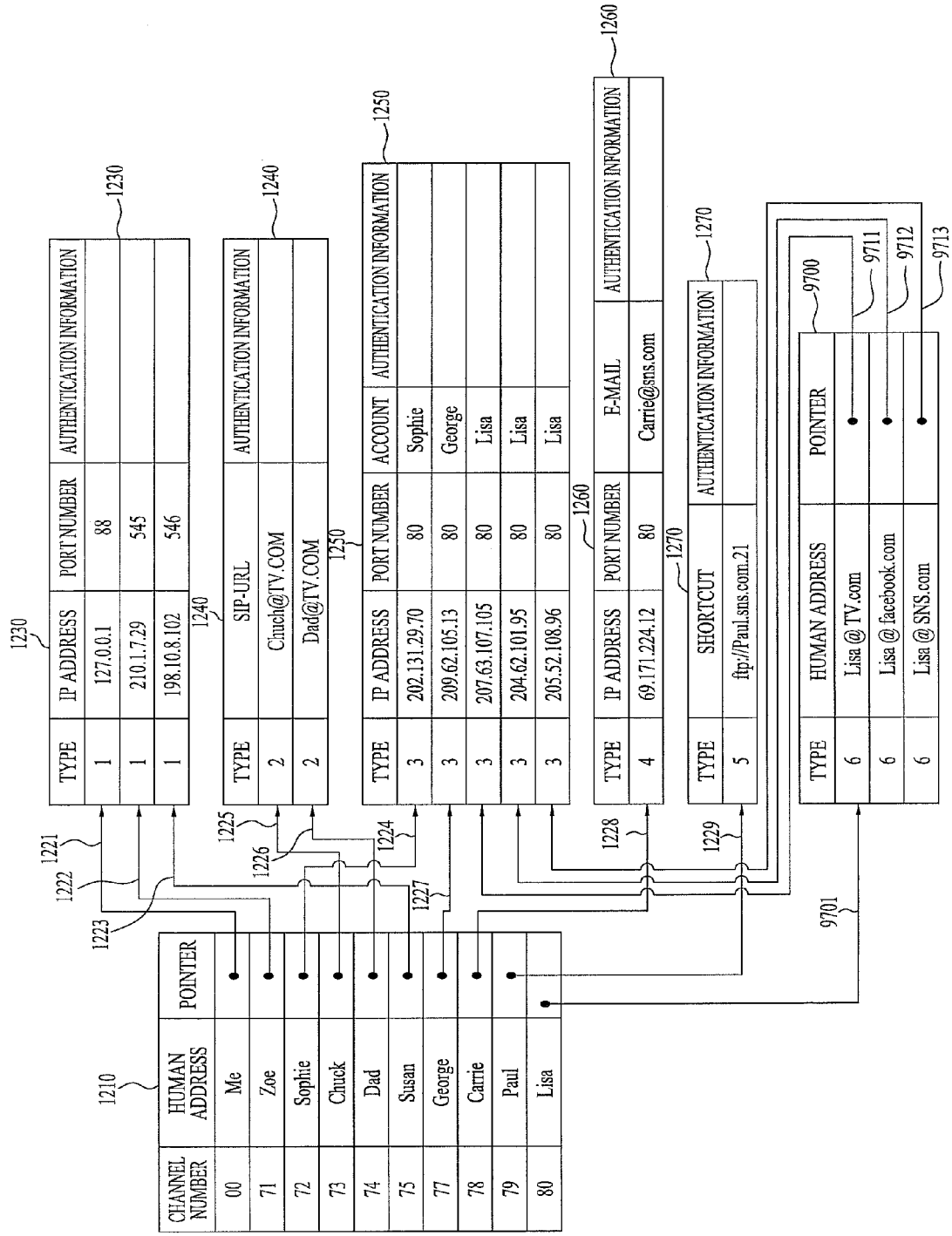
FIG. 97 is a diagram illustrating another exemplary embodiment for a human channel map.

FIG. 97 is a diagram illustrating another exemplary embodiment for a human channel map.

The human channel map 1210 of FIG. 97 further includes a channel number '80' associated with a plurality of human addresses. The channel number '80' is associated with the friend 'Lisa', and the friend 'Lisa' has a plurality of human addresses (Lisa@TV.com, Lisa@SNS.com and Lisa@facebook.com). That is, the channel number '80' is assigned to each of Lisa@TV.com, Lisa@SNS.com and Lisa@facebook.com.

If a pointer indicates a particular table, the controller 340 can confirm that a corresponding channel number is associated with a plurality of human addresses. In one example, if a pointer 9701 of the channel number '80' indicates a table 9700, the controller 340 confirms that the channel number '80' is associated with a plurality of human addresses.

The table 9700 includes the human addresses, i.e. Lisa@TV.com, Lisa@SNS.com and Lisa@facebook.com, associated with the channel number '80', and pointers respectively corresponding to Lisa@TV.com, Lisa@SNS.com and Lisa@facebook.com. The pointers may indicate positions where information associated with the human addresses is stored.

The pointer 9711 indicates a position where information associated with Lisa@TV.com is stored. More particularly, the pointer 9711 indicates the third row of the third connection information map 1250. An IP address associated with Lisa@TV.com is 207.63.107.105, and a port number and an account associated with Lisa@TV.com are 80 and Lisa, respectively. Connection to a channel of Lisa@TV.com may be implemented by the access method denoted by type 3.

The pointer 9712 indicates a position where information associated with Lisa@facebook.com is stored. More particularly, the pointer 9712 indicates the fourth row of the third connection information map 1250. An IP address associated with Lisa@facebook.com is 204.62.101.95, and a port number and an account associated with Lisa@facebook.com are 80 and Lisa, respectively. Connection to a channel of Lisa@facebook.com may be implemented by the method denoted by type 3.

The pointer 9713 indicates a position where information associated with Lisa@SNS.com is stored. More particularly, the pointer 9713 indicates the fifth row of the third connection information map 1250. An IP address associated with Lisa@SNS.com is 205.52.108.96, and a port number and an account associated with Lisa@SNS.com are 80 and Lisa, respectively. Connection to a channel of Lisa@SNS.com may be implemented by the access method denoted by type 3.

In the present disclosure, the pointers 9711, 9712 and 9713 are not limited to the embodiments indicating the rows of the third connection information map 1250, and may indicate rows of different connection information maps. In one embodiment, channel 80 may be linked to human addresses for a plurality of different individuals. For example, the human address 'Lisa' may be replaced by human address 'family' representing a group of individuals. The human addresses in table 9700 may be linked to an SNS account of each of the individual in the group, e.g., human addresses dad and me, in tables 1240 and 1230, respectively.

Figure 98:
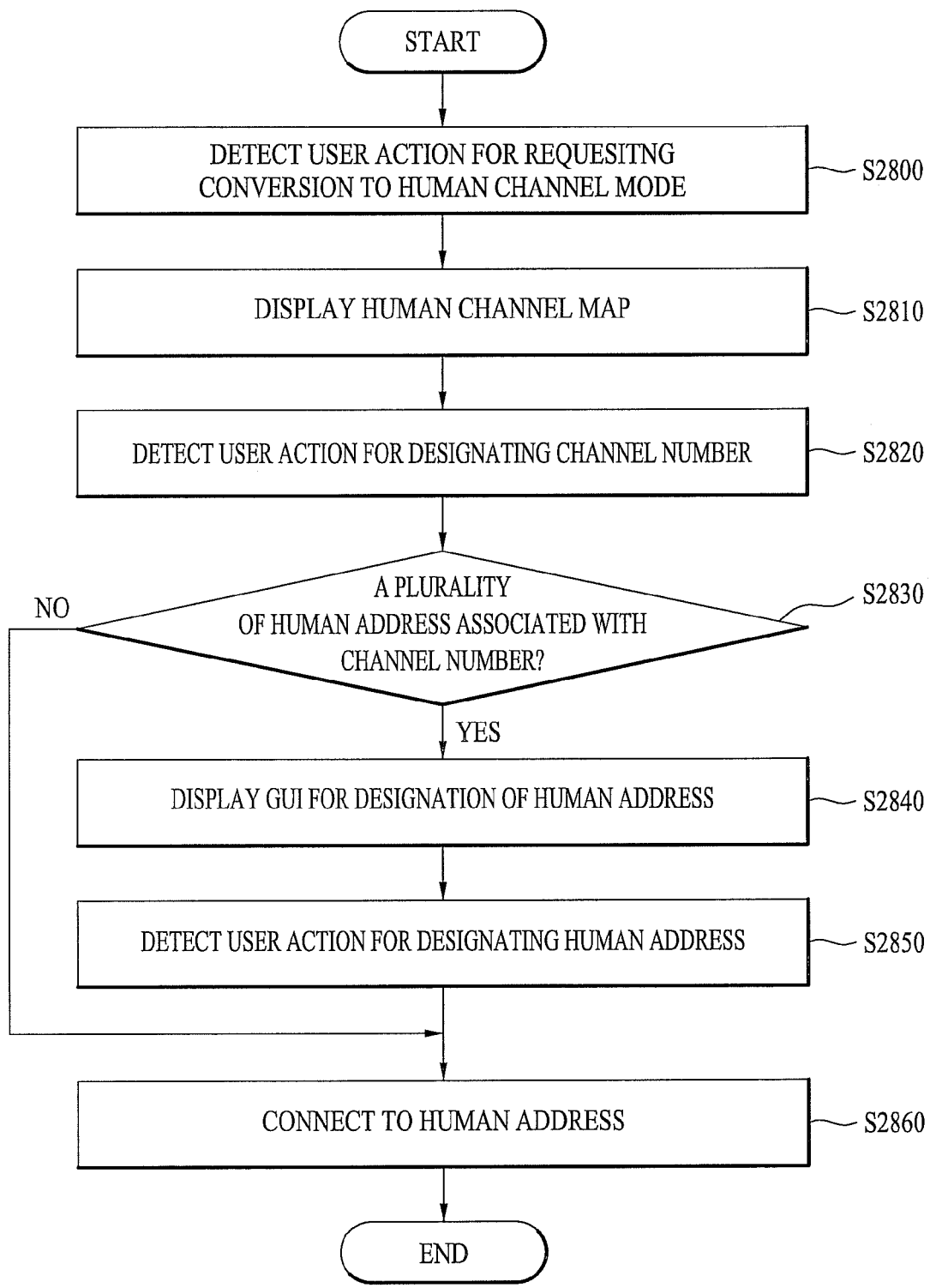
FIG. 98 is a flowchart illustrating an implementation procedure of another exemplary embodiment in relation to a method for providing a human channel service in accordance with the present disclosure.

FIG. 98 is a flowchart illustrating an implementation procedure of another exemplary embodiment in relation to a method for providing a human channel service in accordance with the present disclosure.

Referring to FIG. 98, the controller 340 detects a user action for requesting conversion to a human channel mode (S2800) (or social network channel mode). In some embodiments, the user action may be a user action for pushing one of an up key, a down key, a right key or a left key of a remote controller, or may be a user action for pushing a mode conversion key (for example, a colored button) of the remote controller.

The controller 340 controls display of a human channel map in response to the detected user action (S2810). The display 302 may display the human channel map 7220 illustrated in FIG. 72.

The controller 340 detects a user action for designation of a channel number (S2820).

The controller 340 confirms whether or not a plurality of human addresses is associated with the channel number in response to the detected user action (S2830). The controller 340 can confirm whether or not the plurality of human addresses is associated with the channel number by use of the human channel map. In one example, if a channel number '77' is designated in Step S2820, it can be confirmed from the human channel map of FIG. 97 that the channel number '77' is associated with a single human address. If a channel number '80' is designated in Step S2820, it can be confirmed from the human channel map of FIG. 97 that the channel number '80' is associated with the plurality of human addresses (i.e. Lisa@TV.com, Lisa@SNS.com and Lisa@facebook.com).

If the plurality of human addresses is present, the controller 340 controls display of a GUI for designation of a human address (S2840).

Figure 99:
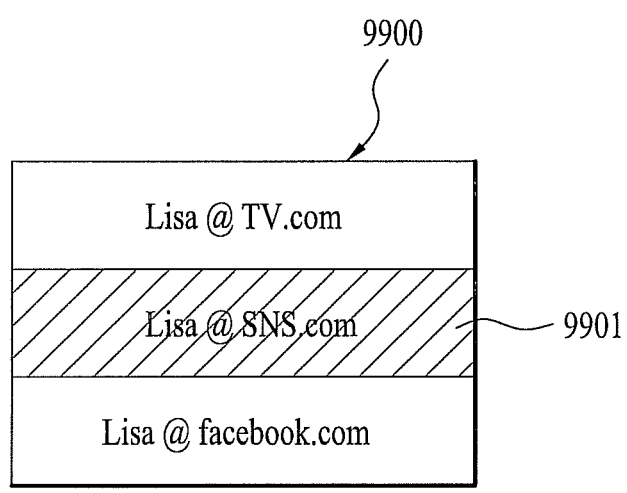
FIG. 99 is a diagram illustrating an embodiment of a GUI for designation of a human address.

FIG. 99 is a diagram illustrating an embodiment of a GUI for designation of a human address.

Referring to FIG. 99, the display 302 may display a GUI 9900 as the GUI for designation of the human address if the user action for designating the channel number '80' is detected in Step S2820. The GUI 9900 lists the human addresses Lisa@TV.com, Lisa@SNS.com and Lisa@facebook.com associated with the channel number '80'.

The controller 340 detects a user action for designation of a human address (S2850). In one example, the user action may be a user action for pushing a particular key (for example, an 'OK' key) on a remote controller in a state in which an indicator 9901 of FIG. 99 is located at a particular human address. The user action designates a human address where the indicator 9901 is located.

The controller 340 performs connection to the human address (S2860). If a plurality of human addresses is not associated with the channel number designated in Step S2820, the controller 340 performs connection to the human address associated with the channel number designated in Step S2820. Also, if a plurality of human addresses is associated with the channel number designated in Step S2820, the controller 340 performs connection to the human address designated in Step S2850.

The controller 340 may display at least one of a Web page associated with the SNS account of the SNS server, a screen captured by the electronic device, a broadcast channel that the user of the electronic device is viewing, content or content list stored in the electronic device, based on the result of connection. The Web page associated with the SNS account of the SNS server may be a home page.

Step S2860 may include at least one step included in the implementation procedure of the method for receiving content of a human channel in relation to FIGS. 19 to 21, and may include at least one step included in the implementation procedure of the method for setting connection between electronic devices of FIG. 26.

Figure 100:
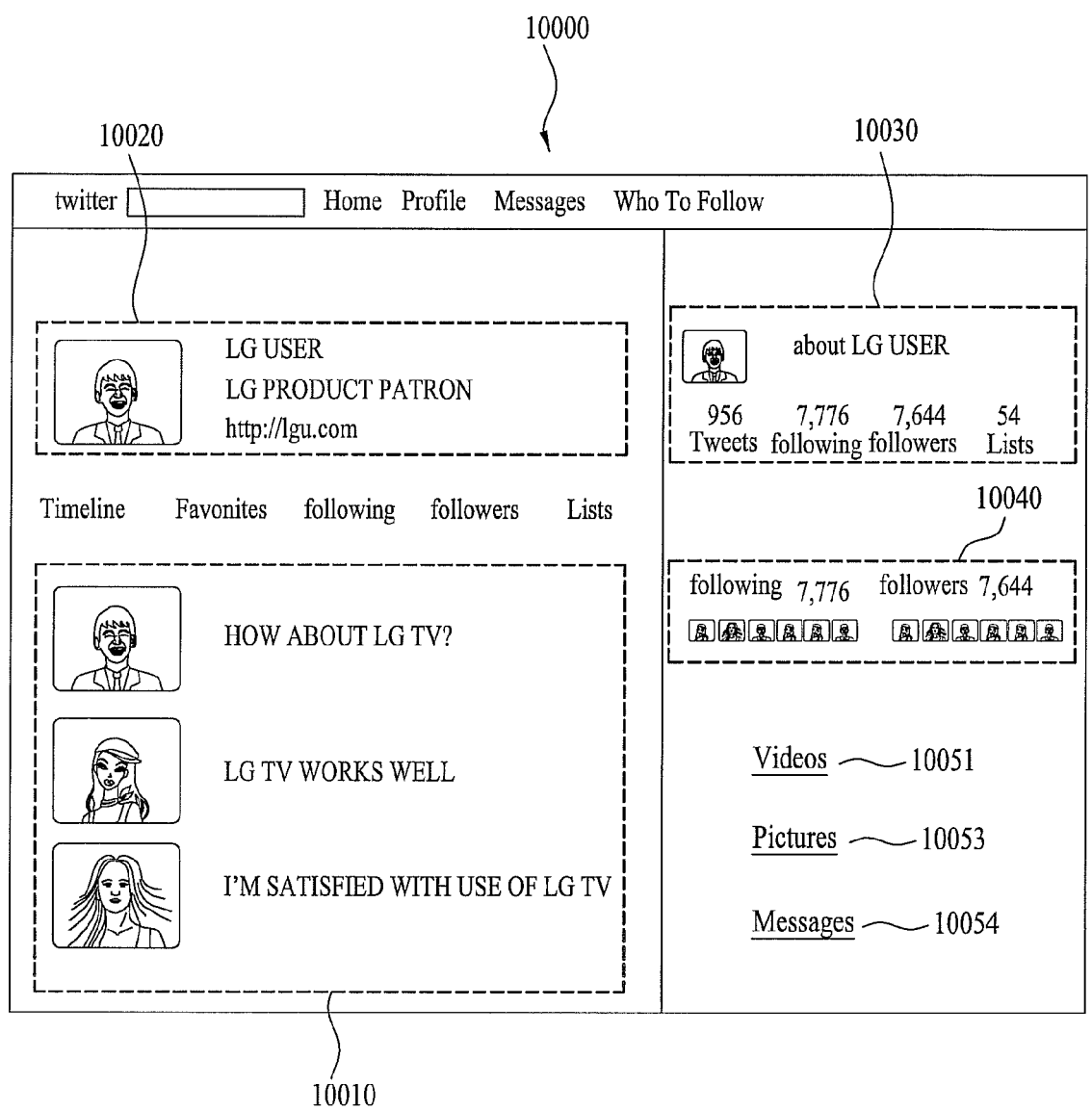
FIG. 100 is a diagram illustrating another embodiment of a screen on which a human channel map and content of a selected human channel are displayed.

FIG. 100 is a diagram illustrating another embodiment of a screen on which a human channel map and content of a selected human channel are displayed.

Referring to FIG. 100, the controller 340 may control display of a screen 10000 based on the result of connection of Step S2860. The screen 10000 is a screen on which a Web page received from the SNS server is displayed.

The screen 10000 may include a list region 10010, a user information region 10020, a statistical information region 10030, a friend list region 10040, a video link 10051, a picture link 10053 and a message link 10054. The list region 10010 displays a user question and answers of friends with respect to the question, the user information region 10020 displays brief introduction information with respect to the user, and the statistical information region 10030 displays statistical information. The friend list region 10040 displays a number of followers (other users who are registered to receive information about the user) and following (other users whom the user is registered to receive information about), the video link 10051 is a connection link for a Web page on which unloaded video files can be seen, the picture link 10053 is a connection link for a Web page on which uploaded pictures can be seen, and the message link 10054 is a connection link for a Web page on which messages between the user and the friend(s) can be seen.

Figure 101:
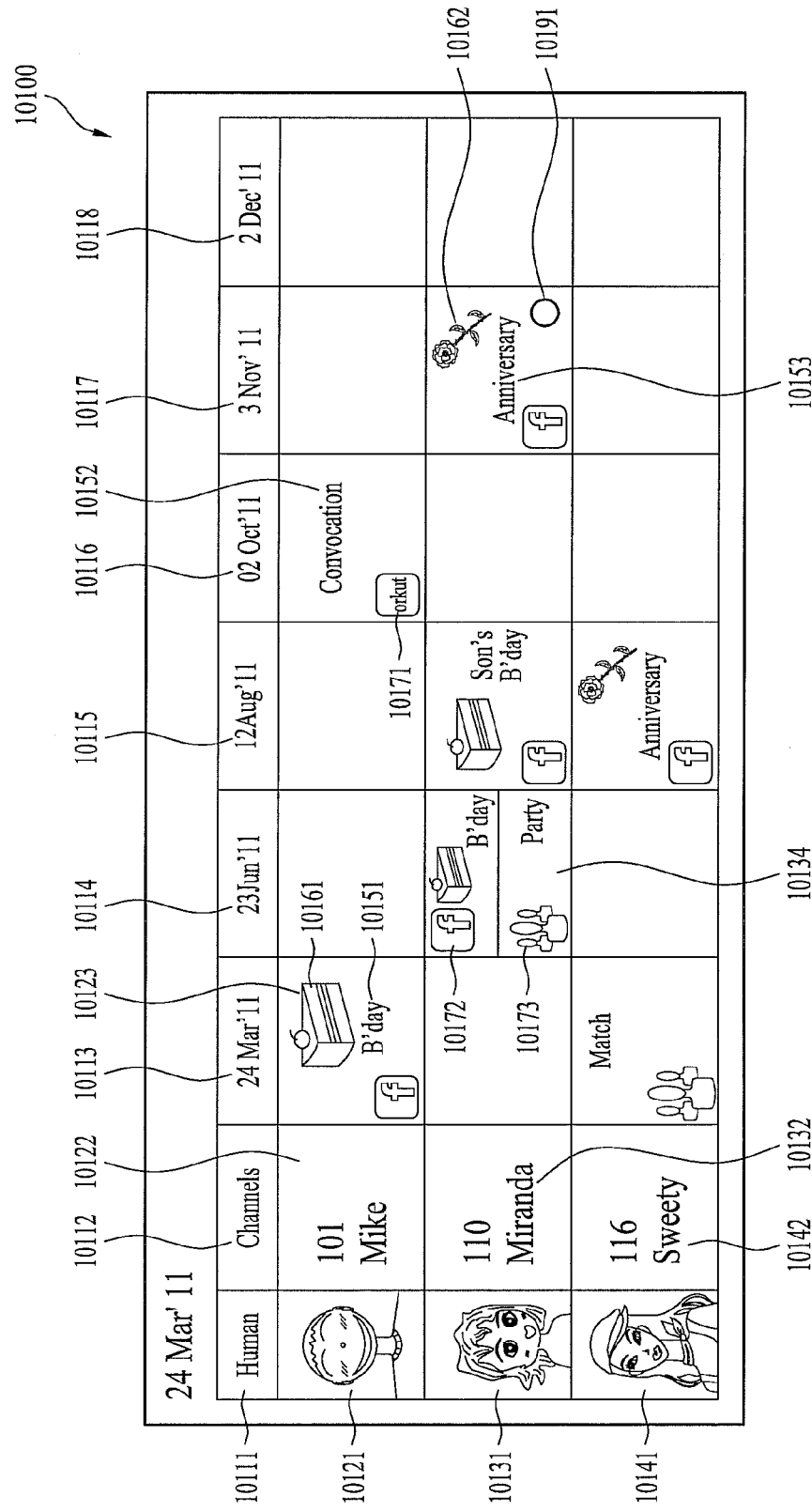
FIG. 101 is a diagram illustrating an embodiment of a screen on which an Electronic Program Guide (EPG) for a human channel in accordance with the present disclosure is displayed.

FIG. 101 is a diagram illustrating an embodiment of a screen on which an Electronic Program Guide (EPG) for a human channel in accordance with the present disclosure is displayed.

Referring to FIG. 101, the controller 304 may control display of an electronic program guide 10100 for a human channel. The electronic program guide 10100 may be displayed if a user action for requesting the EPG is detected during display of the human channel. If the user action for requesting the EPG is detected during display of a broadcast channel, the controller 340 may control display of an EPG for the broadcast channel.

The remote controller 304 may include a button for requesting the electronic program guide 10100 for the human channel. If the controller 340 detects a user action for pushing the button, the controller 340 may control display of the electronic program guide 10100 in response to the detected user action. In one embodiment, the button for requesting the EPG 10100 for the human channel may be a dedicated button. In this case, the EPG for the human channel may be displayed regardless of the type of content that is being displayed, e.g., broadcast, application, or human channel content. Alternatively, the button may be configured to display a particular type of EPG corresponding to the type of content being displayed, e.g., human channel type EPG.

The EPG 10100 may be configured as a grid or calendar. The EPG 10100 may include a human indicating cell 10111 at the first row of the first column and a human channel indicating cell 10112 at the first row of the second column, and the other columns of the first row may include date cells 10113 to 10118. The human indicating cell 10111 displays information indicating that human cells are listed in the first column, the human channel indicating cell 10112 displays information indicating that channel cells are listed in the second column, and the date cells 10113 to 10118 display dates.

In some embodiments, if there is no event associated with a particular date, a date cell displaying the particular date need not be displayed. In addition, date cells may be orderly displayed from the date cell 10113 representing a present date to the date cell 10114 representing a future date.

The electronic program guide 10100 includes human cells 10121, 10131 and 10141 in the other rows of the first column, channel cells 10122, 10132 and 10142 in the other rows of the second column and event cells 10123 and 10134 in the other rows of the other columns. The human cells 10121, 10131 and 10141 display information associated with owners of the respective human channels. Here, the human cells may display pictures of the owners of the human channels. The channel cells 10122, 10132 and 10142 display human channel numbers respectively (e.g., channel numbers 101, 110, and 116). The channel cells 10122, 10132 and 10142 may further display human addresses of the owners of the human channels (e.g., Mike, Miranda, and Sweety). In some embodiments, the human cells 10121, 10131 and 10141 need not be displayed.

The event cells are associated, according to positions thereof, with particular human cells, particular channel cells and particular date cells. More particularly, each event cell is associated with a human cell and a channel cell of the same row and is also associated with a date cell of the same column. The event cell is associated with an event, which is associated with a date displayed by the date cell of the same column, from among events associated with the human channel having the channel number displayed by the channel cell of the same row.

The event cell may display at least a part of event information, i.e. information about an associated event. The event information may include an SNS account associated with an event, information about an SNS site to which the event has been uploaded, information about the type of the event, the title of the event, the date of the event and detailed information about the event. The event may include at least one of a schedule, a function, a memorial day or holiday, content, or the like. The content may be a multimedia content such as a picture or video, or the content may be a message or note, for example.

The event cells may display at least one of event titles 10151, 10152 and 10153, event icons 10161 and 10162 or event source marks 10171, 10172 and 10173. The event cells may further display a reminder mark 10191 (or indicia). The reminder mark 10191 may be displayed in the case where a reminder for an event is set up. If the reminder is set up, an alarm for the event may be displayed as a message, for example, on the multi-functional display device or may be transmitted to a mobile appliance, an email address, or the like. The reminder may be set up according to a user request.

If one event cell is associated with a plurality of events, event information about the plurality of events may be displayed respectively. For example, an event cell 10134 displays a plurality of events 10172 and 10173.

Figure 102:
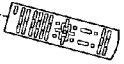
FIG. 102 is a diagram illustrating an embodiment of a screen in which detailed information about an event is displayed on an electronic program guide in accordance with the present disclosure is displayed.

FIG. 102 is a diagram illustrating an embodiment of a screen in which detailed information of an event is displayed on an electronic program guide in accordance with the present disclosure.

Referring to FIG. 102, the controller 340 may detect a user action for selecting a date cell of the electronic program guide 10200, for example, using a cursor or an arrow as illustrated. The controller 340 may control display of detailed information 10210 of an event associated with the date cell in response to the detected user action. In one example, if the controller 340 detects a user action for selecting a date cell 10243, the controller 340 controls display of the detailed information 10210 about a "Match" event associated with the date cell 10243 in response to the detected user action.

FIG. 103 is a diagram illustrating an embodiment of a screen in which channel numbers are selected on an electronic program guide in accordance with the present disclosure.

Referring to FIG. 103, the controller 340 may detect a user action for selecting a human cell of the electronic program guide 10300. The controller 340 may control display of content of a human channel of a person indicated by the human cell in response to the detected user action. In one example, if the controller 340 detects a user action for selecting a human cell 10341, the controller 340 controls display of content of a human channel of a person 'Sweety' indicated by the human cell 10341 in response to the detected user action.

Figure 104:
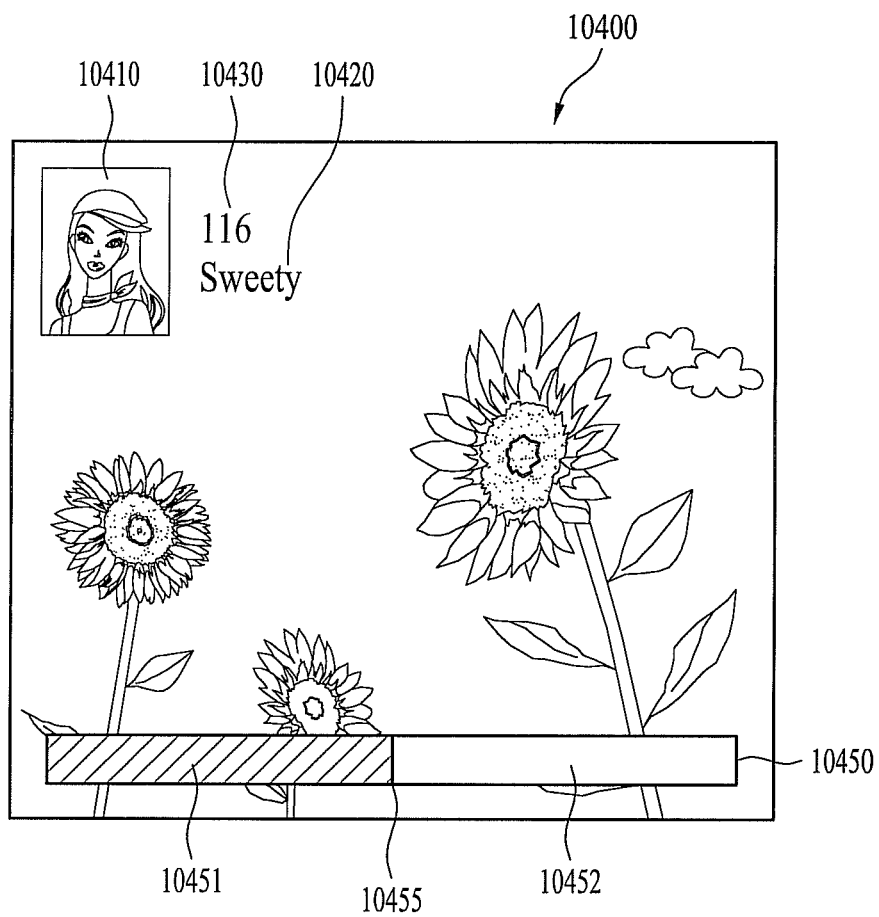
FIG. 104 is a diagram illustrating an embodiment of a screen on which content of a human channel is displayed.

FIG. 104 is a diagram illustrating an embodiment of a screen on which content of a human channel is displayed.

Referring to FIG. 104, if the controller 340 detects a user action for selecting the human cell 10341, the controller 340 may control display of content 10400 of a human channel of an owner 'Sweety' indicated by the human cell 10341 in response to the detected user action. The screen 10400 may further display a picture 10410 of the owner 'Sweety', a human address 10420 of the owner 'Sweety' and a channel number 10430 of the human channel of the owner 'Sweety'.

If the content 10400 is a video file, the controller 340 may further display a time guidance graph 10450 which represents a displayed time of the entire playing time of the video file. In the time guidance graph 10450, a region 10451 means a displayed amount, a region 10453 means an amount to be displayed, and a divider 10455 represents a position of an image being displayed.

Figure 105:
Figure 106:
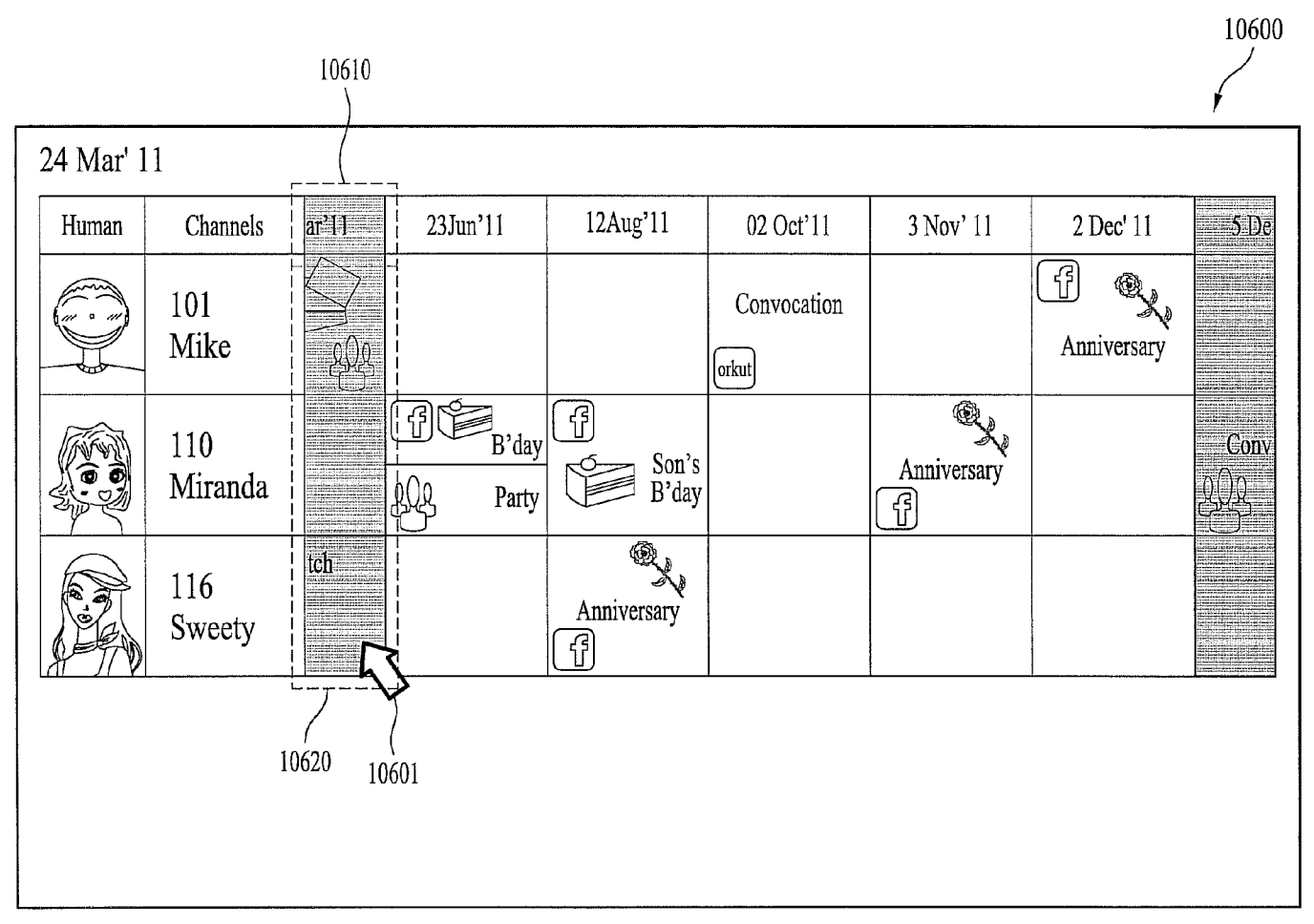
Figure 107:
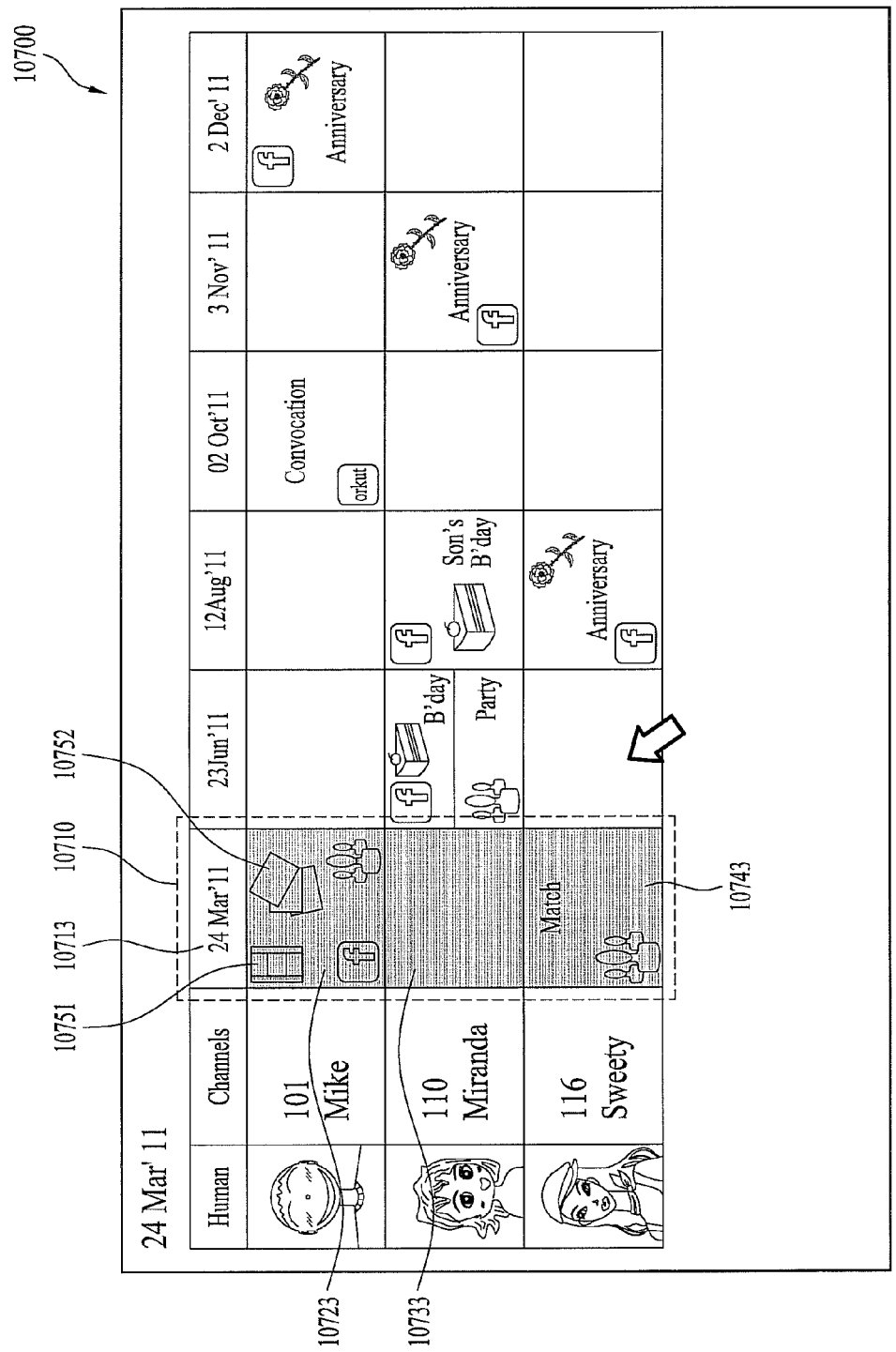

FIGS. 105 to 107 are diagrams illustrating an embodiment in which an electronic program guide in accordance with the present disclosure is dragged.

Referring to FIGS. 105 to 107, in a state in which a pointer 10501 is located at the third row of the electronic program guide 10500, if the controller 340 detects a down event and subsequently, detects at least one drag event, the controller 340 moves the pointer 10501 to a position 10601 in response to the detected down event and the detected drag event. Then, the controller 340 controls display of a part of a date cell 10610 indicating a date after a certain time corresponding to a movement distance of the pointer 10501 has elapsed and at least a part of an event cell 10620 associated with an event of the date. The down event may be a user action for selecting a channel cell 10513, or may be a user action for selecting one of event cells 10523, 10533 and 10543.

If the controller 340 detects an up event after detection of the at least one drag event, the controller 340 controls display of an electronic program guide 10700 including an added column 10710. The added column 10710 includes a date cell 10713 representing a particular date after the certain time has elapsed and event cells 10723, 10724 and 10743 associated with the event of the particular date. The event cell 10723 displays content 10751 and 10752 uploaded at the corresponding date. The number of columns that are added (and the corresponding dates which are displayed) may correspond to an amount in which the cell is dragged in a prescribed direction. Additionally, the direction in which a cell is dragged may determine whether previous or later dates are added to the EPG. For example, dragging a cell to the right in the EPG may display columns for later dates.

In one embodiment, a date range for the dates included in the EPG may be entered to display events corresponding to the entered date range. A scroll bar may be provided to scroll the EPG to the desired date range. Moreover, a scroll bar may also be provided to scroll the EPG vertically to display additional channels assigned to different users and their respective SNS accounts. In one embodiment, each channel as well as a particular date (e.g., each row or column of the EPG) may be hidden based on a manual designation or based on user preferences or filters (e.g., friend lists). For example, the entire row for channel number 110 corresponding to Miranda may be hidden in the EPG.

Figure 108:
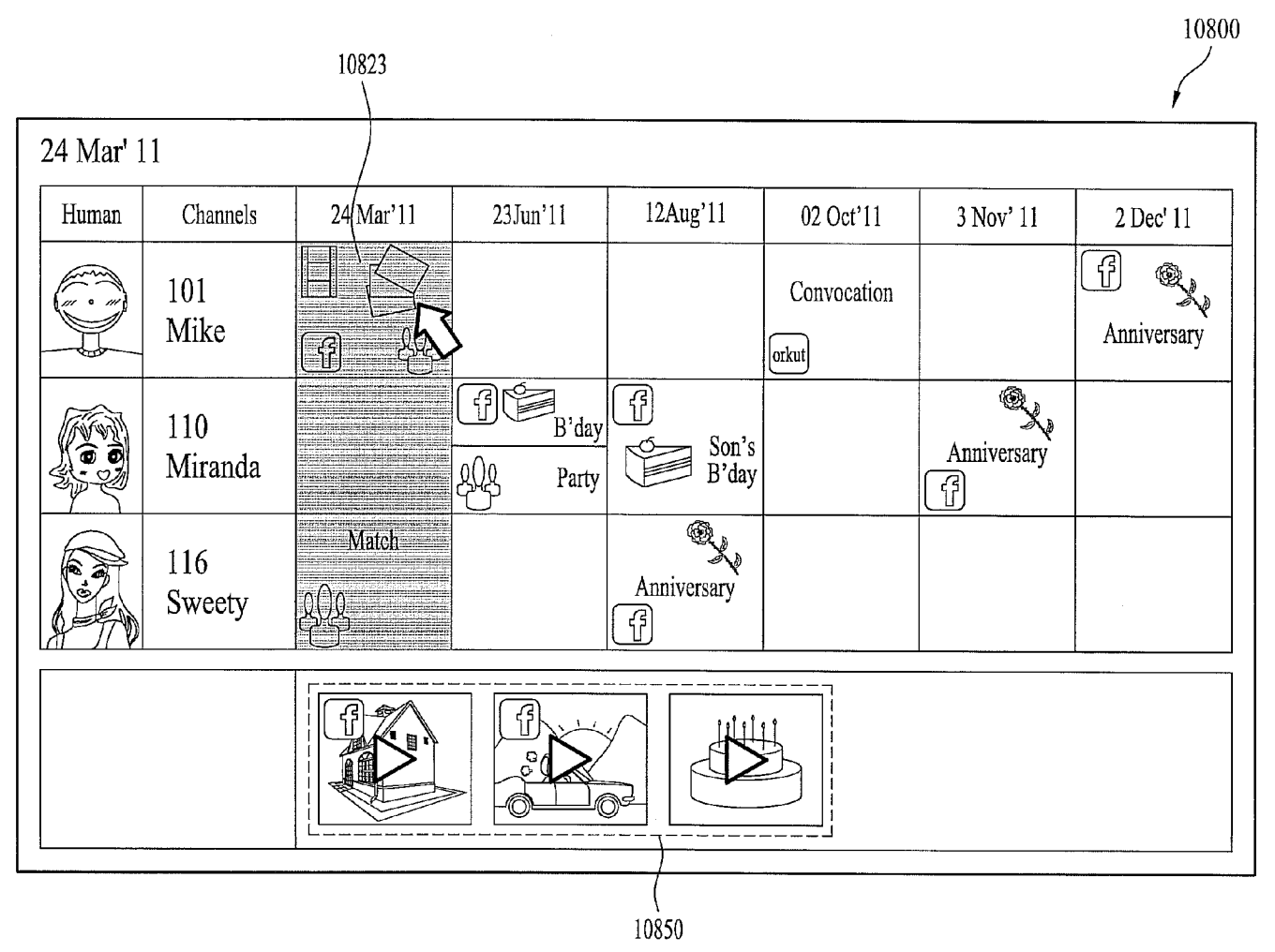

FIG. 108 is a diagram illustrating an embodiment of a screen in which a content list is displayed on an electronic program guide in accordance with the present disclosure.

Referring to FIG. 108, the controller 340 may detect a user action for selecting an event cell 10823 of an electronic program guide 10800. The controller 340 may control display of a content list 10850 associated with the event cell 10823 in response to the detected user action. The content list 10850 may be a list of events associated with the event cell 10823, or may be a list of content uploaded to the server on a date associated with the event cell 10823. The server may be the server 10 or the server 20, and the content may be content uploaded to the server belonging to an account associated with a human channel having a channel number '101'. The account may be an SNS account.

Figure 109:
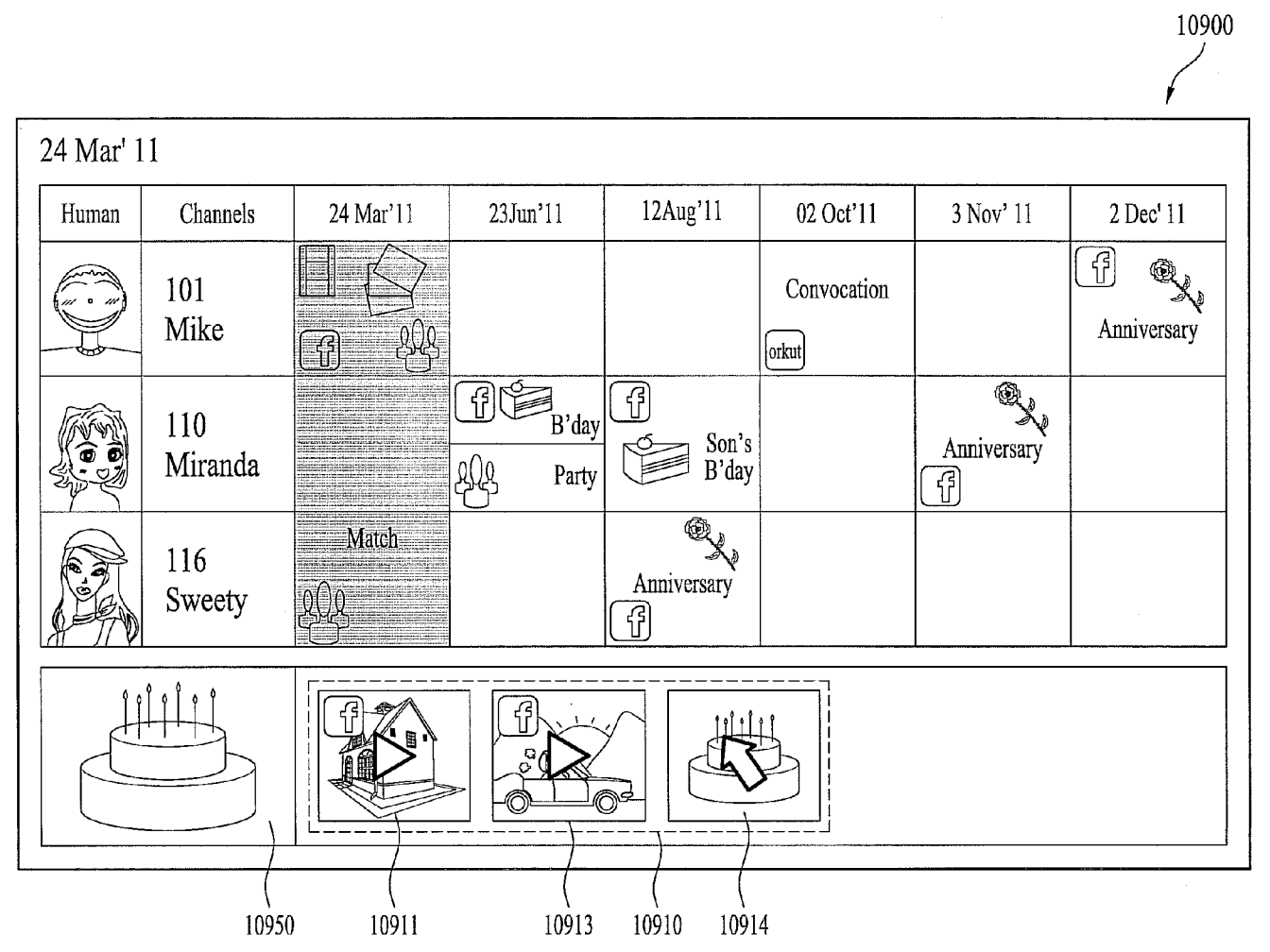

FIG. 109 is a diagram illustrating an embodiment of a screen on which a preview of content selected from among the content list of FIG. 108 is displayed.

Referring to FIG. 109, the controller 340 may detect a user action for selecting a particular item from among items 10911, 10913 and 10915 included in a content list 10910 displayed on the electronic program guide 10900. The controller 340 may control display of a preview 10950 of content indicated by the selected particular item. The preview may be prepared independently of the content, may be a part of the content, or may be the entire content.

In one example, if the controller 340 detects a user action for selecting an item 10914, the controller 340 controls display of a preview of content indicated by the item 10914 in the region 10950 in response to the detected user action. If the controller 340 detects a user action for selecting the region 10950 where the preview will be displayed, the controller 340 may control display of the content indicated by the item 10914 over the entire screen. In this case, the content may overlap over the electronic program guide 10900, or the electronic program guide 10900 may temporarily disappear from the screen during display of the content. In one embodiment, if the controller 340 detects a prescribed type of selection on an item 10911, 10913, 10914 (e.g., a double click or selection of a prescribed button on the remote controller), the content may be immediately displayed without displaying a preview of the item in region 10950.

Figure 110:
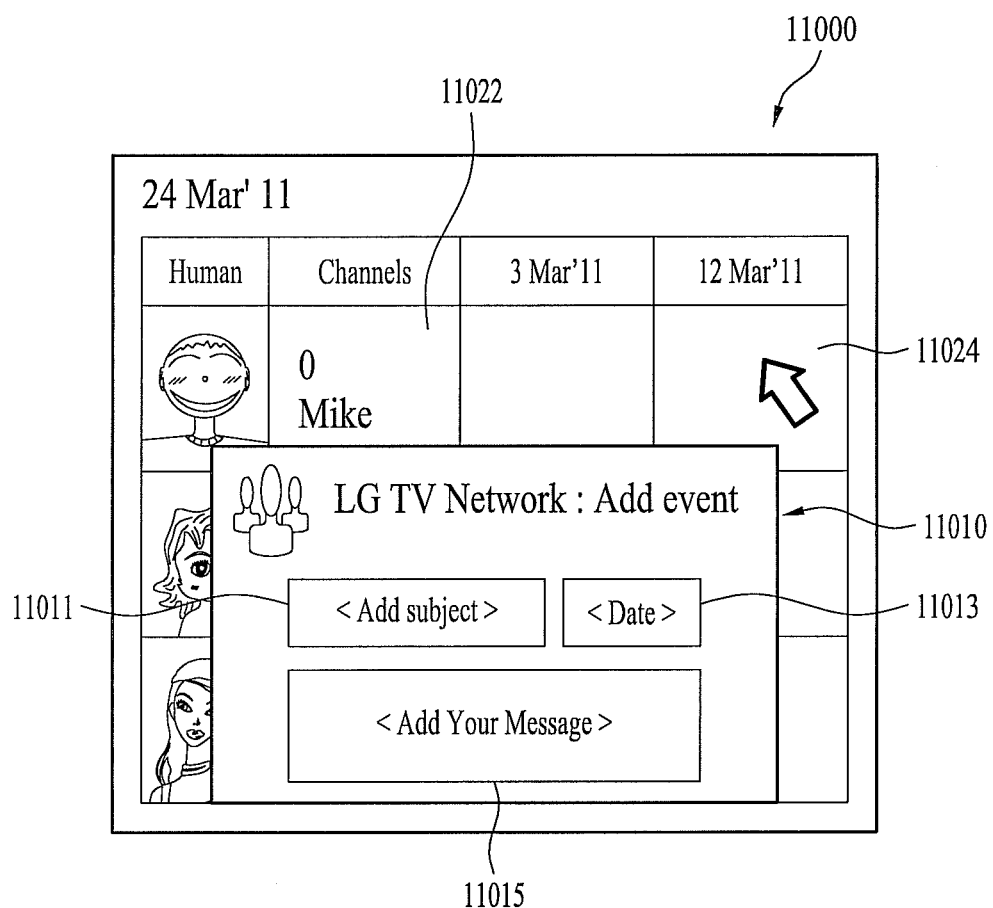
FIG. 110 is a diagram illustrating an embodiment of a screen on which a graphical user interface to produce an event is displayed.

FIG. 110 is a diagram illustrating an embodiment of a screen on which a graphical user interface to produce an event is displayed.

Referring to FIG. 110, the controller 340 may detect a user action for selecting a cell included in a row associated with a user human channel on an electronic program guide 11000. The controller 340 may control display of a graphical user interface 11010 to produce an event in response to the detected user action. In one example, an event cell 11024 is located on the same row as a channel cell 11022 indicating a channel number '0', a human channel having the channel number '0' means a human channel of the owner of the electronic device 300, and the channel cell 11022 further indicates a human address 'Mike' and therefore, the owner of the electronic device 300 is Mike. If the controller 340 detects a user action for selecting the event cell 11024, the controller 340 controls display of the graphical user interface 11010 in response to the user action.

The graphical user interface 11010 may include a first region 11011 used to input the title (or subject) of an event, a second region 11013 used to input the date of an event, and a third region 11015 used to input detailed information about an event.

Figure 111:
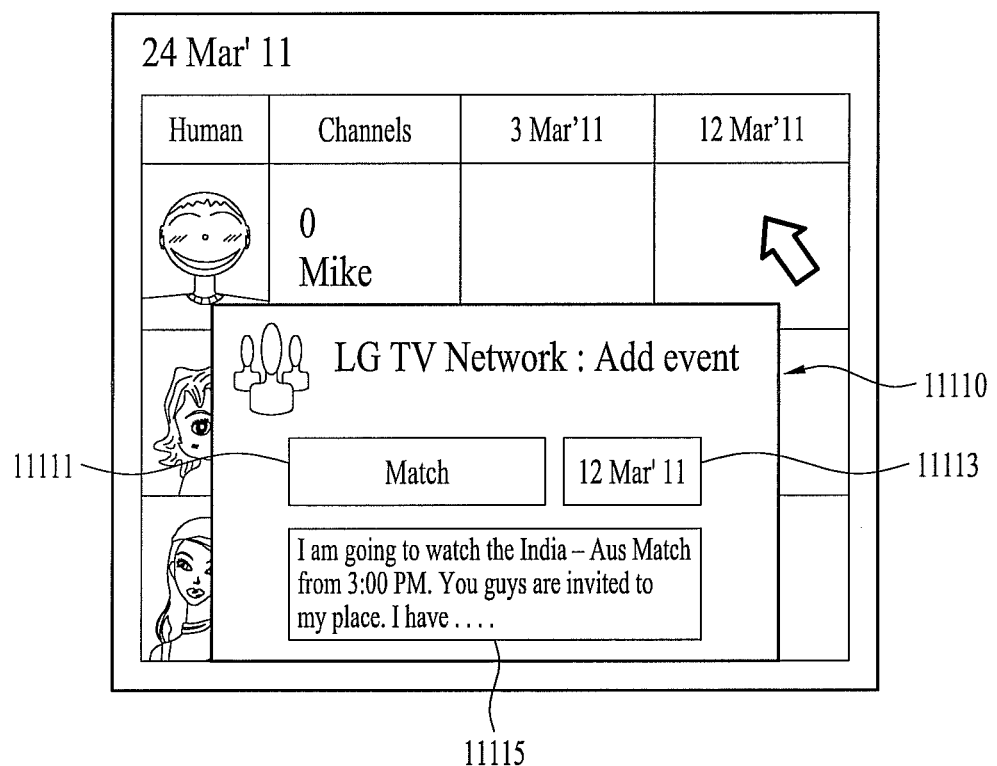
FIG. 111 is a diagram illustrating an embodiment of a screen in which an event input into the graphical user interface of FIG. 110 is displayed.

FIG. 111 is a diagram illustrating an embodiment of a screen on which an event input into the graphical user interface of FIG. 110 is displayed.

Referring to FIG. 111, a first region 11111 of the graphical user interface 11010 receives the title of an event "Match", a second region 11113 receives the date of the event "12 Mar. 2011", and a third region 11115 receives detailed information about the event "I am going to watch the India-Aus Match from 3:00 PM. You guys are invited to my place. I have . . . ."

Figure 112A:
FIGS. 112A and 112B are diagrams illustrating a screen on which an electronic program guide in accordance with the present disclosure, which reflects the event input in FIG. 111, is displayed.
Figure 112B:

FIGS. 112A and 112B are diagrams illustrating a screen on which an electronic program guide in accordance with the present disclosure, which reflects the event input in FIG. 111, is displayed.

Referring to FIG. 112A, if the input of the event illustrated in FIG. 111 is completed, the controller 340 controls display of at least a part of the event information input in FIG. 111 on an event cell 11224 associated with the date "12 Mar. 2011" of the electronic program guide 11200. The event cell 11224 is located on the row indicated by the human channel of the owner 'Mike' of the electronic device 300.

If the input of the event illustrated in FIG. 111 is completed, the controller 340 may control transmission of the event information input in FIG. 111 to the server 10, the server 20 and other electronic devices. The controller 340 may detect an SNS account associated with Mike from the human channel map and then, control upload of the event information to the detected SNS account. In addition, the controller 340 may acquire an address of the electronic device transmitted to each human channel of the human channel map and then, control transmission of the event information to the acquired address.

As shown in FIG. 112B, an electronic program guide 11201 is displayed on the electronic device of Molly. The event information input in FIG. 111 is displayed on an event cell 11234 associated with the date "12 Mar. 2011" at the row indicating the human channel of Mike. The electronic device of Molly may directly receive the event information from the electronic device of Mike, or may indirectly receive the event information through the server 10 or the server 20.

Figure 113:
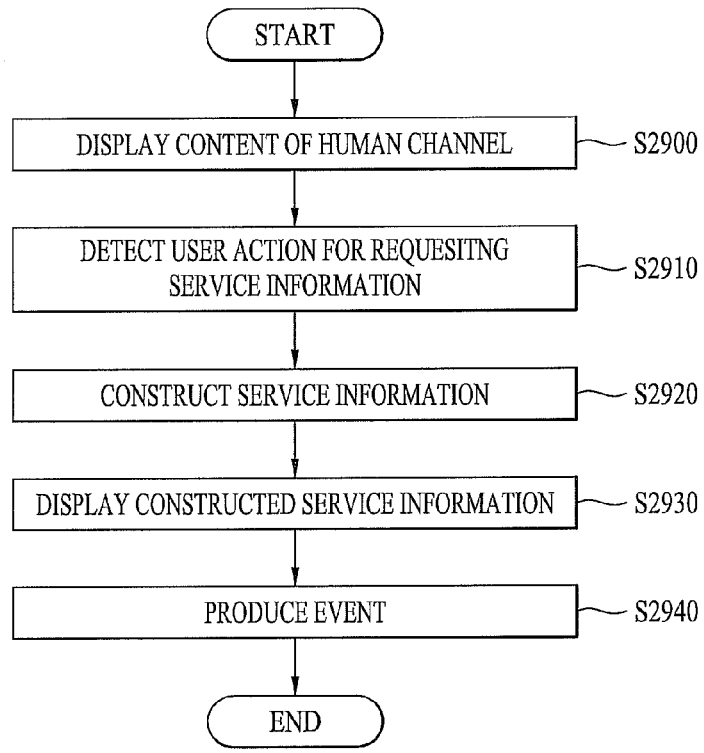
FIG. 113 is a diagram illustrating an implementation procedure of an exemplary embodiment in relation to a method for providing service information in accordance with the present disclosure.

FIG. 113 is a diagram illustrating an implementation procedure of an exemplary embodiment in relation to a method for providing service information in accordance with the present disclosure.

Referring to FIG. 113, the controller 340 controls display of content of a human channel. The display 302 may display the screen 1500 of FIG. 15, the screen 1600 of FIG. 16, the screen 1700 of FIG. 17, the screen 10000 of FIG. 100 and the screen 10400 of FIG. 104.

The controller 340 detects a user action for requesting service information (S2910).

The controller 340 constructs service information in response to the detected user action (S2920). The constructed service information may be event information and information associated with the event information and the human channel. The constructed service information may be stored in the storage unit 345.

Figure 114:
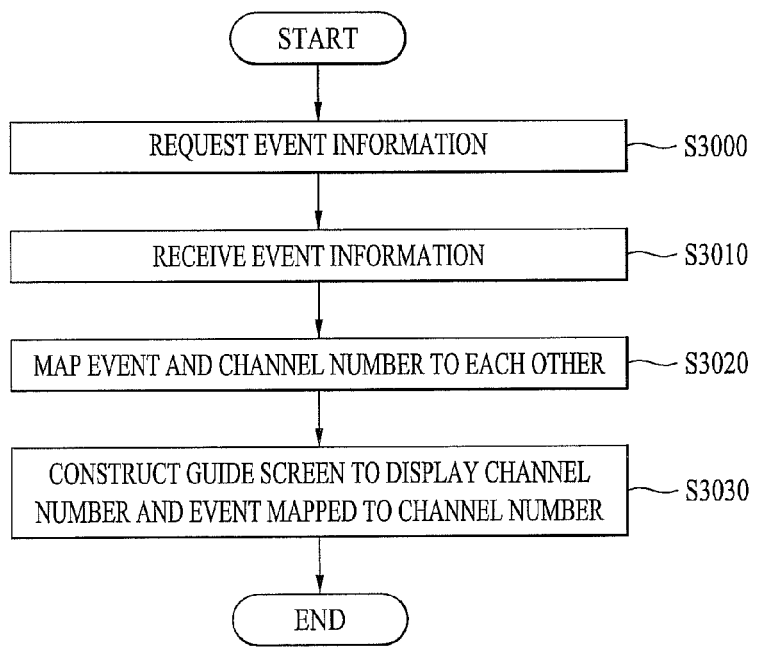
FIG. 114 is a diagram illustrating an implementation procedure of an exemplary embodiment in relation to a method for constructing service information in accordance with the present disclosure.

In some embodiments, Step S2920 may include an implementation procedure of a method for constructing service information in relation to FIG. 114.

The controller 340 controls display of the constructed service information (S2930). The display 302 may display the electronic program guide 10100 of FIG. 101. The constructed service information may be displayed in the form of the electronic program guide 10100.

In some embodiments, Step S2930 may include an implementation procedure of a method for displaying service information in relation to FIG. 115 as described hereinafter.

The controller 340 controls production of an event and transmission of the produced event (S2940).

In some embodiments, step S2940 may include an implementation procedure of a method for producing an event in relation to FIG. 116 as described hereinafter.

In some embodiments, Step S2920 may be performed before Step S2910, the service information constructed in Step S2920 may be stored in the storage unit 345, and Step S2930 may be performed after Step S2910. In this case, the stored service information may be displayed in Step S2930.

Step S2920 may be initially performed, may be performed when an event is additionally produced or received, or may be executed at a predetermined interval. The service information stored in the storage unit 345 may be updated upon execution of Step S2920.

FIG. 114 is a diagram illustrating an implementation procedure of an exemplary embodiment in relation to a method for constructing service information in accordance with the present disclosure.

Referring to FIG. 114, the controller 340 controls transmission of an event information request signal to request event information (S3000). The controller 340 may request event information on a per human channel basis or on a per SNS account basis, or may request event information with respect to a human channel included in a human channel map using a single signal. The controller 340 may transmit the event information request signal to at least one of the server 10, the server 20 or the electronic device.

The network interface 320 receives an event signal including the event information in response to the event information request signal (S3010). The event signal may be received from at least one of the server 110, the server 20 or the electronic device. The event information may include information about at least one event. For example, the event information may include the event 10152 and the event 10123 associated with the channel cell 10122 of Mike in FIG. 101 and the event 10153 associated with the channel cell 10132 of Miranda.

The event information includes an SNS account associated with the event, and may further include at least one of information about the SNS site to which the event has been uploaded, information about the type of the event, the title of the event, the date of the event or detailed information about the event. The event may be an event uploaded to a site including the SNS account.

The controller 340 maps the event and the channel number to each other (S3020). By using a channel map including at least one channel number and at least one SNS account assigned to the at least one channel number and also, using an SNS account included in the received event information, the controller 340 may map one of the at least one event or one or more events to one of the at least one channel number. The channel map, which includes at least one channel number and at least one SNS account assigned to the at least one channel number, may be a human channel map, and the human channel map may be the human channel map illustrated in FIG. 12 or the human channel map illustrated in FIG. 97.

The controller 340 maps the event to the channel number if the SNS account of the event is equal to the SNS account assigned to the channel number. In one example, the event 10123 and the event 10152 assigned with the channel cell 10122 of Mike in FIG. 101 may be mapped to the channel number '101', and the event 10153 associated with the channel cell 10132 of Miranda may be mapped to a channel number '110'.

The controller 340 constructs a guide screen to display the channel numbers and the events mapped to the channel numbers (S3030). The controller 340 may align the channel numbers and the mapped events in the order of dates of the events, or may align the events in the order of the channel numbers mapped to the events. The controller 340 may select and process event information to be displayed on event cells. The event information to be displayed on the event cells may be the titles of the events and may include at least one of icons indicating SNS sites to which the events have been uploaded or event icons.

Figure 115:
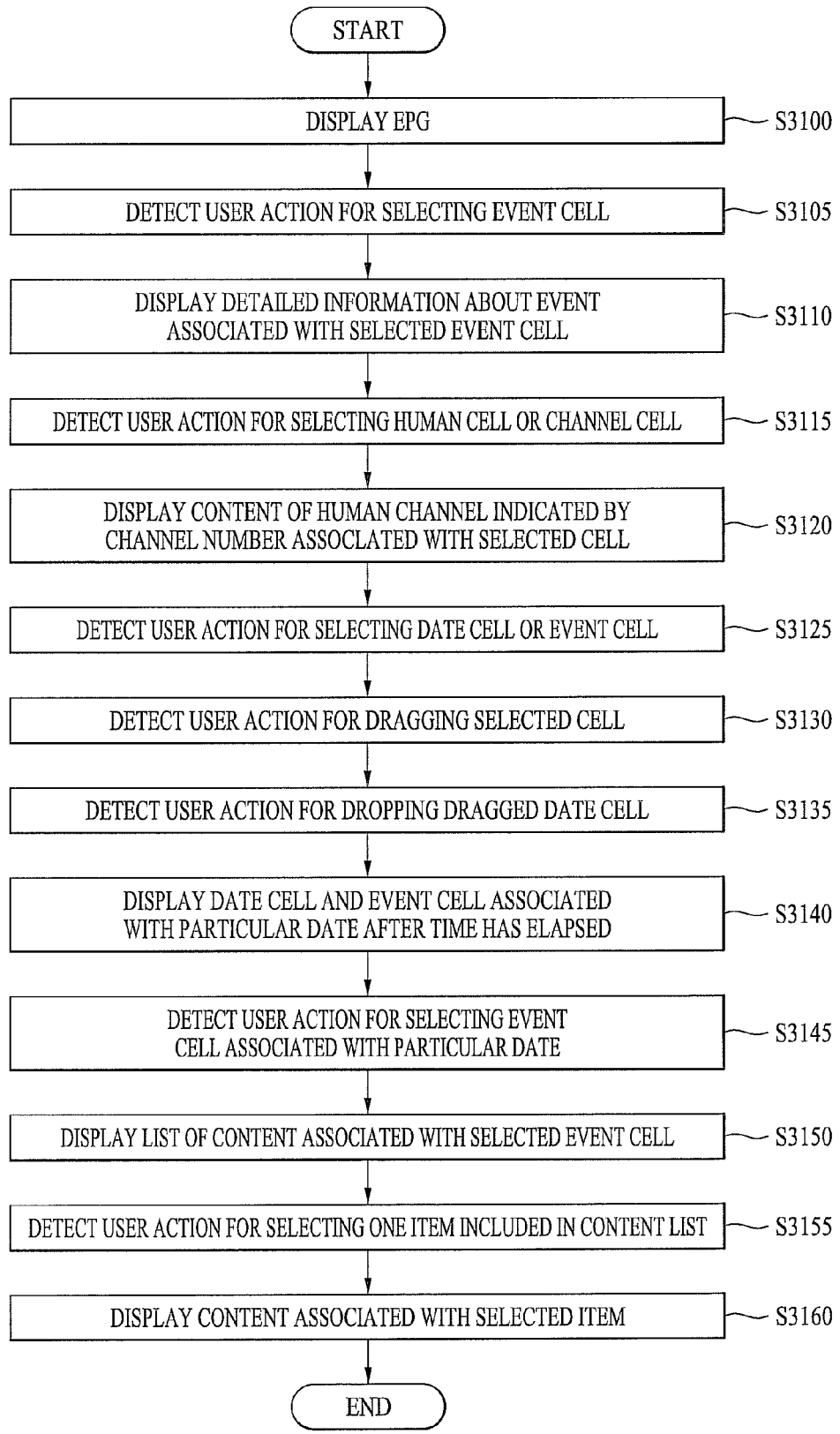
FIG. 115 is a diagram illustrating an implementation procedure of an exemplary embodiment in relation to a method for displaying service information in accordance with the present disclosure.

FIG. 115 is a diagram illustrating an implementation procedure of an exemplary embodiment in relation to a method for displaying service information in accordance with the present disclosure.

Referring to FIG. 115, the controller 340 controls display of en electronic program guide (S3100). The display 302 may display the electronic program guide 10100 of FIG. 101.

The controller 340 detects a user action for selecting en event cell (S3105).

The controller 340 displays detailed information about an event associated with the selected event cell in response to the detected user action (S3110). The display 302 may display the detailed information 10210 of FIG. 102.

The controller 340 detects a user action for selecting a human cell or a channel cell (S3115).

The controller 340 controls display of content of the human channel indicated by the channel number associated with the selected human cell or the selected channel cell in response to the detected user action (S3120). The display 302 may display the content 10400 of FIG. 104.

The controller 340 detects a user action for selecting a date cell or an event cell (S3125). The user action for selecting the date cell or the event cell may be a down event.

The controller 340 detects a user action for dragging the cell selected in Step S3125 (S3130). The display 302 may display the electronic program guide 10600 of FIG. 106.

The controller 340 detects a user action for dropping the dragged cell (S3135). The user action for dropping the dragged cell may be an up event.

The controller 340 displays the event cell and the date cell, associated with a particular date after a certain time has elapsed, on the electronic program guide in response to the detected user action (S3140). The display 302 may display the electronic program guide 10700 of FIG. 107.

The controller 340 detects a user action for selecting the event cell associated with the particular date after a certain time has elapsed (S3145).

The controller 340 displays a list of content associated with the selected event cell in response to the detected user action (S3150). The display 302 may display the content list 10850 of FIG. 108.

The controller 340 detects a user action for selecting one of items included in the content list (S3155).

The controller 340 controls display of content associated with the selected item (S3160). The controller 340 may display a preview of the content. The content may be displayed over the entire screen, or may be displayed on a certain region on the electronic program guide. In one example, the content may be displayed on the region 10950 of FIG. 109.

Figure 116:
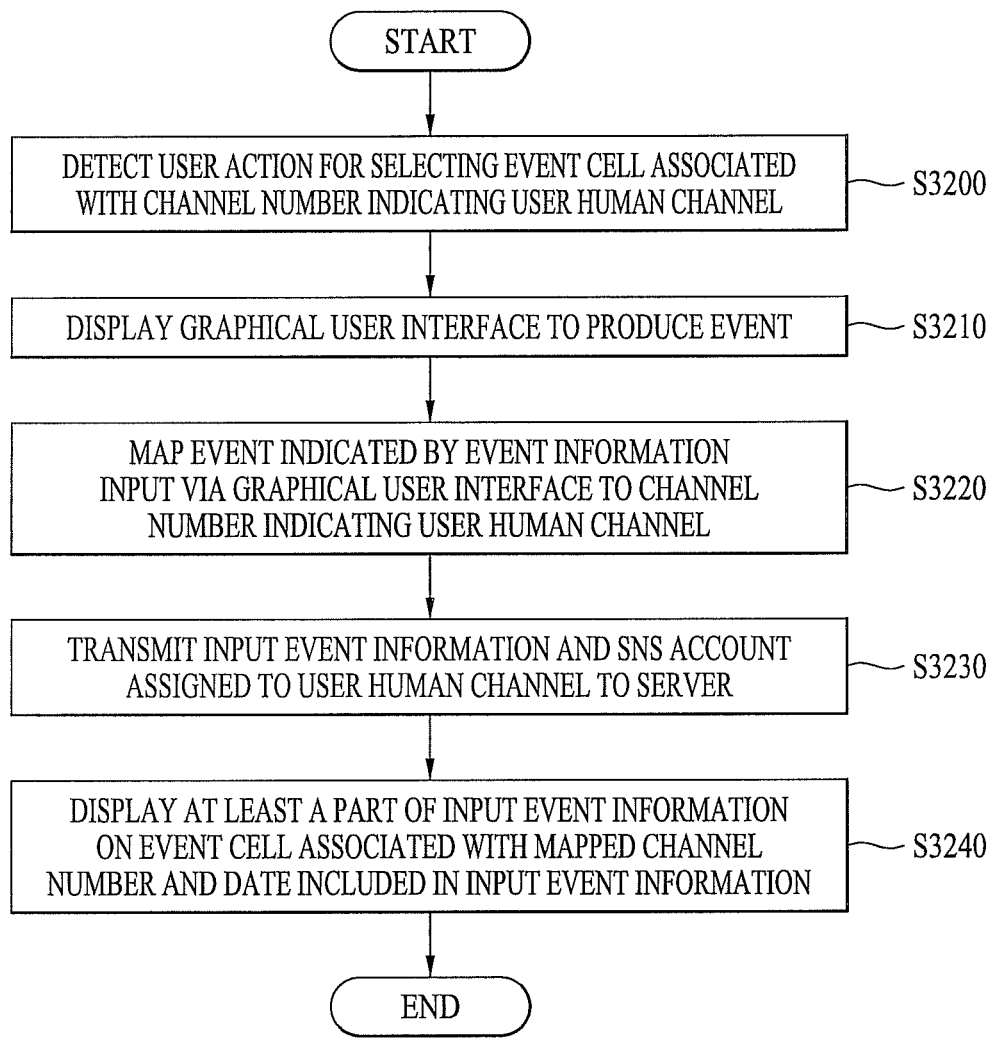
FIG. 116 is a diagram illustrating an implementation procedure of an exemplary embodiment in relation to a method for producing an event in accordance with the present disclosure.

FIG. 116 is a diagram illustrating an implementation procedure of an exemplary embodiment in relation to a method for producing an event in accordance with the present disclosure.

Referring to FIG. 116, the controller 340 detects a user action for selecting an event cell associated with a channel number indicating a user human channel (S3200). For example, the event cell associated with a channel number indicating a user human channel may be the event cell 11024 of FIG. 110.

The controller 340 controls display of a graphical user interface to produce an event in response to the detected user action (S3210). The display 302 may display the graphical user interface 11010 of FIG. 110.

The controller 340 maps the event indicated by the event information input via the graphical user interface to the channel number indicating the user human channel (S3220).

The controller 340 transmits the input event information and an SNS account assigned to the user human channel to the server (S3230). The server may be a server including the SNS account or may be the server 10. If the input event information and the SNS account are transmitted to the server 10, the server 10 transmits the event information and the SNS account assigned to the user human channel to the SNS site including the SNS account.

The controller 340 displays at least a part of the input event information on an event cell that is associated with the mapped channel number and a date included in the input event information (S3230). The display 302 may display the electronic program guide 11200 of FIGS. 112A and 112B.

Configurations of the electronic device and operating methods thereof in accordance with the present disclosure are not limited to the above described embodiments, and all or a part of the embodiments may be selectively combined to realize various modifications thereof.

The present disclosure may be implemented as code that can be written on a computer-readable recording medium and can thus be read by a computer. The computer-readable recording medium includes all types of recording devices in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer devices connected through a network so that computer-readable code is written thereto and executed therefrom in a decentralized manner.

As is apparent from the above description, with an electronic device, a method of providing a human channel service, a method of constructing a human channel map and a method of relaying a human channel in accordance with the present disclosure, on-line networks between designated individuals can be accomplished using channel numbers. A user can communicate with a designated person by selecting a channel number assigned to the designated person, which assures convenient and easy utilization of a social network service. Further, according to the present disclosure, by allowing the user to acquire an address of an electronic device using a human address independent of an IP address as well as the IP address, the user can utilize the electronic device for a social network service even when the electronic device has a dynamic IP address or a private IP address. Furthermore, according to the present disclosure, the user can conveniently and easily access a social network service anytime and anywhere. Moreover, according to the present disclosure, by allowing a user to access an acquaintance connected to a social network through a human channel, the user and the acquaintance can easily view the same broadcast channel through human channels thereof.

The present disclosure provides a chat screen for allowing the user to confirm a friend who is viewing the same content as the user using a human channel map and to chat with the confirmed friend, whereby the user can view a broadcast while chatting with the friend who is viewing the same content.

Moreover, according to the present disclosure, as a result of providing a variety of kinds of channel maps and a user interface for assisting channel map switch, the user can easily select a variety of kinds of channel maps. Further, allowing the user to select a variety of kinds of channels listed in a channel map can further facilitate easy user selection of a variety of kinds of channels.

The present disclosure provides a menu for the scan of an App service and an SNS service, similar to a broadcast channel scan menu, which can allow the user not only to easily operate a scan menu, but also to easily set an App channel and a human channel based on the result of scan.

In addition, the present disclosure provides event information about friends in the form of an Electronic Program Guide (EPG), which can allow the user to easily acquire and manage information about friends, to easily produce a user event and to easily share the produced event with friends.

As embodied and broadly described herein, the present disclosure is directed to an electronic device, a method of providing a human channel service, a method of constructing a human channel map and a method of relaying a human channel, a method for inviting to view channel, a method for remotely viewing content at the same time, a method for providing channel map service, a method for providing a channel scan interface and a method for providing service information that substantially obviate one or more problems due to limitations and disadvantages of the related art.

One object of the present disclosure is to provide an electronic device, a method of providing a human channel service, a method of constructing a human channel map and a method of relaying a human channel, which enable a user to more conveniently and easily use a social network service.

Another object of the present disclosure is to provide an electronic device, a method of providing a human channel service, a method of constructing a human channel map and a method of relaying a human channel, which enable a user to use a social network service anywhere and anytime.

Another object of the present disclosure is to provide an electronic device, a method of providing a human channel service, a method of constructing a human channel map and a method of relaying a human channel, which enable a social network service between electronic devices even when the electronic devices have dynamic Internet Protocol (IP) addresses.

Another object of the present disclosure is to provide an electronic device, a method of providing a human channel service, a method of constructing a human channel map and a method of relaying a human channel, which enable a social network service between electronic devices even when the electronic devices have private IP addresses.

A further object of the present disclosure is to provide an electronic device and a method of making invitation to view a channel, which enable a user to invite an acquaintance connected to a social network to view a broadcast channel that the user is viewing.

Another object of the present disclosure is to provide an electronic device, which enables a user to view a broadcast while chatting with a friend who views the same content, and a method for remotely viewing content at the same time.

Another object of the present disclosure is to provide an electronic device and a method of providing a channel map service, which provide a variety of kinds of channel maps and enable a user to easily select a variety of kinds of channel maps.

A further object of the present disclosure is to provide an electronic device and a method of providing a channel map service, which provide a variety of kinds of channels and enable a user to easily select a variety of kinds of channels.

Another object of the present disclosure is to provide an electronic device, which can easily perform a channel scan with respect to various kinds of services and can provide a menu to perform a channel scan with respect to various kinds of services, similar to a conventional broadcast channel scan menu, and a method for providing a channel scan interface.

A further object of the present disclosure is to provide an electronic device, which provides information about friends in a social network, and a method for providing service information.

To achieve these objects and other advantages and in accordance with the purpose of the invention, as embodied and broadly described herein, a method of providing a human channel service may include detecting a user action for designating a channel number, reading a human address associated with the designated channel number from a human channel map in response to the detected user action, acquiring an address of an electronic device to access based on the read human address, receiving content from the electronic device using the acquired address, and displaying the received content. The human address may include at least one of an e-mail address, an account name, a family name (or surname), a Session Initiation Protocol-Uniform Resource Locator (SIP-URL), or another appropriate type of identifier or address.

The address of the electronic device may include at least one of a Media Access Control (MAC) address, an Internet Protocol (IP) address, a port number, a Domain Name System (DNS) name or a Uniform Resource Locator (URL).

The acquiring the address of the electronic device may include reading the address of the electronic device based on the human address from a storage unit.

The acquiring the address of the electronic device may include transmitting a connection request signal including the human address to a server, and receiving the address of the electronic device from the server.

The human channel map may include a channel number, a human address and information associating the channel number and the human address with each other.

In one embodiment, a method of constructing a human channel map may include displaying a first Graphical User Interface (GUI) for designation of a human address, detecting a first user action for designating a human address, displaying a second GUI for designation of a channel number in response to the detected first user action, detecting a second user action for designating a channel number, and storing the channel number, the human address and information associating the channel number and the human address with each other in the human channel map in response to the detected second user action. The displayed first GUI may list at least one selectable human address. The displayed second GUI may list a plurality of selectable channel numbers.

In this embodiment, the human channel map constructing method may further include receiving the at least one human address from a server.

The human channel map constructing may further include displaying a Web page of a Social Network Service (SNS)

server, the displayed Web page listing at least one human address, detecting a third user action for selecting one of the listed at least one human address, and displaying the first GUI in response to the detected third user action.

In one embodiment, a method of relaying a human channel may include receiving a first registration request signal, including a first human address and an address of a first electronic device, from the first electronic device, storing the first human address and the address of the first electronic device in response to the received first registration request signal, receiving a second registration request signal, including a second human address and an address of a second electronic device, from the second electronic device, storing the second human address and the address of the second electronic device in response to the received second registration request signal, receiving a connection request signal including the second human address from the first electronic device, and transmitting a response signal including the address of the second electronic device to the first electronic device in response to the received connection request signal, and transmitting a response signal including the address of the first electronic device to the second electronic device.

In one embodiment, an electronic device may include a controller configured to detect a user action for designating a channel number, read a human address associated with the designated channel number from a human channel map in response to the detected user action, and control acquisition of an address of an electronic device to access, based on the read human address, and a network interface configured to receive content from the electronic device using the acquired address.

The electronic device may further include a display configured to display the received content. Moreover, the controller may be configured to control transmitting a connection request signal including the human address to a server, and control receiving the address of the electronic device from the server.

In one embodiment, an electronic device may include an interface configured to receive a user action, a controller configured to detect a first user action for designating a human address, control displaying a second GUI for designation of a channel number in response to the detected first user action, detect a second user action for designating a channel number, and control storing the human address, the channel number, and information associating the human address and the channel number with each other in a human channel map in response to the detected second user action, and a storage device configured to store the human channel map.

The interface may include at least one of an image capture device, a touch screen, a touch pad, or a remote controller receiver.

In one embodiment, a method of constructing a human channel map may include displaying a GUI for setting up a channel, the displayed GUI including a human channel region listing at least one human address and a channel region listing at least one channel number, detecting a first user action for selecting one of the at least one human address, detecting a second user action for dragging the selected human address, detecting a third user action for selecting one of the at least one channel number, and storing the selected human address, the selected channel number, and information associating the channel number and the human address with each other in the human channel map in response to the detected third user action. The displayed GUI may further include a broadcast channel region including at least one broadcast channel and an App channel region including at least one App channel.

In this embodiment, the human channel map constructing method may further include confirming whether or not a human address associated with the selected channel number is present in the human channel map, in response to the detected third user action, and deleting the associated human address, the selected channel number and information associating the associated human address and the selected channel number with each other from the human channel map if the associated human address is present.

In accordance with another aspect of the present disclosure, a method of making invitation to view a channel includes detecting a first user action for selecting a displayed broadcast program, detecting a second user action for selecting one of at least one channel number included in a displayed human channel map, and transmitting a channel viewing request signal for requesting viewing of the selected broadcast program to an electronic device or a server associated with the selected channel number, in response to the second user action, and the transmitted channel viewing request signal includes at least one of detailed user information, detailed information about a physical channel for transmitting the broadcast program, a service name of the broadcast program, a service Identifier (ID) of the broadcast program, a channel number of the broadcast program, an event name of the broadcast program, a transport stream ID of the broadcast program, a network ID of the broadcast program, information about a service provider providing the broadcast program, information about a transmission medium for transmitting the broadcast program or information about a nation or an area where the service provider is located. The displayed human channel map may further include at least one of a channel name, event name or residual broadcast time of the broadcast program displayed by the electronic device associated with the channel number.

The method may further include transmitting a channel guiding signal, including at least one of the channel name, event name or residual broadcast time of the broadcast program, to the electronic device or the server according to an access method associated with the channel number included in the human channel map.

The method may further include receiving a channel viewing request signal from the electronic device, and confirming whether or not a broadcast service is receivable from a service provider indicated by information included in the received channel viewing request signal.

The method may further include searching for a channel, which broadcasts the broadcast program indicated by information included in the received channel viewing request signal, from stored Electronic Program Guide (EPG) data based on information included in the channel viewing request signal, if reception of the broadcast service from the service provider is not possible.

The method may further include receiving a channel viewing request signal from a server, receiving a broadcast program of a channel indicated by information included in the received channel viewing request signal, and displaying the received broadcast program. Information included in the channel viewing request signal may be information obtained as the server amends information included in the channel viewing request signal received from the electronic device according to a difference of at least one of the service provider providing the broadcast service, transmission medium or area.

The transmitting the signal to the electronic device may include reading a human address associated with the channel number from a stored human channel map, acquiring an address of the electronic device based on the read human address, and transmitting the channel viewing request signal using the acquired address. The human address may include at least one of an e-mail address, an account name, a family or and a Session Initiation Protocol-Uniform Resource Locator (SIP-URL). The address of the electronic device may include at least one of a Media Access Control (MAC) address, an Internet Protocol (IP) address, a port number, a Domain Name System (DNS) name or a Uniform Resource Locator (URL).

In accordance with a further aspect of the present disclosure, an electronic device includes an interface configured to receive a user action, a controller configured to control displaying a broadcast program and a human channel map including at least one channel number, detect a first user action for selecting the broadcast program, detect a second user action for selecting one of the at least one channel number, and control transmitting a channel viewing request signal for requesting viewing of the selected broadcast program to an electronic device or a server associated with the selected channel number in response to the detected second user action, and a network interface configured to output the channel viewing request signal, and the transmitted channel viewing request signal includes at least one of detailed user information, detailed information about a physical channel for transmitting the broadcast program, a service name of the broadcast program, a service Identifier (ID) of the broadcast program, a channel number of the broadcast program, an event name of the broadcast program, a transport stream ID of the broadcast program, a network ID of the broadcast program, information about a service provider providing the broadcast program, information about a transmission medium for transmitting the broadcast program or information about a nation or an area where the service provider is located. The human channel map may further include at least one of a channel name, event name or residual broadcast time of the broadcast program displayed by the electronic device associated with the channel number.

The controller may be configured to control transmitting a channel guiding signal, including at least one of the channel name, event name or residual broadcast time of the broadcast program, to the electronic device or the server according to an access method associated with the channel number included in the human channel map.

The network interface may be configured to receive a channel viewing request signal from an electronic device, and the controller is configured to confirm whether or not a broadcast service is receivable from a service provider indicated by information included in the received channel viewing request signal.

The controller may be configured to search for a channel, which broadcasts the broadcast program indicated by information included in the received channel viewing request signal, from stored Electronic Program Guide (EPG) data based on information included in the channel viewing request signal, if reception of the broadcast service from the service provider is not possible.

The network interface may be configured to receive a channel viewing request signal from a server, and the controller may be configured to control receiving a broadcast program of a channel indicated by information included in the received channel viewing request signal. Information included in the channel viewing request signal may be information obtained as the server amends information included in the channel viewing request signal received from the electronic device according to a difference of at least one of the service provider providing the broadcast service, transmission medium or area.

The controller may be configured to read a human address associated with the channel number from a stored human channel map, acquire an address of the electronic device based on the read human address, and control transmitting the channel viewing request signal using the acquired address. The human address may include at least one of an e-mail address, an account name, a family name or a Session Initiation Protocol-Uniform Resource Locator (SIP-URL). The address of the electronic device may include at least one of a Media Access Control (MAC) address, an Internet Protocol (IP) address, a port number, a Domain Name System (DNS) name or a Uniform Resource Locator (URL).

In accordance with another aspect of the present disclosure, a method for remotely viewing content at the same time includes displaying content, detecting a user action for requesting a simultaneous viewing mode, confirming the presence of an owner who is viewing the displayed content from among owners of human channels included in a human channel map in response to the detected user action, and displaying a silhouette of the confirmed owner. The displayed silhouette may be changed and displayed according to the emotions of the owner. The displayed silhouette may be changed and displayed according to a motion of the owner. The silhouette may be displayed as a 3D image. A chat phrase of the owner may be displayed at a location associated with the silhouette.

The method for remotely viewing content at the same time may further include reflecting a screen effect requested by the owner on the displayed content.

The confirming the presence of the owner may include transmitting an image frame request signal to request an image frame at a particular time, acquiring the image frame at the particular time from among image frames of the displayed content, receiving an image frame transmission signal including the image frame at the particular time, and comparing the acquired image frame with the image frame included in the received image frame transmission signal so as to confirm the presence of the owner.

The confirming the presence of the owner may include transmitting an owner list request signal including information about the content to a server, receiving an owner list from the server, and confirming an owner included in the owner list as the owner who is viewing the displayed content. The information about the content may include at least one of detailed user information, detailed information about a physical channel that transmits the content, a service name of the content, a service ID of the content, a channel number of the content, an event name of the content, a transport stream ID of the content, a network ID of the content, information about a service provider to provide the content, information about transmission media to transmit the content or information about a nation or locale where the service provider is located.

The human channel map may include a channel number, a human address and information associating the channel number and the human address with each other. The human address may be an identification mark given to the owner.

In accordance with another aspect of the present disclosure, an electronic device includes an interface configured to receive a user action for requesting a simultaneous viewing mode, and a controller configured to confirm the presence of an owner who is viewing content from among owners of human channels included in a human channel map in response to the user action if the user action is detected during display of the content and to control display of a silhouette of the confirmed owner.

The controller may control change of the displayed silhouette according to the emotions of the owner and display of the changed silhouette.

The controller may control change of the displayed silhouette according to a motion of the owner and display of the changed silhouette.

The controller may control display of a chat phrase of the owner at a location associated with the silhouette.

The controller may control reflection of a screen effect requested by the owner on the displayed content.

The controller may control display of the silhouette as a 3D image.

The controller may control transmission of an image frame request signal for requesting an image frame at a particular time, acquiring the image frame at the particular time from among image frames of the displayed content, and if an image frame transmission signal including the image frame at the particular time is received, comparing the acquired image frame with the image frame included in the received image frame transmission signal so as to confirm the presence of the owner.

The controller may control transmission of an owner list request signal including information about the content to a server, and if an owner list is received from the server, confirming an owner included in the owner list as the owner who is viewing the displayed content.

The information about the content may include at least one of detailed user information, detailed information about a physical channel to transmit the content, a service name of the content, a service ID of the content, a channel number of the content, an event name of the content, a transport stream ID of the content, a network ID of the content, information about a service provider to provide the content, information about a transmission media to transmit the content or information about a nation or locale where the service provider is located.

The human channel map may include a channel number, a human address and information associating the channel number and the human address with each other. The human address may be an identification mark given to the owner.

In accordance with another aspect of the present disclosure, a method of providing a channel map service includes displaying a first channel map on a screen on which content is being displayed, detecting a first user action for requesting channel map switch, and switching the displayed first channel map to a second channel map, in response to the detected first user action. One of the first channel map and the second channel map is a human channel map including at least one human channel. The first user action may be an action in which a user presses one of directional keys of a remote controller.

The switching to the human channel map may include displaying content of one of human channels included in the human channel map.

The channel map service providing method may further include detecting a third user action for requesting channel switch in a state in which the human channel map is displayed, switching a selected human channel to another human channel in the human channel map in response to the detected third user action, and displaying content of the switched human channel.

The displaying may include reading a human address associated with a channel number of the human channel, acquiring an address of an electronic device to access, based on the read human address, receiving the content from the electronic device using the acquired address, and displaying the received content.

The channel map service providing method may further include detecting a second user action for requesting channel map switch, and switching the displayed second channel map to a third channel map in response to the detected second user action.

The channel map service providing method may further include detecting a third user action for requesting a full channel map, and displaying a full channel map including the at least one human channel, in response to the detected third user action.

The displayed full channel map may further include at least one broadcast channel and at least one App channel.

The displayed full channel map may include a sheet on which the at least one human channel is marked, and the sheet is selected by a sheet tab.

The full channel map may include sheets on which the at least one broadcast channel and the at least one App channel are marked respectively.

The channel map service providing method may further include detecting a third user action for requesting a recently viewed channel map, and displaying a recently viewed channel map including a broadcast channel, a human channel and an App channel displayed within a preset period, in response to the detected third user action.

In accordance with another aspect of the present disclosure, a method of providing a channel map service includes detecting a first user action for requesting a channel map, and displaying a channel map including at least one human channel in response to the detected first user action. The channel map may include a connection state mark indicating an online state of an owner of the at least one human channel. The channel map may further include at least one broadcast channel and at least one App channel.

The connection state mark may include a first connection state mark indicating a first online state for representing whether or not the owner is online via an electronic device, and a second connection state mark indicating a second online state for representing whether or not the owner is logged in to a server. Information about the first online state may be received from the electronic device or the server.

The channel map service providing method may further include transmitting information, indicating that the owner of the human channel is online via the electronic device, to at least one electronic device associated with the at least one human channel or to the server.

The transmitting to the electronic device may include reading a human address associated with a channel number from a stored human channel map, acquiring an address of the electronic device based on the read human address, and transmitting information, indicating that the owner is online, using the acquired address. The human address may include at least one of an e-mail address, an account name, a family name or a Session Initiation Protocol-Uniform Resource Locator (SIP-URL). The address of the electronic device may include at least one of a Media Access Control (MAC) address, an Internet Protocol (IP) address, a port number, a Domain Name System (DNS) name or a Uniform Resource Locator (URL).

In accordance with a further aspect of the present disclosure, an electronic device includes an interface configured to detect a user action, and a controller configured to control displaying a first channel map on a screen on which content is being displayed, detect a first user action for requesting channel map switch, and switch the displayed first channel map to a second channel map in response to the detected first user action, and one of the first channel map and the second channel map is a human channel map including at least one human channel.

In accordance with another aspect of the present disclosure, a method for providing a channel scan interface includes displaying a plurality of menu items to select service types, detecting a user action for selecting one of the plurality of displayed menu items, scanning information to construct a channel of the service type indicated by the selected menu item in response to the detected user action, and displaying the result of scan. One of the service types may be a human channel. The service types may further include at least one of a broadcast channel or an App channel.

The scanning may include transmitting a signal to request information about a friend to a server and receiving the information about the friend from the server. The information about the friend may include a single SNS account, or may include one or more SNS accounts.

The displaying the result of scan may include displaying the single SNS account, or displaying at least one of the one or more SNS accounts.

The method for providing the channel scan interface may further include assigning a first channel number to the single SNS account or to one of the one or more SNS accounts.

The method for providing the channel scan interface may further include assigning the first channel number to at least one SNS account among other SNS accounts of a friend associated with the SNS account to which the first channel number has been assigned.

The first channel number may be equal to a channel number assigned to another SNS account of the friend associated with the single SNS account. The first channel number may be a channel number assigned to a broadcast channel or an App channel.

In accordance with another aspect of the present disclosure, an electronic device includes a controller configured to control display of a plurality of menu items for selecting service types, detect a user action for selecting one of the plurality of displayed menu items, control scan of information to construct a channel of the service type indicated by the selected menu item in response to the detected user action, and a display to display the result of scan. One of the service types may be a human channel.

In accordance with another aspect of the present disclosure, a method for providing service information, includes receiving event information including information about at least one event, mapping one of the at least one events or one or more events to one of at least one channel numbers by use of a channel map including the at least one channel number and at least one Social Network Service (SNS) account assigned to the at least one channel number and an SNS account included in the received event information, and displaying one of the at least one channel numbers or one or more channel numbers and at least a part of information about the event mapped to one of the at least one channel numbers or the one or more channel numbers. The event may be uploaded to an SNS site including the SNS account. The event may include at least one of a schedule, a function, a memorial day or content. The event information may include an SNS account associated with the event, and further includes at least one of information about an SNS site to which the event has been uploaded, information about the type of the event, the title of the event, the date of the event or detailed information about the event. The channel map may be a human channel map. At least a part of the displayed information may be the title of the event. The method may further include displaying at least one of an icon indicating an SNS site to which the mapped event has been uploaded or an icon of the mapped event.

A broadcast channel may be further assigned to one of the at least one channel numbers or the one or more channel numbers. A plurality of SNS accounts may be assigned to one of the at least one channel numbers or the one or more channel numbers.

One of the at least one events or one or more events may be mapped to a channel number, to which an SNS account associated with the event is assigned.

One of the at least one channel numbers or the one or more channel numbers and at least a part of the displayed information may be displayed in a calendar form.

The calendar form may be configured such that the displayed one channel number or one or more channel numbers are listed in columns, dates are listed in rows, and at least a part of the displayed information is displayed on a corresponding region on the basis of the channel number columns and the date rows. At least a part of information about a plurality of events may be separately displayed on the region. A reminder mark may be further displayed on the region.

The method for providing service information may further include detecting a first user action for selecting the region or a region on which the date is displayed, detecting a second user action for dragging the selected region, detecting a third user action for dropping the dragged region, and displaying a particular date after a certain time has elapsed in response to the detected third user action and at least a part of information about an event of the date.

The method for providing service information may further include detecting a user action for selecting a region located at a row, containing a region on which a user channel number is displayed, from among a region on which one of the at least one channel numbers or the one or more channel numbers are displayed, and displaying a graphical user interface to produce an event in response to the detected user action.

The method for providing service information may further include detecting a user action for selecting a region on which at least a part of information about the mapped event is displayed, and displaying detailed information about the event in response to the detected user action.

The method for providing service information may further include detecting a user action for selecting a region on which one of the at least one channel numbers or the one or more channel numbers are displayed, and displaying content of a human channel indicated by the channel number in response to the detected user action.

The method for providing service information may further include detecting a user action for selecting a region on which at least a part of information about the mapped event is displayed, and displaying a list of at least one piece of content associated with the event in response to the detected user action.

In accordance with a further aspect of the present disclosure, an electronic device includes a network interface configured to receive event information including information about at least one event, a storage unit configured to store at least one channel number and at least one SNS account assigned to the at least one channel number, and a controller configured to map one of the at least one events or one or more events to one of the at least one channel numbers by use of the stored SNS account and an SNS account included in the received event information and to construct a guide screen for displaying one of the at least one channel numbers or the one or more channel numbers and at least a part of information about the event mapped to one of the at least one channel numbers or the one or more channel numbers.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying event information and channel information associated with a channel number in a multi-functional display device, the method comprising:
    receiving at a network interface information related to at least one event;
    receiving at the multi-functional display device channel registration information from a user, the channel registration information including a human address associated with an individual;
    mapping at a controller the channel registration information and the at least one event to a channel number using a channel map, wherein the multi-functional display device requests the channel number from the user from available channels, receives from the user a selection of a channel number from the available channels to associate with the individual, and associates the human address to the selected channel; and
    displaying at least a portion of the channel information and the corresponding channel number on a display, the channel information including the channel registration information,
    wherein the channel map includes a first channel number for displaying broadcast programs and a second channel number for displaying content associated with the channel information, the content including information on at least one of a name, a Social Network Service (SNS) account, or an e-mail account of the individual,
    wherein the multi-functional display device is configured to connect the user to the individual associated with the channel number interactively, based on a selection of the second channel number displayed on the display, and display contents related to the second channel number when the user selects to connect with the individual associated with the second channel number, the contents including channel information for a channel which the connected individual is viewing and activity of the connected individual, and
    wherein the event information is mapped to the second channel number and the SNS account associated with the second channel number.

2. The method of claim 1, wherein the channel registration information includes account information for the SNS account associated with the human address, and at least one of a SNS server address, a SNS name, an identification associated with the SNS account, or a description about the SNS account.

3. The method of claim 1, wherein the mapped channel registration information and the corresponding channel number are displayed in an electronic programming guide (EPG).

4. The method of claim 1, wherein the mapped channel registration information and the corresponding channel number are displayed in a grid, and wherein the channel numbers are listed in a first column of the grid, and the channel information is displayed in a region of the grid that corresponds to the channel number.

5. The method of claim 4, further comprising:
    detecting an input on the grid to select and drag the grid in a prescribed direction; and
    displaying one or more columns corresponding to one or more additional data based on the selection.

6. The method of claim 4, further comprising:
    detecting a selection of a second region on the grid;
    displaying a graphical user interface (GUI) to create an event based on the selection;
    associating the new event to a channel number and date; and
    transmitting information associated with the new event to an SNS server associated with the new event.

7. The method of claim 4, further comprising:
    detecting a selection of the displayed channel map on the grid; and
    displaying additional information related to the selected channel in response to the detected selection.

8. A multi-functional display device comprising:
    a display for displaying broadcast programs and data;
    a network interface configured to receive channel registration information associated with a human address associated with a social network service (SNS) account for an individual or entity;
    a storage unit configured to store at least one channel number and at least one SNS account information assigned to the at least one channel number; and
    a controller configured to map the channel registration information and an event to a channel number using a channel map, wherein the multi-functional display device requests the channel number from the user from available channels, receives from the user a selection of a channel number from the available channels to be associated with the individual, associates the human address to the selected channel,
    wherein the controller is further configured to display at least a portion of the channel information and the corresponding channel number on the display, the channel information including the channel registration information,
    wherein the channel map includes a first channel number for displaying broadcast programs and a second channel number for displaying content associated with the channel information, the content including information on at least one of a name, a Social Network Service (SNS) account, or an e-mail account of the individual, and
    wherein the controller is further configured to connect the user to the individual associated with the channel number interactively, based on a selection of the second channel number displayed on the display, and display contents related to the second channel number when the user selects to connect with the individual associated with the second channel number, the contents including channel information for a channel which the connected individual is viewing and activity of the connected individual.

* * * * *